United States Patent [19]

Edison et al.

[11] 4,138,669
[45] Feb. 6, 1979

[54] REMOTE MONITORING AND CONTROLLING SYSTEM FOR SUBSEA OIL/GAS PRODUCTION EQUIPMENT

[75] Inventors: David M. Edison, Murrysville; Fred S. Marton, Monroeville, both of Pa.; John N. Ucovich, San Jose, Calif.

[73] Assignee: Compagnie Francaise des Pétroles "TOTAL", Paris, France

[21] Appl. No.: 466,392

[22] Filed: May 3, 1974

[51] Int. Cl.$^2$ .......................... H04Q 9/00; G05B 9/03; G05D 7/00; G06F 15/46
[52] U.S. Cl. ............................... 340/147 R; 340/163; 364/120; 364/115
[58] Field of Search ................ 340/151, 163, 213 Q, 340/147 R; 235/151.1, 151.3

[56] References Cited

U.S. PATENT DOCUMENTS

| | | | |
|---|---|---|---|
| 3,516,063 | 6/1970 | Arkin et al. | 340/151 X |
| 3,519,807 | 7/1970 | Jaques et al. | 235/151.1 |
| 3,717,849 | 2/1973 | Thornton, Jr. | 340/151 X |
| 3,832,688 | 8/1974 | Strojny et al. | 340/147 R |
| 3,845,472 | 10/1974 | Buchanan et al. | 340/147 R |
| 3,855,456 | 12/1974 | Summers et al. | 340/213 Q |

Primary Examiner—Donald J. Yusko
Attorney, Agent, or Firm—Ernest F. Marmorek

[57] ABSTRACT

A remote monitoring and controlling system for sub-sea oil/gas production equipment includes a control station for generating an appropriate digital code signal to accomplish a desired function and a cooperating remote station system for receiving the signal and processing it in order to perform the selected function after the receipt of the signal is confirmed at the control system and an execute digital signal is generated at the control system.

16 Claims, 115 Drawing Figures

OP CODE SELECTOR CIRCUIT

DATA SCANNER

MULTIPLEXING OUTPUT TO BUFFER

FIG 13 CLOCK DISTRIBUTION

BUTTON SCAN I

CKT B #1
INPUT CIRCUIT #1

FIG 18 BEACON INPUT CIRCUIT #1

FIG 20 PUMP #2 INPUT CIRCUIT #1

FIG 21 AUTO/MAN CONTROL INPUT CIRCUIT #1

SPARE INPUT CIRCUIT #1

FIG 23 CHOKE CONTROL INPUT CIRCUIT #6

SHIP IN CONTROL
INPUT CIRCUIT #1

FIG 25 WING VALVE INPUT CIRCUIT #1

FIG 27 MASTER VALVE INPUT CIRCUIT #1

FIG 28 SYSTEM A/B INPUT CIRCUIT #1

DHSV OPEN/CLOSE
INPUT CIRCUIT #1

LINES OPEN/BLOCK
INPUT CIRCUIT #1

ALARM SCAN

FIG 36 ANALOG CALIBRATION & INPUT CIRCUIT #5

INPUT CIRCUIT #4 EXECUTE

FIG 38 EP ALARM SET INPUT CIRCUIT #2

FIG 39 ES ALARM SET INPUT CIRCUIT #2

LOW FLOWLINE PRESSURE
ALARM SET
INPUT CIRCUIT #2

INPUT CIRCUIT #3

ALARM LEVEL SET BUTTON SCAN

LAMP DRIVERS

FIG 45 EXECUTE CONTROL

FIG 46 DISPLAY DECODING

FIG 47 DISPLAY DECODING I

DISPLAY CODING II

FIG 49 DISPLAY DECODING

FIG 50 DISPLAY DECODING

LAMP DRIVERS

LAMP DRIVERS

LAMP DRIVERS

LAMP DRIVERS

LAMP DRIVERS

LAMP DRIVERS

LAMP DRIVERS

LAMP DRIVERS

LAMP DRIVERS

LAMP DRIVERS

LAMP DRIVERS

LAMP TEST DIODE & RELAY CIRCUIT I

LAMP TEST
DIODE &
RELAY
CIRCUIT II

LAMP TEST DIODE & RELAY CIRCUIT I

LAMP TEST DIODE &
RELAY CIRCUITRY II

DATA TRANSMITTER

FIG 68 DATA RECEIVER

XMTR/RECEIVER I

SUBSEA PCR RECEIVER

FIG 72 SUBSEA STT RECEIVER

SUBSEA STT TRANSMITTER

CLOCK DISTRIBUTION

COMMUNICATION CIRCUITS

FIG 77 SYSTEM A/B BOARDS

FIG 78 SYSTEM A SYSTEM B SELECTOR

SYSTEM A/B BOARDS

SYSTEM A/B BOARDS
PCR STT SELECTOR

FIG 82 SYSTEM B BOARD ONLY SYSTEM A/B SELECTOR

SYSTEM A/B BOARDS
INPUT-OUTPUT CONTROL

FIG 84 SYSTEM A/B BOARDS
WELL ENABLE & OP CODE DECODER

FIG 85 SYSTEM A/B BOARDS ALARM LEVEL CONFIRM

FIG 86 SYSTEM A/B BOARDS ALARM LEVEL SELECTOR

SYSTEM A/B BOARDS
CONTROL CONFIRM
EXECUTE ACKNOWLEDGE

FIG 88 SYSTEM A/B BOARDS CONTROL EXECUTE SHIP IN CONTROL

SYSTEM A/B BOARDS
OUTPUT MULTIPLEXER
ADDRESS

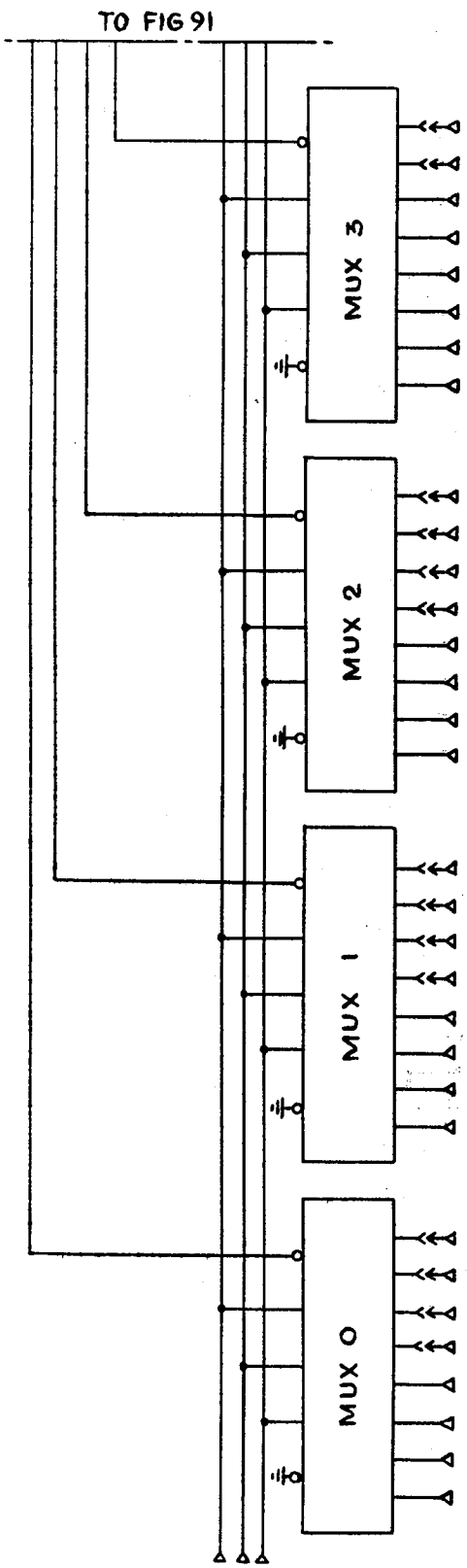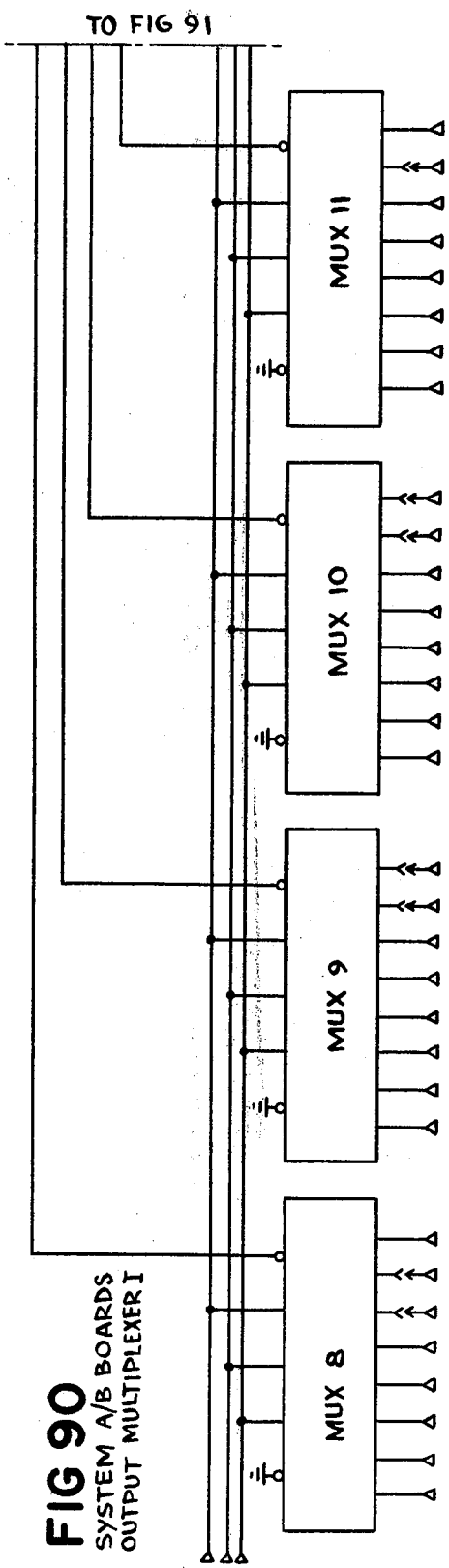
FIG 90 SYSTEM A/B BOARDS OUTPUT MULTIPLEXER I

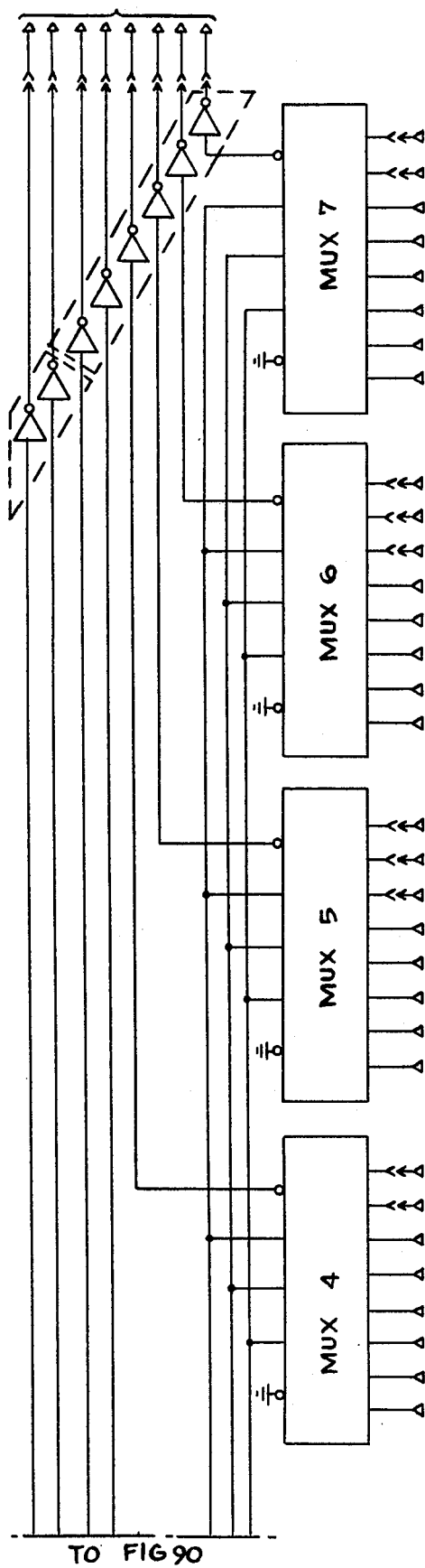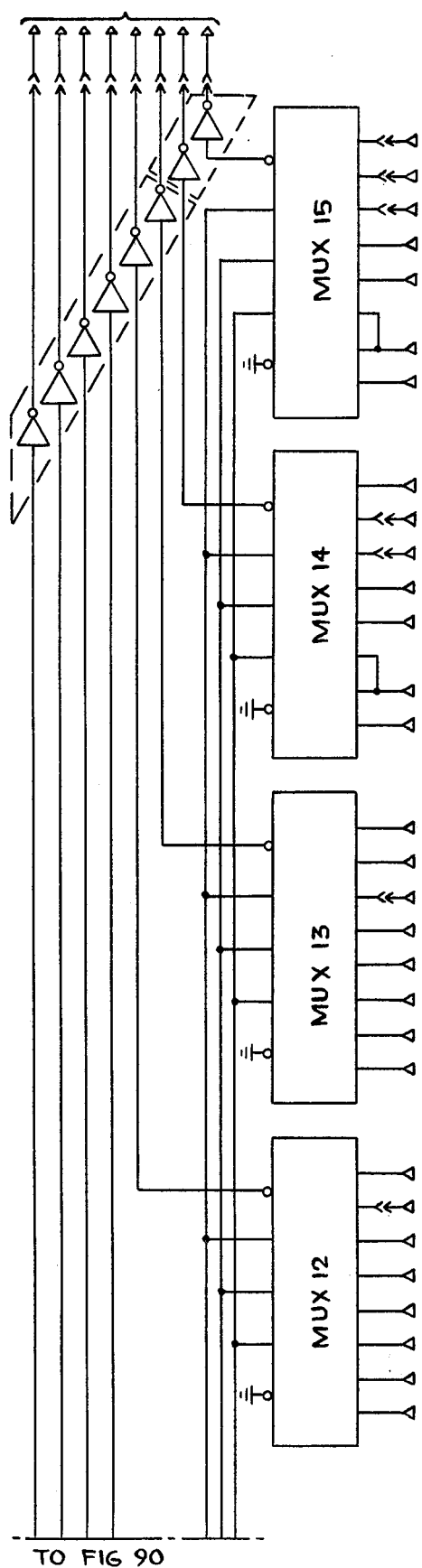
FIG 91
SYSTEM A/B BOARDS OUTPUT MULTIPLEXER II

SYSTEM A/B BOARDS
ANALOG INPUT NETWORK

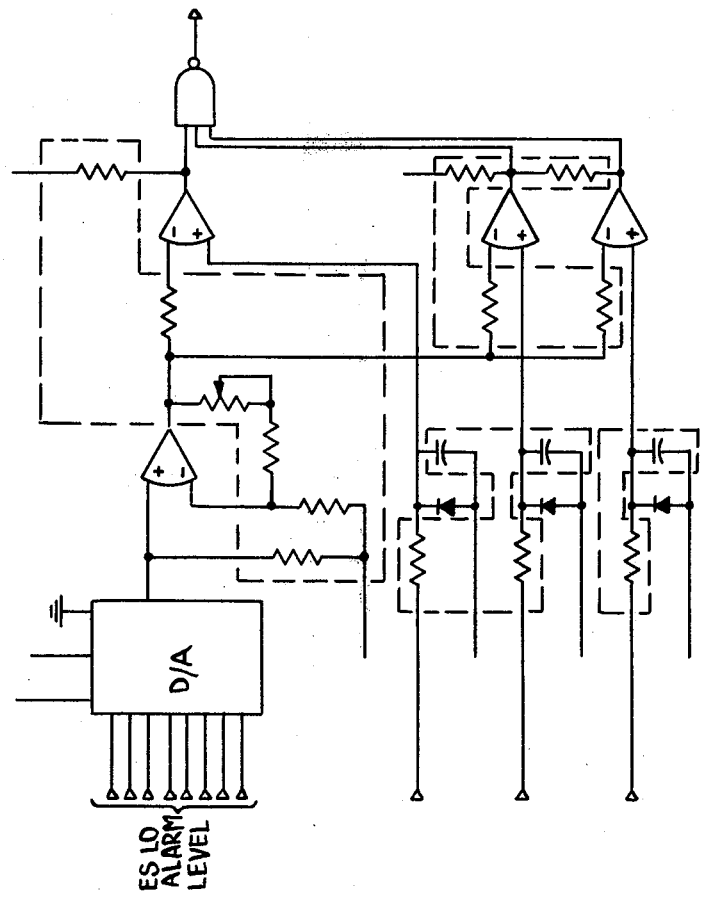
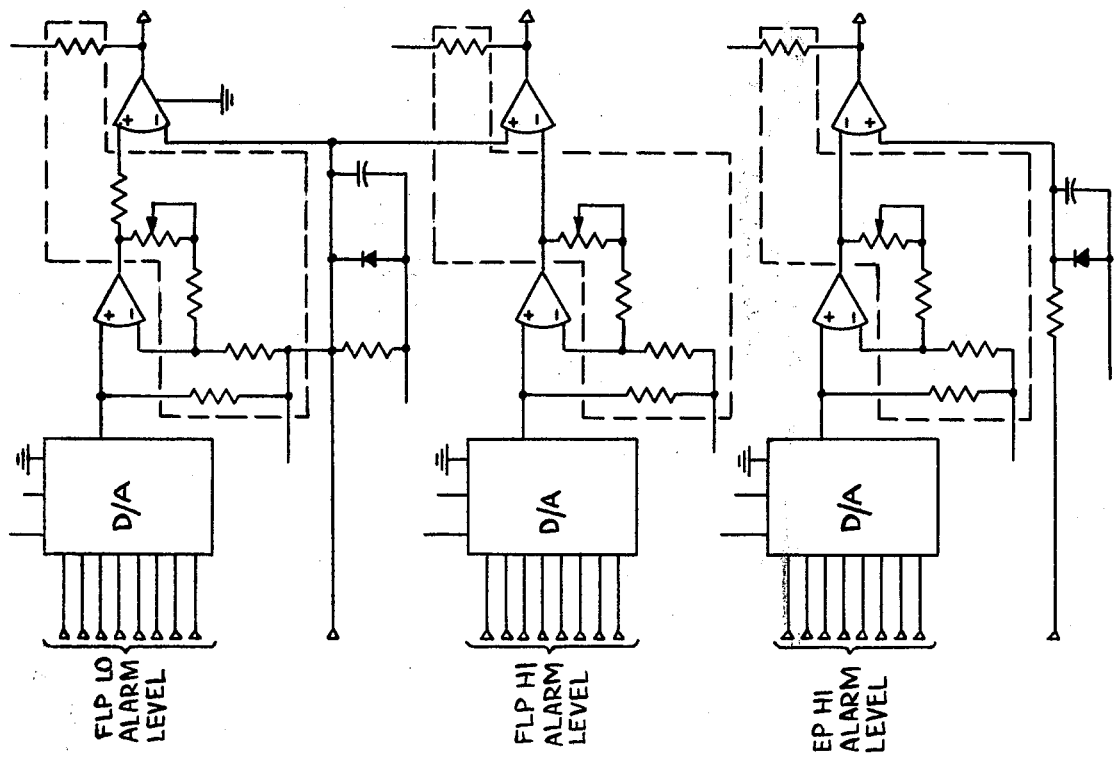
FIG 94 SYSTEM A/B BOARDS LEVEL SET ALARM

SYSTEM A/B BOARDS
FIXED LEVEL ALARMS

SYSTEM A/B BOARDS
CALIBRATING VOLTAGE, SYSTEM CLEAR
& VALVE POSITION ALARM

FIG 98 CHOKE CONTROL & POSITION COUNTER (COMMON)

PUMP CONTROL (COMMON)

DOWN HOLE SAFETY
VALVE CONTROL (COMMON)

DC CONTROL OUTPUT INTERFACE

DC CONTROL OUTPUT INTERFACE

OUTPUT CONTROL CHASSIS

OUTPUT SYSTEM CLEAR & DC CONTROL OUTPUT INTERFACE

DIGITAL CONTACT
INTERFACE (COMMON)

DIGITAL CONTACT
INTERFACE (COMMON)

DIGITAL CONTACT
INTERFACE (COMMON)

DIGITAL CONTACT
INTERFACE (COMMON)

DIGITAL CONTACT
INTERFACE (COMMON)

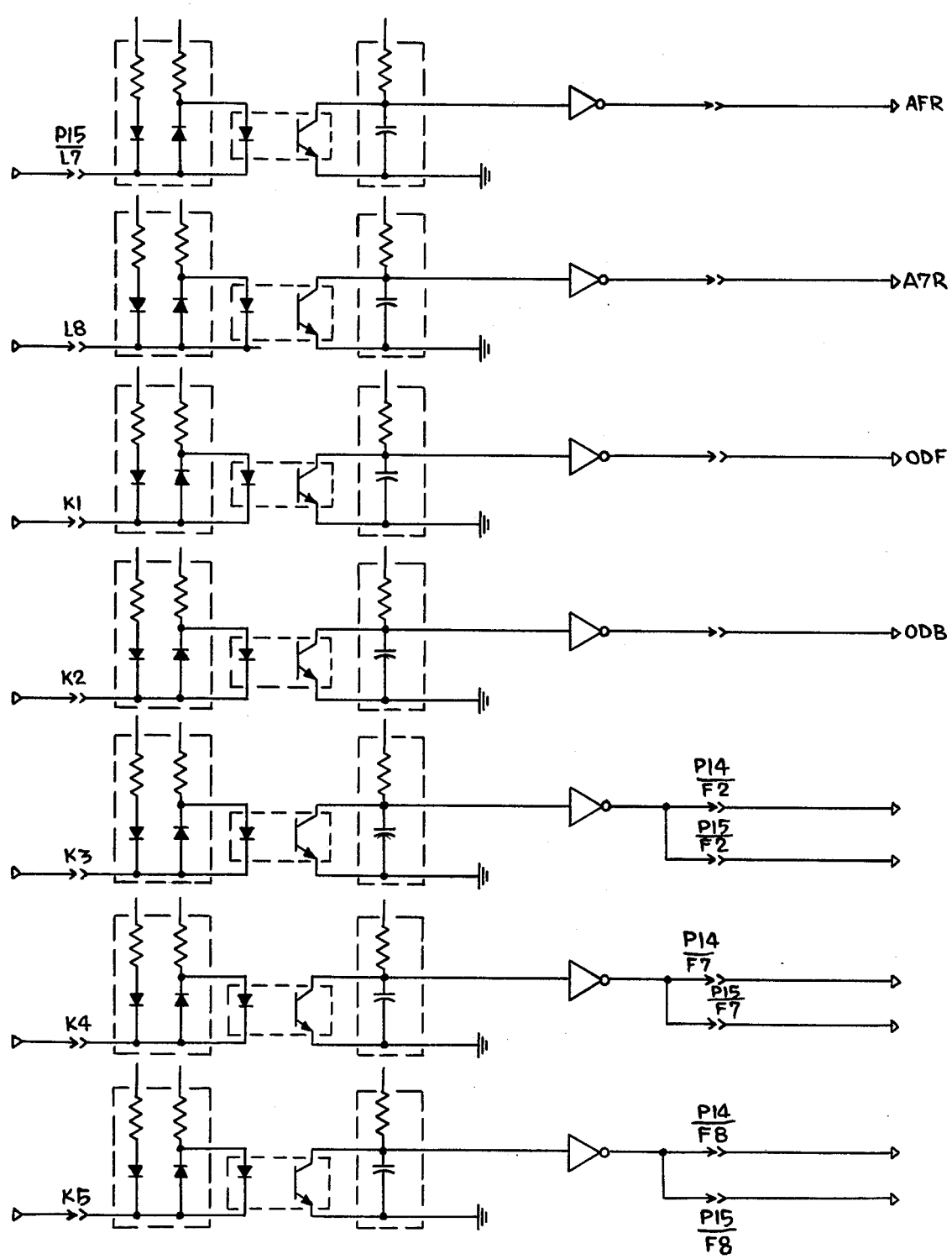
FIG III
DIGITAL CONTACT INTERFACE (COMMON)

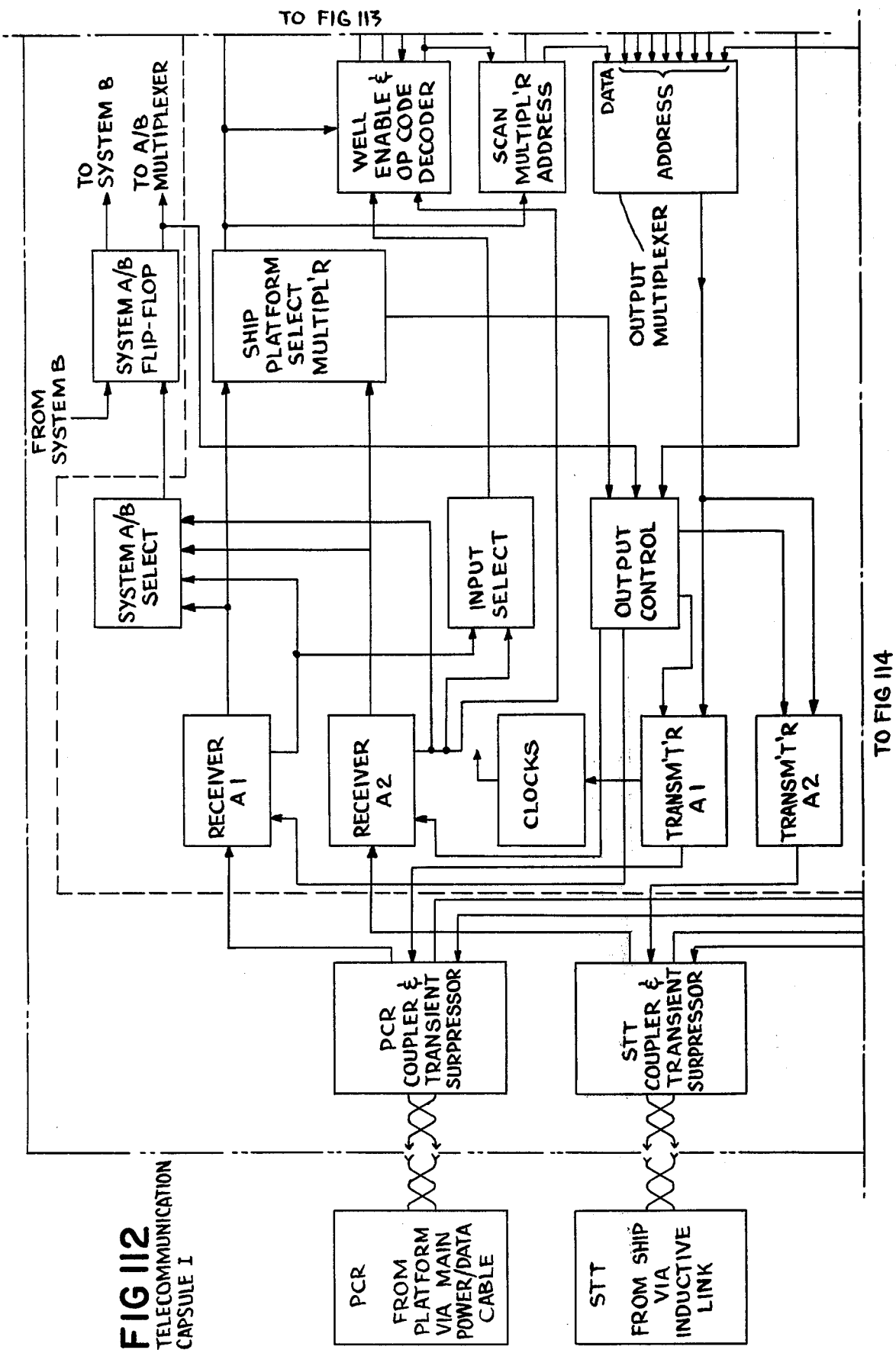

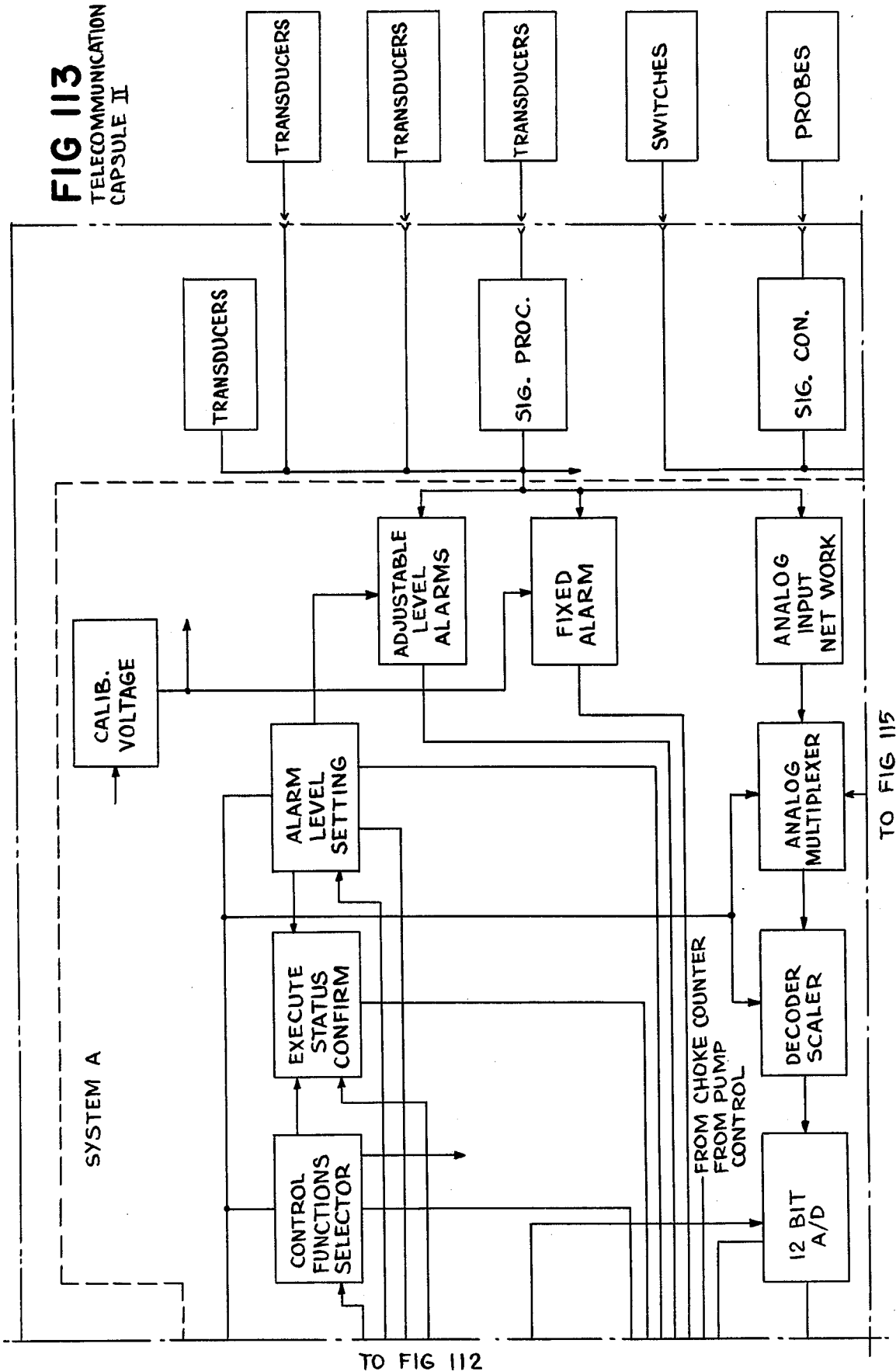

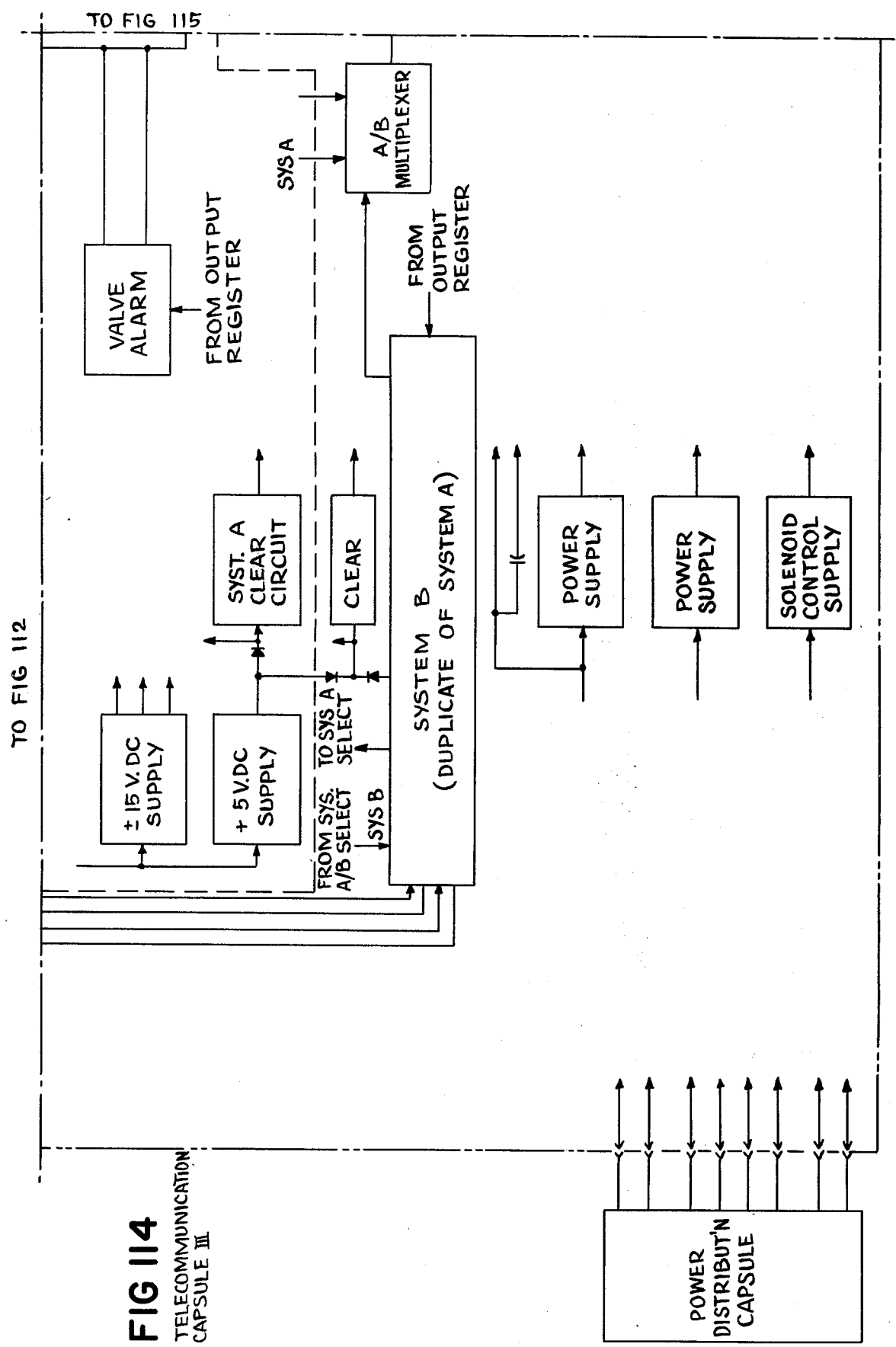

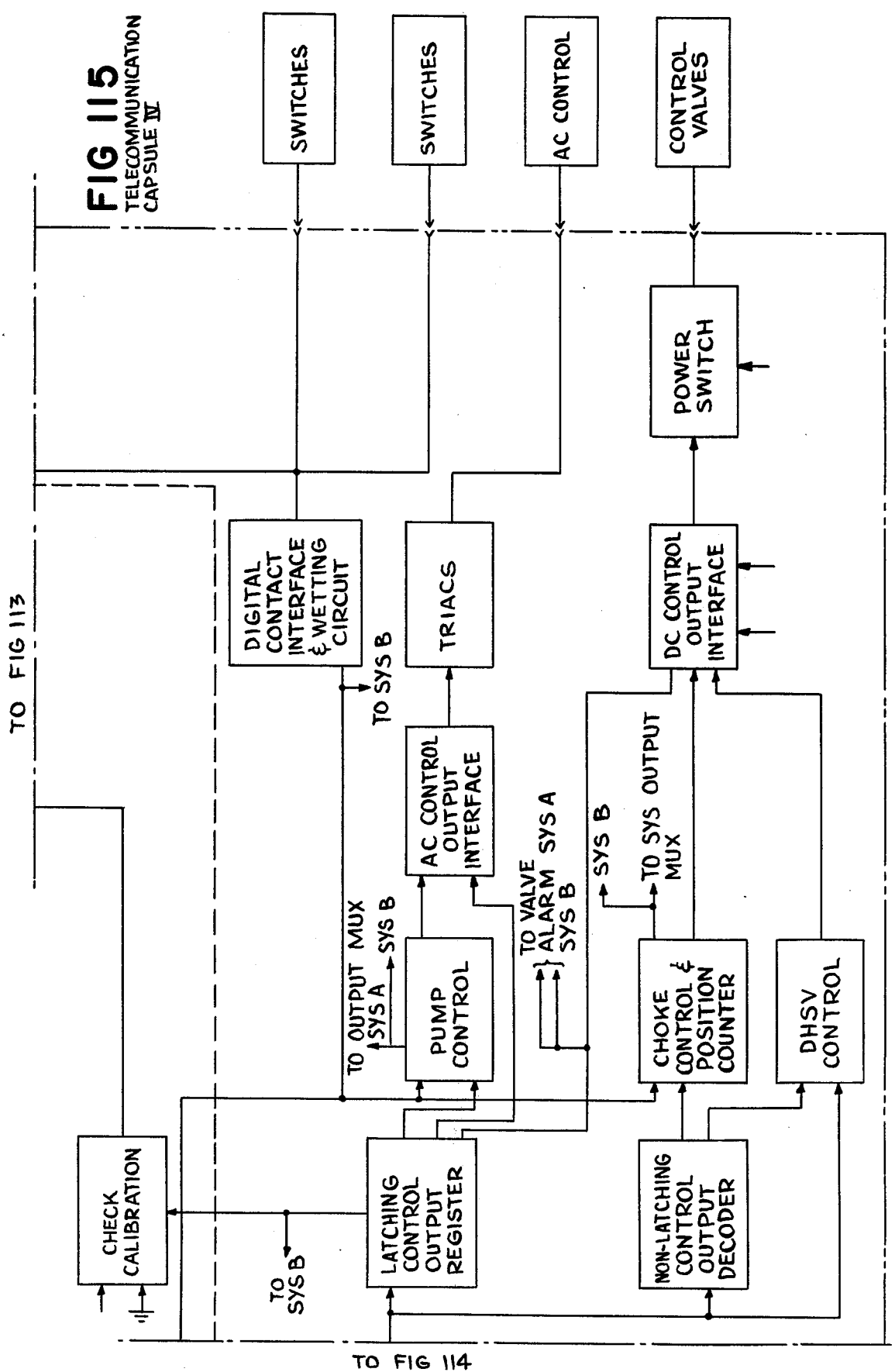
FIG 115 TELECOMMUNICATION CAPSULE IV

# REMOTE MONITORING AND CONTROLLING SYSTEM FOR SUBSEA OIL/GAS PRODUCTION EQUIPMENT

BACKGROUND OF THE INVENTION

The present invention relates to a system for the remote monitoring and controlling of functions of syb-sea oil/gas production equipment.

Present day demands for energy have resulted in increased activities in the search for sub-sea oil and gas in water depths to 1500 feet and distances from land up to 20 miles. Many of the sub-sea operations include multiple combinations of sub-sea oil/gas wells and associated workover equipment including marine risers and equipment for operating various tools.

The increased complexity of sub-sea oil/gas field operations has resulted in the requirement for electronic equipment for the monitoring and controlling of the equipment at the various sub-sea wells.

The present invention is not only reliable and economical but is suited for module construction and can be expanded to monitor and control additional wells.

SUMMARY OF THE INVENTION

One of the principle objects of the invention is a system for the remote monitoring and controlling of functions of sub-sea oil/gas production equipment wherein a control station generates a plurality of coded signals for transmission to a remote station for the monitoring and control of the production equipment.

Another object of the invention is a control station, for use in a system for the remote monitoring and controlling functions of sub-sea oil/gas production equipment, featuring a system which can transmit a digital code to a remote station for performing a predetermined function upon the confirmation of the receipt of the signal and an order to execute.

Another object of the invention is a remote station, for use in a system where the remote monitoring and controlling of functions of sub-sea oil/gas production equipment wherein a control station generates a plurality of coded signals for transmission to the remote station for the monitoring and controlling of sub-sea equipment.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements, and parts, as set forth in the claims hereof, certain embodiments of the same being illustrated in the accompanying drawings and described in the Specification.

The invention accordingly comprises the features of construction, combination of elements and arrangement of parts which will be exemplified in a construction hereinafter set forth and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawings, in which:

FIGS. 7 to 115 shows a preferred embodiment for the present invention.

DESCRIPTION OF THE PREFERRED EMBODIMENTS

SECTION I

SYSTEM OPERATION

The present system is suited for the remote monitoring and control of sub-sea oil/gas production equipment in water depths as deep as 1500 feet and distances from land as far as 20 miles with a control station located either at an offshore platform or shipboard faced. The flexibility of the system permits its use with either single or multiple combinations of sub-sea oil/gas wells and associated workover equipment including marine risers and equipment handling tools.

Figure 1:
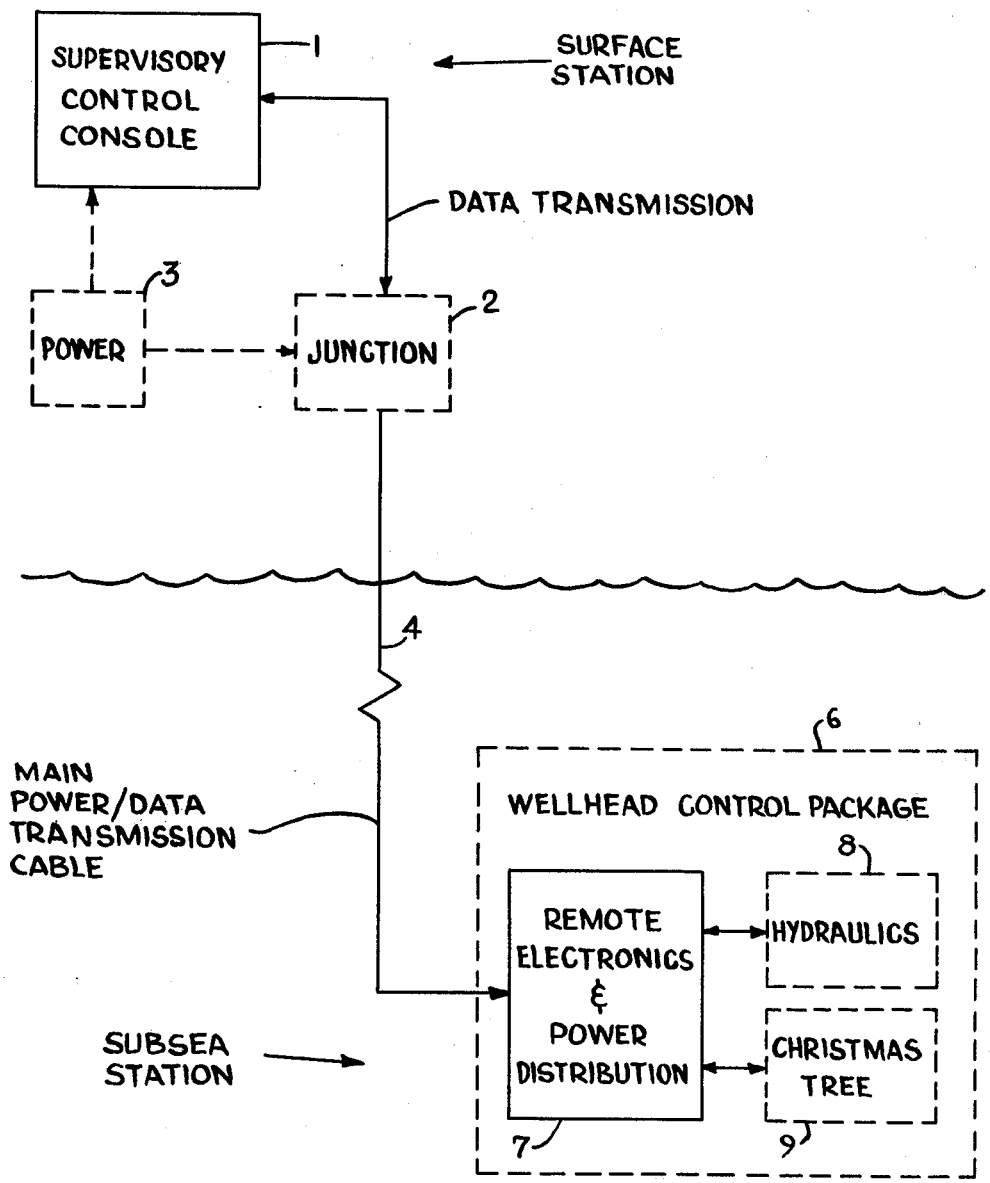
FIG. 1 shows the present invention for use with a single well.
Figure 2:
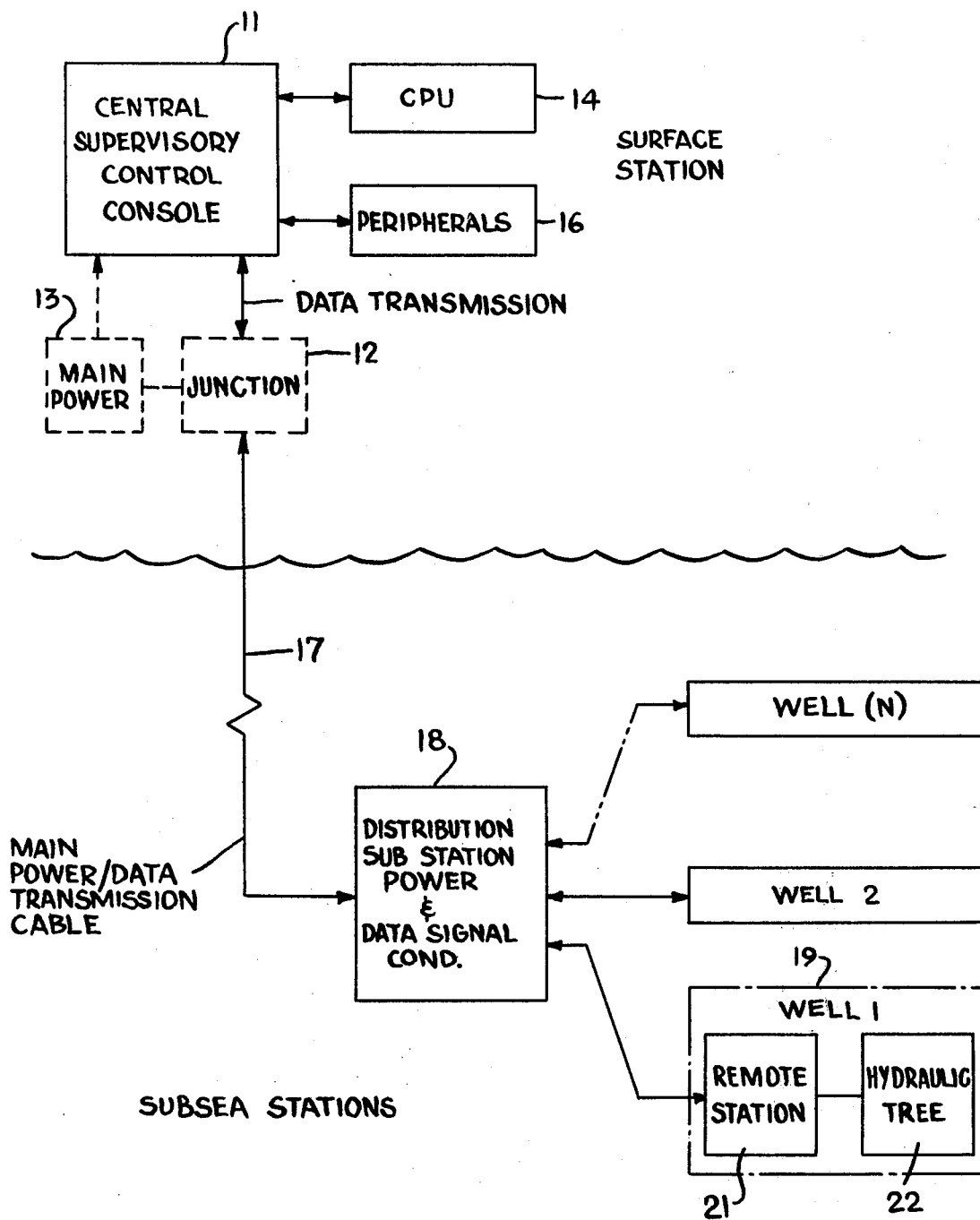
FIG. 2 shows the present invention for use with more than one well.
Figure 3:
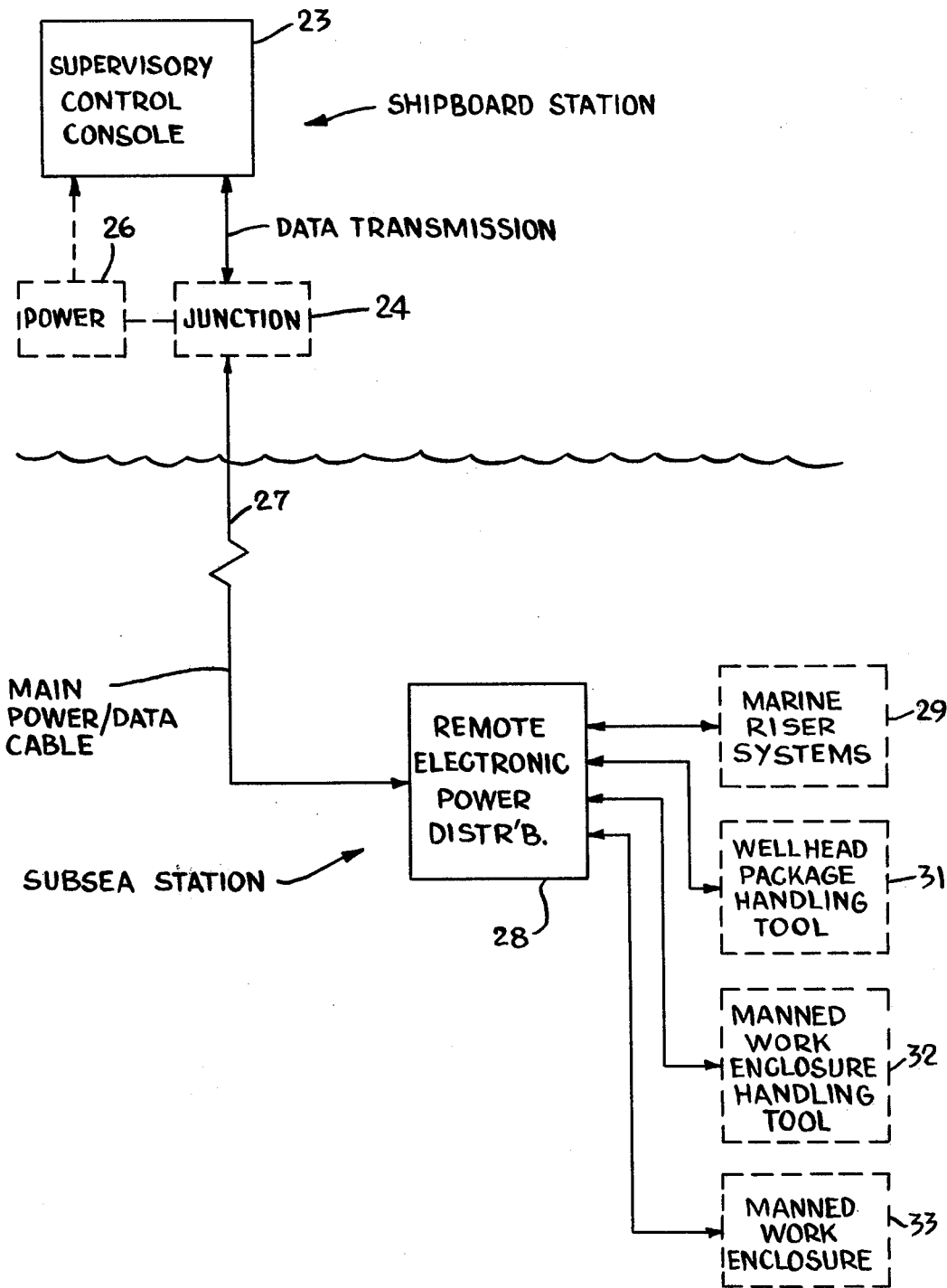
FIG. 3 shows the present invention for a control station located shipboard.

The basic configuration of the system is shown in FIGS. 1 to 3. FIG. 1 shows a control station suited for surface operation and including a supervisory control consul 1, a junction 2 for the power transmission of data signals, and a power distribution center 3.

A main power/data transmission cable 4 communicates the control station to a wellhead control package 6 wherein a remote electronics and power distribution system 7 distributes the process data to the hydraulics 8 on the basic apparatus mounted at the wellhead used to control and regulate the well production, Christmas Tree 9.

FIG. 2 shows another embodiment similar to the system of FIG. 1 but suited for multi-well control. In this embodiment, the control station includes central supervisory control consul 11 which corresponds to the supervisory consul 1 but has further modules for the control of additional wells and for both manual and CPU operations. Junction 12 serves as a power driver for the transmission of data. A main power source 13 drives the control station. A CPU 14 provides automatic operation and peripheral 16 permits the usual monitoring of the control station by a human operator. Cable 17 interconnects the control station with the sub-sea station at distribution sub-station 18 which interconnects to wells 19. Typically, each well includes a remote station 21 and a hydraulics and Christmas Tree system 22 driver.

FIG. 3 shows a system similar to FIG. 2 but suited for a control station located shipward. Supervisory control console 23 and power junction 24 are energized by power source 26 and communicate over cable 27 to remote electronics and power distributor 28 which is interconnected to marine riser systems 29, wellhead package handling tool 31, landwork enclosure handling tool 32, and manned work enclosure 33.

Figure 4:
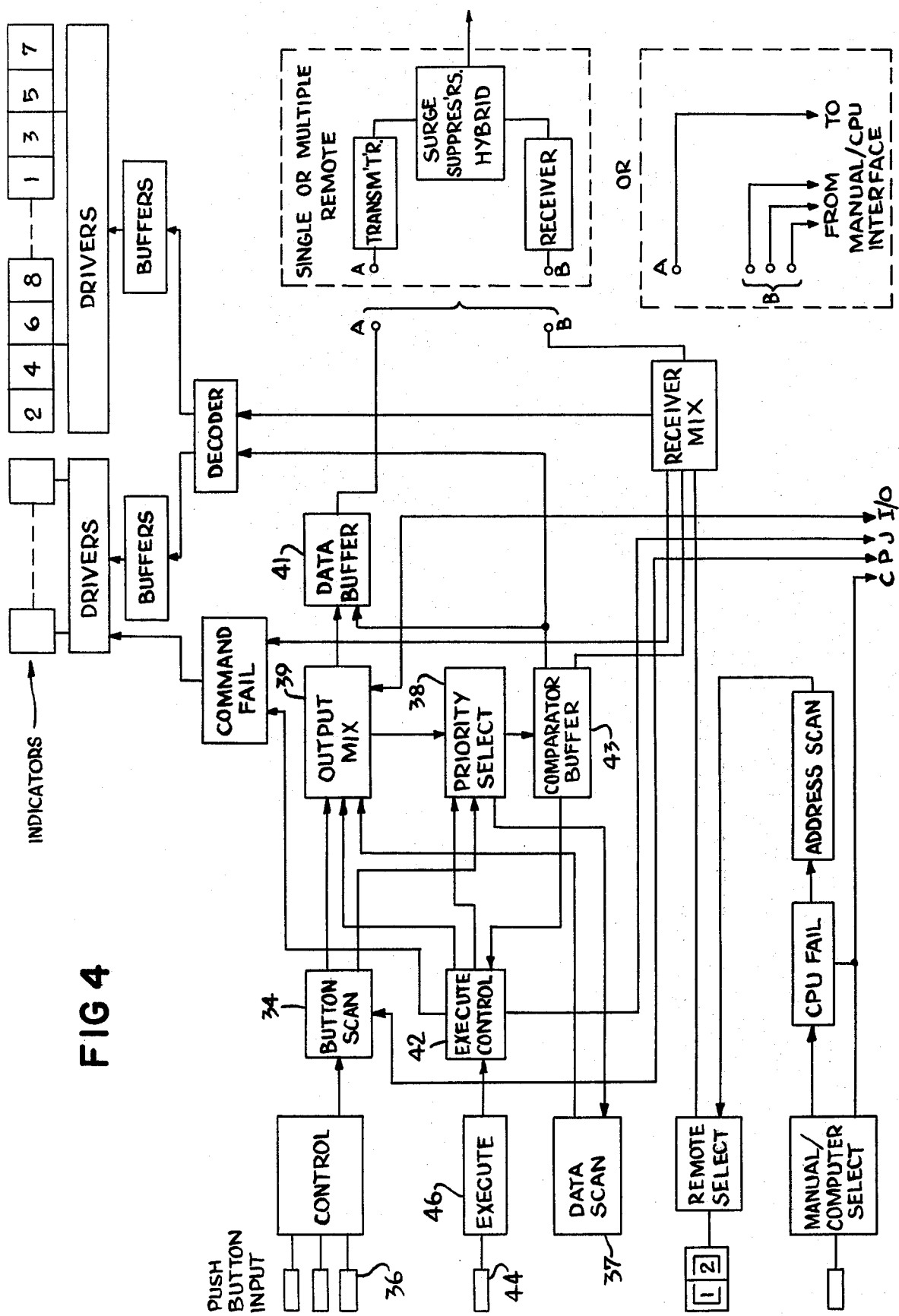
FIG. 4 shows the present control station in a block diagram for manual mode operation.

Generally, the overall system diagram for a central control station without a central processing unit or with the CPU and peripherals disabled is shown in FIG. 4.

There are three distinct commands which are initially at the console 1. These commands, listed in the order of decreasing priority are:

1. Execute. The execute command will execute a control word previously received by the sub-sea remote station with a confirmation cycle word-transmission corresponds to the previously transmitted 16-bit control word pattern at the console 1.

2. Control. The control word sets the requirement for a sub-sea control point to be set. The point to be selected is determined by decoding the control word structure. The actual execution, however, could not take place at the time the control word is received, but an intermediate sub-sea buffer or memory is loaded and the entire 16-bit control word is returned to the console 1 in the next transmission for confirmation before an execute command can be generated.

3. Request for Data. This control word initiates requests the remote station, that is, the sub-sea system, to report the status of its data memory.

In operation, the remote station sends back a signal for confirmation and that signal at the control station initiates the scanning or search of the console 1 linkward controls such as push buttons and the like. If confirmation is made that the corresponding push button control has been activated, an execute command signal is effected. If no confirmations is obtained, the request for data scan is incremented. The full 16-bit is then formed of the highest priority input and the 5-bit remote address selected. As is the usual practice, digital signals are formed from digital words and include frame pulses generated by the power drive or transmitter in order to synchronize the entire "hand shaking" operation.

FIG. 4 shows a block diagram of a control station in a manual mode. In operation, Button scanner 34 receives a frame pulse and increments a counter until it finds a push button 36 which has changed its state since the last scanning. The button canner 34 then stops and the count in the counter is retained. This action initiates the data scanner 37 and priority selector 38 to determine the button 36 status and priority in order to determine the function requested. The button scanner 34 also registers a bid in the priority scanner in the priority selector 38.

The priority scanner starts immediately upon completion of the button scanner 34 operation. The priorities are arranged in descending order starting with the execute command and finishing with a request for data scanning. The priority counter counts down until a priority request is satisfied and completion of the priority scan is signalled to the output multiplexar 39 and data buffer 41, so that an appropriate word for transmission may be generated. When the counter in the button scanner 34 reaches its final state and has not been stopped, the next clock post for the counter is gated to the data scanner 37 to advance the counter for the selection of the next data request point.

It is convenient to form the data scanner 37 counter from two synchronous counter chips. The maximum count is predetermined to preclude 20 at the end of a word frame. In some cases, a shorter update display time may be desired to show the command word and action. This may be obtained by having the counter cleared to zero following a data request. In both cases, a count is transferred to the output multiplex 39 and then to data buffer 41 for transmission.

The output multiplexar 39 and data buffer are a multiplexing stage where the execute, control, for data scan words. These work together with a 2-bit code generated by the priority selector 38 are then routed for transmission. The data buffer 41 is formed of two buffer registers and at the time of transmission, the 16-bit are gaited into one of the buffer registers and the count in the button scanner 34 is gaited into the other buffer register simultaneously. A second buffer register then either contains the address of the data returning from the sub-sea station or original command word for subsequent comparison.

The execute control 42 and comparative buffer 43 receive returning data for comparison against the content of the second buffer register in the data buffer 41. If a match is obtained, and a command word is decoded, then the execute control 42 is partially enabled. If execute button 44 has activated execute 46 after the execute control of 42 has been partially enabled, then an execute word would be transmitted following the next frame interval. Immediately thereafterward, the execute enable is reset.

Generally, a suitable panel display for the control station can be formed from data buffers, digital display drivers, land drivers, and demultiplexing circuits. These circuits are used for both manual and computer control moles. A correct display of returning data is obtained by maintaining a correspondence between display point addresses and the remote station point addresses. The problems associated with analog data can be avoided by scanning variables before analog-tool-digital conversion in the remote station unit. In the case of remarkable remote stations, information is updated on a display for the selected remote station, but each of the remote stations are scanned at one point to determine if there are any active alarms. These alarms would indicate that a maximum has been exceeded and are generated sub-sea by the differenital comparative circuits employing preset trigger or alarm levels. These conditions are logically "OR" gaited to one status point. When an operator is given an indication of an alarm, the appropriate remote station address may be selected for a full status display.

Figure 5:
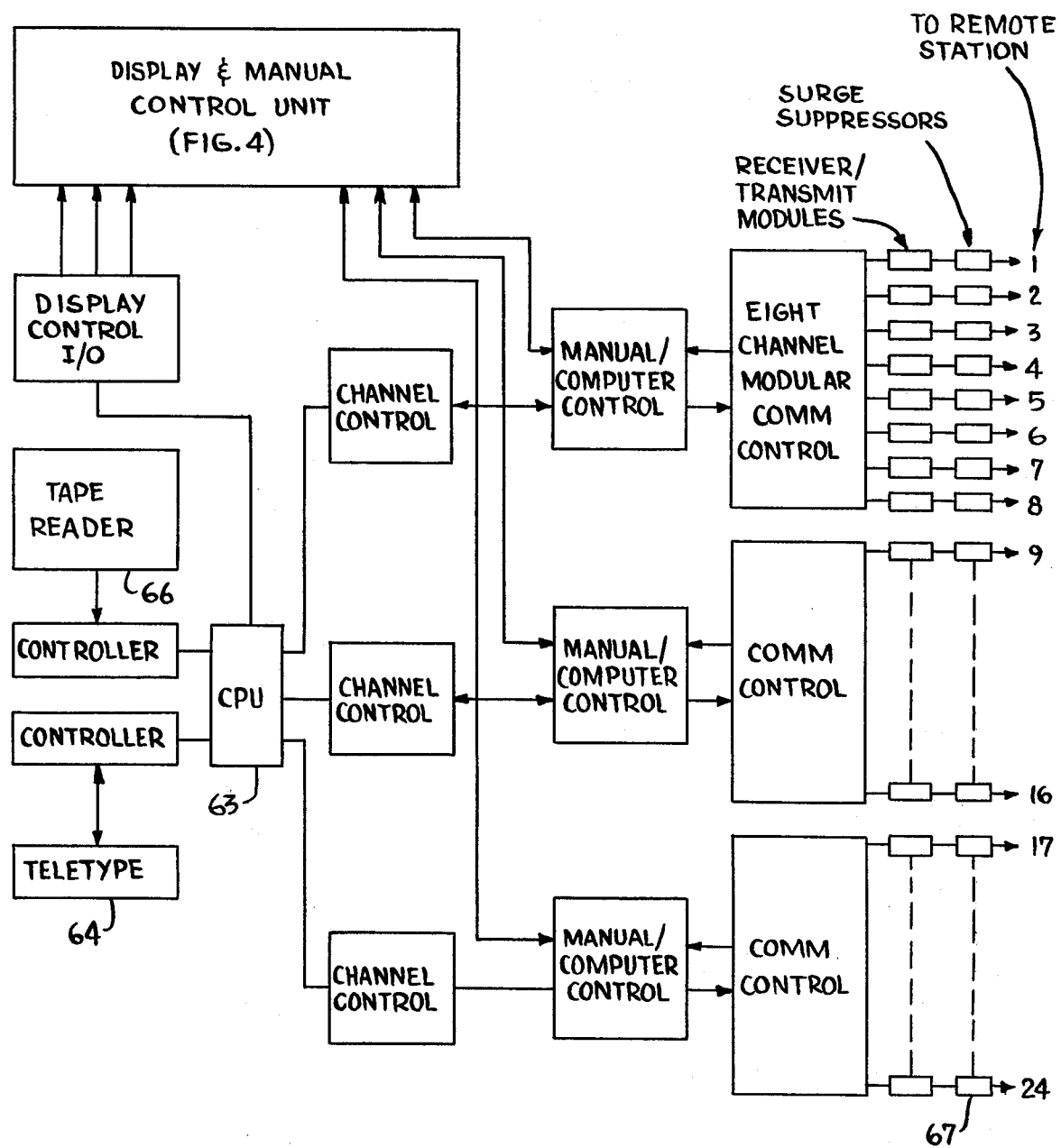
FIG. 5 shows the present control station in a block diagram for CPU mode operations.

The block diagram for a control station including a central processing unit (CPU) and peripheral devices as shown in FIG. 5. In this system, the CPU 63 plays a key role and is used in conjunction with standard peripheral devices, such as prototype 64 and paper tape reader 66. Interconnection to the CPU 63 can be accomplieshed using 16-bit input and output buffers, a 16-bit status input, and a 16-bit command output. In addition, each board can be formed to contain an interrupt line which is divided into eight sub-levels by means of the status-bit inputs. FIG. 5 shows a configuration wherein there are twenty-four remote stations 67.

The computer can be used to control accesses and control the control panel push button scan circuitry to determine the location of input buttons requiring service. The computer then collects the information contained thereat and transmits it to the remote station. Upon the receipt of an answer, the computer then places the 16-bits in the display dimultiplexar circuit and a display is affected. The execute control "hand shaking" is accomplished by the computer.

Figure 6:
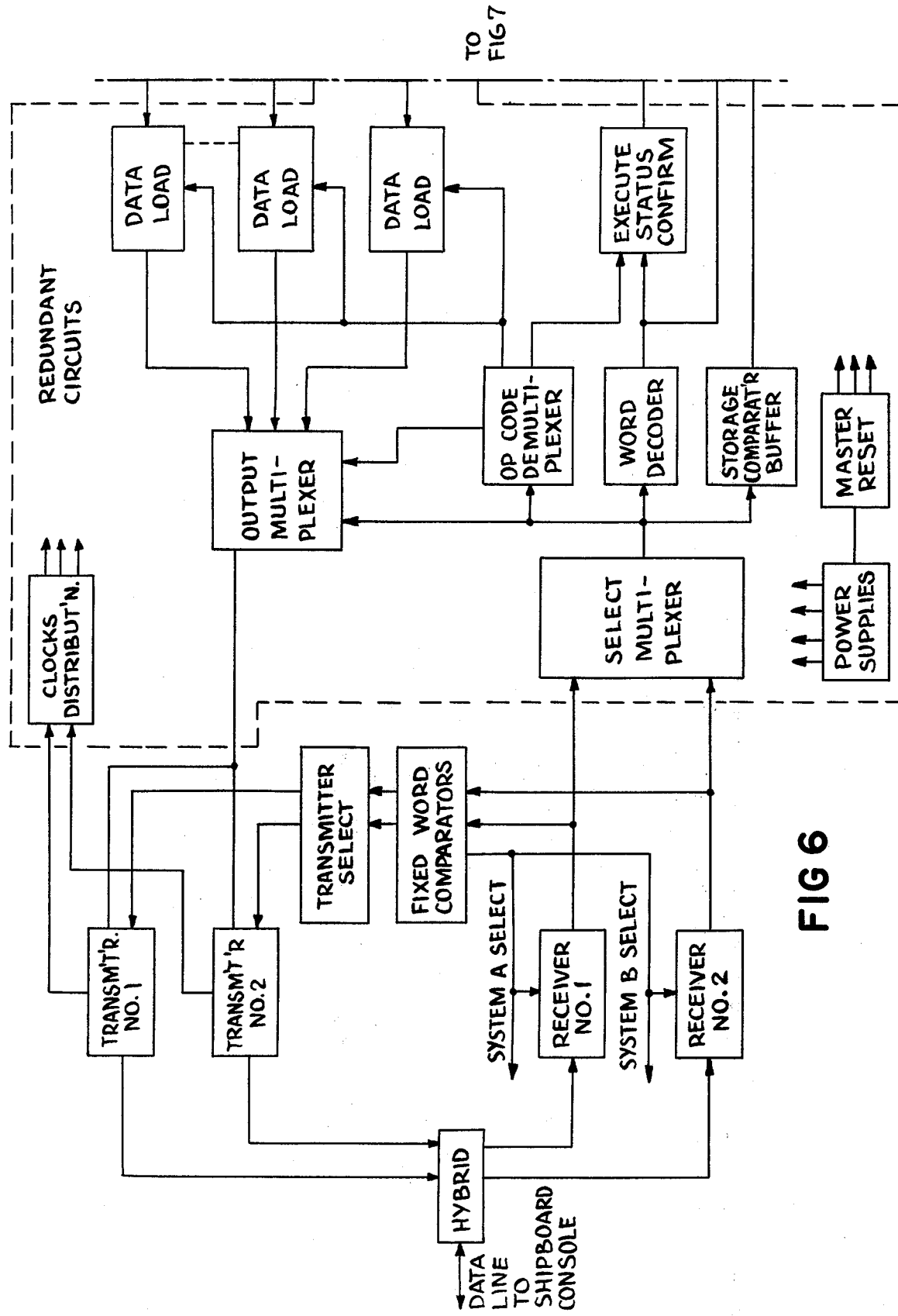
FIG. 6 shows the present remote station in a block diagram.

The overall system block diagram for a remote station is shown in FIG. 6. The remote station includes circuits for digital and analog signals, data storage, word decoding, multiplexing, and receiver-transmitter control circuits. The basic operation is directly coupled to the control system. When a command word is received from the control station, it is stored in a buffer register. The output multiplexar is then switched to transfer the data to the transmitter which are enabled so that the command word is transmitted back to the control station for confirmation. If confirmation is obtained, an execute command word may be transmitted. If such an execute command word is transmitted, this execute command word is compared with the stored word and the buffer register for all but the execute code portion of the word. If a match is obtained, the stored command word is available to carry out the selected function. This operation fully interlocks command-confirm-executed cycle to avoid errors. Systems supervisory data is obtained by the use of analog and digital sub systems. The analog sub systems include scaling amplifiers and analog-tool digital converters which convert the data to BCD format. The data sub systems receive data through LED coupled isolators to provide isolation.

A coded data transmission and receiving security may be obtained through the use of specialized transmission codes. One known device uses FSK transmission and are used in the final transmittal and receiving stages of the system. FSP cone transmissions are used because of the high loaders rejection characteristic. In accordance with known design techniques, it is advisable to increase the system reliability through the use of abundant circuits and codes of receivers and transmitters. These circuits and the transmitters and receivers can be independently selected at any time without interference to the normal operation of the system. The output signals of the two receivers can be compared at all times with reserved control command words. If either receiver should detect the command word, the control comparator will respond and transfer the data and post lines to the other receiver which is not in control at that time. Thus, only one working receiver can gain system control regardless of the operational condition of the other receiver, even if it is stored with a vowel control word. Each angular word can also be verified because the system responds to a control word. A control word will be stored and retransmitted in a normal way to verify system operation.

Generally, the remote station handles the following types of signals:

1. Control signal. A control signal causes a selected function to be performed such as a valve to close or open. Thus, a command signal or word is initiated from the control station and received at the sub-sea station, that is, the remote station.

2. Supervisory Digital Signal. This type of signal indicates the status of a control device, such as a valve position whether it is open or closed. Thus, a supervisory digital signal is initiated at the sub-sea station and received at the control station.

3. Supervisory Analog Signal. This type of signal indicates quantitative information, such as a pressure reading from a pressure transducer. Thus, this signal originates at the sub-sea station and is received at the control station.

SECTION II

SYSTEM OVERVIEW

1.0 INTRODUCTION

The SIS Telecom Control System described in this manual provides for the remote monitoring and control of the Yellow Module Subsea Wellhead Assembly in water depths to 1500 feet and a distance up to 20 miles from the platform control station. The system is a fully multiplexed digital logic control system and represents a state-of-the-art, all solid state design employing standard commercially available components.

Simplified diagrams of the system, and selected subsystems are shown in FIGS. 1 through 7.

Figure 7:
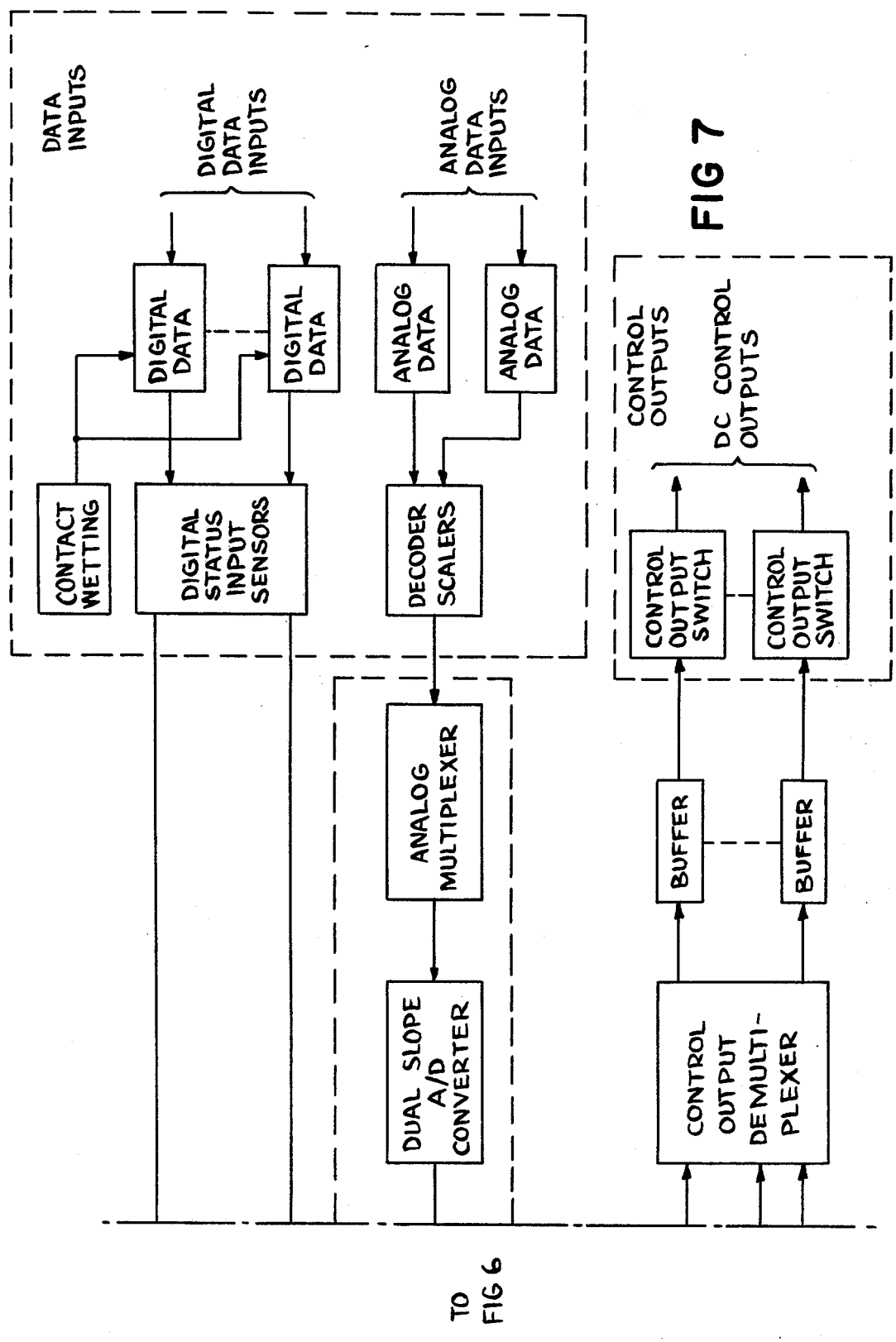

FIG. 1 shows the present invention for use with a single well, while FIG. 2 shows the present invention for use with more than one well. FIG. 3 shows a shipboard station interfacing with a subsea station, the shipboard station being the control station. FIG. 4 shows the block diagram of the control station of FIG. 3 for manual mode operation, while FIG. 5 shows the block diagram of the control station of FIG. 4, for CPU mode operations; and FIGS. 6 and 7 show the block diagram of a remote station.

The major telecom equipment items include a platformbased PCR control console, a shipboard based STT control console, a remote subsea Yellow Module electronics capsule, and a Subsea Yellow Module instrumentation (transducers) and interconnecting electrical cable assemblies.

2.0 TELECOMMUNICATION SYSTEM

Control and monitoring of the subsea equipments are generated by multiplexed commands from either the platform PCR control station or the shipboard STT control station. These commands, which employ standard 16-bit word formats, are generated either automatically or by operator action and are transmitted digitally in serial form using FSK (frequency shift keying) transmission over a twisted shielded pair of voice grade wires. In forming these command words, four different operation codes are used which correspond to the type command action desired. Data Scan and display of data, including alarm monitoring, are continuous automatic functions which are overridden only during control executions. Validity of these commands are assured by a fully interlocked command/confirm/execute cycle and message security is obtained by using the LARSE data transmission code.

2.1 Communication Word Format

Information exchange is via 16-bit binary information words separated by frame pulses. The PCR-to-Well and STT-to-Well word, which constitutes a command to the well, is divided up into four sections. Well-to-PCR or Well-to-STT confirmation that the proper command has been received at the well prior to execute action utilizes the same word format. Each command word section is decoded upon receipt at the well according to context. The individual sections of the word are described as follows:

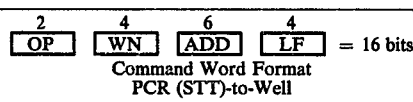

Command Word Format
PCR (STT)-to-Well

1. OP (Operation Code) - 2 Bits

The first two bits of the word tell the well what sort of command is being transmitted. These two bits allow four distinct commands to be interpreted. These are:

a. Data Scan The well is to report data back to the PCR or STT. The data point to be selected is determined by decoding the rest of the word.

b. Control Set

A control point is to be set. The point to be selected is determined by decoding the remaining bits. The actual set action, however, does not take place at this time but an intermediate buffer is loaded and the entire 16-bit command word is returned to the PCR or STT in the next transmission for confirmation.

c. Alarm Level Change

An alarm level is to be changed. The alarm point and level to be selected is determined by decoding the remaining bits. The actual set action, however, does not take place at this time but follows the same confirmation cycle as described for the control set operation code.

d. Execute

The previously received (at well) command word will be executed by an execution word if the confirmation cycle word transmission corresponds to the initial 16-bit command word pattern. Upon receipt of a correctly decoded 16-bit execution word, the previous control command word is then executed by transferring the contents of the temporary buffer to the control point as identified by the rest of the word. The execution word format is identical to the previously sent command word with exception to the OP code portion of the word.

2. WN (Well Number) - 4 Bits

After the OP code is interpreted, the control point to be effected must be located. These four bits determine which of the 16 wells the point addressed is to be located.

3. ADD (Address) - 6 Bits

Having once identified which well station is to respond to the commands, it remains to identify the responding point in question. This is done by the address code.

If the compound is a control action, the address code is interpreted to select the appropriate single-bit control register. Thus, up to 64 control registers can be used which results in a total of 64 digital control points.

If the command is a data scan, up to 64 points, each with digital data up to 16 bits, can be directly addressed.

4. LF (Literal Field) - 4 Bits

Depending on the operation code selected, the literal field is interpreted as four bits of control information for each single-bit register selected by the address code.

For a Control Set operation, the first two bits are spare and the remaining two bits provide the control logic. For a Data Scan operation, all four bits are spare since the digital data is channeled by the address code. For an Alarm Level Change operation, all four bits will be used to provide the change information.

The Well-to-PCR and Well-to-STT word which is formed at the well will have the following formats:

| 4 | 12 |
|---|---|
| SPARE | DATA | = 16 bits

Data Scan Word, Analog Data
Well-to-PCR(STT)

For three-decade BCD, analog data, the 12 least significant digits are interpreted as data.

| 16 |
|---|
| DATA | = 16 bits

Data Scan Word, Digital Data
Well-to-PCR(STT)

For single-bit and two-bit status data, all 16 digits are used to form a data train which utilizes the total capacity of the 16-bit transmission.

Each of the above word formats are loaded into their appropriate control display register as selected by the address code during data scan command operation.

2.2 Communication Method

The FSK transmitters and receivers used in the final transmit and receiving stages of the system are LARSE data communicators. These are identified as SEN (transmitter) and REDE (receiver) units. The description of these devices and their method of transmission security are given in the LARSE Co. Technical Manual for the Data Communication (trademark) and reference is had to U.S. Pat. No. 3,742,199 assigned to LARSE Co.

The 16-bit binary information words will be coded by the LARSE transmission method. Each coded word will be 34 bits in length. Serial word transmission frequency from PCR-to-Well and Ship-to-Well will be 750 ± 150 hertz with a bit rate of 60 bits/second. Transmission frequency from Well-to-PCR and Well-to-Ship will be 1,620 ± 180 hertz with a bit rate of 360 bits/second. This transmission will be an asynchronous single-word burst, 42 bits in length. As required by the LARSE transmission method, eight additional bits to the normal 34-bit word are needed by synchronization at the receiving end.

The subsea electronics capsule (remote station) is equipped with two separate data ports. These are identified as STT access and PCR access and are routed thru their respective inductive connectors. Each data port includes its own LARSE transmit and receive communicators and there are no electrical connections between the data ports at the carrier level. These separate data ports allow for asynchronous data scanning from both the PCR and STT control stations.

The subsea electronics includes standby redundancy which is identified as System A and System B. Selection of either system is possible from either the PCR or STT control stations. The subsea telecom interfaces with other Yellow Module systems to provide solid-state control of both AC and DC devices (circuit breakers and solenoids) and monitor status of switch contacts and transducer outputs. To achieve maximum noise immunity, all subsea digital status inputs and solid-state AC/DC control outputs are individually isolated from their logic control circuit by light-emitting diode (LED) photocouplers. All subsea analog inputs from transducers are routed to a dual-slope A/D converter through individual protection circuits which provide fault-current limiting. To dual slope A/D converter minimizes the effect of noise during conversion period.

A functional description of system equipment is given in Section III.

3.0 SYSTEM CAPACITY

The system has a capacity of 64 digital control points, 64 data channels at 16 bits each and 64 alarm level change channels at 4 bits each.

Table II-1 lists the control, monitor and alarm functions which are presently performed by the system. The table shows that 34 digital control points, 16 data channels and 8 alarm level change channels are used. The total display updata time at the control consoles for these functions listed is approximately 10 seconds.

TABLE II-1

| FUNCTION | TELECOM SYSTEM FUNCTIONS | | | | COMMENTS |
|---|---|---|---|---|---|
| | CONTROL | ANALOG | SUPERVISE DIGITAL | ALARM | |
| ANNULUS TOP VALVE (V1) FULLY OPENED | | | X(2) | | |
| ANNULUS TOP VALVE (V1) FULLY CLOSED | | | | | |
| TUBING SWAB VALVE (V2) FULLY OPENED | | | X(2) | | |
| TUBING SWAB VALVE (V2) FULLY CLOSED | | | X(2) | | |
| ANNULUS VENT VALVE (V3) OPEN (OPENED) | X | | | | |
| ANNULUS VENT VALVE (V3) CLOSE (CLOSED) | X | | | | |
| WING VALVE (V4) OPEN (OPENED) | X | X(2) | | | |
| WING VALVE (V4) CLOSE (CLOSED) | X | | X(1) | | |
| ADJUSTABLE CHOKE (V5) STEP OPEN 1° (FORWARD) | X | | X(1) | | 1° STEP INCREMENTS |
| ADJUSTABLE CHOKE (V5) STEP CLOSE 1° (BACKWARD) | | | | | 0° POSITION |
| ADJUSTABLE CHOKE (V5) CLOSED (0°) | | | X(2) | | |
| MASTER VALVE (V7) OPEN (OPENED) | X | | X(1) | | |
| MASTER VALVE (V7) CLOSE (CLOSED) | X | | X(1) | | |
| DHSV (V8) OPEN | X | | X(1) | | |
| DHSV (V8) CLOSE | X | | X(1) | | |
| MAIN HYDRAULICS PUMP 1 ON | X | | X(1) | | |
| MAIN HYDRAULICS PUMP 1 OFF | | | | | |
| MAIN HYDRAULICS PUMP 2 ON | X | | X(1) | | |
| MAIN HYDRAULICS PUMP 2 OFF | | | | | |
| SHIP-IN-CONTROL | | | | | |
| CIRCUIT BREAKER #1 OPEN (OPENED) | X | | X(1) | | |
| CIRCUIT BREAKER #1 CLOSE (CLOSED) | | | | | |
| CIRCUIT BREAKER #2 OPEN (OPENED) | X | | X(1) | | |
| CIRCUIT BREAKER #2 CLOSE (CLOSED) | | | | | |
| ACOUSTIC BEACON ON | X | | | | |
| ACOUSTIC BEACON OFF | X | | | | |
| ANALOG CHECK ZERO | X | | | | |
| ANALOG CHECK GAIN | X | 3BCD | | | |
| ALARM LEVEL CHANGE, FLOWLINE PRESSURE HIGH | 1 DEC BCD | | | | % FULL RANGE |
| ALARM LEVEL CHANGE, FLOWLINE PRESSURE LOW | 1 DEC BCD | | | | % FULL RANGE |
| ALARM LEVEL CHANGE, PRIMARY VOLTS (EP) HIGH | 1 DEC BCD | | | | % FULL RANGE |
| ALARM LEVEL CHANGE, SECONDARY VOLTS (ES) LOW | 1 DEC BCD | | | | % FULL RANGE |
| SUBSEA SYSTEM A ON | X | | X(1) | | |
| SUBSEA SYSTEM B ON | X | | X(1) | | |
| TUBING PRESSURE | | 3BCD | | | 0-5,000 PSIA |
| ANNULUS PRESSURE | | 3BCD | | | 0-5,000 PSIA |
| FLOWLINE PRESSURE | | 3BCD | | | 0-5,000 PSIA |
| MAIN HYDRAULIC PRESSURE | | 3BCD | | | 0-4,000 PSID |
| DHSV HYDRAULICS PRESSURE | | 3BCD | | | 0-6,000 PSID |
| FLOWLINE TEMPERATURE | | 3BCD | | | 0-150° C |
| PRIMARY VOLTAGE (EP) | | 3BCD | | | 0-600 VAC |
| SECONDARY VOLTAGE, PHASE 1 (ES PH1) | | 3BCD | | | 0-50 VAC |
| SECONDARY VOLTAGE, PHASE 2 (ES PH2) | | 3BCD | | | 0-150 VAC |
| SECONDARY VOLTAGE, PHASE 3 (ES PH3) | | 3BCD | | | 0-150 VAC |
| DHSV HYDRAULICS % OIL LEVEL | | 2BCD | | | % LEVEL |
| FLOWLINE PRESSURE HIGH | | | | X | ADJUSTABLE LIMIT |
| FLOWLINE PRESSURE LOW | | | | X | ADJUSTABLE LIMIT |
| ANNULUS PRESSURE HIGH | | | | X | MIXED LIMIT |
| MAIN HYDRAULICS PRESSURE HIGH | | | | X | MIXED LIMIT, 3300 PSI |
| MAIN HYDRAULICS PRESSURE LOW | | | | X | MIXED LIMIT, 1250 PSI |
| DHSV HYDRAULICS OIL LEVEL LOW | | | | X | 25% LEVEL |
| SALT WATER IN MAIN HYDRAULICS | | | | X | CONTACT CLOSURE |
| PRIMARY VOLAGE (EP) HIGH | | | | X | ADJUSTABLE LIMIT |
| SECONDARY VOLTAGE (ES) LOW (PHASE AB, BC OR AC) | | | | X | ADJUSTABLE LIMIT |
| CIRCUIT BREAKER TRIPPED (CB1 or CB2) | | | | X | CONTACT CLOSURE |
| MOTOR OVERLOAD (MS1 OR MS2) | | | | X | CONTACT CLOSURE |

TABLE II-1-continued

| | TELECOM SYSTEM FUNCTIONS | | | | |
|---|---|---|---|---|---|
| | CONTROL | ANALOG | SUPERVISE DIGITAL | ALARM | COMMENTS |
| FUNCTION | | | | | |
| LEAK DETECTION | | | | X | |
| ANNULUS VENT VALVE NOT FULLY CLOSED | | | | X | CONTACT CLOSURE |
| MASTER VALVE CLOSED | | | | X | AFTER CLOSE COMMAND IF NOT FULLY OPEN |
| MAIN HYDRAULICS AUTO CONTROL ON | X | | X(1) | | |
| MAIN HYDRAULICS MANUAL CONTROL ON | | | | | |
| DHSV LINES OPEN | | | X(1) | | FOR SHIPBOARD |
| DHSV LINES BLOCK | X | | X(1) | | CONTROL ONLY |
| ADJUSTABLE CHOKE CLOSED (180°) | | | | | 180° POSITION |

TOTALS
32 Control Functions = 17 (2 bit) Control Channels = 34 Digital Control Points used
14 Analog Supervise Functions = 11 (3 BCD) + 2 (2BCD) Data Channels = 13 Channels (16 bits each) used
32 Digital Supervise Functions = 5 (2 bit) + 14 (1 bit) Digital Channels = 2 Channel (16 bits each) used
4 Alarm Level Change Functions = 8 Channels (4 bits each) used
15 Alarm Functions = 15 (1 bit) Alarm Channel = 1 Channel (16 bits each) used
SPARES
Control Points = 64 − 34 = 30 Points
Data Channels = 64 − 16 = 48 Channels (16 bits each)
Alarm Level Change Channels = 64 − 8 = 56 Channels (4 bits each)

4.0 SPECIFIC SYSTEM FEATURES

The following summary of features are unique to the SEAL Yellow Module Telecommunication System.

1. A fully interlocked command/confirm/confirm-/execute command cycle which essentially affords foolproof control panel operation.
2. A self-check system which enables checking of key elements such as A/D conversion (calibration).
3. A dual remote station data port system which allows asynchronous data update operation from two surface stations.
4. A remote station alarm level adjust capability.
5. High level data transmission security employing FSK transmission and LARSE coding.
6. An operator panel interrupt system which can be directly interfaced with standard process control computers for a powerful computer/manual operation mode.
7. All-solid-state design employing MSI/LSI control circuitry and power Triac/transistor outputs. This affords maximum reliability at minimum cost.
8. The use of monometallic, ceramic packaged logic components for long life and high reliability.
9. High-noise-immunity by use of photo-coupling isolators (LED's) on all remote input/output interfaces.
10. Separately selectable redundant remote circuits increasing probability of survival.
11. System fabricated entirely from commercially available, off-the-shelf, components.

SECTION III

Functional Description PCR And STT Control Systems

1.0 INTRODUCTION

The platform (PCR) and shipboard (STT) systems are the control and monitor stations for the subsea Yellow Module assembly. Commands are initiated and well head status is displayed at these stations. The various signals are sent to the subsea telecom system via serial digital transmission over a twisted pair cable using FSK (frequency shift keying) techniques. For every word sent (defined as 16 bits of information in a field of 34 bits) the PCR (STT) expects a definite answer back from the subsea telecom. This action is part of the command/confirm/execute cycle.

The PCR (STT) uses parallel TTL (transistor-transistor logic) logic except for the serial digital transmission. It also uses a DTL (diode-transistor logic) interface gate between the control push-button and the TTL logic.

2.0 SPECIFIC OPERATIONAL DESCRIPTIONS

1. Command/Confirm/Execute Cycle

A fully interlocked control, readback, execute command cycle is utilized to provide foolproof control panel operation. Commanding a change of condition is accomplished by depressing the appropriate pushbutton to address the desired subsea device. Acknowledgement that the proper address has been received results in the illumination of the "Execute Command" pushbutton. This is the command word confirmation cycle indication. The "Execute Command" pushbutton is then depressed to transmit the execute word and to complete the control operation.

2. Confidence Checking

At the completion of a normal data scan, a command-/confirm/execute cycle is automatically generated to verify that the command system is functioning. As later described, this command cycle is also used for the analog subsystem check operation. Failure of this cycle results in an alarm condition which is displayed as "Command Fail." This indication will remain until such time proper operation is re-established. When the STT is in control, this alarm condition along with "Ship-In-Control" alarm will persist at the PCR.

A pulsed indication, "Scan Running" is also provided to indicate that data scanning is in progress.

3. Alarm Level Adjust

The AC voltage and flowline pressure subsea alarm levels are changeable at PCR station only. Each of these subsea alarms are changeable in 1% increments by two one-decade switches which select the required alarm level in percentage of full-scale range (0–99%). The operation of a set button causes the values shown on both decade switches to be transmitted sequentially (each being an automatic command/confirm/execute cycle). The first cycle transmits the least significant decade as a 4-bit BCD quantity using the literal field in the command word. Execute takes place automatically upon receipt of a successful confirmation. The cycle then automatically repeats itself for the next setting (most significant digit).

4. Alarm Initiating and Acknowledgement

All alarms with exception of "Command Fail" are generated subsea and are transmitted to the PCR as part of the normal data scan cycle. Receipt of an alarm at the PCR console causes a buzzer to sound and the appropriate switch light, in the alarm block grouping to illuminate RED. At the same time, if applicable, the corresponding specific alarm indicator (e.g., main hydraulics pressure low) illuminates RED. Depressing the switch light silences the buzzer and changes its illumination to AMBER. When the alarm condition clears, all appropriate lights will extinguish.

5. Analog Check

The analog check, which utilizes the automatic command cycle for confidence checking, provides a calibration check of the subsea A/D converter used for the measured analog data and display. A three-decade display and two momentary pushbuttons with full lense illumination are provided. These are labeled "Analog Check Zero" and "Analog Check Gain."

To check the calibration of the analog system, and if linearity is assumed, two points are required, "0" volts for offset and "5" volts for maximum gain. Momentarily depressing either analog check button, which are electrically maintained and interlocked, sets a bit in the subsea register placing "0" volts or "5" volts as required on an otherwise unused analog channel, however, when power is initially applied to the console, analog check zero is automatically selected. The three-decade display is updated by the normal data scan; and subsequent to operation of the other check button, the appropriate quantity will be displayed and will remain indefinitely. The last check button operated remains illuminated until the other one is selected.

6. Main Hydraulic System Pump Control

Automatic control with manual override is provided for control of the two pump motors in the Yellow Module main hydraulic system. Two interlocked auto-/manual control pushbutton switches with half lens illumination are provided with one indicating "Automatic Control On" and the other "Manual Control On."

When in the automatic control mode, closed-loop control logic at the subsea telecommunication capsule energizes the pump motor when the hydraulic system pressure indicates low. The pump motor energized is the one which had not been energized last. The motor will continue to run until the high pressure switch closes. Both high and low pressure logic for automatic operation are generated subsea from pressure switch closures in the hydraulic system (PS1 & PS2). These high and low limits are not the alarm limits but are at some level short of alarm. The high and low pressure alarms are generated subsea from the analog signal provided by the differential pressure transducer. During the automatic or manual modes, pump motor ON and OFF status is displayed on the control console by monitoring their respective motor starter operation.

The manual control mode provides an auto override by transmitting an inhibit command to the subsea closed-loop circuit. This allows the console operator to control both motors (one and/or two) at his discretion. The system pressure high logic for automatic control is also overriden during manual operation. It is not desirable to shut down the motors automatically with the overpressure signal because if this single switch were to fail, the whole hydraulic system would shut down.

Under manual control, the pump motors operate as follows. When the operator desires, he can start either or both of the motors. He takes this action when he observes that the hydraulic pressure is low, or when the low pressure alarm alerts him. Pumping starts and continues until the operator manually stops it. The pressure setting for the high pressure alarm is above the pressure where the pressure switch normally shuts off the pump when it is on automatic. Under manual conditions, if the operator lets the pressure rise to this point, the alarm sounds and he would then shut the motor off. This high pressure alarm point is obviously below the pressure relief valve setting in the hydraulic system.

The pressure switches are used for motor control, independently of the pressure transducer. Thus a cross check is possible at every cycle of the system, when it is automatic. All the operator does is to note the pressure reading when the motor automatically starts, and when it automatically stops.

7. Control Panel Operation, On/Off Control

Each on/off control action (e.g., master valve open and master valve closed) is made up of two half lens switch light buttons, one for energize command and one for de-energize command mounted one below the other. Upon proper command word confirmation cycle previously described, the execute command switch completes the operation. The upper half lens of each control switch indicates the command status and the lower half indicates the status of the device whose data is transmitted and updated by the normal data scan cycle. This half light presentation philosophy enables the operator to detect either a problem of transition state or the presence of an incomplete command/confirm/execute cycle when each button remains half illuminated.

8. Wellhead Power Emergency Trip

A control switch is provided on the PCR control console to trip the main power to the Yellow Module in case of a subsea catastrophic failure.

9. Ship-In-Control

The PCR controls the Yellow Module at all times except when the STT transmits a Ship-In-Control command. When this command is received subsea, a Ship-In-Control alarm is received at both the PCR and STT and no further PCR control cycles are enabled including execute cycles. This PCR inhibit situation is maintained until either the STT communication link is lost (FSK carrier signal) or the STT initiates a Ship-Out-Of-Control command. During a STT takeover of the Yellow Module both the PCR and STT scan for DATA asynchronously. PCR data scan, therefore, is not inhibited during STT operation. The same is true for the STT. With the STT energized, but not in control, the STT will scan for data while the PCR is still in control.

3.0 SUBSYSTEM DESCRIPTIONS

Figure 8:
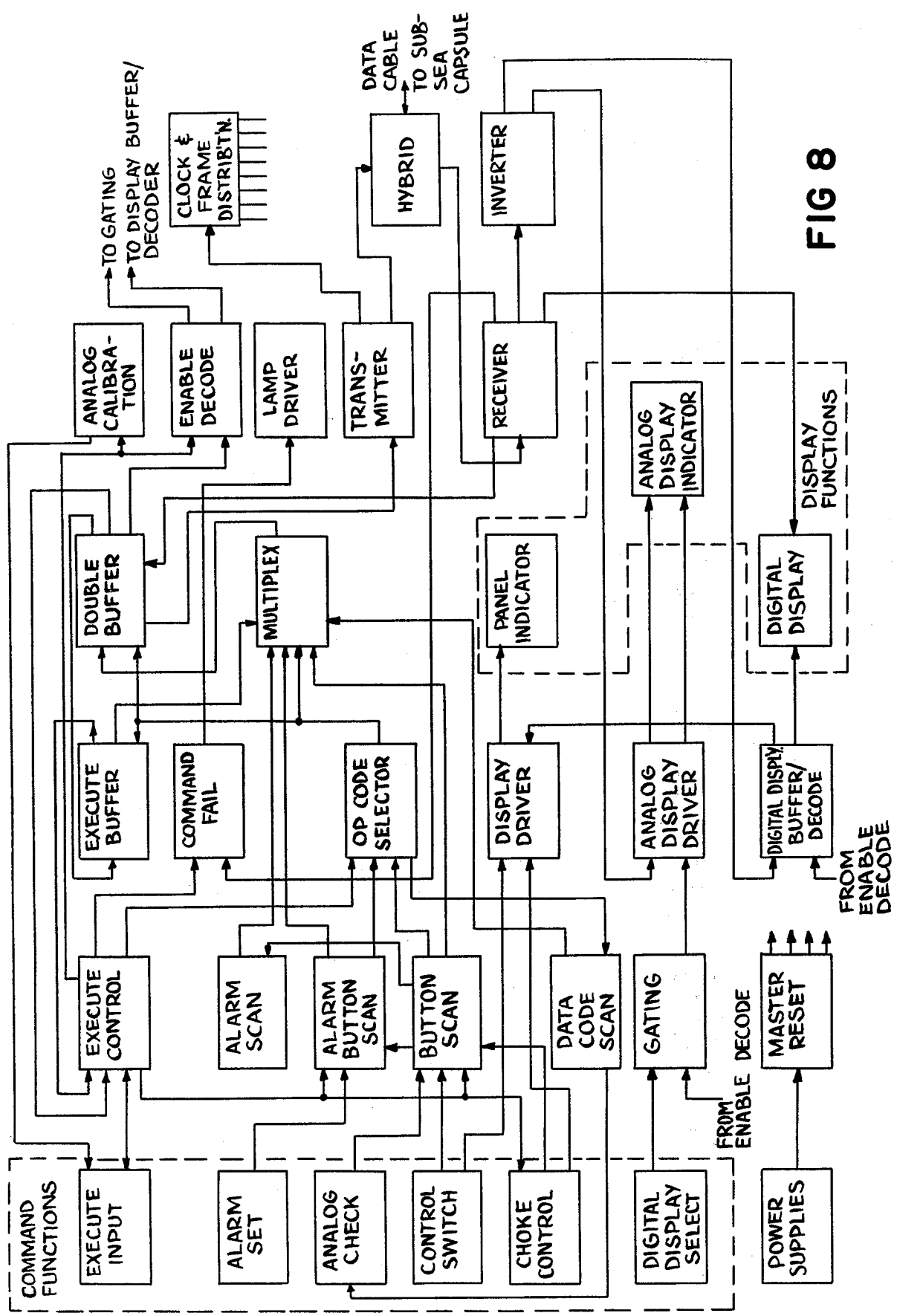

A logic block diagram of the PCR (STT) system is shown in FIG. 8. The PCR (STT) system performs the following functions:

1. Stores the status of the control panel pushbuttons.
2. Displays the status of the Yellow Module as received.
3. Generates execute commands when:
   (a) The Execute button is pressed
   (b) An alarm level change button is pressed
   (c) The data scan has completed a cycle, to check analog calibration.
4. Generate control commands which are later carried out by an execute command.
5. Generate alarm level change commands. Two alarm level words and two execute words are generated automatically when the alarm level change button is pressed.
6. Generate scan words. According to the scan word generated and address given, either a 12 bit digitized analog value is returned or 16 independent digital information bits (on, off; hi, low, opened, closed) are returned by the subsea electronics.
7. Route the answer to a scan word to the appropriate display and, if applicable, sound an alarm.

These functions or actions are performed on a priority basis. There are four levels of priorities. Starting with the highest they are:

1. When there is an execute bid on, all other actions are postponed.
2. When there is an alarm level change bid on, the next four words sent to subsea respectively:
   (a) Alarm level word 1 (LSB)
   (b) Alarm level word 2 (MSB)
   (c) Execute word for alarm word 1
   (d) Execute word for alarm word 2

During the alarm level change word bid, all other bids are ignored until these four words are sent.

3. When there is a control bid on, the scan cycle is interrupted for the send period of one word so that the control word can be sent.
4. When neither of the above three bids are on, a scan bid is assumed and a scan word(s) is sent.

3.1 Scan Subsystem

The logic sequence of the scan subsystem is has been designed as that all addresses have the same priority since the address generator is incremented only when a scan word is to be sent. When the scan is interrupted, i.e. by an alarm level change bid, the address generator retains the last scan address sent.

In scan word format the OP code is 00; the well number identifies the destination (1 of 16) and the 5 bit address field requests for either a analog or digital data scan. When bit 8 = 0 the scan is for analog data with a capacity of 16 channels. When bit 8 = 1 the scan is for digital data with a capacity of 4 channels of 16 bits each for a total of 64 digital points. Bits 0, 1, 2, 3 and 9 are unused and are permanently set high (1).

3.2 Control Subsystem

When a control button is depressed and if no execute or alarm level bids are on, the PCR (STT) generates a control word. The op code is 01 and the address field allows up to 32 different on/off control points. The status bit S identifies the particular action required. When S = 0; open breaker, close valve, off, etc. When S = 1; close breaker, open valve, on, etc. The parity bit P is sent as P = S̄, and is used as an extra security level in addition to the LARSE code. Bits 2, 3 and 9 are unused and are permanently set high (1).

After the control word is sent the answer back from the subsea should be the exact same word including the unused bits. If the answer back matches, bit by bit, the execute command is enabled. The string of words sent and received form a scan cycle interrupted by a command word. The subsea can start sending an answer only after receiving the complete word from the PCR (STT). The PCR enables the execute during the frame pulse. Therefore the fastest a control command can be initiated in the subsea equipment is three word times or 1.7 seconds after depressing a control pushbutton.

3.3 Alarm Level Adjust Subsystem

When an alarm level set button is pressed on the PCR panel (not included on the STT panel), two alarm level set words are sent subsea. These words carry the operator selected BCD information from a pair of BCD switches on the panel which represents the percent of full scale alarm level point. These two words are followed by two execute words if the retransmitted words from the subsea compared bit by bit.

The op code for the alarm level change word is 10. Bits 5 and 6 specify the four alarm change addresses and bit 4 (C) specified if the data (bits 0, 1, 2 and 3) is the least significant BCD data (Bit 4 = 0) or most significant BCD data (Bit 4 = 1).

A scan cycle may be interrupted by an alarm level change bit. It is assumed that both returned words compared bit by bit.

3.4 Execute Subsystem

The execute bid which is produced either by pressing the Execute Command pushbutton, by pressing an alarm level set pushbutton, or when the data scan has completed one cycle (auto execute for command system check and analog calibration check), is enabled only when the stored word contains a 01 or 10 op code and the return and stored word compare bit by bit. When these conditions are met, the execute word sent has an 11 op code with the rest of the bits of the word equal to the previously stored and compared word.

The subsea equipment, when receiving an execute word for an alarm level change, compares bits 0 through 6 and 10 through 13 with the stored alarm level set word. For a stored control word, comparison is made with bits 0, 1 and 4 through 13. Therefore, for an execute action to take place, the above bits must be transmitted, received and compared 3 times without error: from surface to subsea on the initial control or alarm level set word, subsea to surface for comparison and again, surface to subsea and comparison on the execute word.

4.0 CIRCUIT DESCRIPTION

The PCR (STT) system operates on three distinct commands which are initiated at the console. These, listed in their order of decreasing priority are:

1. Execute

The execute command will execute the previously received (at subsea) control word if the confirmation cycle word transmission corresponds to the previously loaded 16-bit control word pattern at the console.

2. Control

The control word calls for a subsea control point to be set. For the PCR this can either be a control command or an alarm level change command. For the STT it is only a control command. The point to be selected is determined by decoding its bit structure. Actual execution, however, does not take place at this time, but an intermediate subsea buffer is loaded and the entire 16-bit control word is returned to the console in the next transmission for confirmation and execution.

3. Request for Data

This control word initiates a scan which requests the subsea system to report the status of its data.

In operation the console scans for pushbutton control or execute inputs. If they are found, they are placed in the order that will effect Execute Command. However, if no control inputs are found, the Request for Data scan is incremented. The full 16-bit word is then formed of the highest priority input and the 5 bit remote address selected. Frame pulses from the transmitter synchronize the entire operation. The following descriptions make reference to FIGS. 37 to 68 which depict the logic schematics of the PCR (STT) control circuits.

Figure 68:
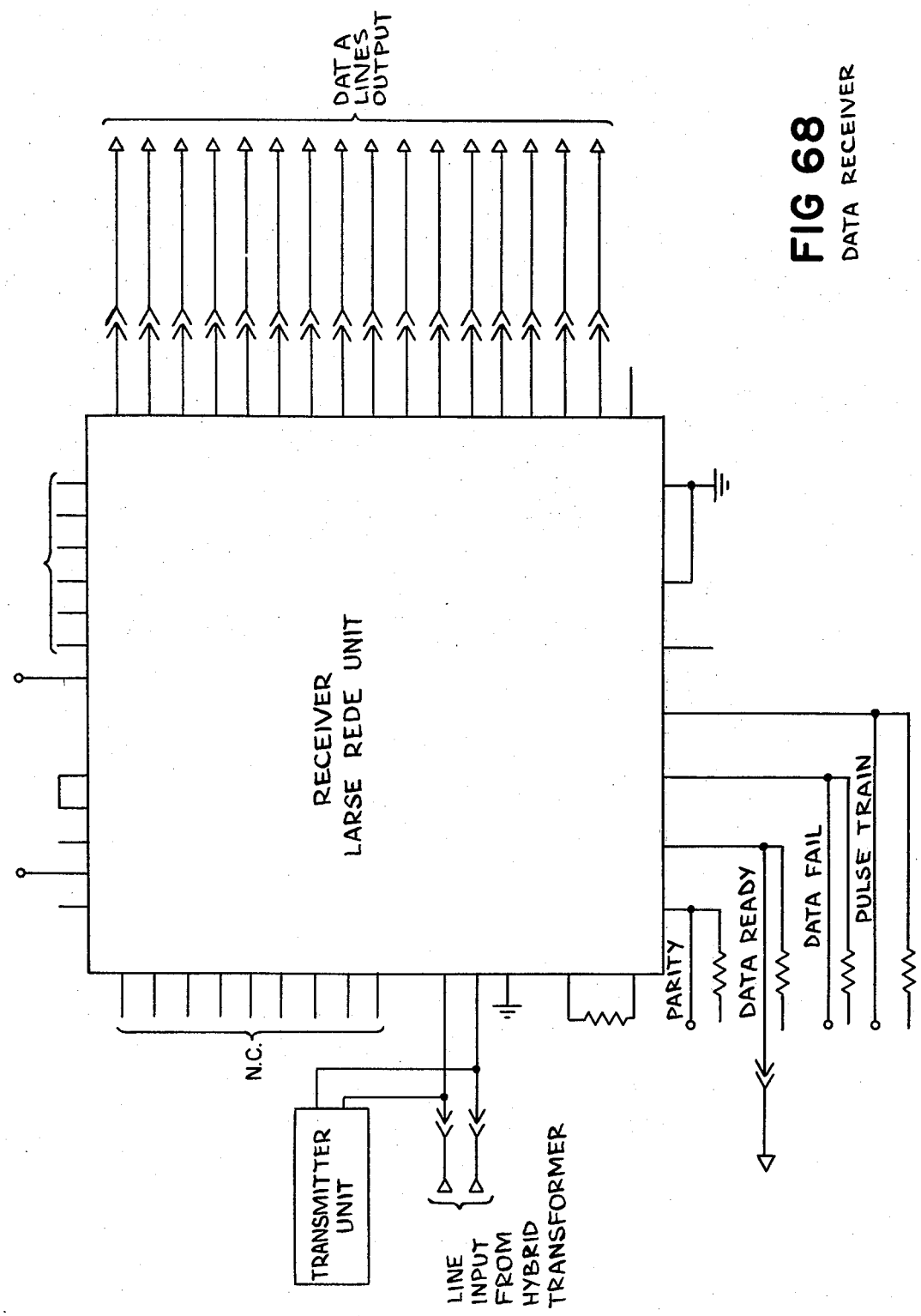
Figure 69:
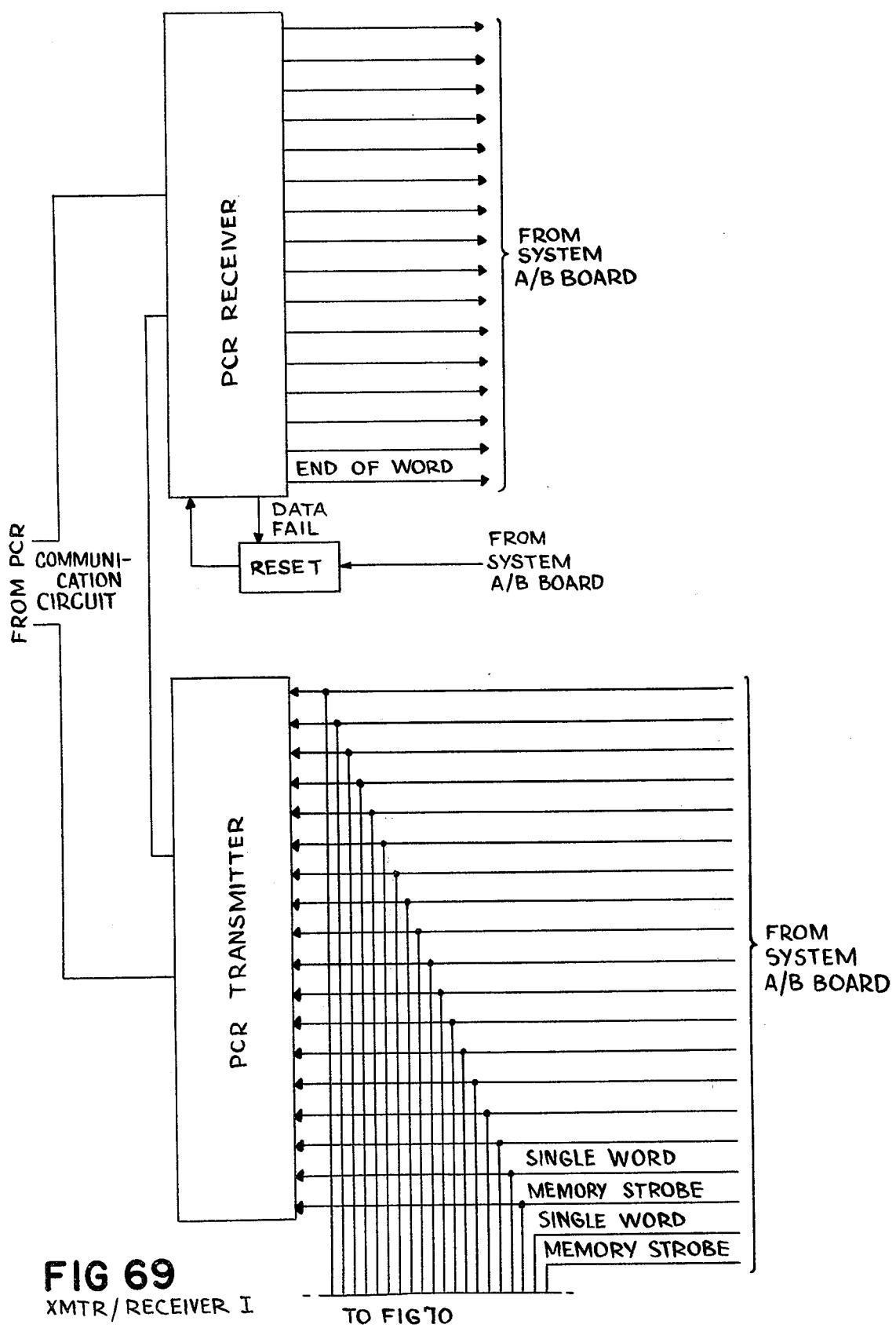
Figure 70:
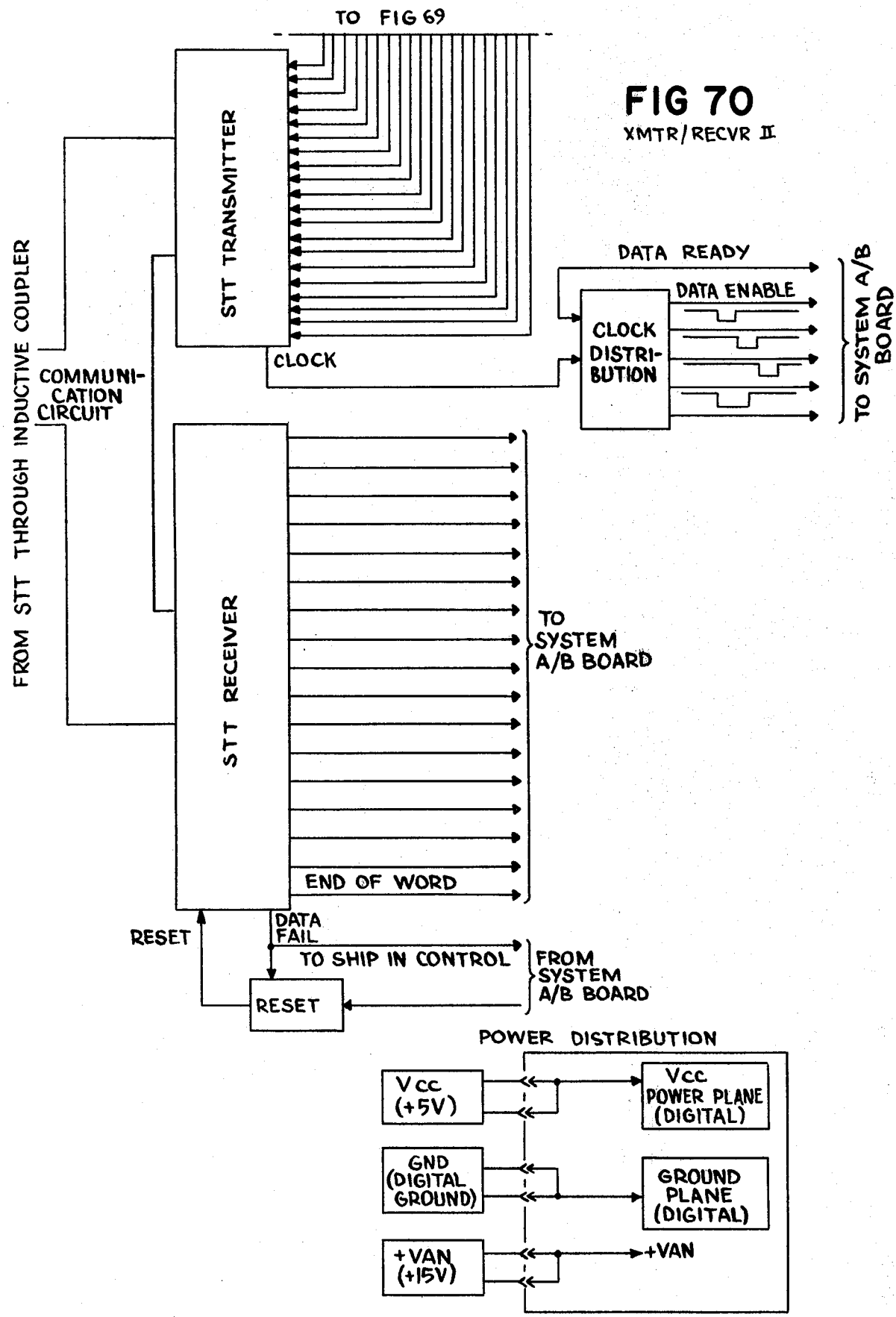
Figure 71:
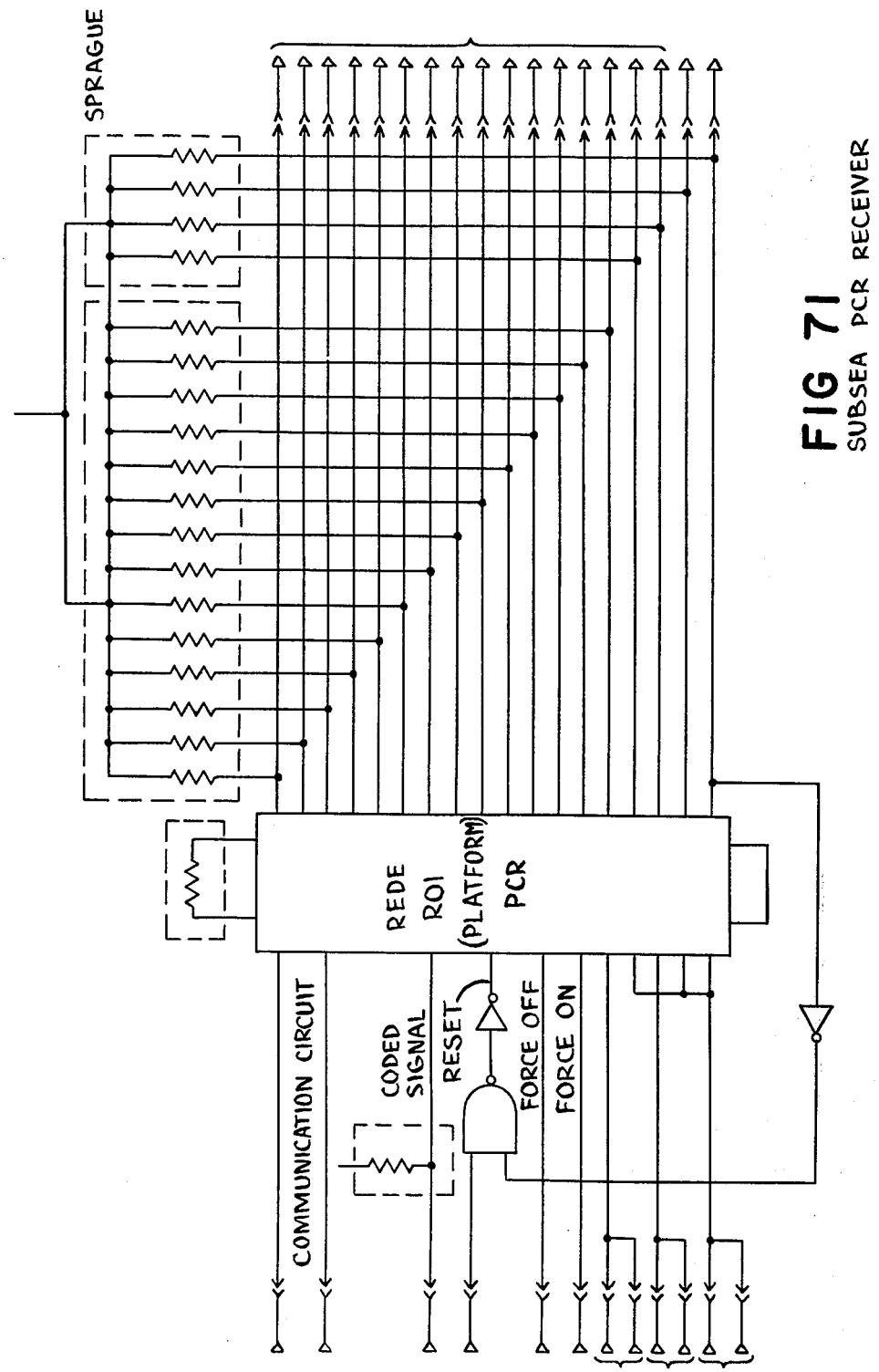
Figure 72:
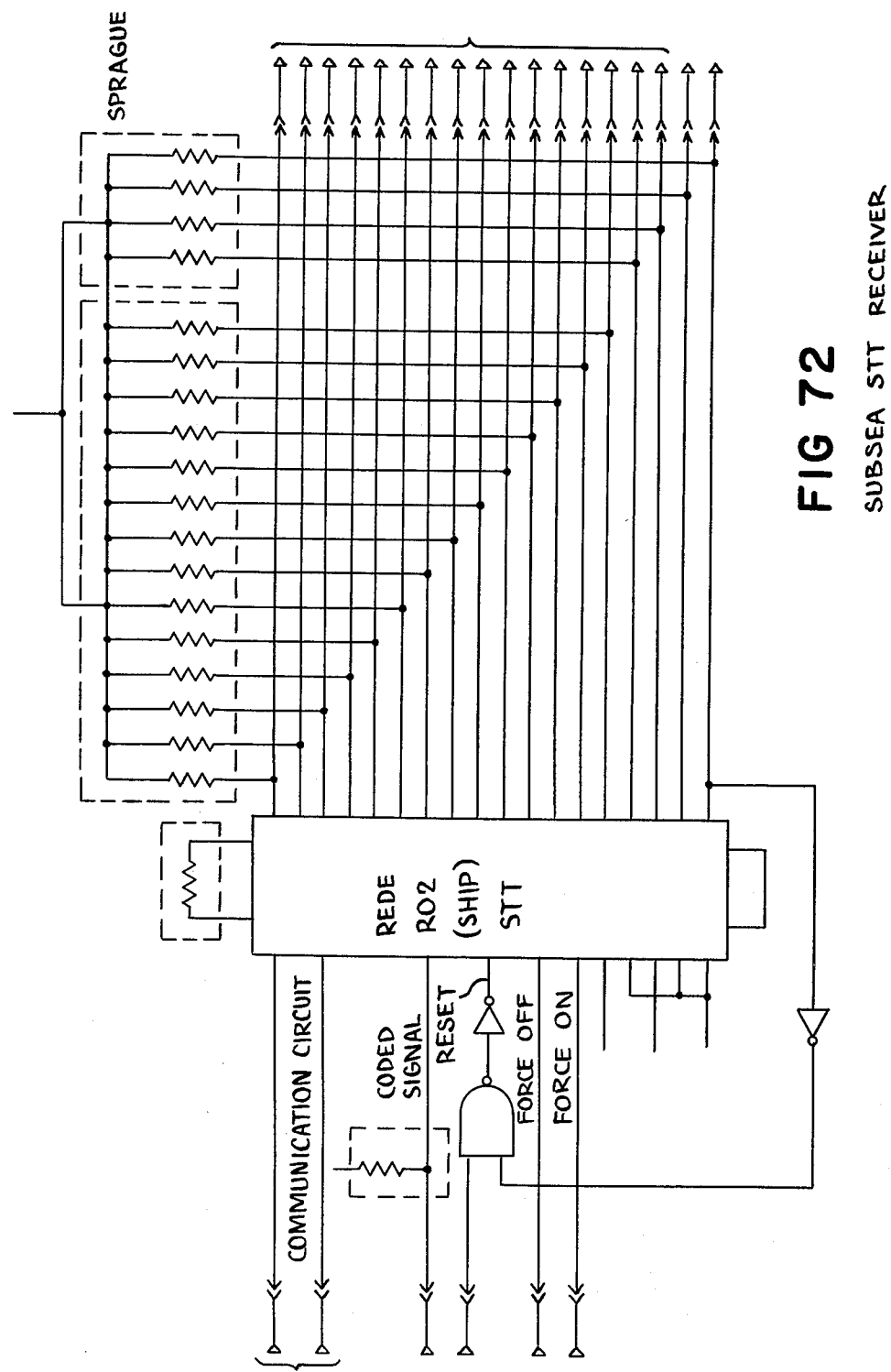

4.1 Receiver (FIG. 68)

The LARSE surface receiver (REDE Unit) operates on a 1620 Hz center frequency ± 180 Hz FSK data signal from the subsea transmitter at a 360 bps word rate. Refer to the LARSE Data Communicator Technical Manual in the component data section of this manual for the operational description of the REDE unit.

The data outputs (R00 thru R15) are high (5V) when the corresponding received bit is a logical 1.

The Data Ready (DR) output is high (5V) when the received data has been released to the data outputs.

Receiver sensitivity can be varied by selecting a resistor for placement between pins 48 and 49. For values from 100 ohms to 500K ohms, the sensitivity changes non-linearly from −40 dbm to −12 dbm respectively. Refer to LARSE Data Communicator Technical Manual for sensitivity curve.

Figure 13:
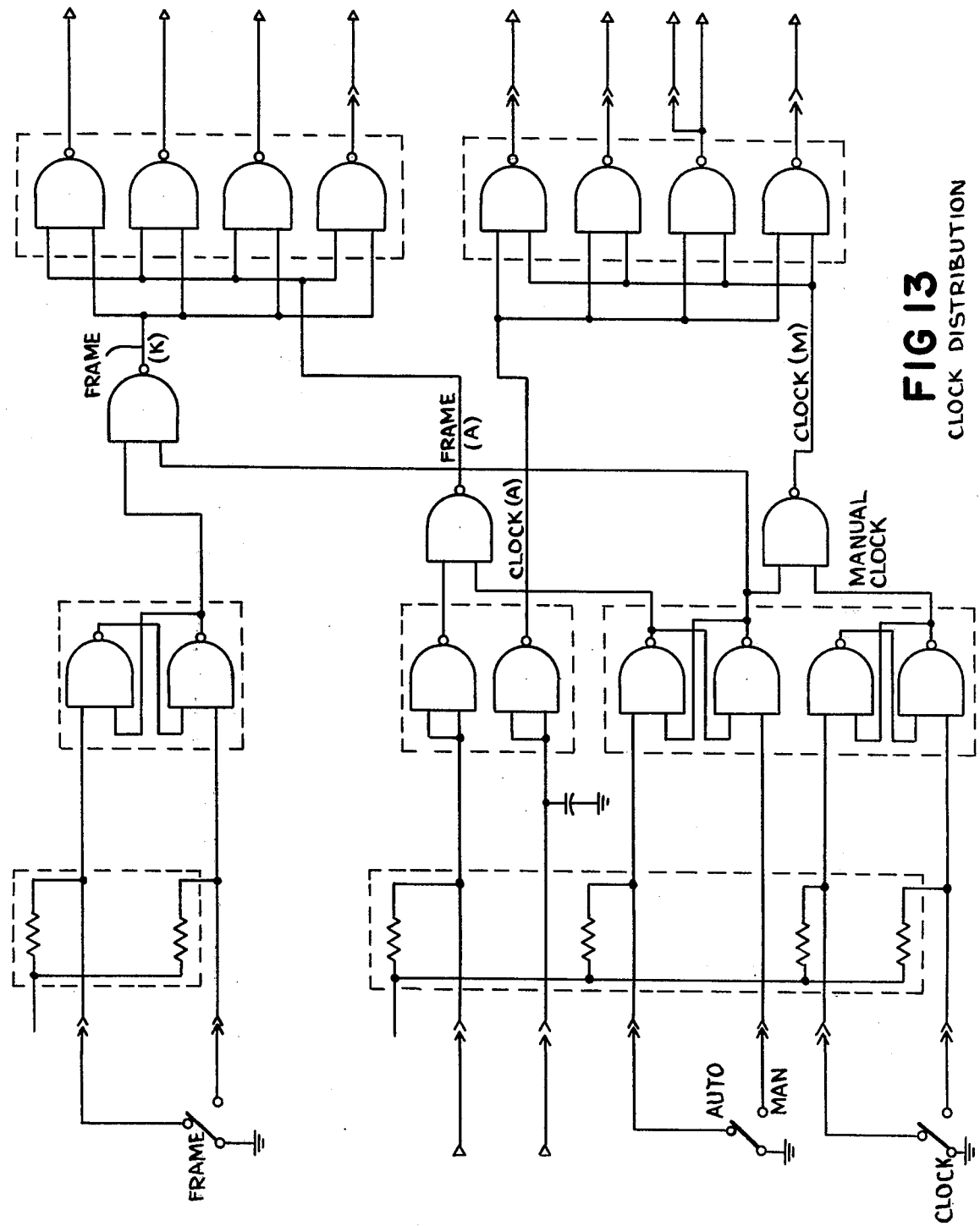
Figure 67:
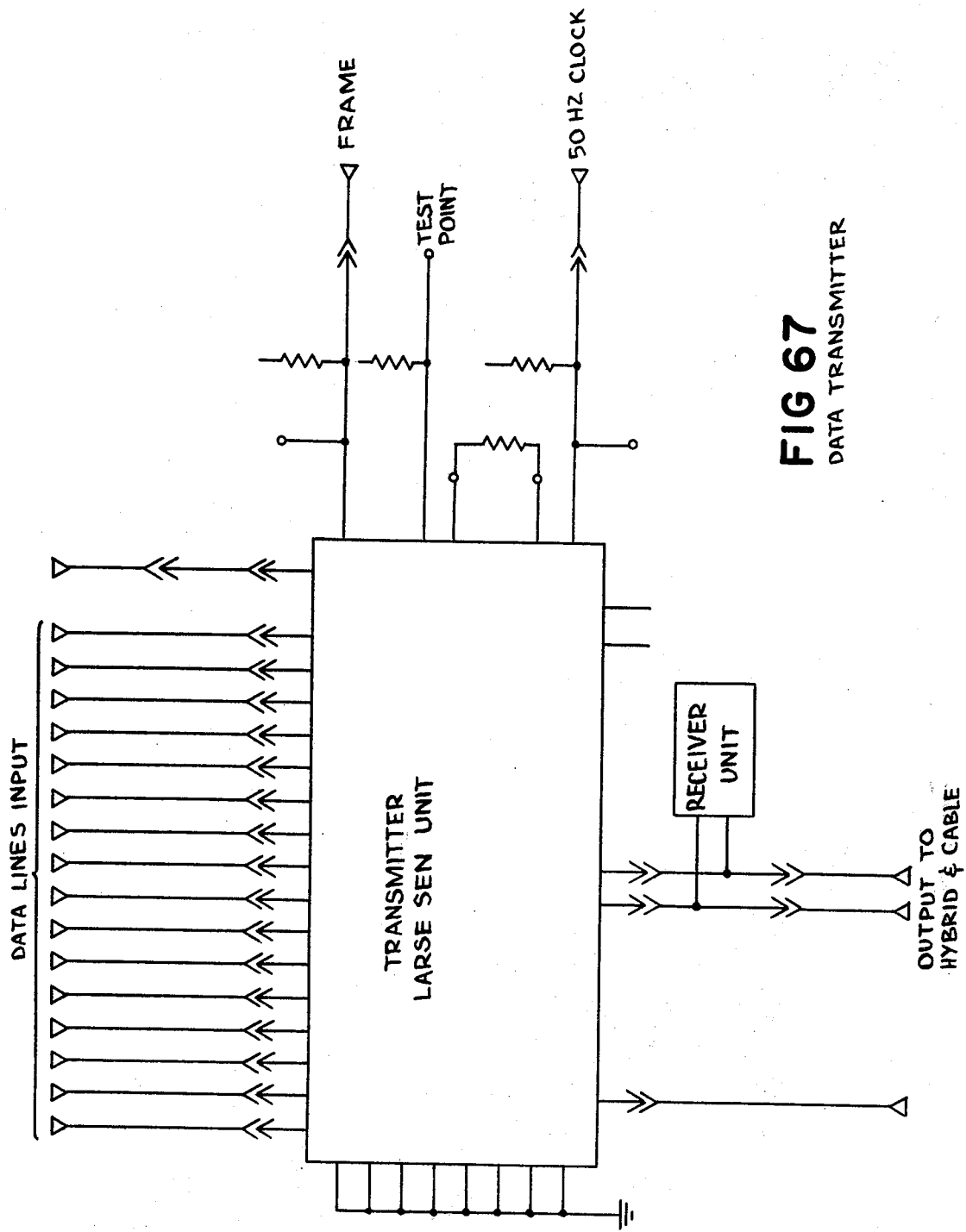

4.2 Transmitter, Clock and Frame Pulses (FIGS. 13 and 67)

The LARSE surface transmitter (SEN Unit) transmits a 750 Hz center frequency ± 150 Hz FSK data signal to the subsea receiver at a 60 bps word rate. Refer to the LARSE Data Communicator Technical Manual for the operational description of the SEN unit and the sensitivity resistor selection.

The basic system clock pulse (Clock A) is derived from the SEN unit crystal oscillator, pin 17, which has a frequency of 57.6 KHz. A second clock pulse (Clock M) is derived from a manual momentary pushbutton. With the Auto/Manual toggle switch in the auto position, automatic Clock A pulses are distributed. When in the manual position, Clock M pulses are individually incremented by operation of the manual clock pushbutton. During the two sync bit periods of the transmitted word, the Frame output of the SEN unit, pin 4, is high (5V). These automatic frame pulses (Frame A) are distributed when the Auto/Man toggle switch is in the Auto position. In the Manual positions Frame M pulses are individually incremented by the manual Frame pushbutton. The Frame pulses in the AUTO mode are high for 33.3 msec and low for 533 msec. The 533 msec period is the time for single word transmission and the leading edge of the 33.3 msec period denotes end of word transmission (EOW).

The manual or auto Frame and Clock pulses are parallel NAND gated to provide necessary distribution to the system.

For normal system operation the Auto/Man switch is set to the Auto position so that automatic synchronization of system operation is possible. The Manual position and manual generation of Clock and Frame pulses is provided only as a troubleshooting aid, where the entire PCR (STT) system sequence can be manually stepped thru.

4.3 Control Button Input Circuit (FIGS. 16 to 22 and 24 to 30)

When either control button is momentarily depressed, a logic 1 state appears at the output of the F9935 gate (DTL inverter) by virtue of its grounded input. This causes the status flip-flop to be set or cleared on the falling edge of the clock pulse (CLKA). In addition, a logic 1 is set into the changed-state flip-flop. The OPEN BKR, CLOSE VALVE and OFF control buttons set the button state (status) flip-flop. The CLOSE BKR, OPEN VALVE and ON control buttons reset the status flip-flop.

The output of these flip-flops (CNSXX and CNCXX) are directed to the button scanner circuit for acknowledgement (para. 4.4). When a button change is acknowledged, the changed-state flip-flop is reset by the button scanner circuit (CNRXX). This flip-flop is also cleared when power is turned on. This is the master reset input, MR1 (para. 4.14). The outputs of the button state flip-flop (CNSXX and CNSCC[1]) are also directed to lamp driver circuits (para. 4.11) for appropriate half-light button illumination which indicates button command state.

The button contact circuit employs 24 volt contact wetting for purposes of maintaining clean contacts over long-time operation in a marine atmosphere. When the contact is momentarily closed, approximately 7.5 ma flows through the contact from the 24 volt supply. The blocking diode, a 1N649, is forward biased by the 5 volt logic supply and produces a logic 1 at the output of the inverter (F9935). In the contact-open position, the blocking diode prevents current flow from the 24 volt supply into the logic. The 0.001 mfd capacitor is used to provide a low impedance path for any noise spikes that may be generated due to contact action and also to reduce the diode displacement current upon return to its blocking state. The 200 ohm resistor limits the capacitor short circuit current to 120 ma peak upon contact closure.

4.4 Button Scanner

The button scanner scans the 16 pushbutton interfaces. Upon receipt of a frame pulse (FRM D), the scan pulse counter delivers 15 scan pulses to the scan counter. The scan counter then increments until it finds a button that has changed state since the last scan, i.e. one of the CNC(XX) inputs into the CNC multiplexer goes low. Upon discovery a control bid is registered (CBD line goes low) which causes the scan counter to stop. This action is also detected by the OP code selector priority scanner (para. 4.5). The count at which it stops becomes the control button address (CA0 thru CA3) which determines bits 4 thru 8 of the control word. NOTE: bit 8 (CA4) is always = 0 due to the grounding of the CA4 line.

The control action requested is determined by the second multiplexer (CNS) which provides button state (status) and priority. The same scan count (address) which detected a change of state is used to select the status of the line that changed state, CNS(XX). The status bid, CS0, for this address is then registered. The CS0 bid is bit zero (S) and is complement, CS1 is bit-1 (P) of the control word sent.

The change of state flip-flop (para. 4.3) is reset for future control action by the CNR(XX) line output of the CNR 4:16 demultiplexer. The proper flip-flop for reset is chosen by the scan count (address) and when the BCR (control button change reset) line from the Execute Control circuit (para. 4.8) is low.

The second 4-bit counter is the scan pulse counter which allows for 15 scan counts (scan counter). After 15 counts (clock pulses) an SCC pulse (control button scan complete) is generated. The frame pulse (FRM D) is the clear input to this counter. When clear is removed (leading edge of FRM D pulse) the clock input increments the counter to 15 (0 to 15). At this count the NAND gate output (SCC pulse) goes low disabling the clock line. This also enables the OP code selector circuit (para. 4.5).

Light-emitting diodes (LED's) are used on the circuit board to give visual display of the scan counter count (addresses). Table III-1 shows the control button (word) address assignments.

Figure 9:
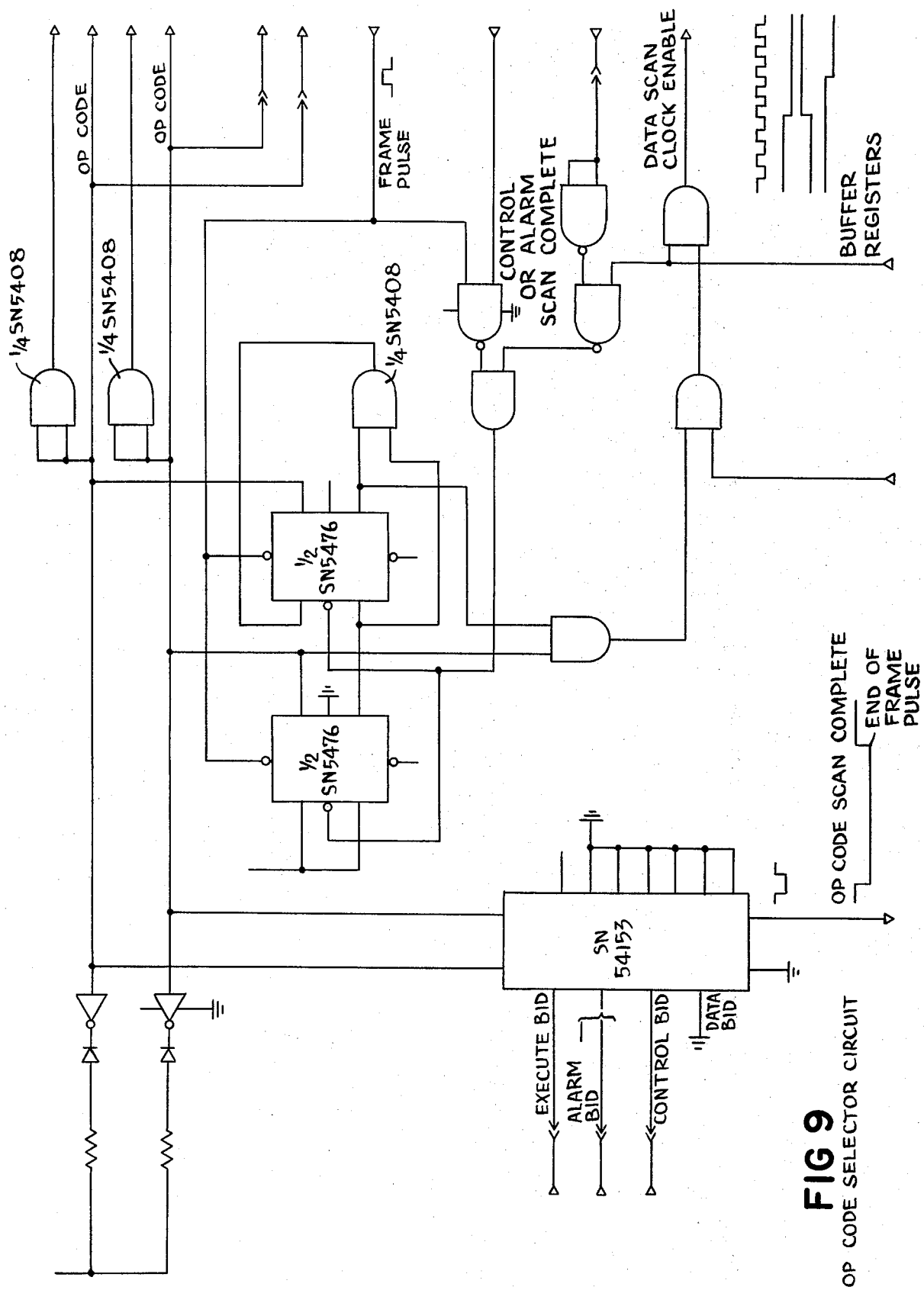

4.5 OP Code Selector (FIG. 9)

This circuit contains the priority scanner and priority counter. The priority counter runs immediately upon completion of the button scan (para. 4.4). This counter, consisting of a dual J-K circuit, is a 2-bit down counter set initially to '11'. When the frame pulse, FRM A, goes high and line SCC goes low (signifying the control button scan and alarm level change scan is complete) the counter starts counting down until a priority request is matched at the priority scanner. The priorities are arranged in descending order starting with '11' (execute command) and finishing with '00' (data scan). The priority scanner is a decoder which monitors if there are any bids on (Execute, Alarm Level Change and Control). The data scan bid, lowest in priority, is wired permanently on as a permanent request. Completion of the priority scan is indicated to the buffer registers (para. 4.7) by the OPC line going low. If the priority counter reaches a state '01' and has not yet been stopped by the OP1 line, the next clock pulse, CLKC, is gated to the data scan counter (para. 4.6) to advance it for selection of the next subsea data request point. This action, initiated by the DSE (Data Scan Clock Enable) is possible since the data scan bid (OP code = 00) is hard wired in.

TABLE III-1

Control Word and Control Button Address Assignments

| WORD NO. | CONTROL WORD | | | | | | USE | CONTROL BUTTON NO. |
|---|---|---|---|---|---|---|---|---|
| | OP CODE 15 14 | WELL NO. 13 12 11 10 | 9 | ADDRESS 8 7 6 5 4 | 3 2 | P 1 | S 0 | | |
| φ | φ 1 | 1 1 1 1 | 1 | φ φ φ φ | 1 1 | 1 φ | φ 1 | CIRCUIT BREAKER 1-OPEN CIRCUIT BREAKER 1-CLOSE | S104 S103 |

TABLE III-1-continued

Control Word and Control Button Address Assignments

| WORD NO. | CONTROL WORD ||||||| USE | CONTROL BUTTON NO. |
| | OP CODE 15 14 | WELL NO. 13 12 11 10 | 9 | ADDRESS 8 7 6 5 4 | 3 2 | P 1 | S 0 | | |
| --- | --- | --- | --- | --- | --- | --- | --- | --- | --- |
| 1 | ↓ | ↓ | ↓ | φ φ φ φ 1 | ↓ | 1 | φ | CIRCUIT BREAKER 2-OPEN | S106 |
|   |   |   |   |   |   | φ | 1 | CIRCUIT BREAKER 2-CLOSE | S105 |
| 2 | ↓ | ↓ | ↓ | φ φ φ 1 φ | ↓ | 1 | φ | ACOUSTIC BEACON-OFF | S108 |
|   |   |   |   |   |   | φ | 1 | ACOUSTIC BEACON-ON | S107 |
| 3 | ↓ | ↓ | ↓ | φ φ φ 1 1 | ↓ | 1 | φ | PUMP 1-OFF | S110 |
|   |   |   |   |   |   | φ | 1 | PUMP 1-ON | S109 |
| 4 | ↓ | ↓ | ↓ | φ φ 1 φ φ | ↓ | 1 | φ | PUMP 2-OFF | S112 |
|   |   |   |   |   |   | φ | 1 | PUMP 2-ON | S111 |
| 5 | ↓ | ↓ | ↓ | φ φ 1 φ 1 | ↓ | 1 | φ | PUMP CONTROL-MANUAL | S114 |
|   |   |   |   |   |   | φ | 1 | PUMP CONTROL-AUTO | S113 |
| 6 | ↓ | ↓ | ↓ | φ φ 1 1 φ | ↓ | 1 | φ | (SPARE) | — |
|   |   |   |   |   |   | φ | 1 | (SPARE) | — |
| 7 | ↓ | ↓ | ↓ | φ φ 1 1 1 | ↓ | 1 | φ | SYSTEM A-ACTIVE | S131 |
|   |   |   |   |   |   | φ | 1 | SYSTEM B-ACTIVE | S132 |
| 8 | ↓ | ↓ | ↓ | φ 1 φ φ φ | ↓ | 1 | φ | ANALOG CHECK-ZERO | S143 |
|   |   |   |   |   |   | φ | 1 | ANALOG CHECK-GAIN | S144 |
| 9 | ↓ | ↓ | ↓ | φ 1 φ φ 1 | ↓ | 1 | φ | ANNULUS VENT VALVE-CLOSE | S150 |
|   |   |   |   |   |   | φ | 1 | ANNULUS VENT VALVE-OPEN | S149 |
| 10 | ↓ | ↓ | ↓ | φ 1 φ 1 φ | ↓ | 1 | φ | MASTER VALVE-CLOSE | S152 |
|   |   |   |   |   |   | φ | 1 | MASTER VALVE-OPEN | S151 |
| 11 | ↓ | ↓ | ↓ | φ 1 φ 1 1 | ↓ | 1 | φ | WING VALVE-CLOSE | S154 |
|   |   |   |   |   |   | φ | 1 | WING VALVE-OPEN | S153 |
| 12 | ↓ | ↓ | ↓ | φ 1 1 φ φ | ↓ | 1 | φ | STEP CHOKE-CLOSE | S156 |
|   |   |   |   |   |   | φ | 1 | STEP CHOKE-OPEN | S155 |
| 13 | ↓ | ↓ | ↓ | φ 1 1 φ 1 | ↓ | 1 | φ | DHSV-CLOSE | S134 |
|   |   |   |   |   |   | φ | 1 | DHSV-OPEN | S133 |
| 14 | ↓ | ↓ | ↓ | φ 1 1 1 φ | ↓ | 1 | φ | LINES-BLOCK (STT) | S166 |
|   |   |   |   |   |   | φ | 1 | LINES-PURGE (STT) | S165 |
| 15 | φ 1 | 1 1 1 1 | 1 | φ 1 1 1 1 | 1 1 | 1 | φ | SHIP CONTROL-OUT (STT) | S168 |
|   |   |   |   |   |   | φ | 1 | SHIP CONTROL-IN (STT) | S167 |

When a bid at the priority scanner is found by the priority counter, the OPC line to the buffer registers (para. 4.7) goes low. This causes the OP1 line from the buffer registers to go low stopping the priority counter at the proper OP code (corresponding to bid). The OP code (lines OP0 and OP1) is then sent to the output multiplexers and buffer registers (para. 4.7) to form a part of the word for transmission (word bits 14 & 15). When the proper OP code is sent as indicated by the clearing of the bid at the priority scanner, the OPC line goes high and the complete cycle is repeated.

Light-emitting diodes (LED's) are provided for visual display of the OP code (OP0=LSB, OP1=MSB)

Figure 10:
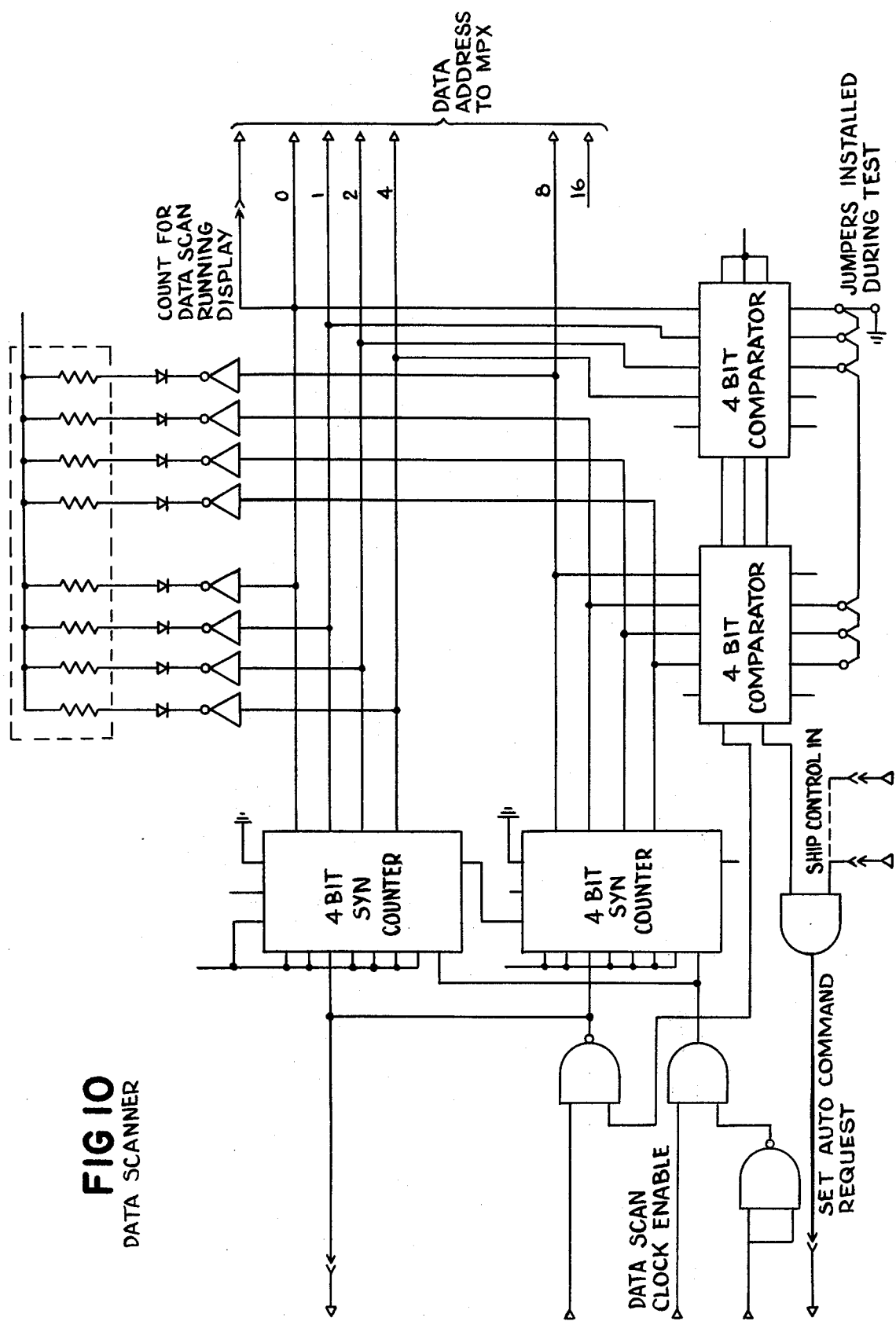

4.6 Data Scanner (FIG. 10)

The data scanner circuit includes a counter and comparator which sets the addresses for all data points subsea.

The counter is formed of two SN54161 4-bit synchronous counters. The maximum count (or address) is determined by on-the-board jumpers, which form one reference for the SN5485 comparators. The comparators cause the counter to be cleared to zero when they increment over this hard-wired address. The 5-bit count (DA0 through DA4), which are the data addresses, are transferred to the output multiplexer for transmission (para. 4.7).

When the DSE pulse is generated by the OP code circuit (para. 4.5) the data address counter is incremented by the CLKC pulse. If no execute, alarm level or control bids are on, the counter continues to count and its output becomes the data addresses for the request for data words sent (bits 4 thru 8). When the counter reaches the last address (11000), as hard wired by jumpers on the comparator, the auto command request line (AUC) goes high. This produces a control bid by automatically setting the changed state flip-flop in the analog check circuit (para. 4.13). NOTE: This automatic analog check is only enabled when the console (PCR or STT) is in command.

When the counter increments past this hard wired address it is cleared by the comparator (CLR line). If there is a control bid in the data scan timing sequence, the DSE pulse is inhibited and the data address counter is not incremented. Therefore, no address is skipped when a control word is sent subsea. Also, the DSE pulse is not generated when execute, alarm level change or control words are sent.

The request for data word address allocations are shown in Tables III-2 and III-3. The last three addresses are reserved by the subsea equipment and are not scanned. Address line DA5 (bit 9) is permanently high and could be used for future expansion.

Both data address counters are equipped with light-emitting-diodes (LED's). They provide visual display of counter state (data addresses) for troubleshooting purposes.

Figure 11:
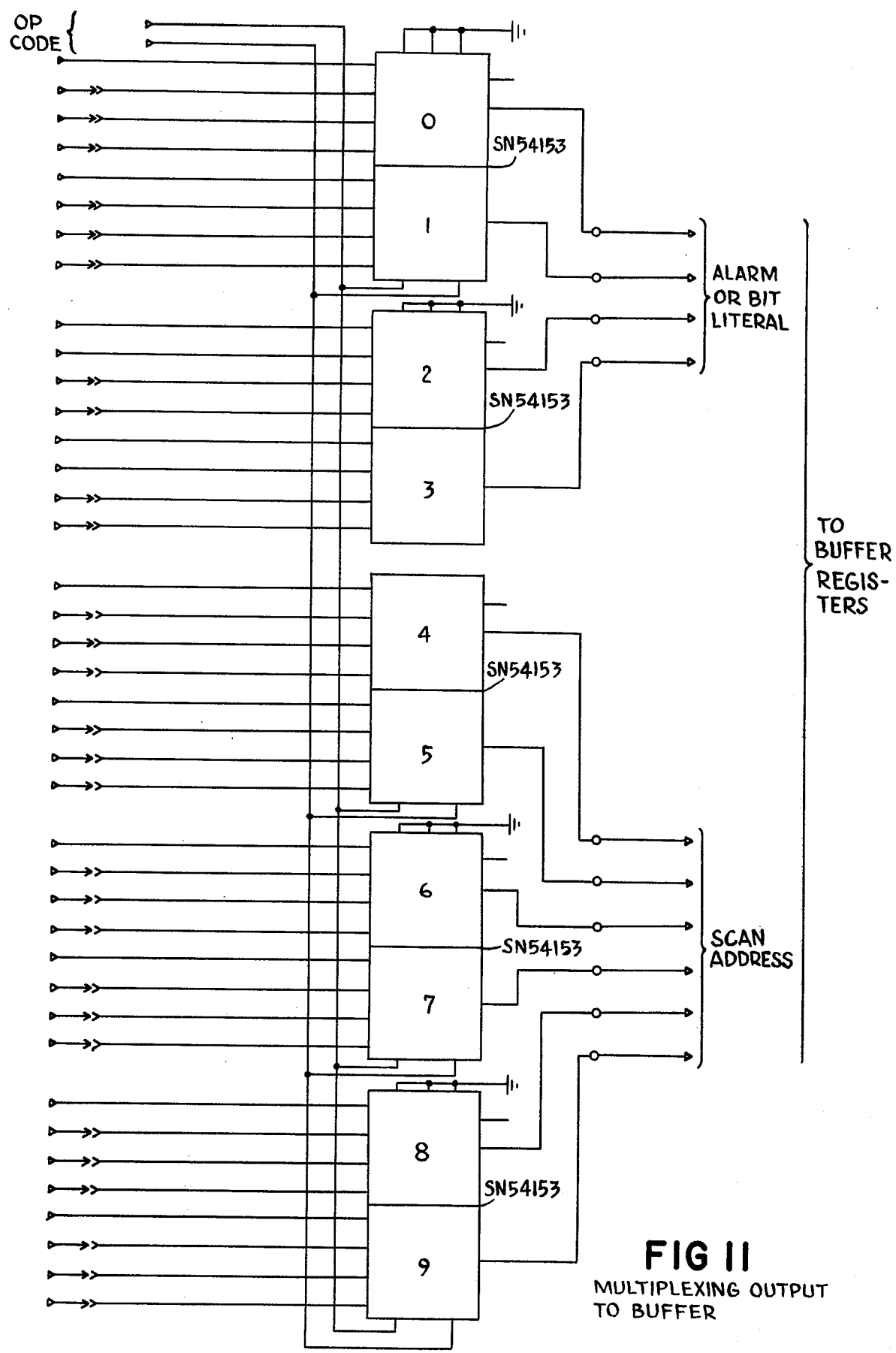
Figure 12:
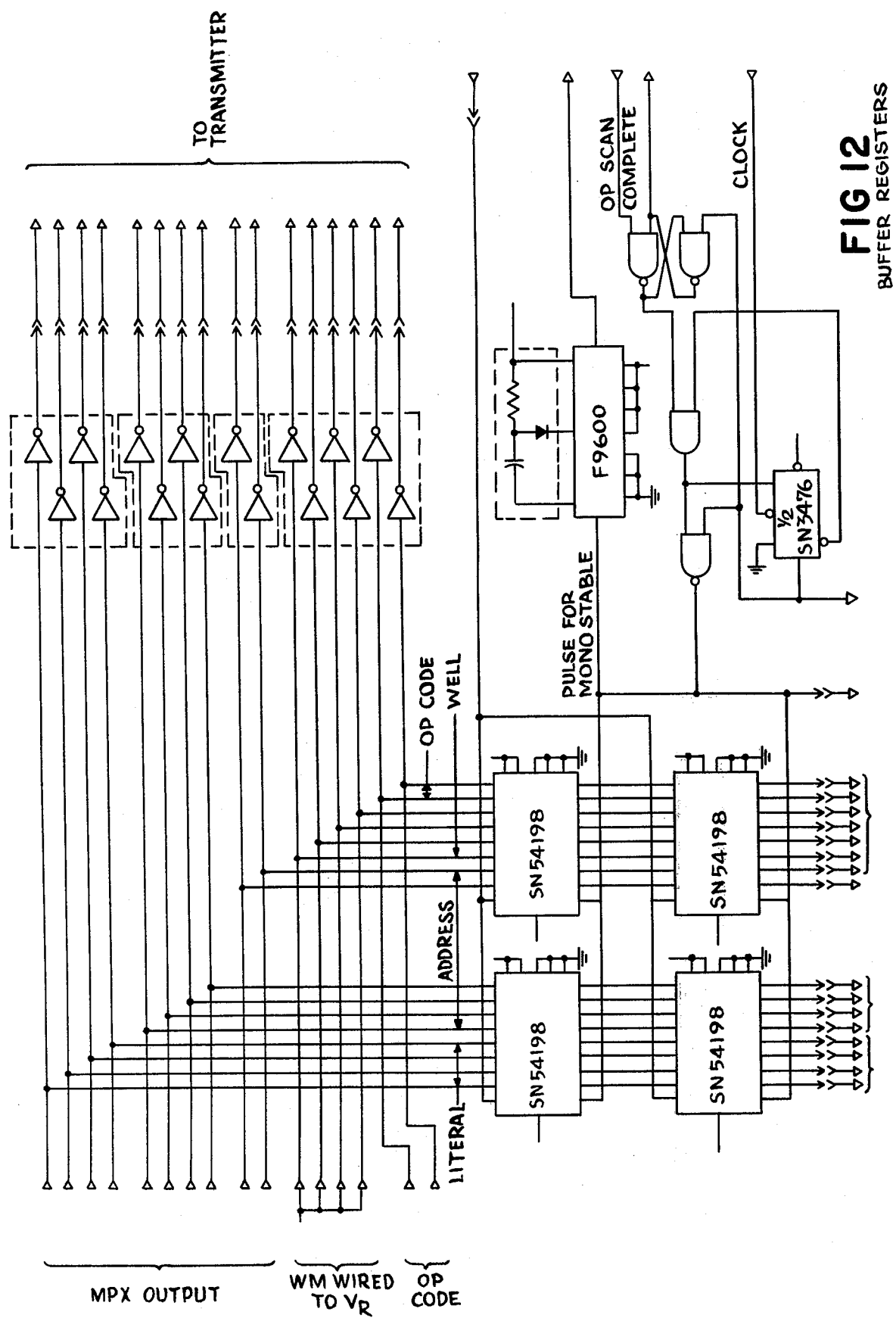

4.7 Output Multiplexer and Buffer Registers (FIGS. 11 and 12)

The output multiplexer stage consists of 5 dual 4 to 1 multiplexers which reduce the 40 line inputs to 10 lines under the control of the OP code selector (para. 4.5). This operation forms the relevant bits of the execute, alarm level change, or data scan word (bits 0 thru 9). These bits together with the 2 OP code bits (14 & 15) and well number address bits (10 thru 13 hard wired as 1111) are routed to the buffer registers and to the inputs of the LARSE SEN unit for transmission.

Operation of the buffer registers (SB1 and SB2) is controlled by the MNP line. When the OPC line from the OP code selector goes low, indicating a bid as been found, the FRM C enabled NAND gate toggle causes the OP1 line to the OP code selector to go low (refer to para. 4.5). The output of the toggle is gated with a J-K flip-flop to form the MNP line. the J-K flip-flop acts as a separate clock which is enabled only during the FRM C pulse period. Therefore, when the OPC line goes low a MNP pulse is generated. In the timing sequence for MNP pulse generation, at the low to high transition of the MNP pulse, the 16 data bits from the output multiplexer are loaded (gated) into buffer register SB1. Simultaneously, the second buffer, SB2, is loaded with the previous contents of SB1. buffer timing. Since in the every frame pulse (FRMC), buffer SB2 contains the data bits as transmitted "one word time" previous. This word storage is used by the Execute Control circuit (para. 4.8) for

TABLE III-2
Request for Data Word and Address Assignments

| WORD NO. | OP CODE 15 14 | WELL NO. 13 12 11 10 | ADDRESS 9 8 7 6 5 4 3 2 1 0 | USE | TYPE |
|---|---|---|---|---|---|
| 0  | φ φ | 1 1 1 1 | 1   φ φ φ φ    1 1 1 1 | ANALOG CHECK 0V OR 5V | ANALOG |
| 1  | ↓  | ↓        |     φ φ φ 1    ↓       | PRIMARY VOLTAGE | ↓ |
| 2  |    |          |     φ φ 1 φ            | SECONDARY VOLTAGE, PHASE A | |
| 3  |    |          |     φ φ 1 1            | SECONDARY VOLTAGE, PHASE B | |
| 4  |    |          |     φ 1 φ φ            | SECONDARY VOLTAGE, PHASE C | |
| 5  |    |          |     φ 1 φ 1            | MAIN HYDRAULIC PRESSURE | |
| 6  |    |          |     φ 1 1 φ            | DHSV HYDRAULIC PRESSURE | |
| 7  |    |          |     φ 1 1 1            | % OIL LEVEL | |
| 8  |    |          |     1 φ φ φ            | TUBING PRESSURE | |
| 9  |    |          |     1 φ φ 1            | ANNULUS PRESSURE | |
| 10 |    |          |     1 φ 1 φ            | FLOWLINE TEMP | |
| 11 |    |          |     1 φ 1 1            | FLOWLINE PRESSURE | |
| 12 |    |          |     1 1 φ φ            | SPARE | |
| 13 |    |          |     1 1 φ 1            | SPARE | |
| 14 |    |          |     1 1 1 φ            | SPARE | |
| 15 |    |          |     1 1 1 1            | SPARE | |
| 16 |    |          |   1 φ φ φ φ            | SEE TABLE III-3 | DIGITAL |
| 17 |    |          |   1 φ φ φ 1            | SEE TABLE III-3 | ↓ |
| 18 |    |          |   1 φ φ 1 φ            | SEE TABLE III-3 | |
| 19 |    |          |   1 φ φ 1 1            | SEE TABLE III-3 | |
| 20 |    |          |   1 φ 1 φ φ            | SEE TABLE III-3 | |
| 21 |    |          |   1 φ 1 φ 1            | SEE TABLE III-3 (STORED CONTROL WORD) | RESERVED |
| 22 |    |          |   1 φ 1 1 φ            | SEE TABLE III-3 (STORED ALARM WORD) | ↓ |
| 23 | φ φ | 1 1 1 1 | 1 1 φ 1 1 1    1 1 1   | SEE TABLE III-3 (A/D CONVERTER, EXECUTE CONFIRM | |
| —  | —  | —        | —  1 1 φ φ    —        | HARD-WIRE STRAP | — | double buffer timing, since the MNP pulse occurs once

TABLE III-3
REQUEST FOR DIGITAL DATA WORD AND RETURN WORD BIT ASSIGNMENTS

| REQUEST FOR DATA WORD | | | RETURN WORD |
|---|---|---|---|
| WORD NO. | ADDRESS LINES 8 7 6 5 4 | USE | BIT ASSIGN |
| 16 | 1 φ φ φ φ | TUBING SWAB VALVE OPEN | φ |
|    |           | TUBING SWAB VALVE CLOSED | 1 |
|    |           | WING VALVE OPEN | 2 |
|    |           | WING VALVE CLOSED | 3 |
|    |           | ANNULUS TOP VALVE OPEN | 4 |
|    |           | ANNULUS TOP VALVE CLOSED | 5 |
|    |           | ANNULUS VENT VALVE OPEN | 6 |
|    |           | ANNULUS VENT VALVE CLOSED | 7 |
|    |           | ANNULUS PRESSURE HIGH ALARM | 8 |
|    |           | MASTER VALVE OPEN | 9 |
|    |           | MASTER VALVE CLOSED | 10 |
|    |           | FLOW LINE PRESSURE HIGH ALARM | 11 |
|    |           | FLOW LINE PRESSURE HIGH ALARM | 12 |
|    |           | MAIN HYDRAULIC PRESSURE HIGH ALARM | 13 |
|    |           | MAIN HYDRAULIC PRESSURE LOW ALARM | 14 |
|    |           | SALT WATER DETECTED ALARM | 15 |
| 17 | 1 φ φ φ 1 | BCD DIGIT. CHOKE POSITION. LSD. | φ |
|    |           |  | 1 |
|    |           |  | 2 |
|    |           |  | 3 |
|    |           |  | 4 |
|    |           | BCD DIGIT. CHOKE POSITION. | 5 |
|    |           |  | 6 |
|    |           |  | 7 |
|    |           |  | 8 |
|    |           | OCTAL DIGIT. CHOKE POSITION, MSD. | 9 |
|    |           |  | 10 |
|    |           | CHOKE AT Z | 11 |
|    |           | CHOKE AT 183 | 12 |
|    |           | OIL LEVEL LOW ALARM | 13 |
|    |           | CIRCUIT BREAKER 1 CLOSED | 14 |
|    |           | CIRCUIT BREAKER 2 CLOSED | 15 |
| 18 | 1 φ φ 1 φ | BEACON ON | φ |
|    |           | PUMP 1 ON | 1 |
|    |           | PUMP 2 ON | 2 |
|    |           | PUMP MODE AUTOMATIC | 3 |
|    |           | VALVE POSITION ALARM | 4 |
|    |           | CKT. BREAKERS TRIPPED ALARM | 5 |
|    |           | PUMP MOTOR OVERLOAD ALARM | 6 |
|    |           | PRIMARY VOLTAGE HIGH ALARM | 7 |
|    |           | INITIAL OIL LEAK DETECTED ALARM | 8 |
|    |           | SECONDARY VOLTAGE LOW ALARM | 9 |
|    |           | SYSTEM A SELECTED | 10 |

TABLE III-3-continued
REQUEST FOR DIGITAL DATA WORD AND RETURN WORD BIT ASSIGNMENTS

| REQUEST FOR DATA WORD | | | RETURN WORD |
|---|---|---|---|
| WORD NO. | ADDRESS LINES 8 7 6 5 4 | USE | BIT ASSIGN |
| 19 | 1 φ φ 1 1 | SYSTEM B SELECTED | 11 |
| | | SHIP IN CONTROL (PCR ONLY) | 12 |
| | | MAXIMUM OIL LEAK DETECTED ALARM | 13 |
| | | SV6 OPEN (DHSV) | 14 |
| | | SV6 CLOSED (DHSV) | 15 |
| | | SV7 OPEN (DHSV) | φ |
| | | SV7 CLOSED (DHSV) | 1 |
| | | Y.M. CONNECTOR FULLY LOCKED | 2 |
| | | Y.M. CONNECTOR FULLY UNLOCKED | 3 |
| | | SPARE | 4 |
| | | " | 5 |
| | | " | 6 |
| | | " | 7 |
| | | " | 8 |
| | | " | 9 |
| | | " | 10 |
| | | " | 11 |
| | | " | 12 |
| | | " | 13 |
| | | " | 14 |
| 20 | 1 φ 1 φ φ | SHIP CONTROL OUT | 15 |
| | | SPARE | φ ↓ |
| 21 NOT SCANNED | 1 φ 1 φ 1 | SPARE | 15 |
| | | STORED CONTROL WORD FOR RETRANSMISSION BY SUBSEA (RESERVED ADDRESS) | φ ↓ |
| | | III-29 | |
| 22 NOT SCANNED | 1 φ 1 1 φ | STORED ALARM LEVEL WORD FOR RETRANSMISSION BY SUBSEA (RESERVED ADDRESS) | 15 φ ↓ |
| 23 NOT SCANNED | 1 φ 1 1 1 | | 15 φ 1 |
| | | BCD DIGIT (LSD) | 2 3 |
| | | A/D CONVERTER OUTPUT — BCD DIGIT | 4 5 6 7 |
| | | BCD DIGIT (MSD) | 8 9 10 |
| | | 100% OVERRANGE BIT | 11 12 |
| | | SPARE | 13 |
| | | SPARE | 14 |
| | | EXECUTE WORD ACCEPTED BIT | 15 | subsea return word comparison. Buffer register SB2, then, contains either the address of the data returning from subsea or the original command word for subsequent execute enable comparison.

The MNP pulse also triggers a single-shot monostable multivibrator (F9600). When triggered, an output pulse MDP is sent to the LARSE transmitter. This pulse (MDP) is approximately 100 usec in length and enables the transmitters data lock input. This causes the information on the 16 data input lines to be transferred into the input hold memory for transmission during the frame period.

The duration of the MDP pulse is set by the RC network input to the monostable (t = 0.32 RC). The diode is used to prevent high inverse leakage currents through the capacitor by preventing inverse voltage across the capacitor. The hex inverters (SN5404) in the data lines are used to invert the data line logic for compatibility with the subsea logic system.

Figure 31:
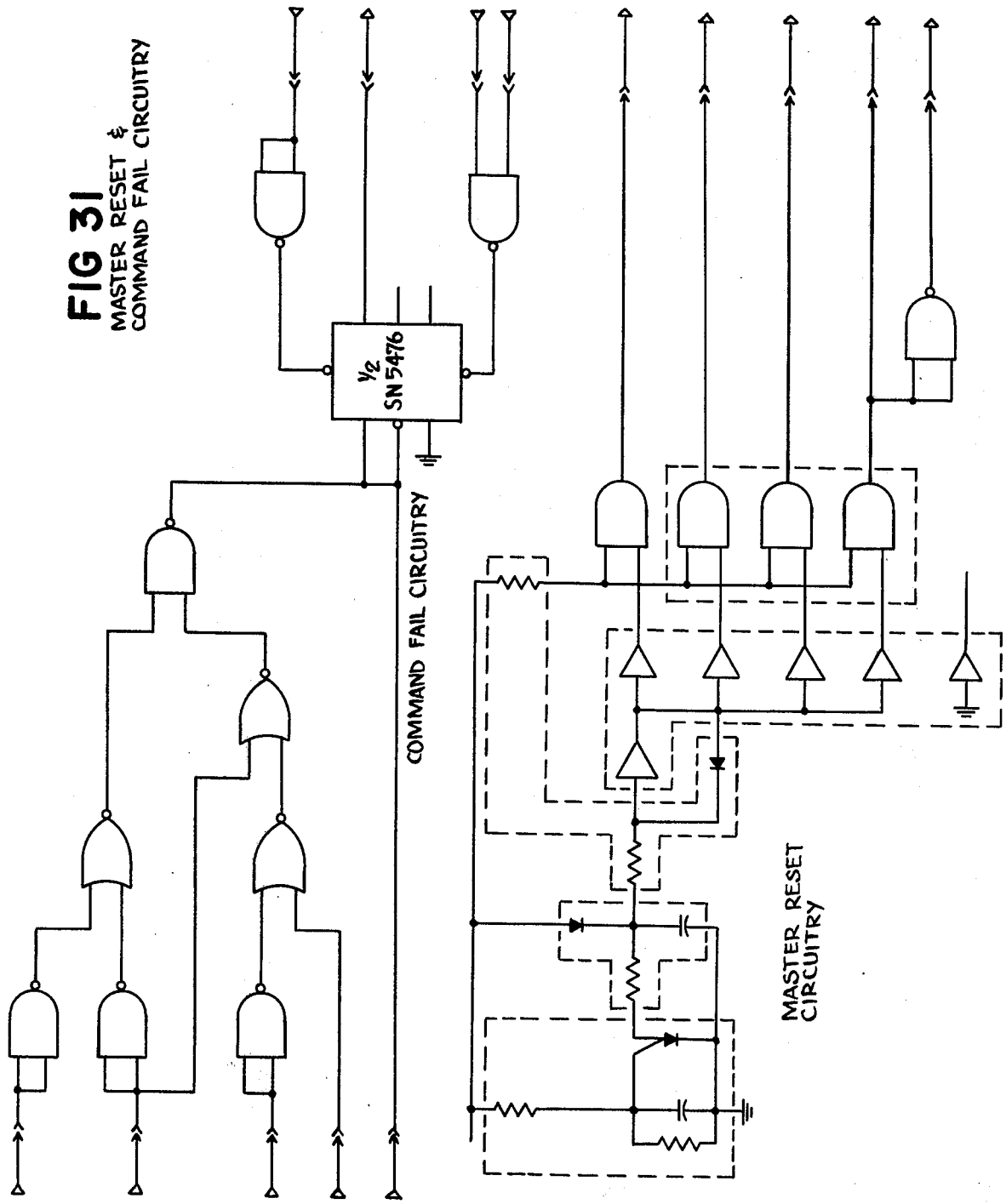
Figure 32:
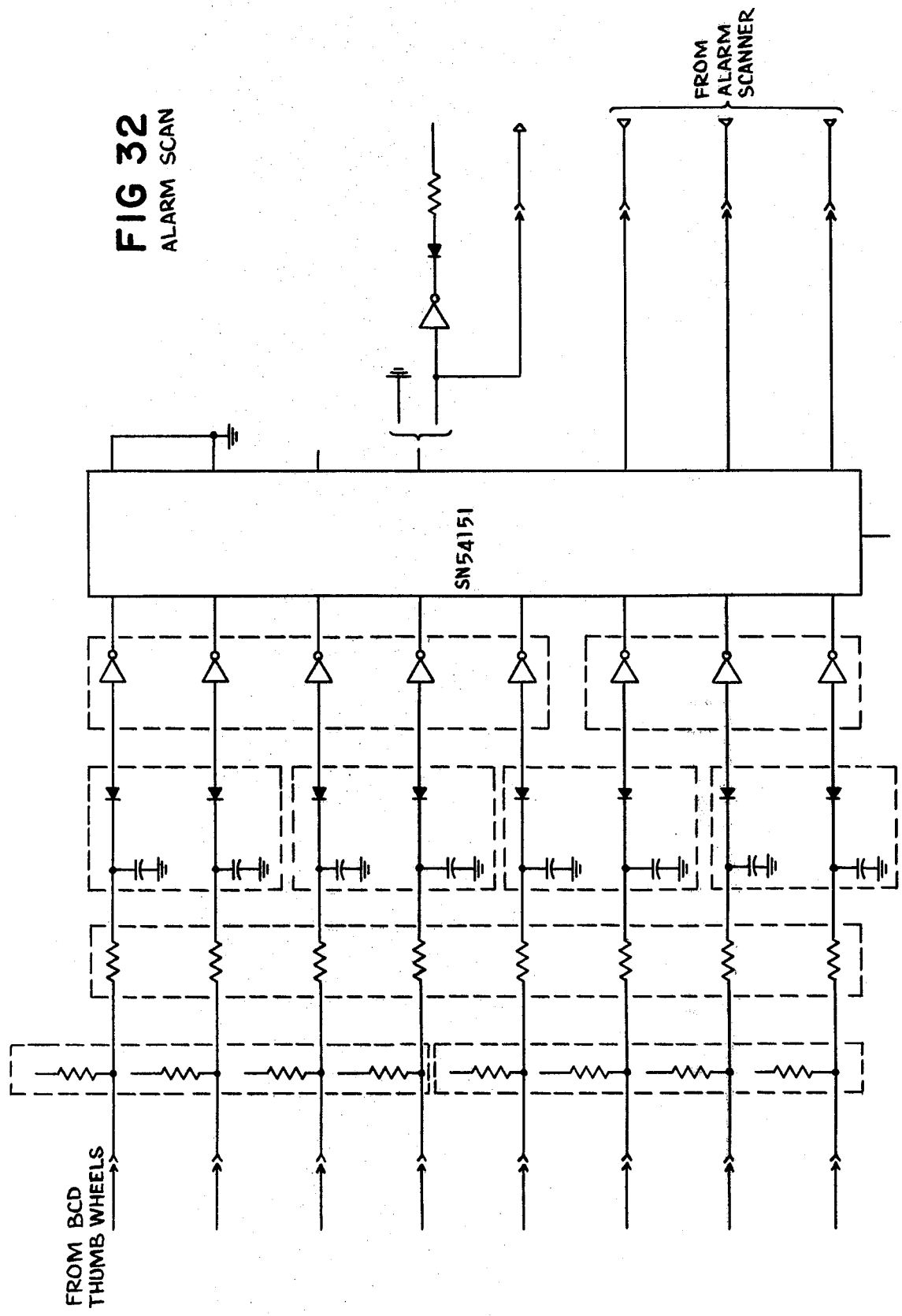
Figure 33:
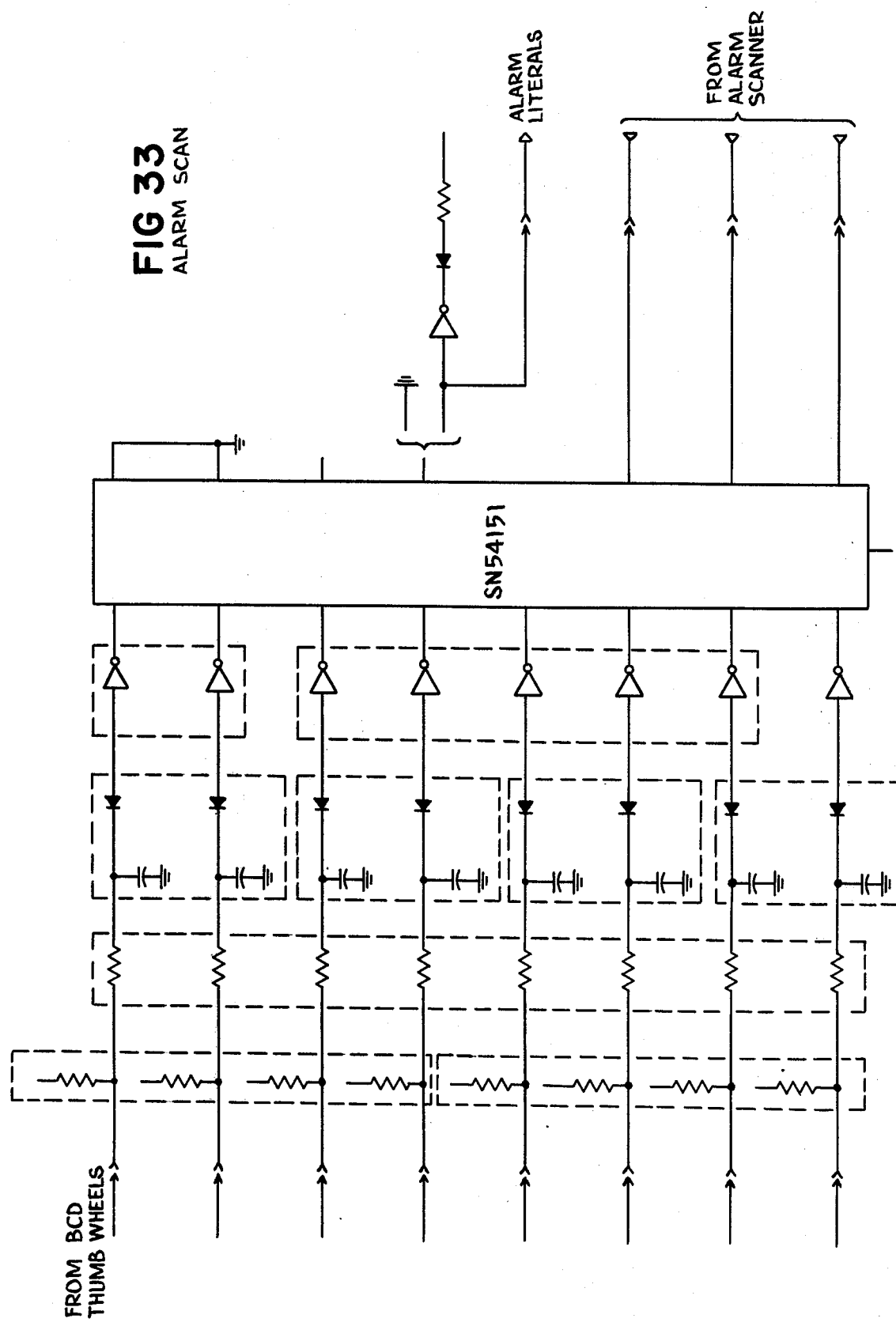
Figure 34:
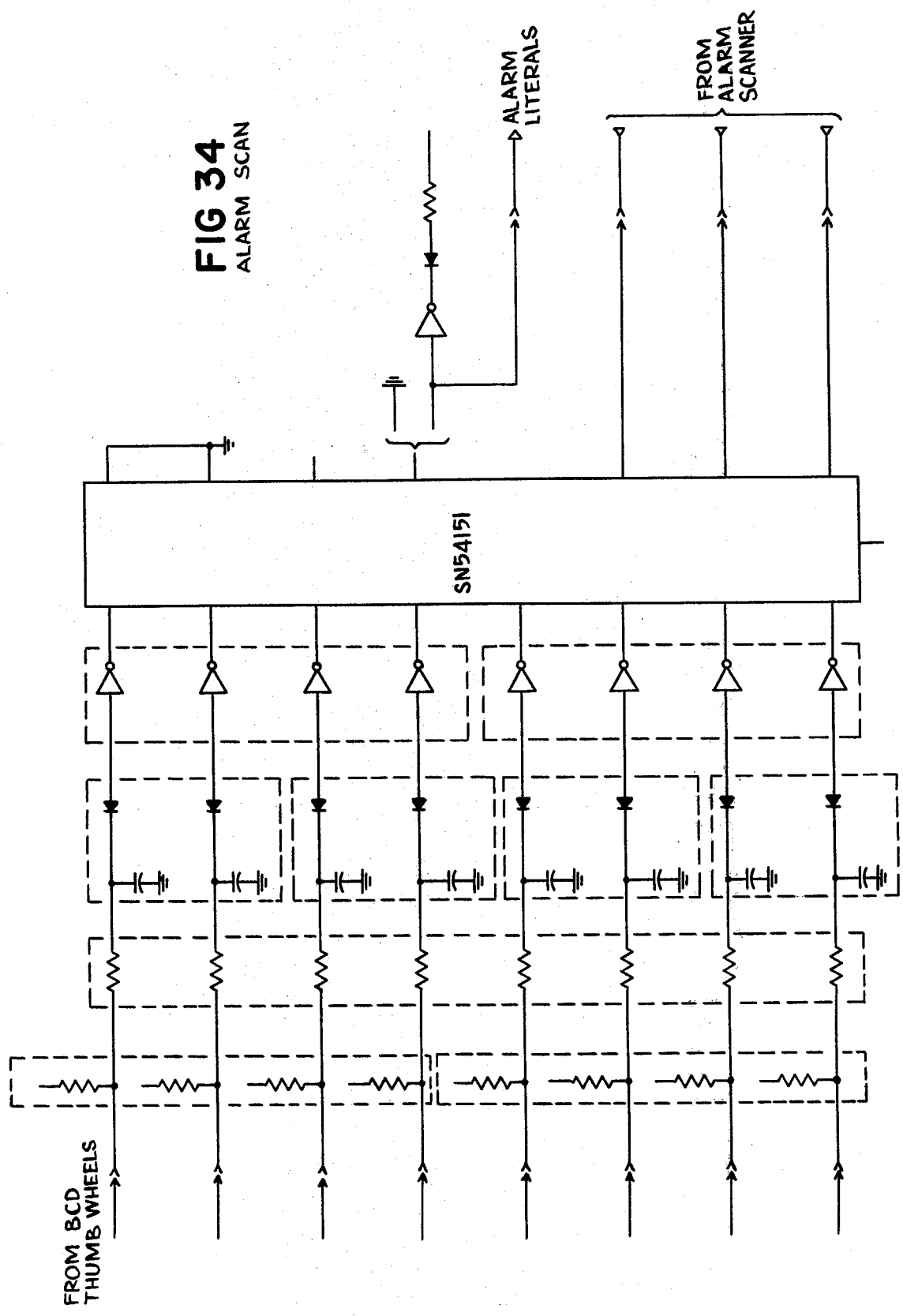
Figure 35:
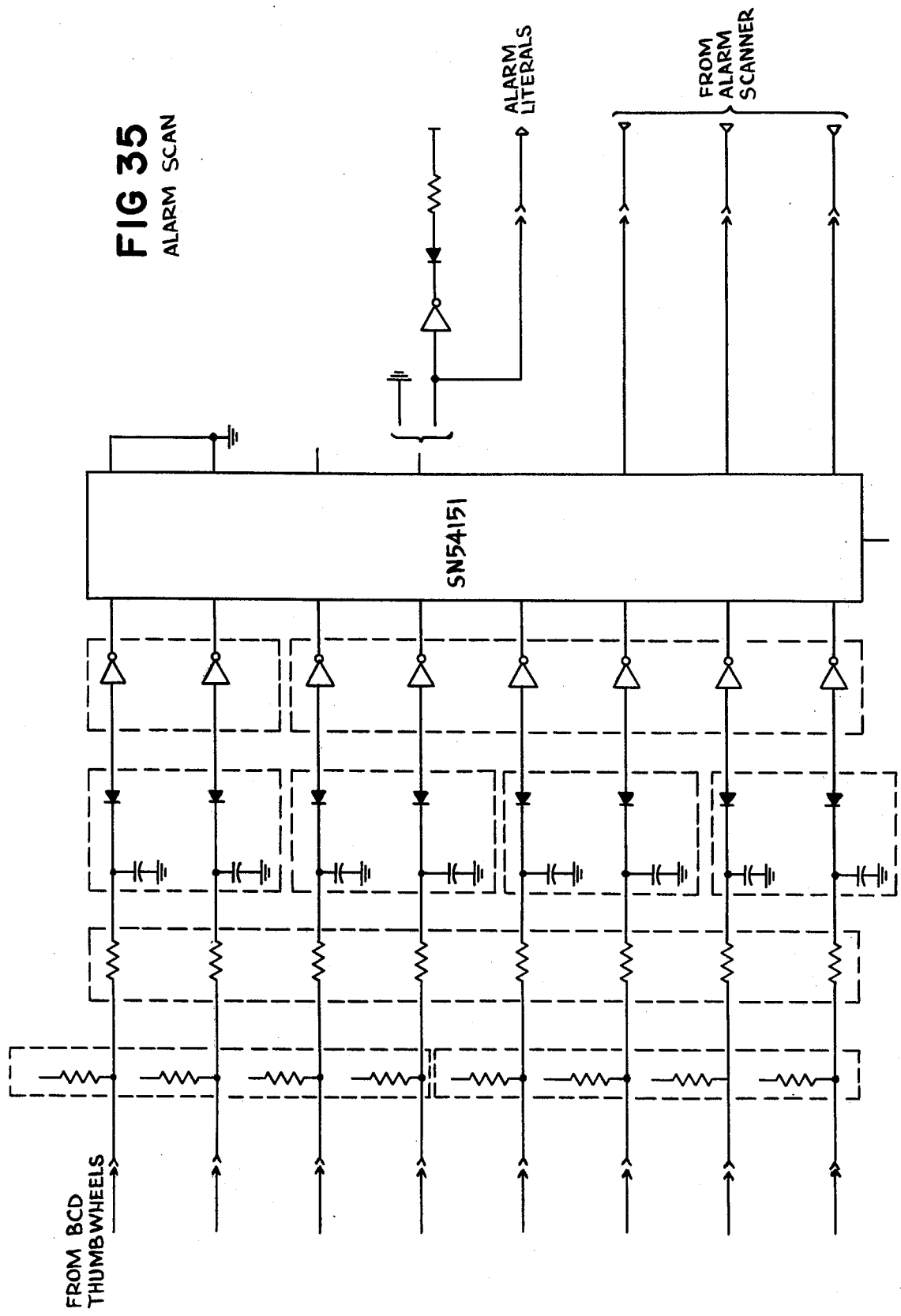
Figure 37:
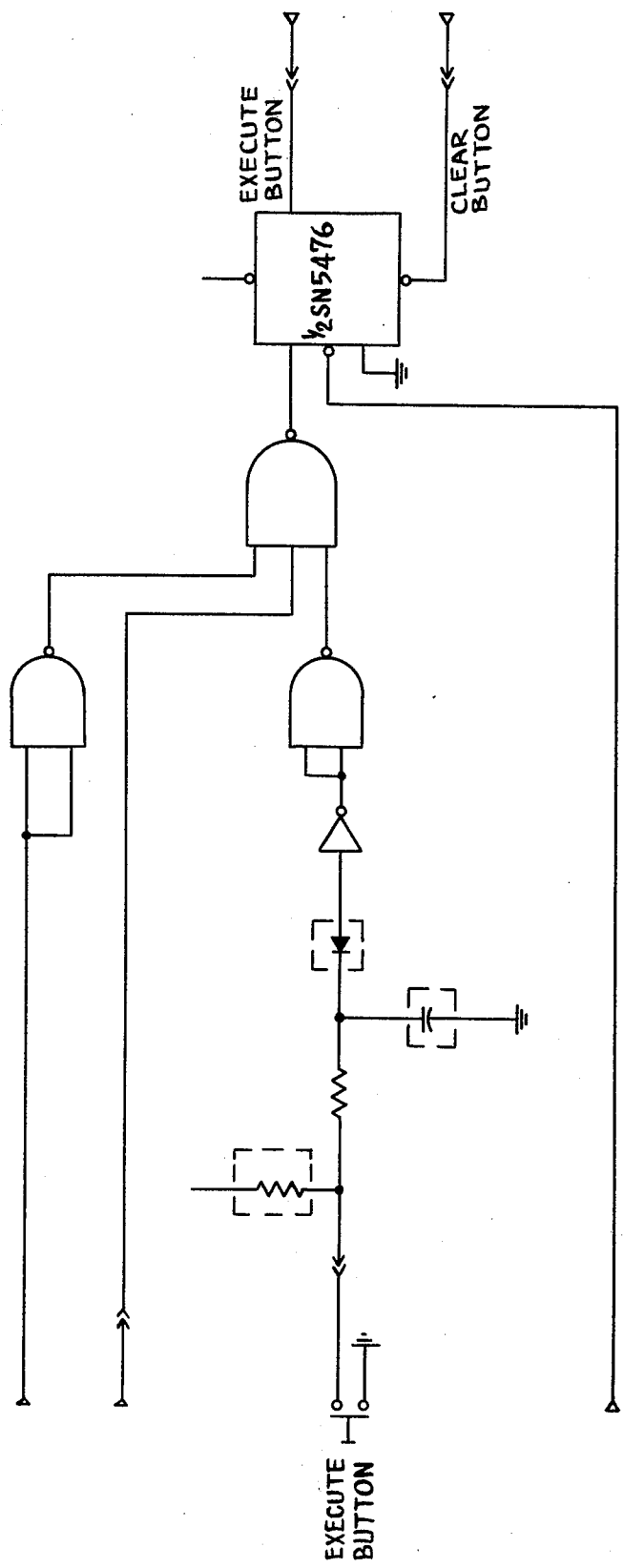
Figure 45:
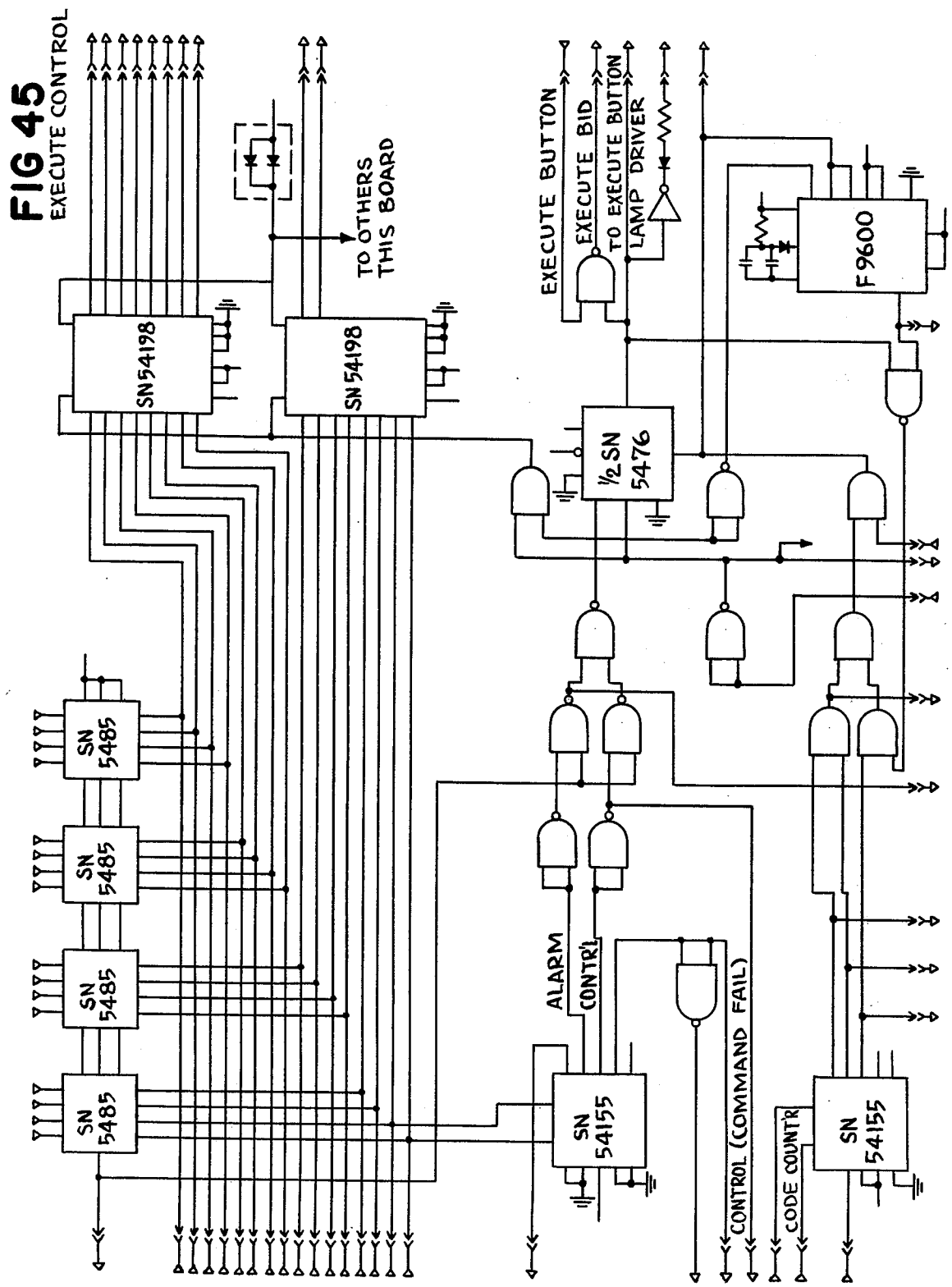
Figure 46:
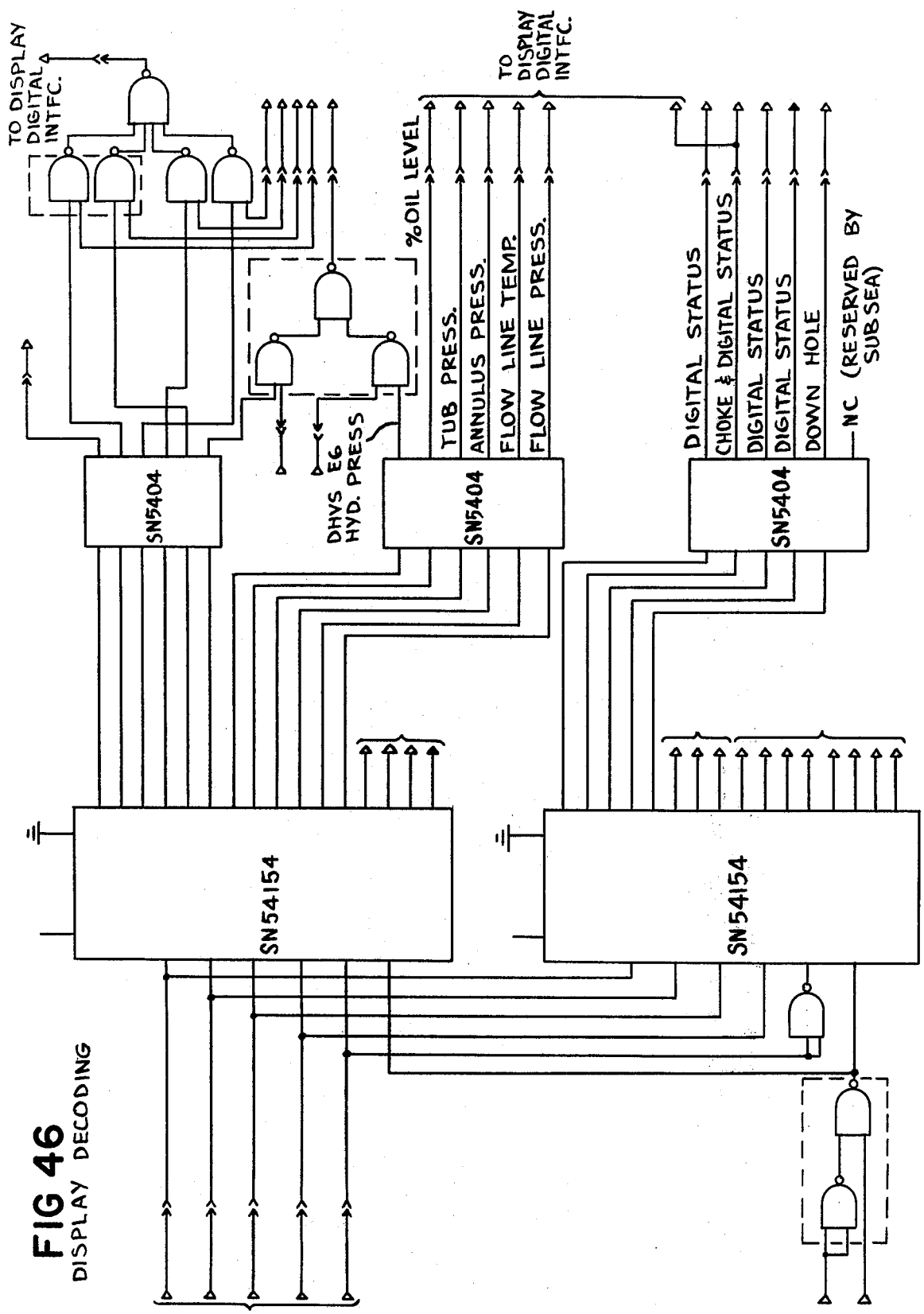

4.8 Execute Control and Command Fail (FIGS. 31, 37, and 45)

Every word received from subsea is compared bit by bit by four SN5485 comparators against the contents stored in the double buffer, SB2 (para. 4.7). If the contents of the buffer and receiver output are the same and a command word (control or alarm level) is decoded from the stored OP code (OB0 and OB1) by the previous OP code decoder, then the execute flip-flop gate is enabled. According to the stored OP code in SB2, an execute line, EXR; an alarm level change line, ALF; a control line, CBN; or the data line, DSB is selected by the decoder. Selection of either the ALF or CBN line partially enables the execute flip-flop gate. When the stored word compares with received word, line EQU (A=B) goes high. This completes the enabling of the execute J-K flip-flop. The J input function for enabling is then, J = ALF · (A=B) or J = CBN · (A=B).

The clock input to the execute flip-flop is driven by the end-of-word (EOW) line from the LARSE receiver. The line is pulsed when the word received from subsea appears at the output registers of the receiver.

Enabling of the flip-flop (J input goes high) and presence of the EOW pulses causes the contents of SB2 to be stored into 10 bit buffer register, SB3. These are the 10 least significant bits of the execute word, which will be transmitted when the OP code is 11 (Execute Command). This assures that the transmitted execute word, with exception of the OP code and well number contains the same bits as the control or alarm level change word. The well number bits are hardwired at both surface and subsea as 1111.

The output of the execute flip-flop illuminates the execute command button and enables the execute button for a period of about 10 seconds. When the operator pushes the button during this period an execute bid (EBD) is directed to the OP code selector circuit (sheet 5) for Execute word transmission.

The OP code, as detected by the OP code priority scanner (sheet 5, lines OP0 and OP1), is decoded into three lines by the Present OP Code Decoder. These are the execute (EX), alarm change reset (ACR) and button change reset (BCR) lines. These lines are active low functions. The execute enable flip-flop and execute timer (F9600) are reset (cleared) when:

EX line = 0 (transmitted OP code = 11)
ACR line = 0 (transmitted OP code = 10)
BCR line = 0 (transmitted OP code = 01)
MR = 0 (master reset during power turn on)
Execute Timer = Quiescent state (monostable timed out)

The execute timer is a single-shot monostable multivibrator with an RC timing control (t = 0.32 RC) of approximately 10 seconds. The monostable is triggered when the execute flip-flop is enabled. This allows about 10 seconds for the operator to operate the execute button after the button is enabled (illuminated). After 10 seconds its output (EX1) is gated to reset the execute flip-flop (CXB line). If a command OP code is transmitted during this period, the execute flip-flop is reset (enable state removed by EX, ACR and BCR lines). This eliminates any possibility of erroneous operation.

The EXR, EQU, DSB$^1$ and EXRT lines are used in the command fail alarm circuit. The "Command Fail" alarm reports that during a command-confirm-execute cycle one or more of the security checks failed and that the command action should again be attempted. The command fail flip-flop is clocked by the EOW (end of transmitted word) pulse and reset by either the master reset (MR3) or EXRT (execute flip-flop reset) line. The flip-flop is normally set by absence of a data fail signal from the LARSE receiver (REDE Unit).

If prior to an execute command attempt, the control word stored in SB2 did not compare with the return word (A not = B) and the previous OP code stored was not a request for data word, the flip-flop output (CFL goes high) will indicate an alarm condition. If the control word did compare, but the execute word OP code (previous OP code stored) did not compare with bit 15 of the returned word, then an alarm is generated. If a data fail is generated by the LARSE receiver, the flip-flop set is lost and an alarm condition is also indicated.

Provision is made in the timing when a control command was rejected, then accepted, and then the execute was not confirmed. The CFL line is routed directly to a lamp driver circuit FIG. 52.

4.9 Alarm Level Change Button Scan and Word Generation (FIGS. 32 to 35, 38 to 41, and 43)

Figure 38:
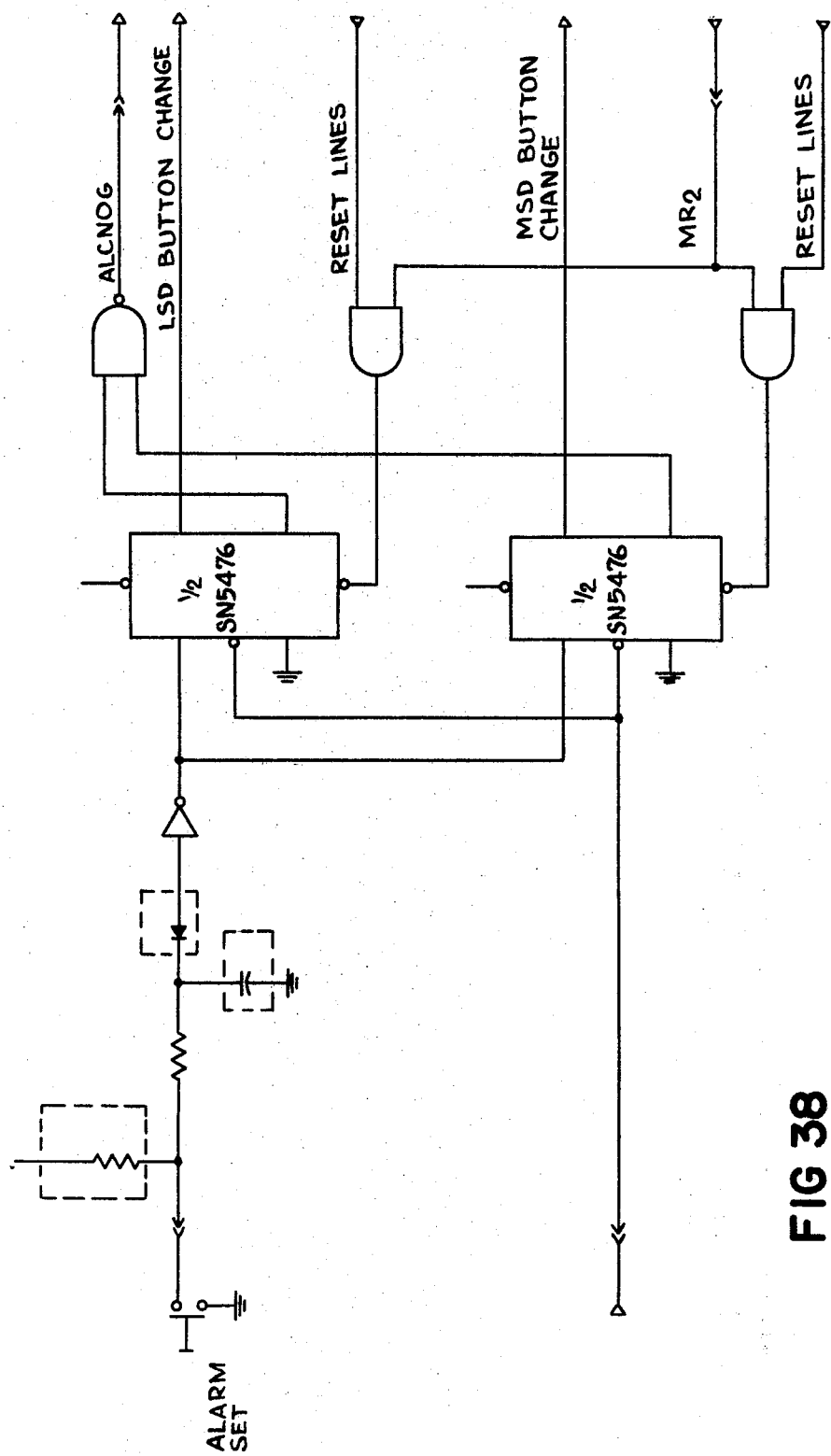
Figure 39:
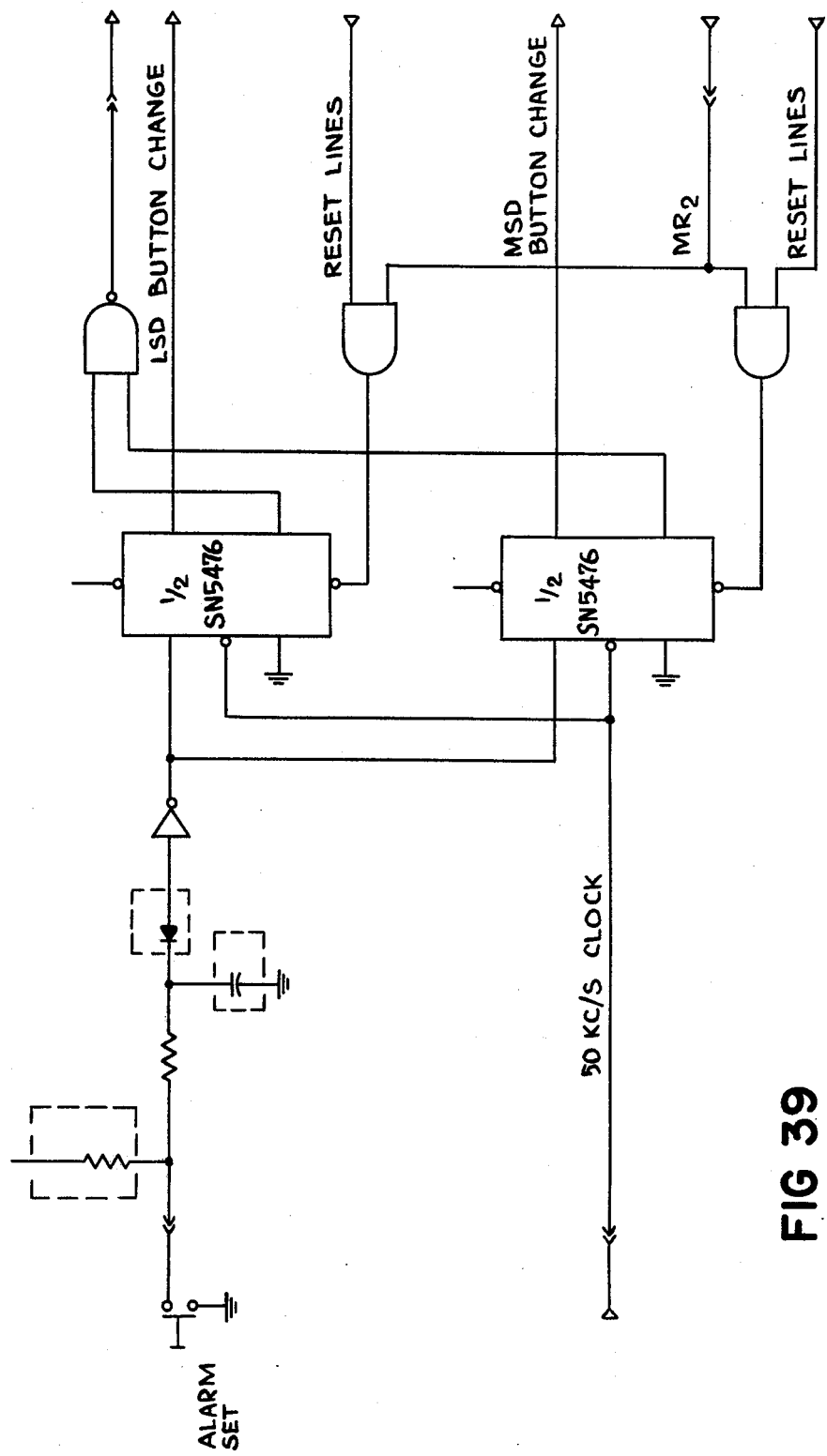
Figure 40:
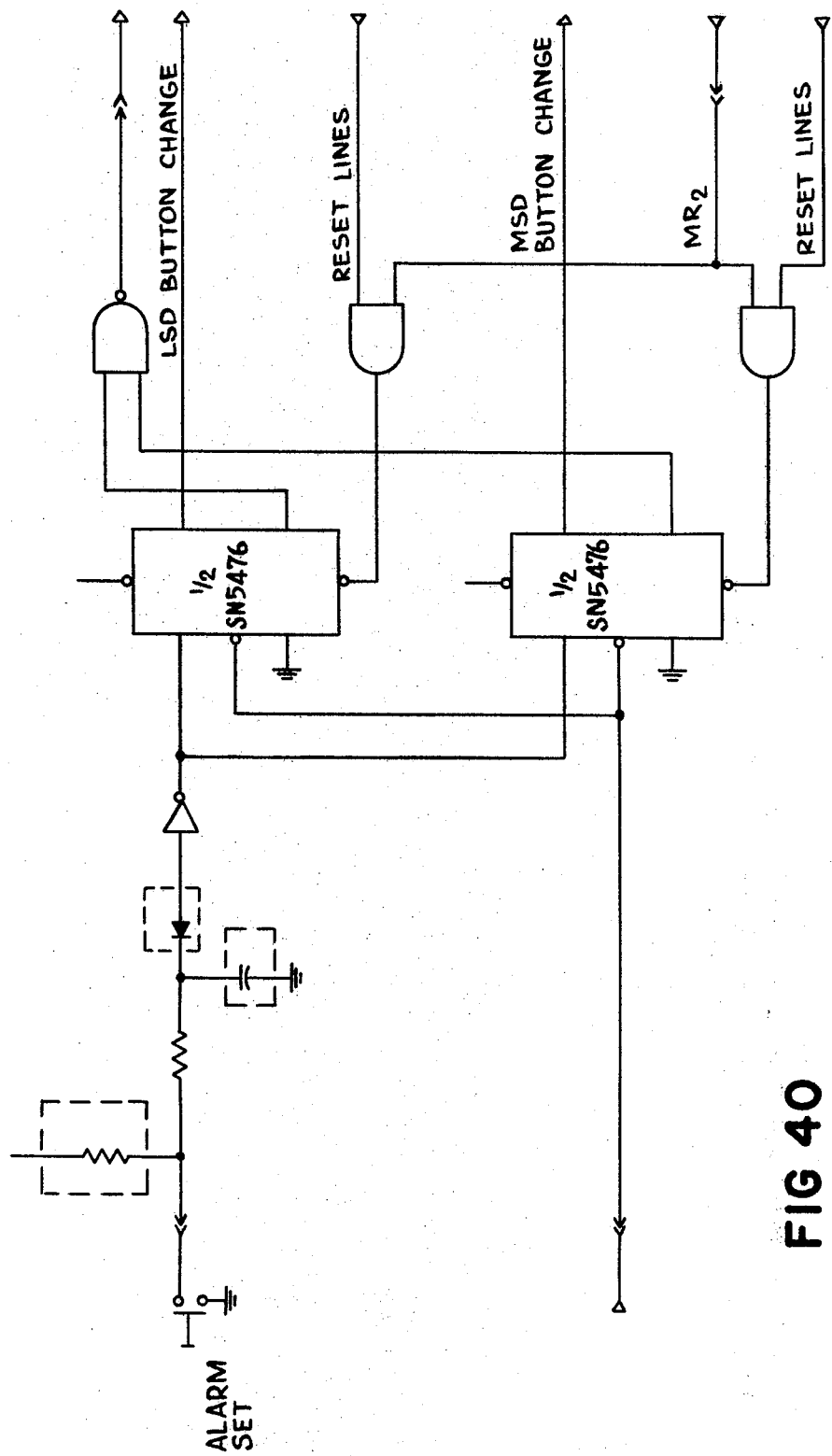
Figure 41:
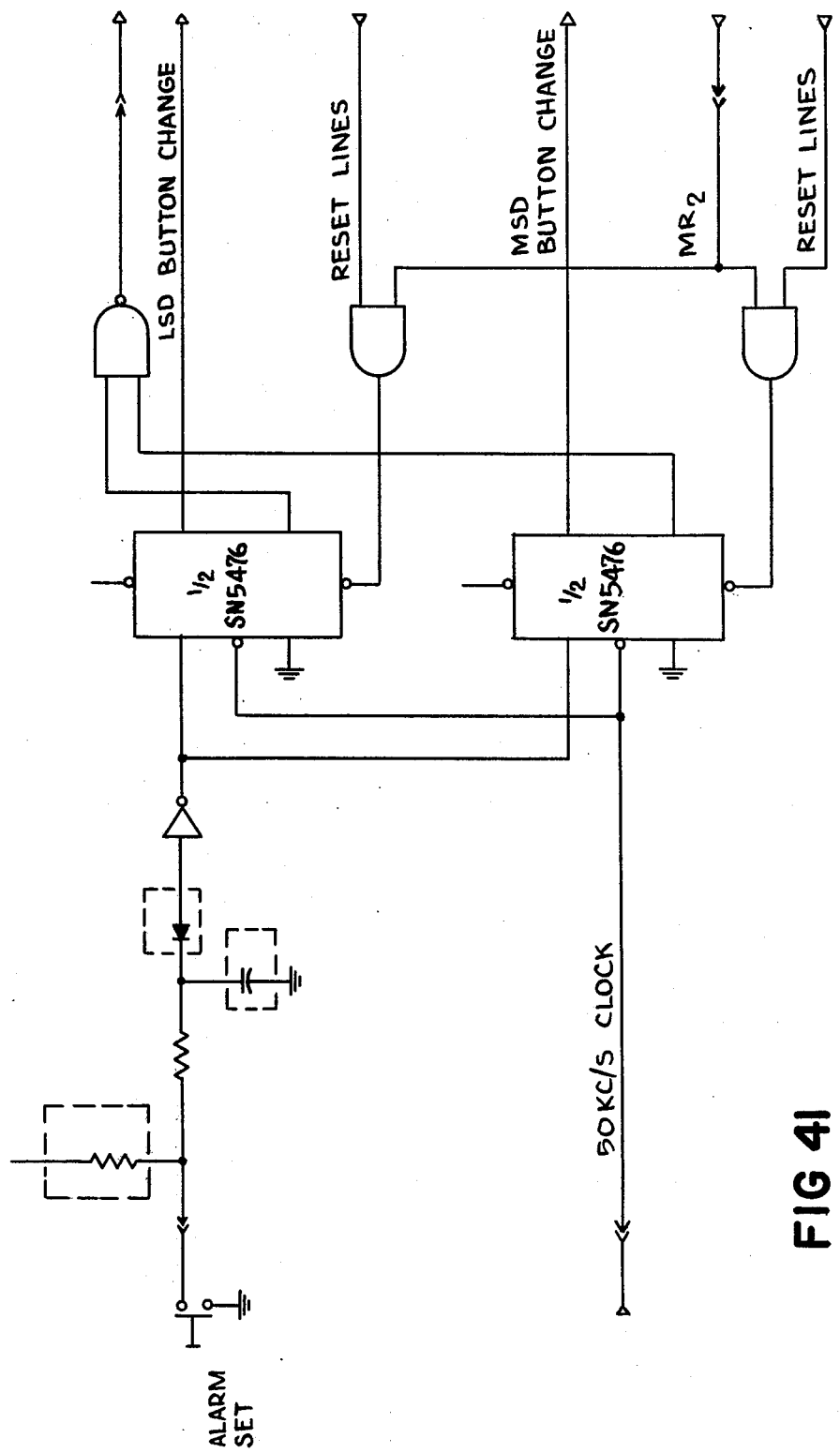
Figure 42:
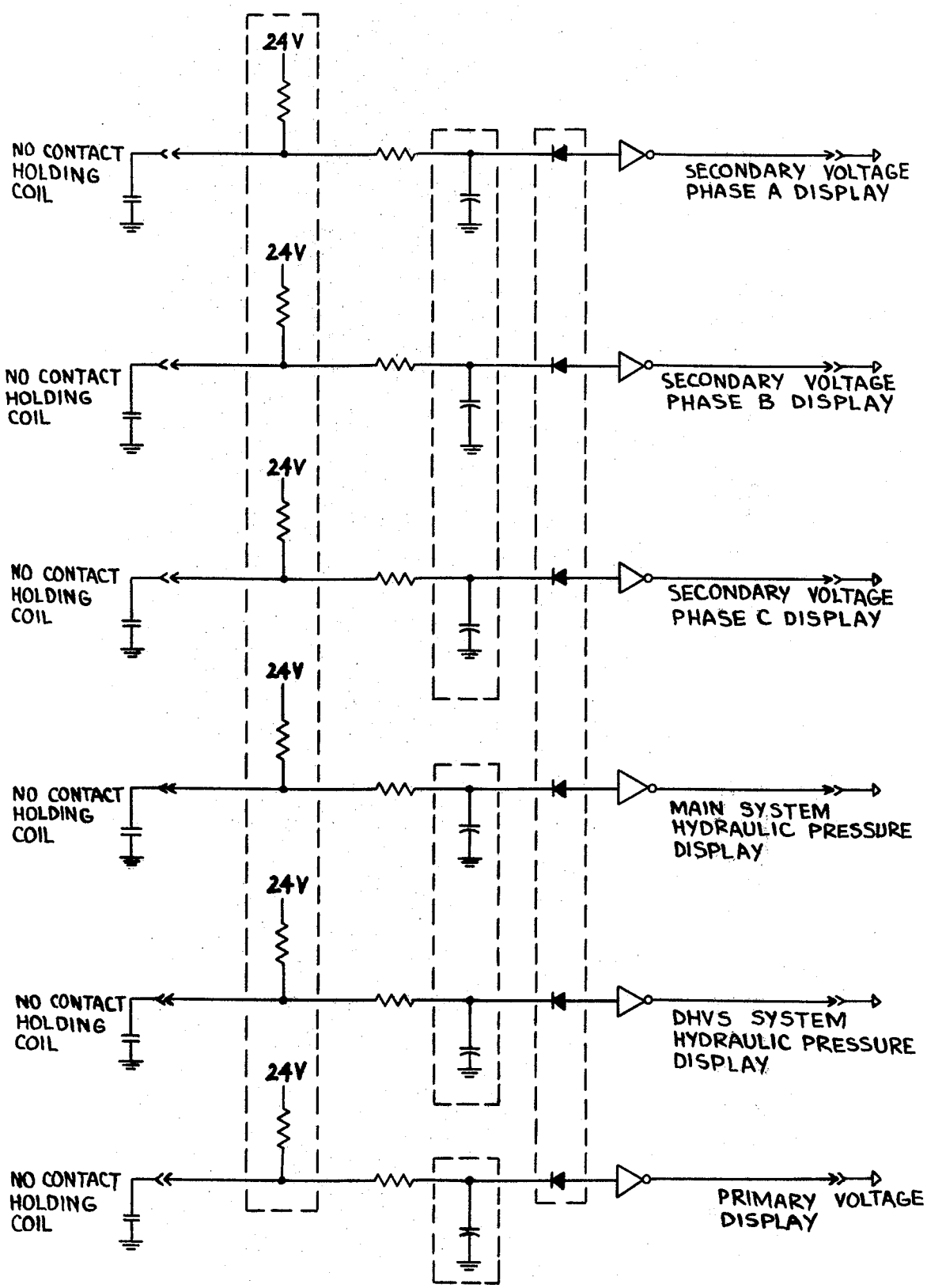
Figure 43:
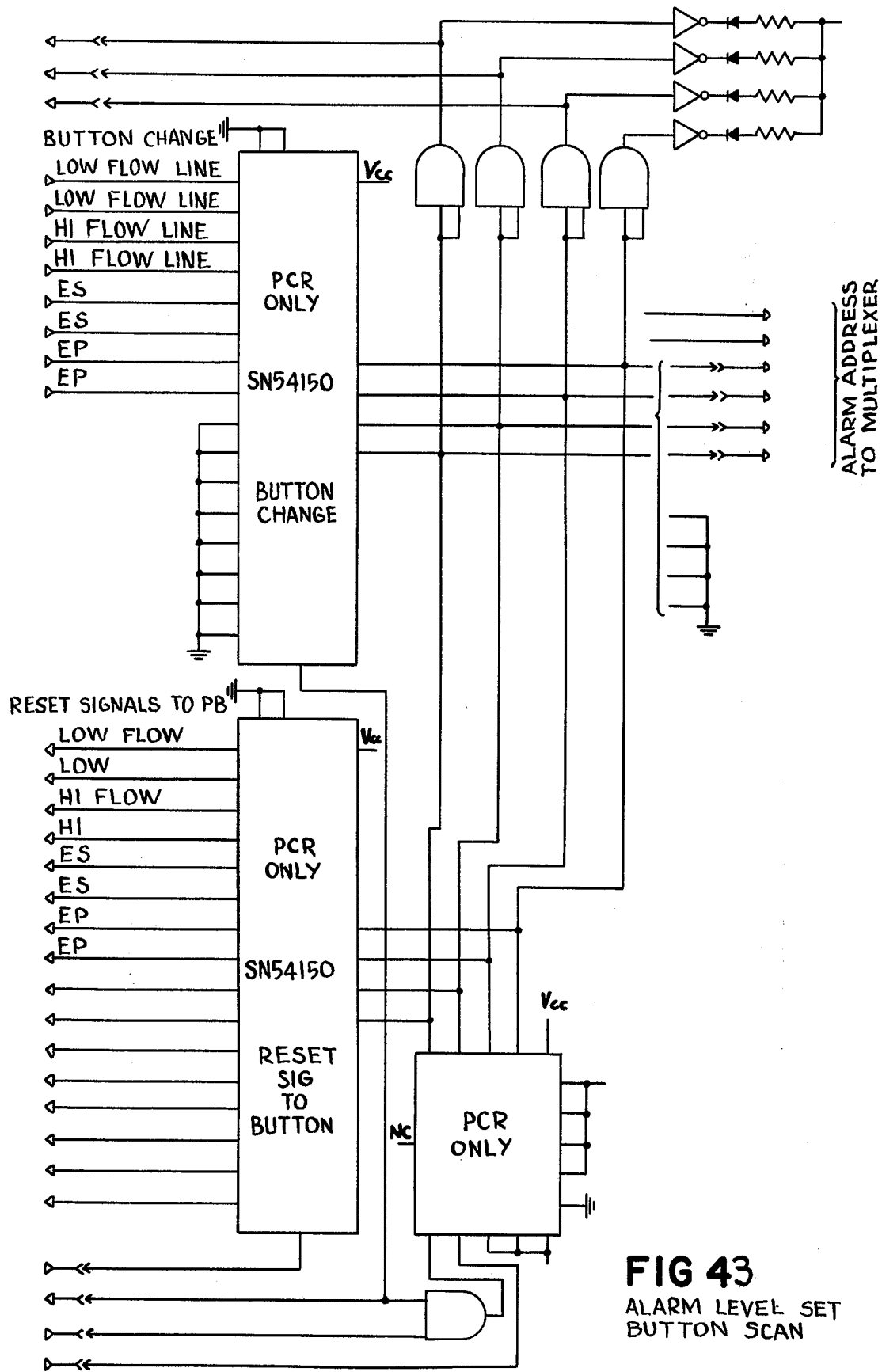
Figure 44:
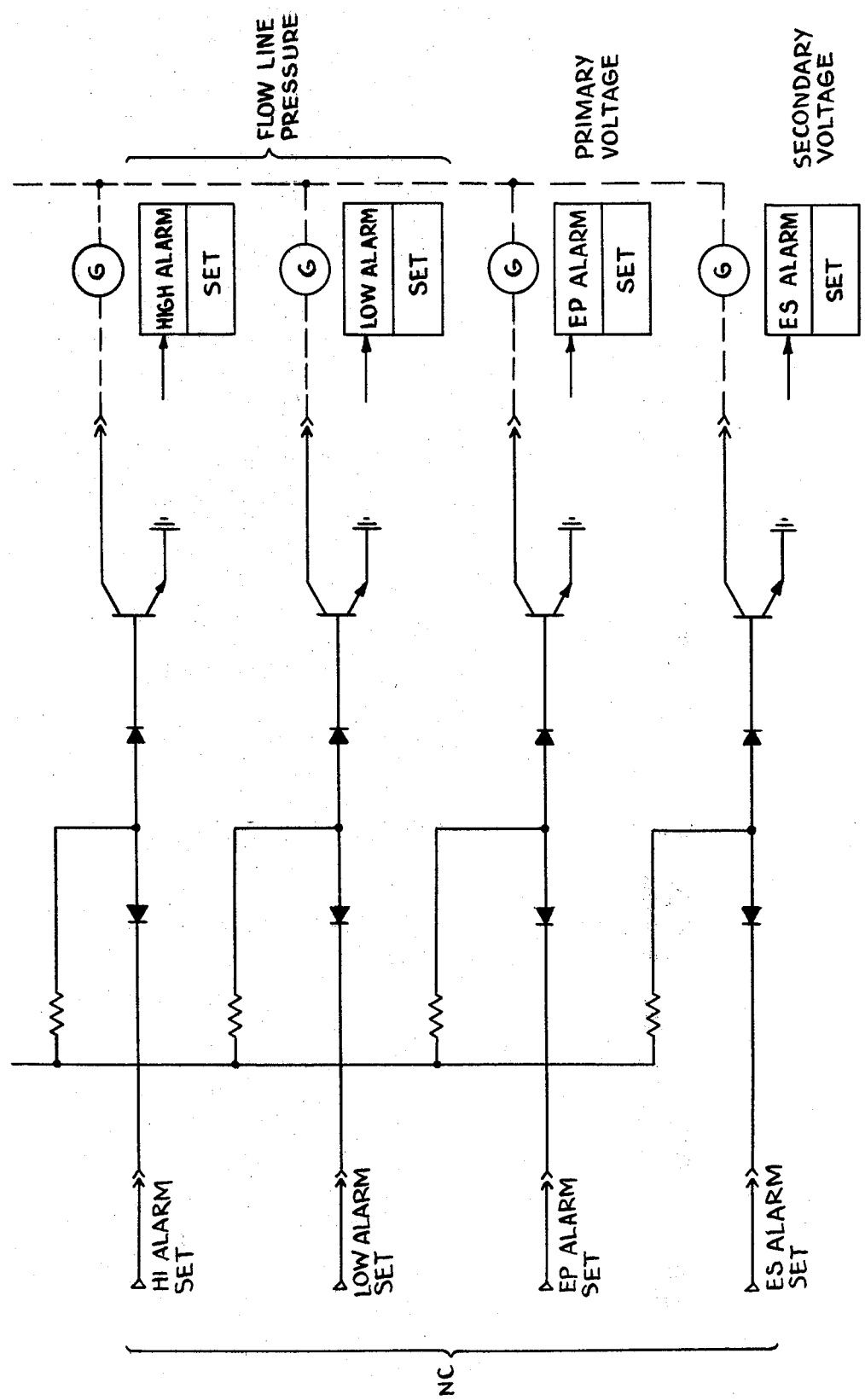

When an alarm level set button is pressed it sets two flip-flops, a least significant digit (LSD) flip-flop and a most significant digit (MSD) flip-flop FIG. 38. These are comparable to the change of state flip-flop in the control button subsystem (para. 4.3).

Figure 14:
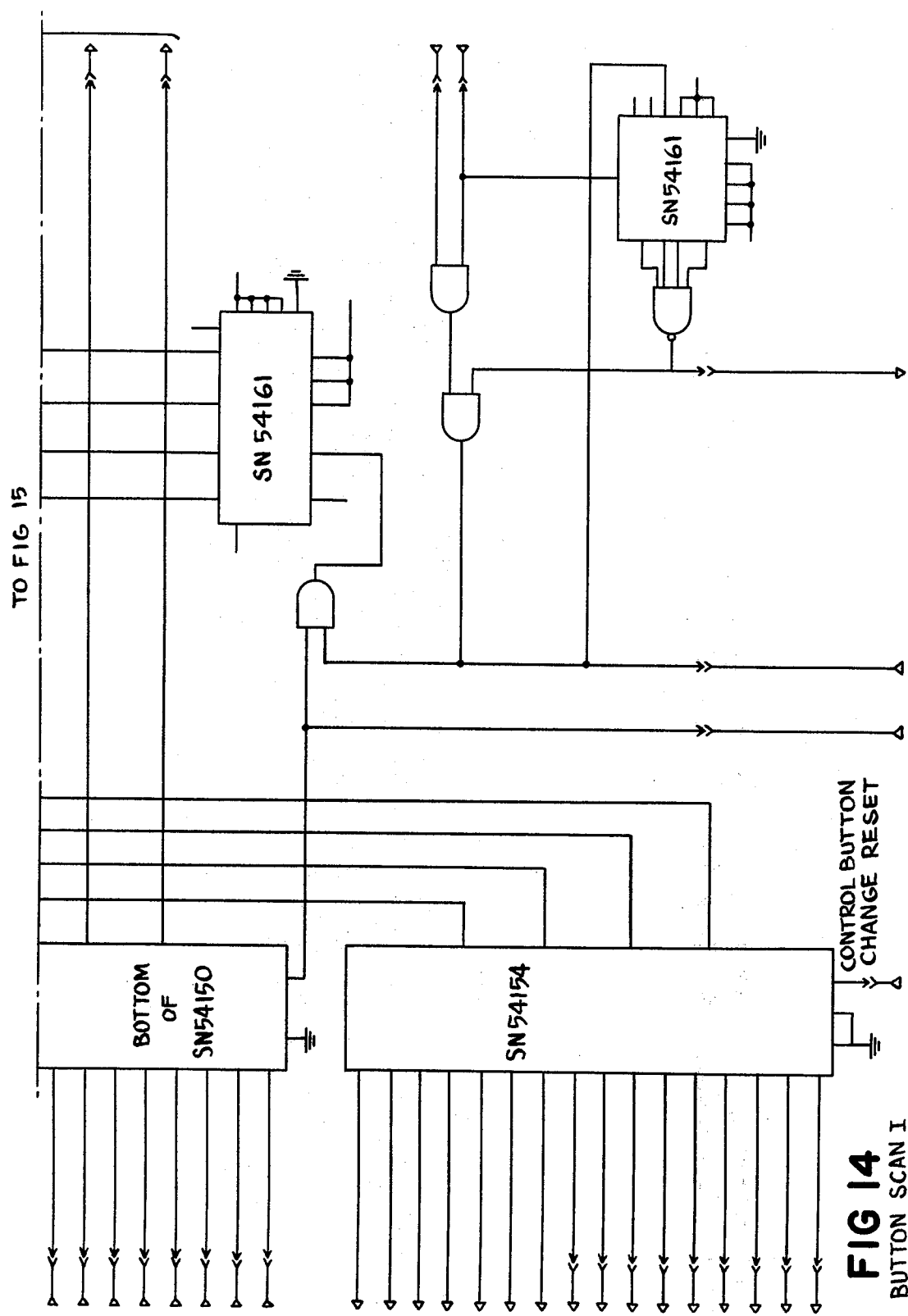
Figure 15:
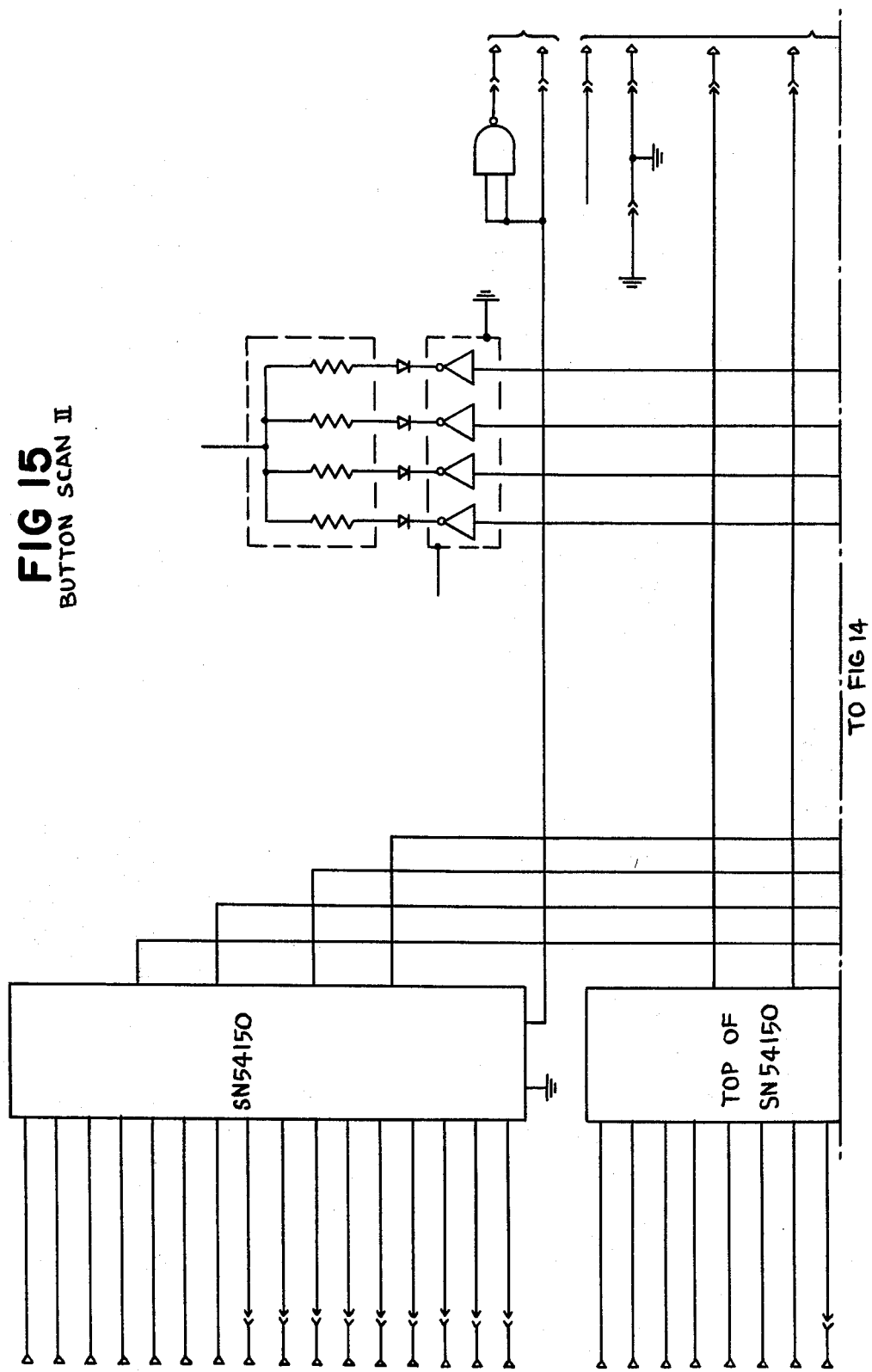
Figure 16:
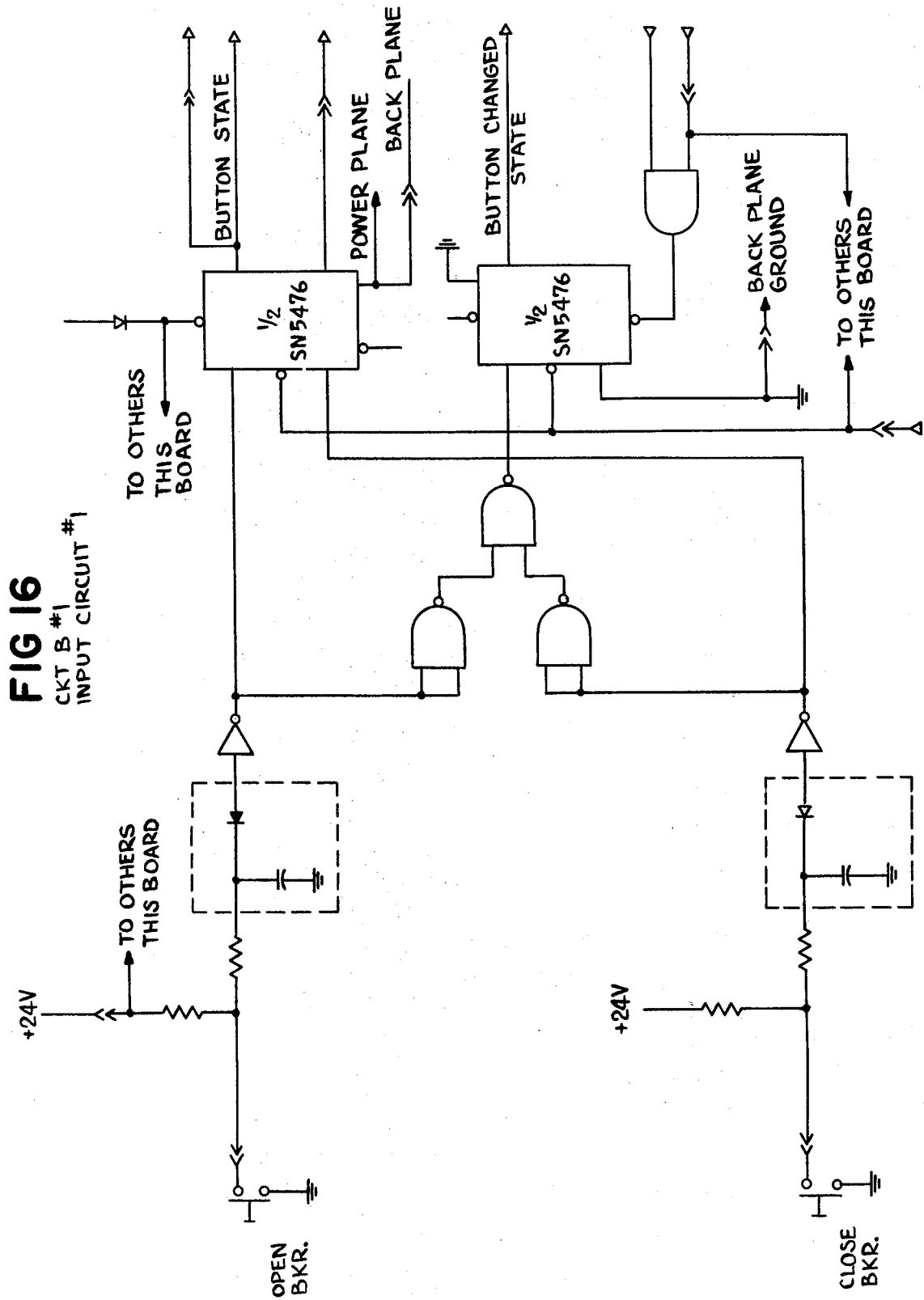
Figure 17:
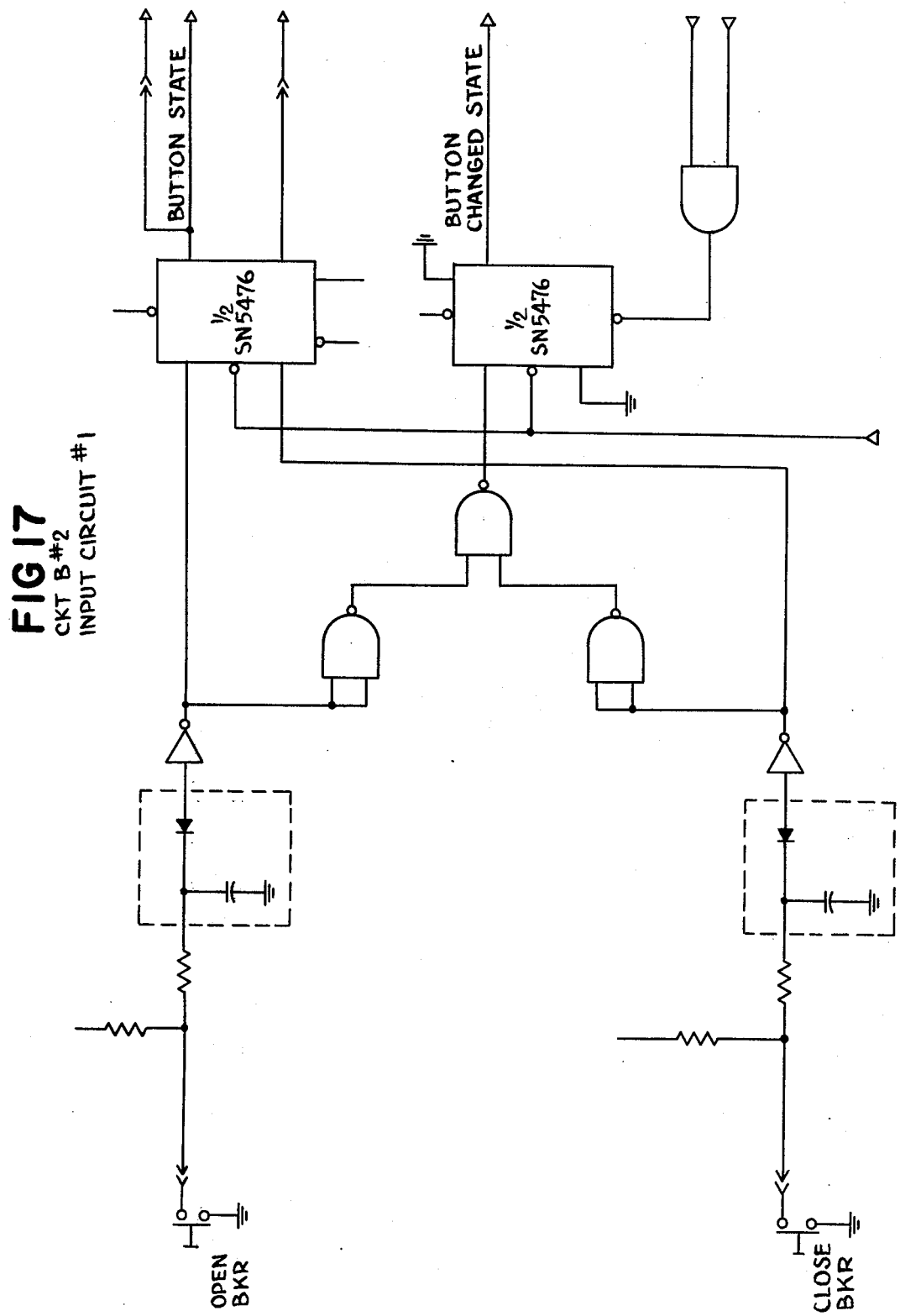
Figure 18:
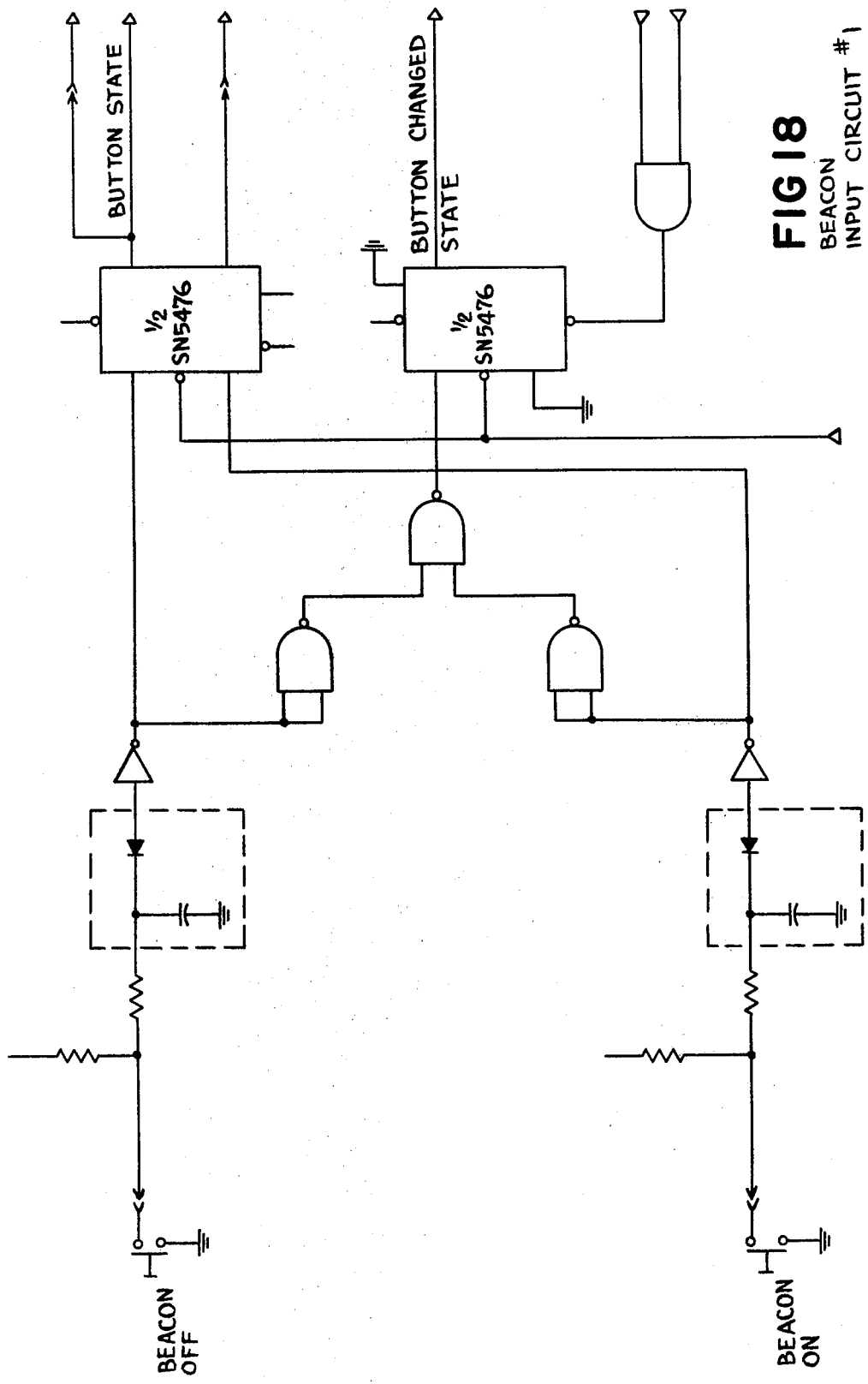
Figure 19:
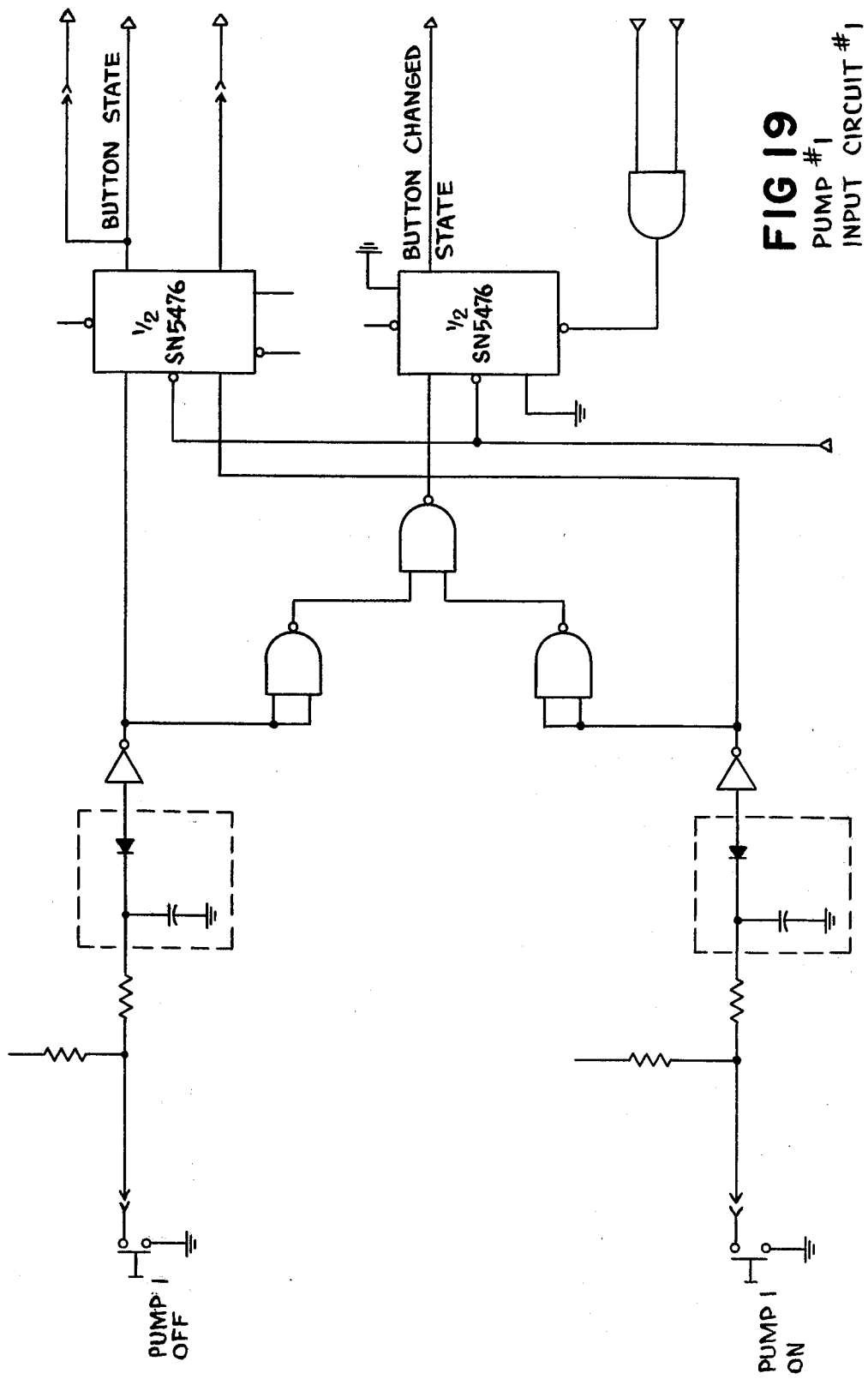
Figure 20:
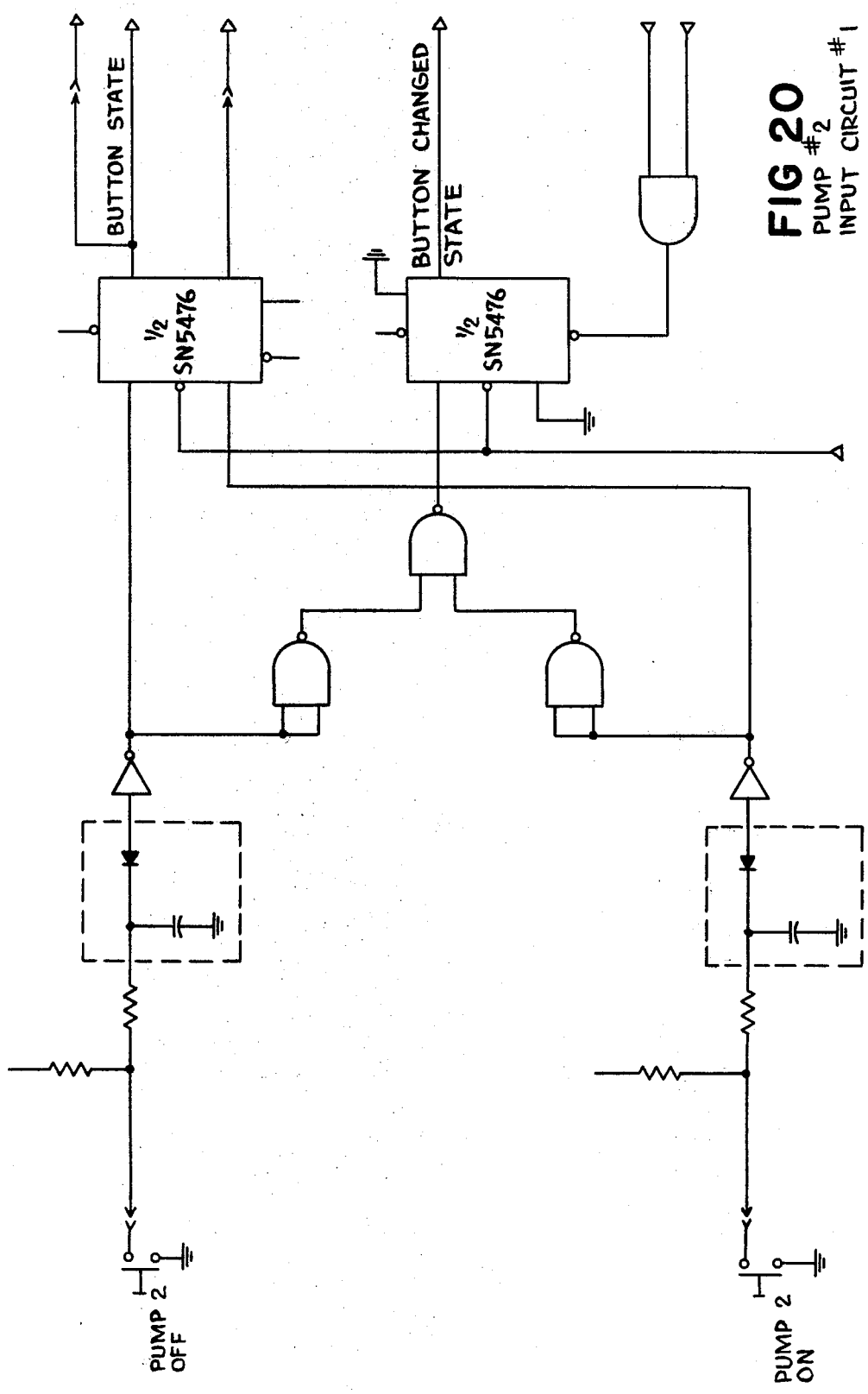
Figure 21:
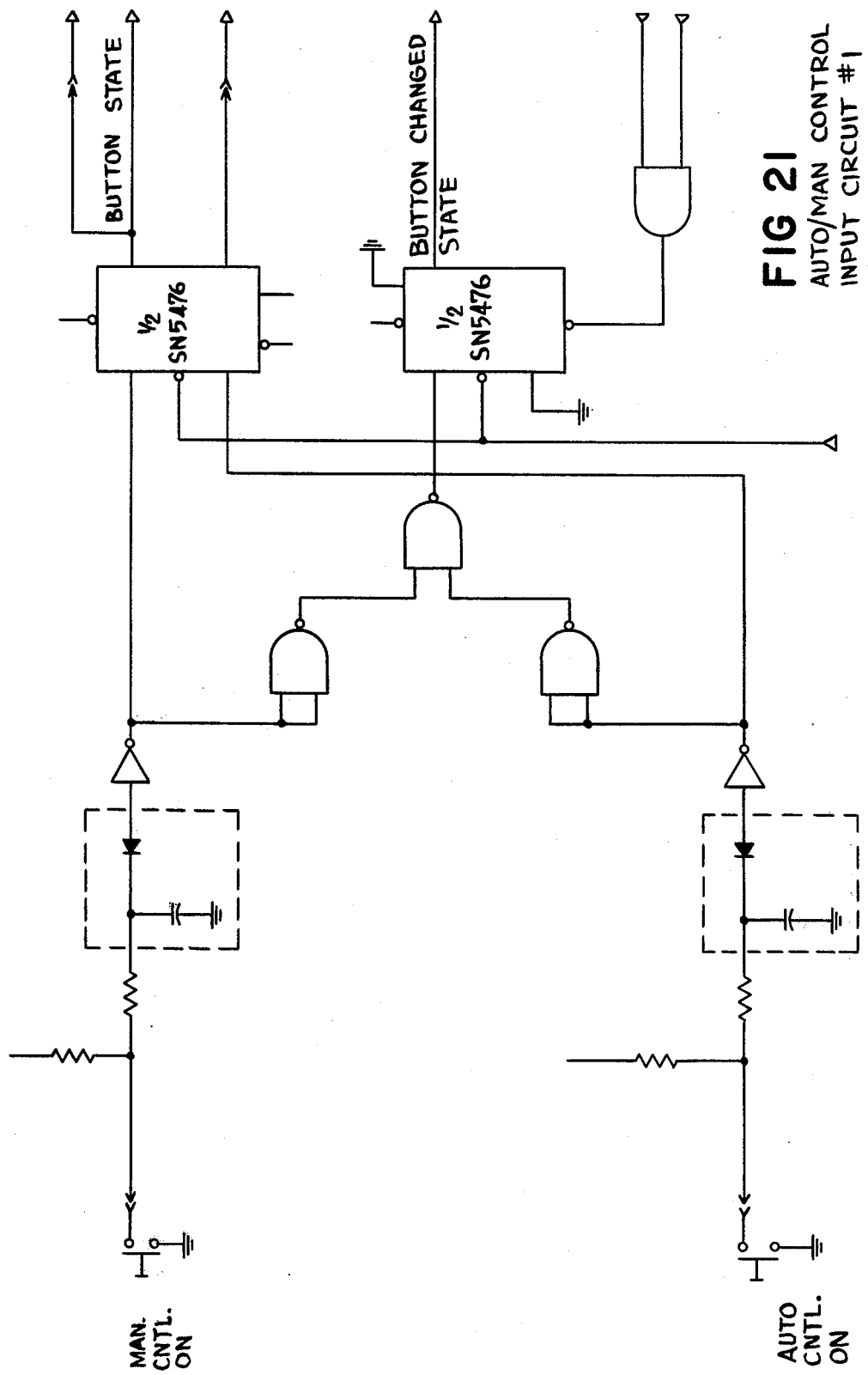
Figure 22:
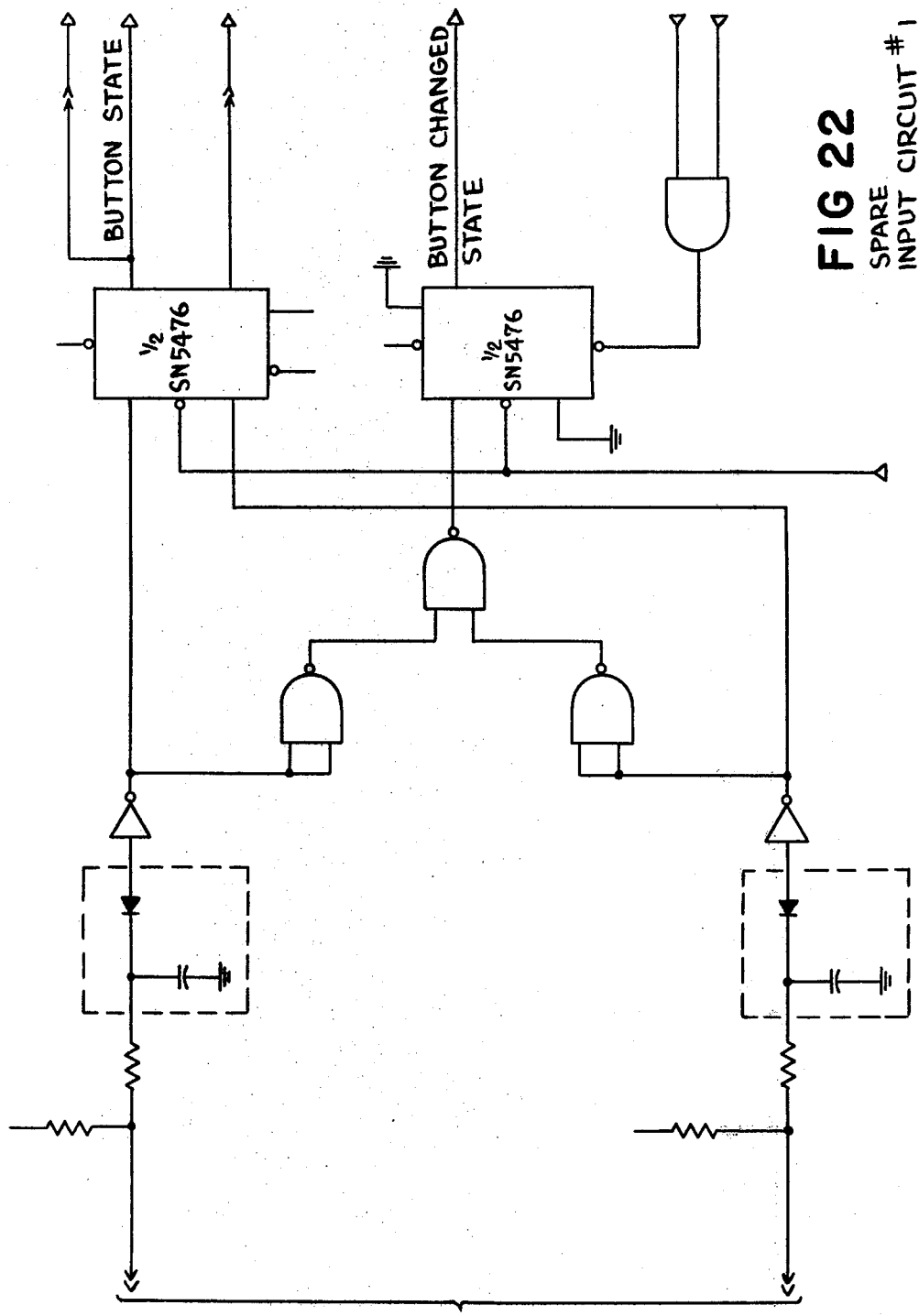
Figure 23:
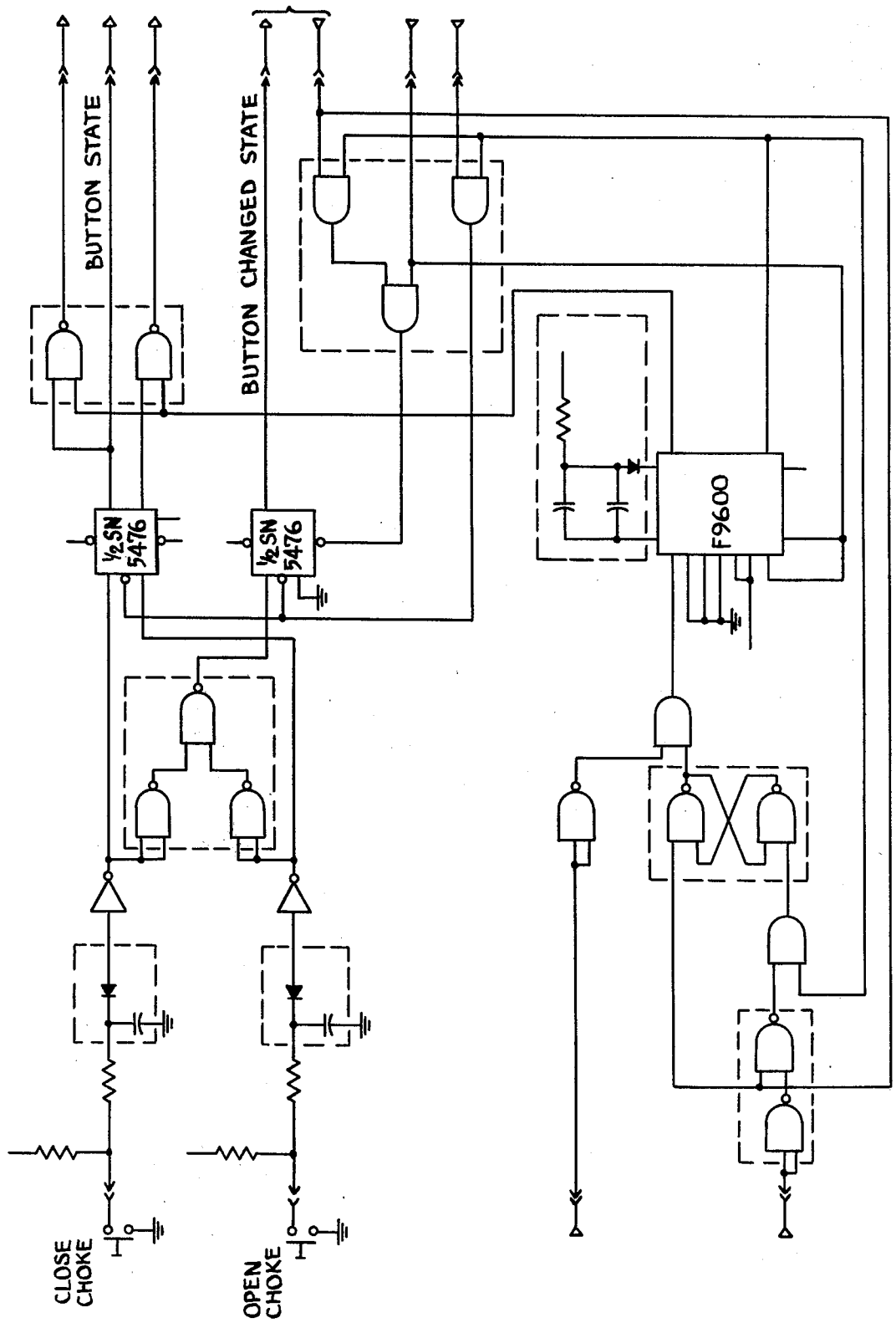
Figure 24:
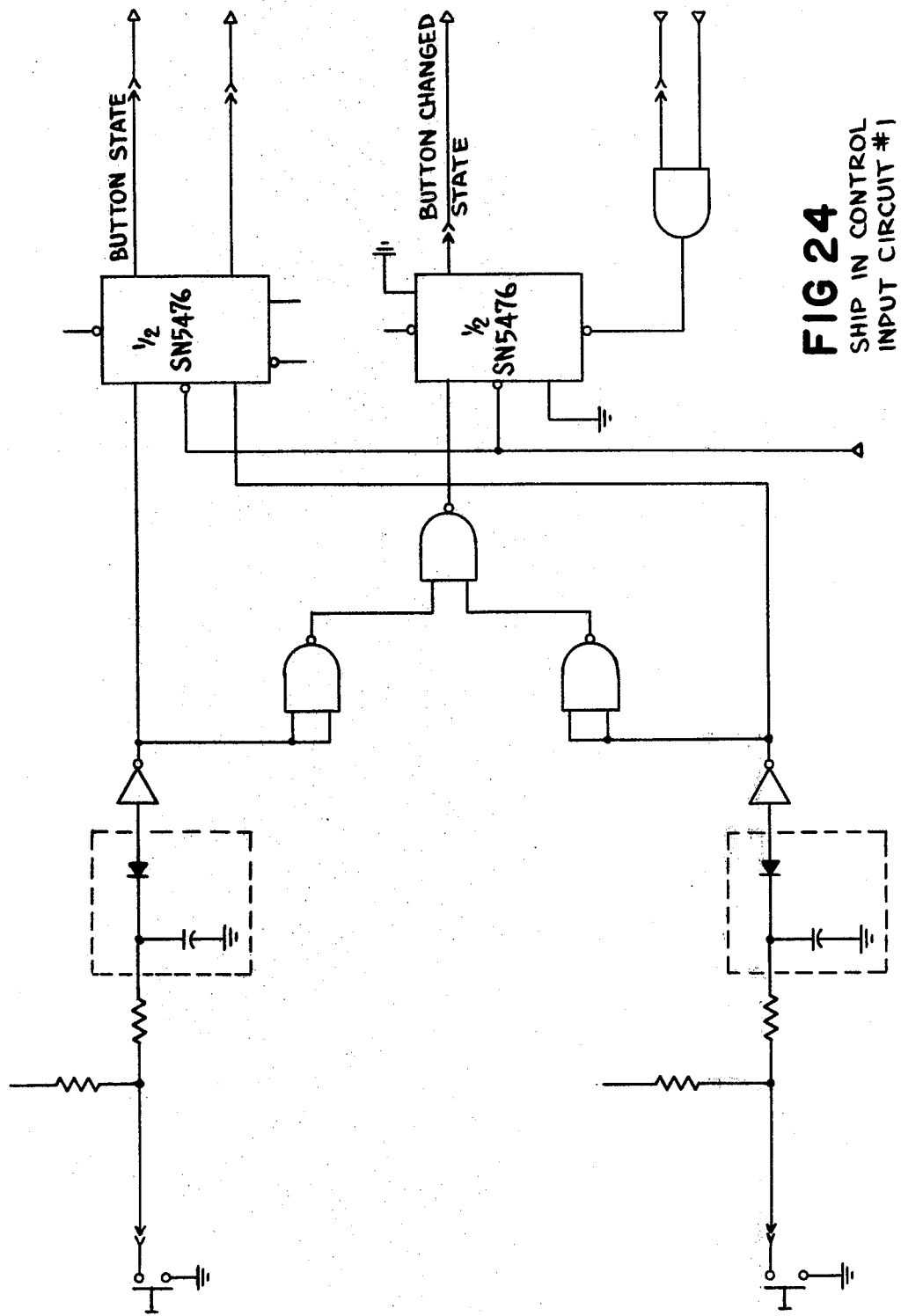
Figure 25:
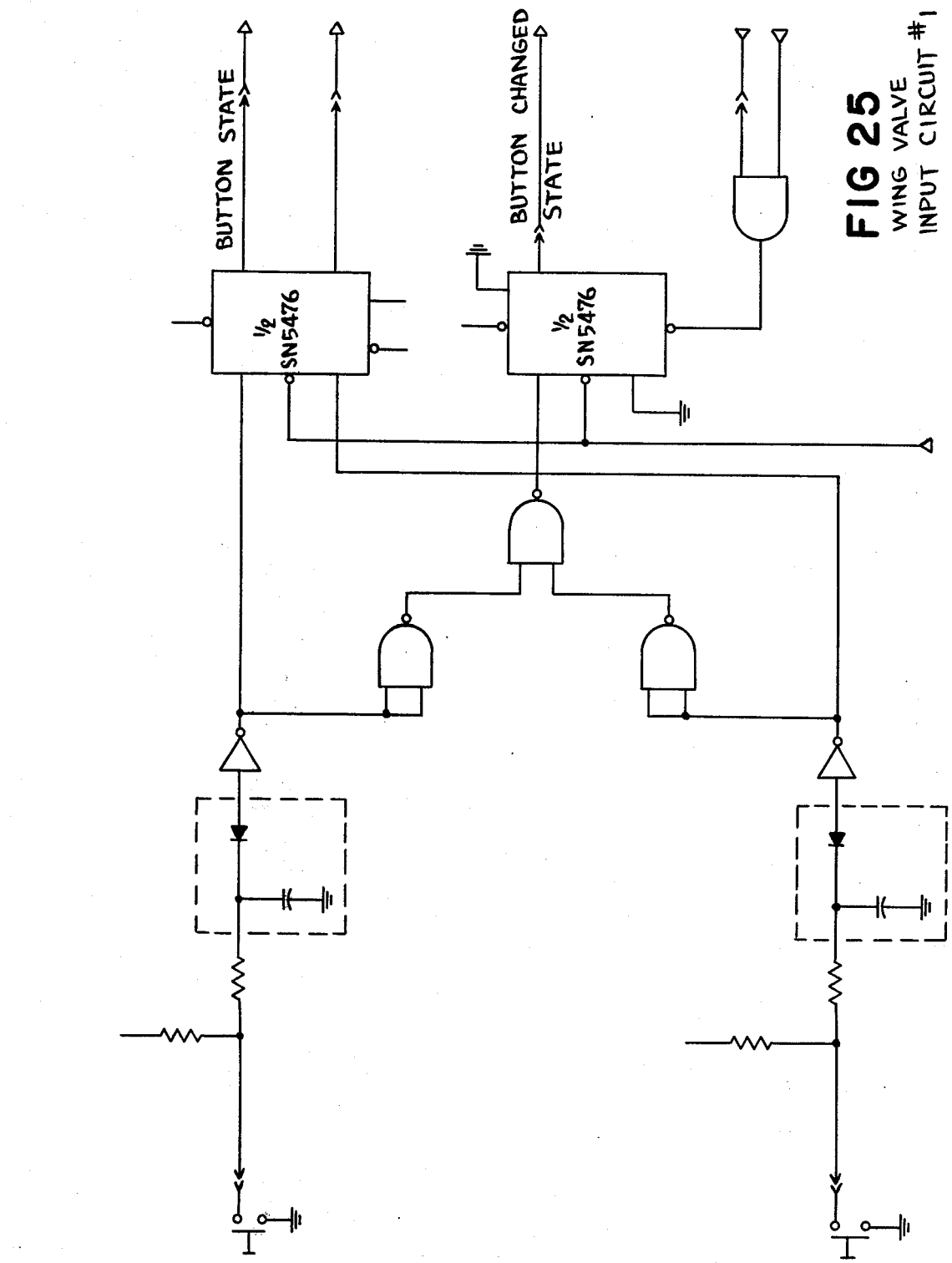
Figure 26:
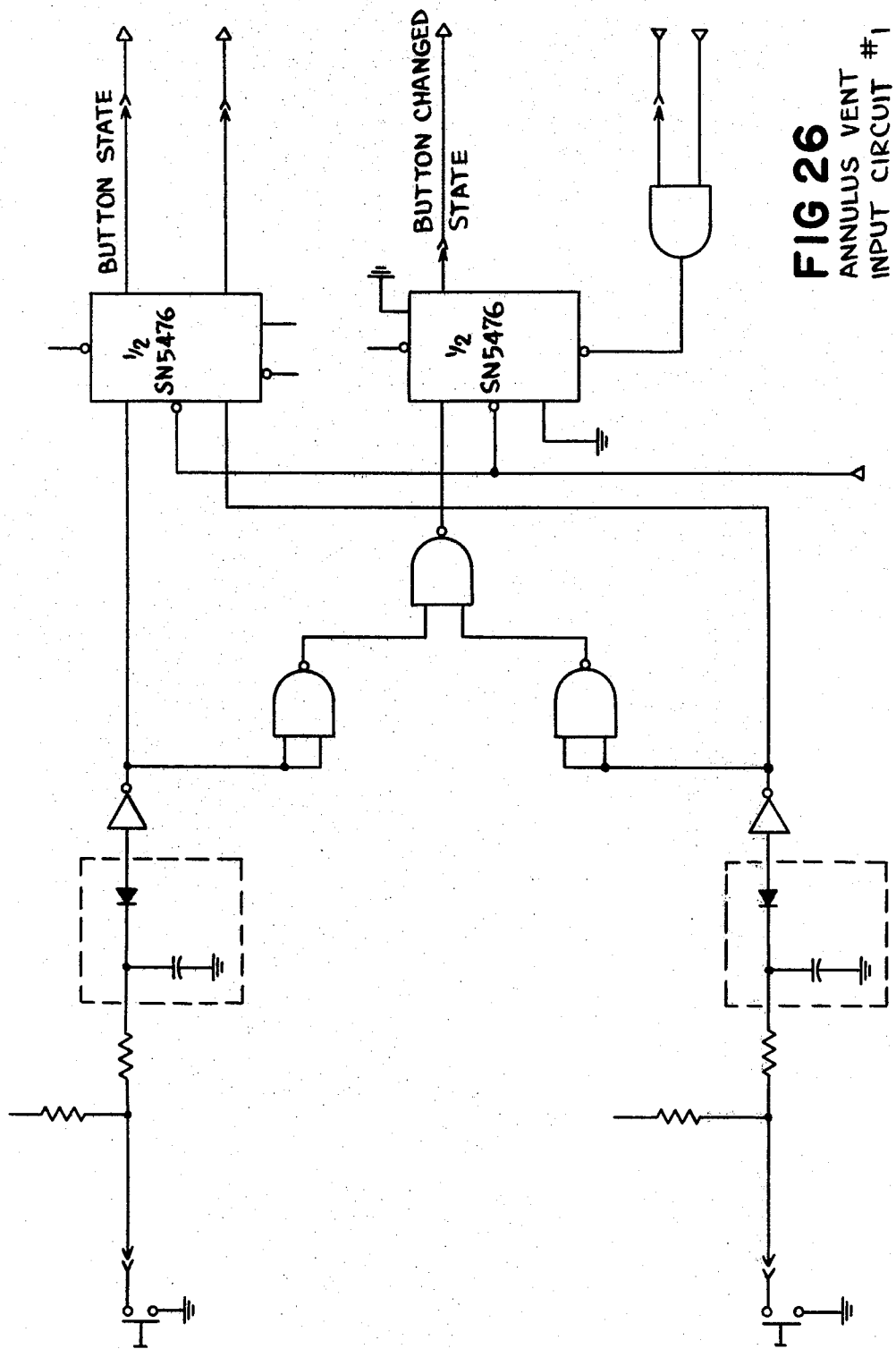
Figure 27:
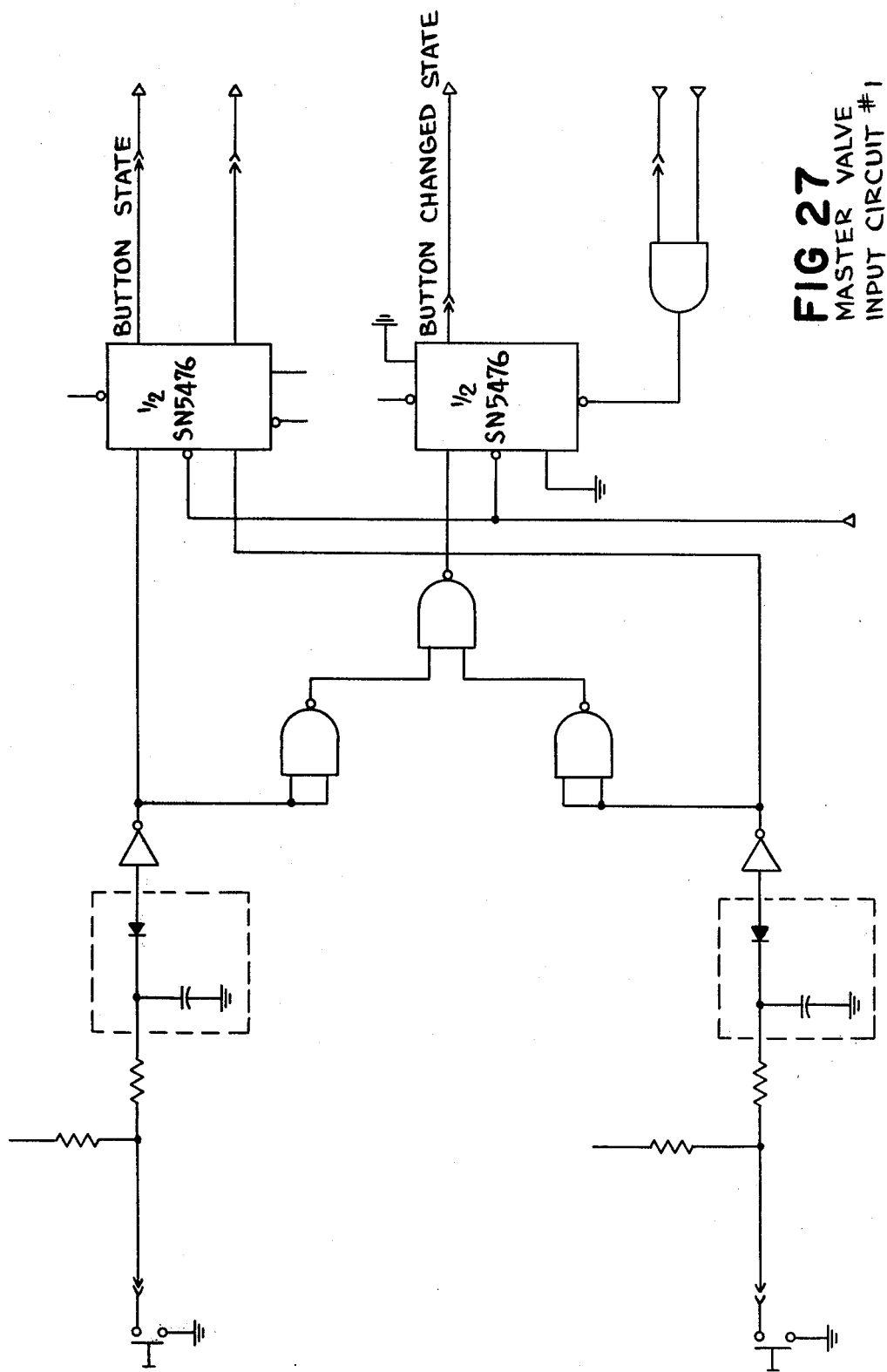
Figure 28:
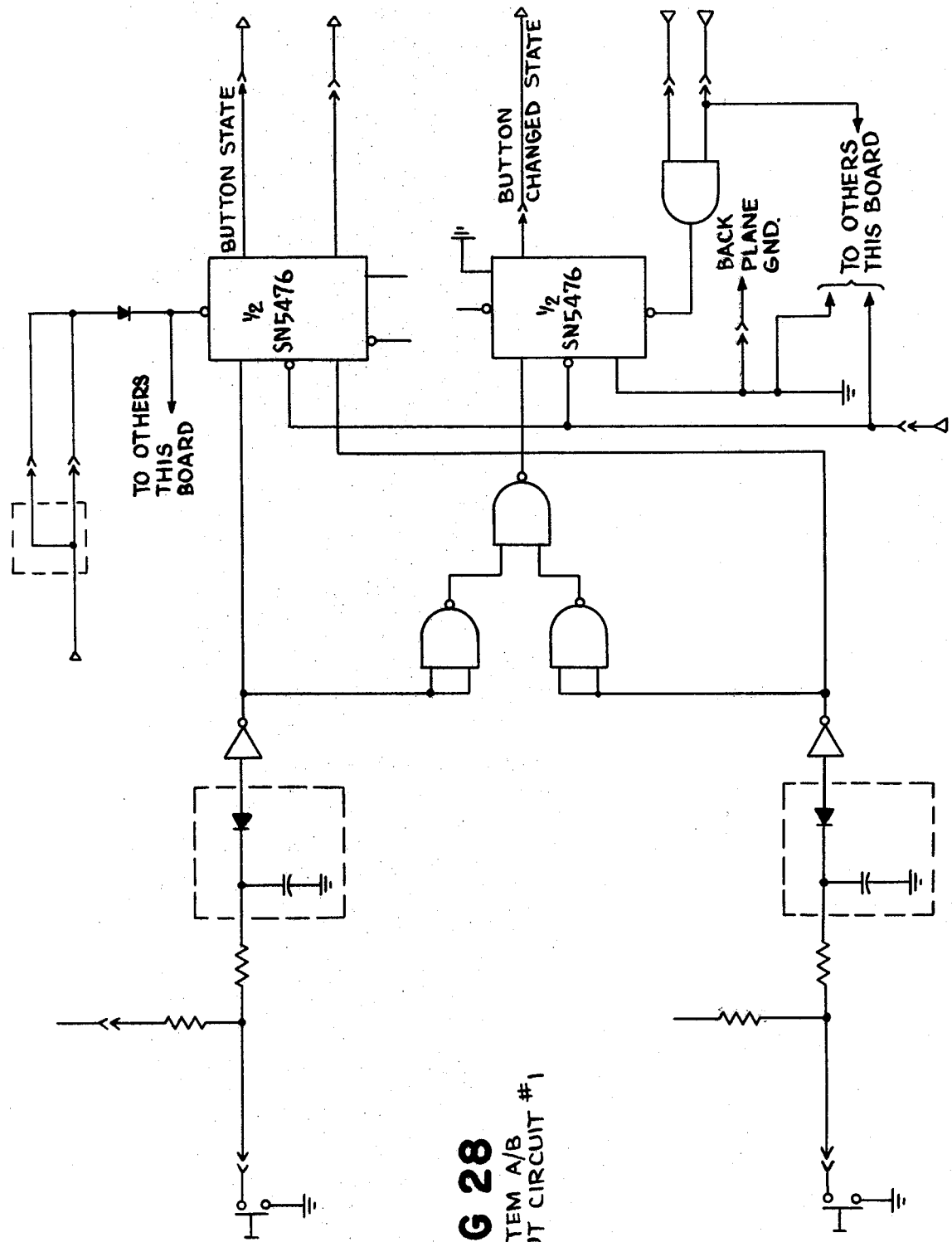
Figure 29:
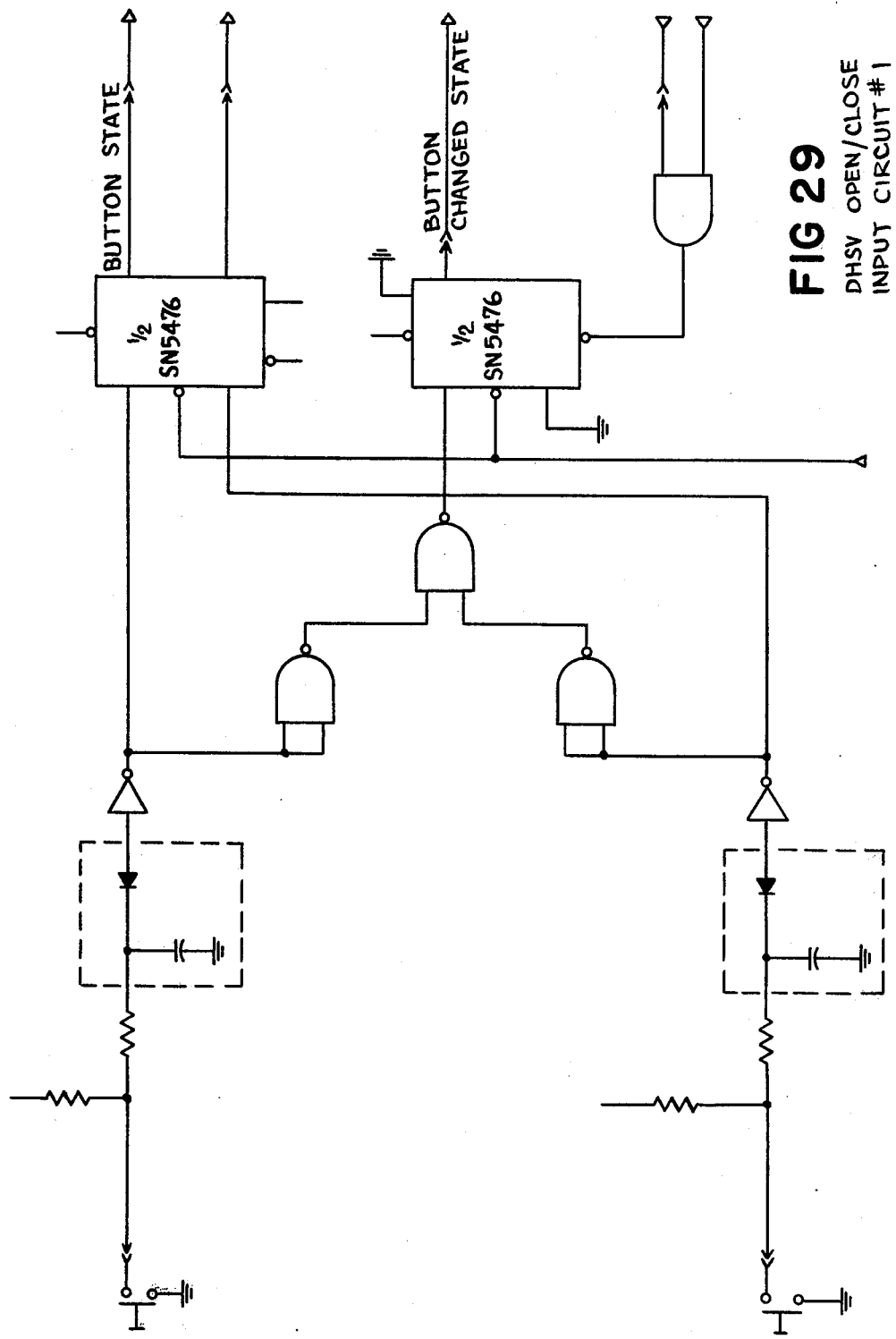
Figure 30:
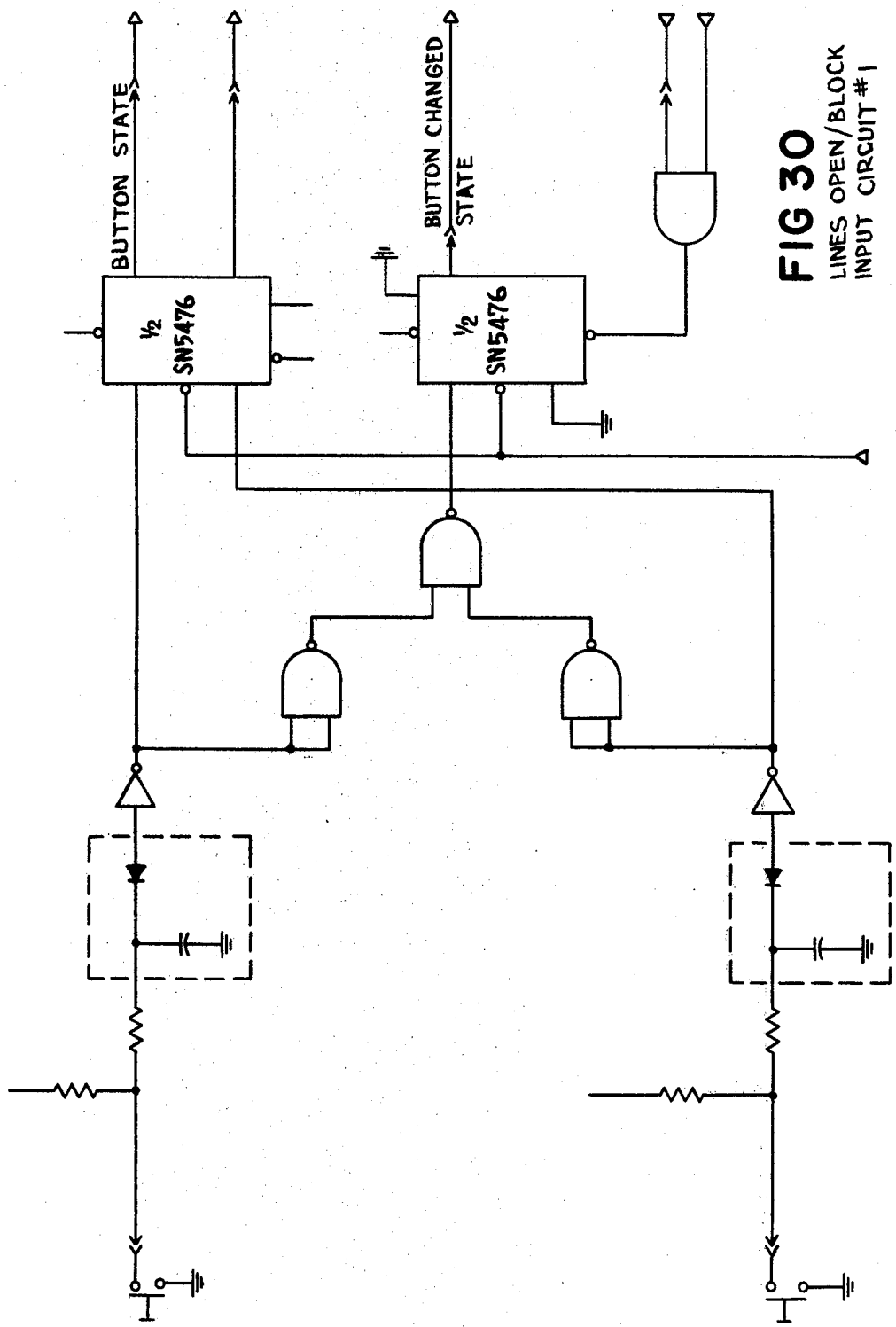

At the beginning of every frame pulse, a 4 bit binary alarm level set address counter is incremented with the SPA line pulses (scan pulse for alarm, FIGS. 14 and 15. The LSD and MSD flip-flops are scanned (SPA = clock · SCC · ABD). When a high flip-flop is detected the counter is stopped, and the alarm level set bid line goes low (ABD = 0). The counter starts at address 0000 through the EOW pulse. This assures that first the LSD and then the MSD of the same alarm are detected.

The three most significant bits of the address lines (bits 5–7) AS0, AS1, AS2 are used to select one out of eight thumbwheel switch lines FIGS. 32 to 35. With four such circuits in parallel, 4 lines (1 BCD digit) are selected out of a possible 32 lines (8 BCD digits).

When an alarm level op code is sent, the alarm level change reset line goes low (ACR = 0) (sheet 40) and the LSD or MSD flip-flop are reset.

The execute enable flip-flop FIG. 45 is reset when an 01, 10 or 11 op code is sent during the MNP pulse.

Table III-4 shows the alarm level change addresses.

4.10 Display Decoding (FIGS. 46 to 50)

The data scan and address generation is discussed in para. 4.6. In review, there are 16 analog addresses and 5 digital addresses available. The last three addresses are reserved by the subsea system and are not scanned. The data from subsea is available for display one word after the address was sent. Scan B data arrives when the control word is being sent.

Figure 49:
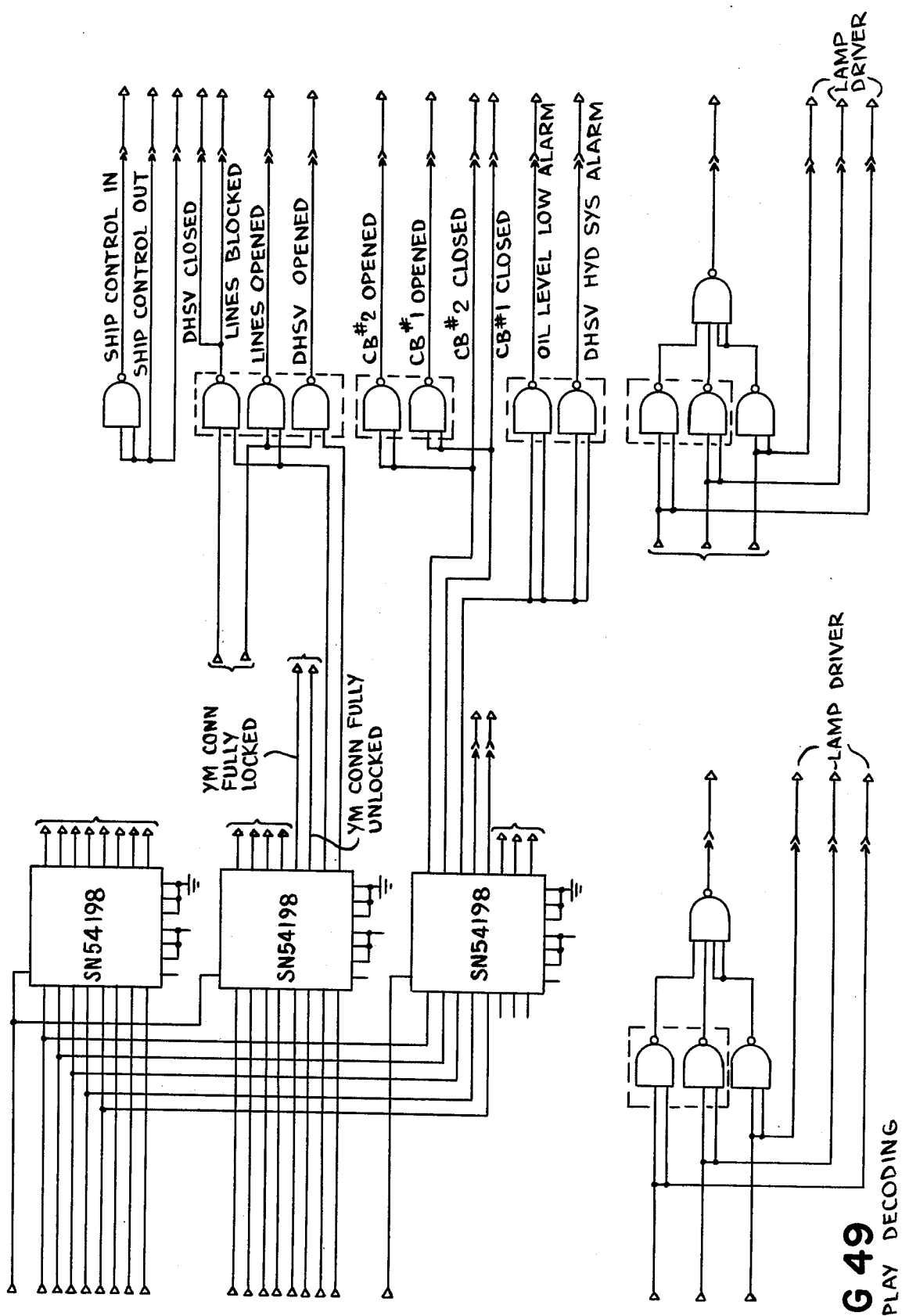

The address portion of the arriving data word is taken from the SB2 buffer register stored word FIG. 49 and is decoded into 17 separate enable lines (E0 thru E11, E16 thru E20). Each of the SN54154 decoders decode the four BCD address inputs into one of sixteen mutually exclusive outputs when both the data (G2) and enable (G1) inputs are low. The second decoder accommodates the addresses which are over the number 16, hence the reason for the inverted enable input G1 from address line AB4 since AB4 is high for addresses above 16. The demultiplexing function is performed by using the four input lines to address an output line, passing data from the data input (G2) to the selected output when enable input (G1) is low. When either G1 or G2 input is high, all outputs are high.

Therefore with a stored data scan op code present (DSB line low) and during the end-of-word pulse (EOW line high for ≦ 100 usec) from the LARSE receiver (REDE Unit) the data input line (G2) is made low and the corresponding output to the stored address is selected. This output goes low with all other outputs remaining high. The decoder outputs are then directed to the SN5404 inverters whose outputs are the enable lines. The enable line selected then goes high while all others remain low. Prior to an EOW pulse (during received word time frame) or if the stored OP code is not a request for data (DSB line high), the data input (G2)

TABLE III-4
Alarm Level Word and Address Assignments

| WORD NO. | OP CODE 15 14 | WELL NO. 13 12 11 10 | ADD 9 8 7 | 6 5 | C 4 | DATA 3 2 1 0 | USE | CONTROL BUTTON NO. | THUMBWHEEL SWITCH SW NO. | TYPICAL SET NO. (DATA) |
|---|---|---|---|---|---|---|---|---|---|---|
| φ | 1 φ | 1 1 1 1 | 1 1 φ | φ φ | φ | 1 φ φ 1 | LOW FLOWLINE PRESS-LSD | S146 | S59 | 9 |
|   |     |          |        | φ φ | 1 | φ 1 1 φ | LOW FLOWLINE PRESS-MSD | S146 | S60 | 6 |
| 1 |     |          |        | φ 1 | φ | φ 1 1 φ | HIGH FLOWLINE PRESS-LSD | S145 | S57 | 6 |
|   |     |          |        | φ 1 | 1 | 1 φ φ 1 | HIGH FLOWLINE PRESS-MSD | S145 | S58 | 9 |
| 2 |     |          |        | 1 φ | φ | φ 1 1 φ | HIGH PRIMARY VOLTAGE-LSD | S147 | S62 | 6 |
|   |     |          |        | 1 φ | 1 | 1 φ φ 1 | HIGH PRIMARY VOLTAGE-MSD | S147 | S61 | 9 |
| 3 |     |          |        | 1 1 | φ | 1 φ φ 1 | LOW SECONDARY VOLTAGE-LSD | S148 | S64 | 9 |
|   |     |          | 1 1 φ  | 1 1 | 1 | φ 1 1 φ | LOW SECONDARY VOLTAGE-MSD | S148 | S63 | 6 |
| 4 |     |          | 1 1 1  | φ φ | φ |         | SPARE-LSD |   |   |   |
|   |     |          |        | φ φ | 1 |         | SPARE-MSD |   |   |   |
| 5 |     |          |        | φ 1 | φ |         | SPARE-LSD |   |   |   |
|   |     |          |        | φ 1 | 1 |         | SPARE-MSD |   |   |   |
| 6 |     |          |        | 1 φ | φ |         | SPARE-LSD |   |   |   |
|   |     |          |        | 1 φ | 1 |         | SPARE-MSD |   |   |   |
| 7 |     |          |        | 1 1 | φ |         | SPARE-LSD |   |   |   |
|   | 1 φ | 1 1 1 1  | 1 1 1  | 1 1 | 1 |         | SPARE-MSD |   |   |   | line of the decoders remain high. This causes all the outputs to go high and upon inverting makes all enable lines low. All displays then remain in their last state until a new corresponding enable line is selected.

The first 12 addresses (words 0 thru 11, refer to Table III-2) enable 8 separate analog quantity digital display units. These enable lines are E0 thru E11. Lines E1 thru E4 enable a single display (ES1 line) for either Primary, Secondary Phase 1, 2, or 3 subsea voltages in accordance with the pushbutton selection on the panel (lines VEP, VES1, VES2 and VES3). Lines E5 and E6 enable a single display (ES2 line) for either main hydraulic or DHSV hydraulic system pressures in accordance with the pushbutton selection on the panel (lines MHP and DHP). Lines E0 and E7 thru E11 enable their corresponding analog quantity display.

The choke position display, whose information is transmitted via a digital address (word No. 17, Tables III-2 and III-3), is displayed in the same manner as the analog data. The E17 line enables the choke position display.

Figure 47:
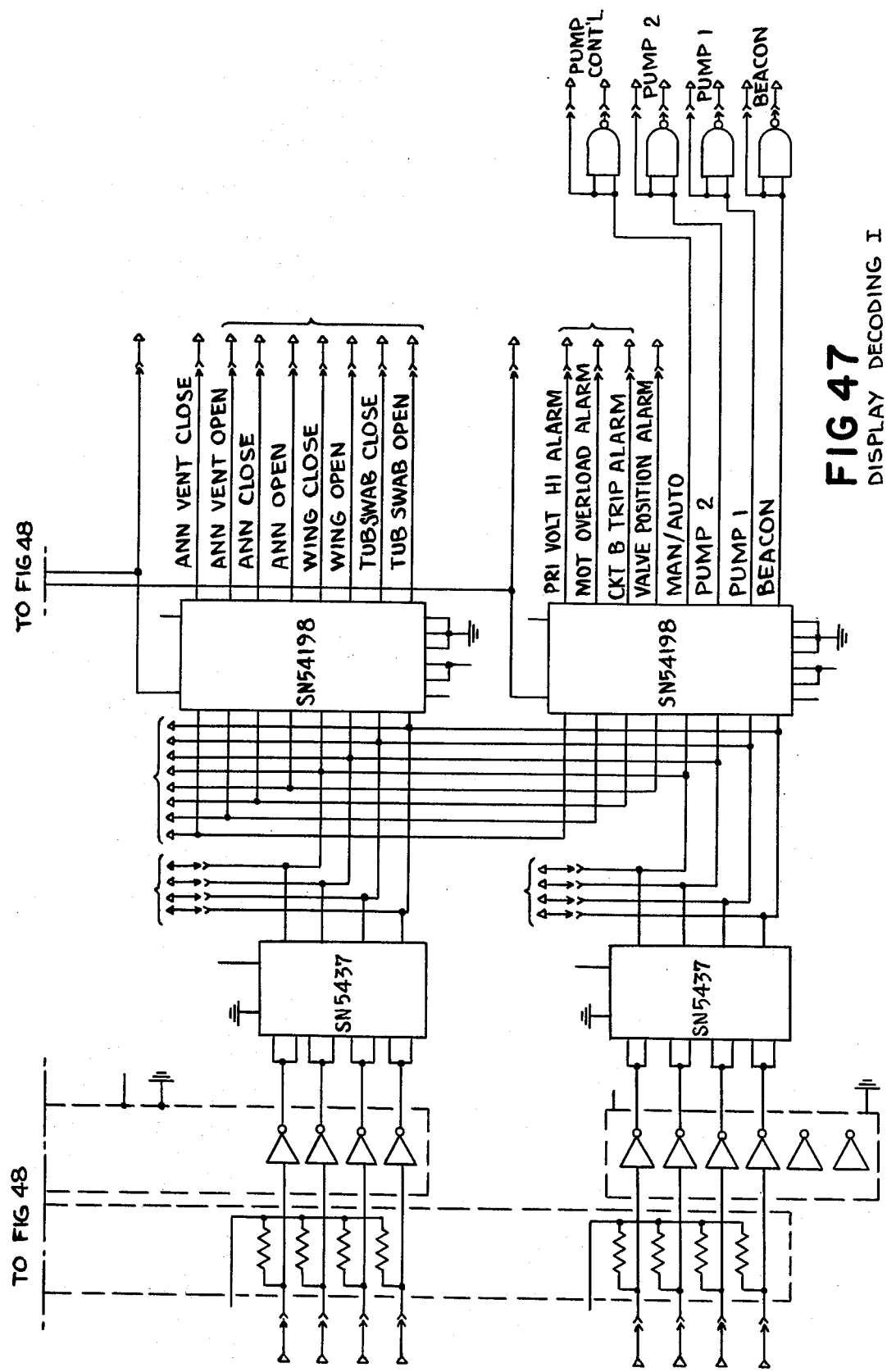
Figure 48:
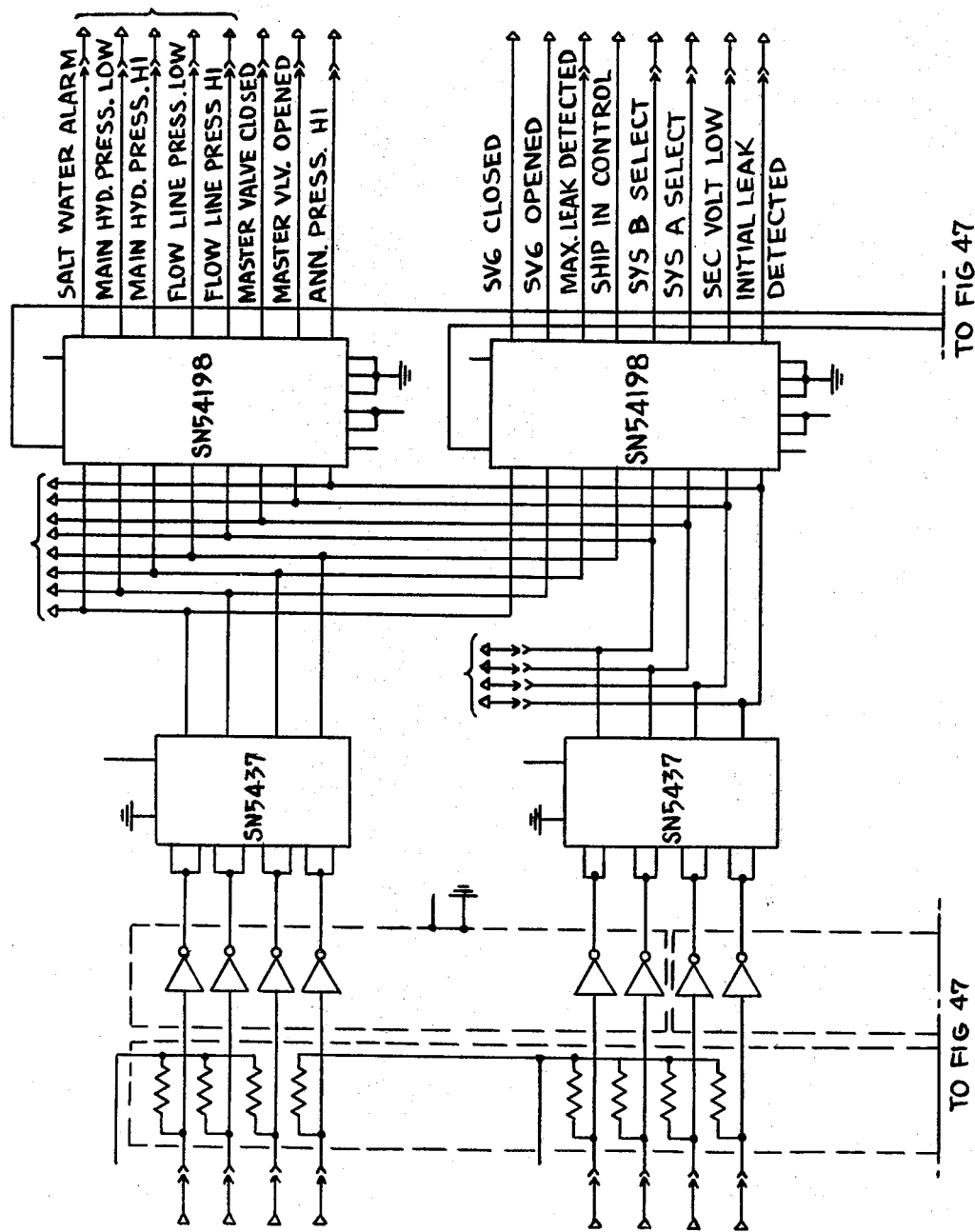

All of the digital displays (analog quantities) include a memory unit as part of the display assembly which is loaded when its corresponding enable line goes high. When the enable line goes low the displayed data is held until the next update. Accordingly, the output data from the LARSE receiver which is routed through the hex inverter and NAND buffer stages FIGS. 47 and 48 are wired directly to the digital displays.

Digital status information (non-analog) is displayed by separate indicator lamps on the panel. All return word information from the LARSE receiver is loaded into 8 bit shift registers (SN54198, FIGS. 47 to 49 which are wired in the parallel load control mode. That is, the eight-bits of input data are loaded and held, and appears at the outputs after the positive transition of their respective enable lines (E16 thru E19). Each of the digital status address (words 16 thru 19, Table III-2 and III-3) activate their own enable line; E16 thru E19 respectively. Enable lines E16, E18 and E19 clock two 8-bit shift registers which provide for 16 indicator lamp control. Line E17 clocks a single 8-bit register which provides for 8 indicator lamp control. The outputs of the shift registers are routed to their respective lamp drivers FIGS. 51 to 52 and/or logic or gates for alarm status display. When an alarm condition is detected the proper display is illuminated and an audible horn sounds (refer to sheets 57 and 58, and Dwg. 912D726 sheets 9 thru 12). Pushing the alarm acknowledge button silences the horn and changes its lense color from red to amber. The alarm light will go out when the next scan, with the proper address, returns data with the alarm bit off. Refer to Table III-3 for alarm assignments.

When the enable lines to the 8-bit shift registers go low, the data is held in memory until the next enable pulse (update) is generated.

Figure 50:
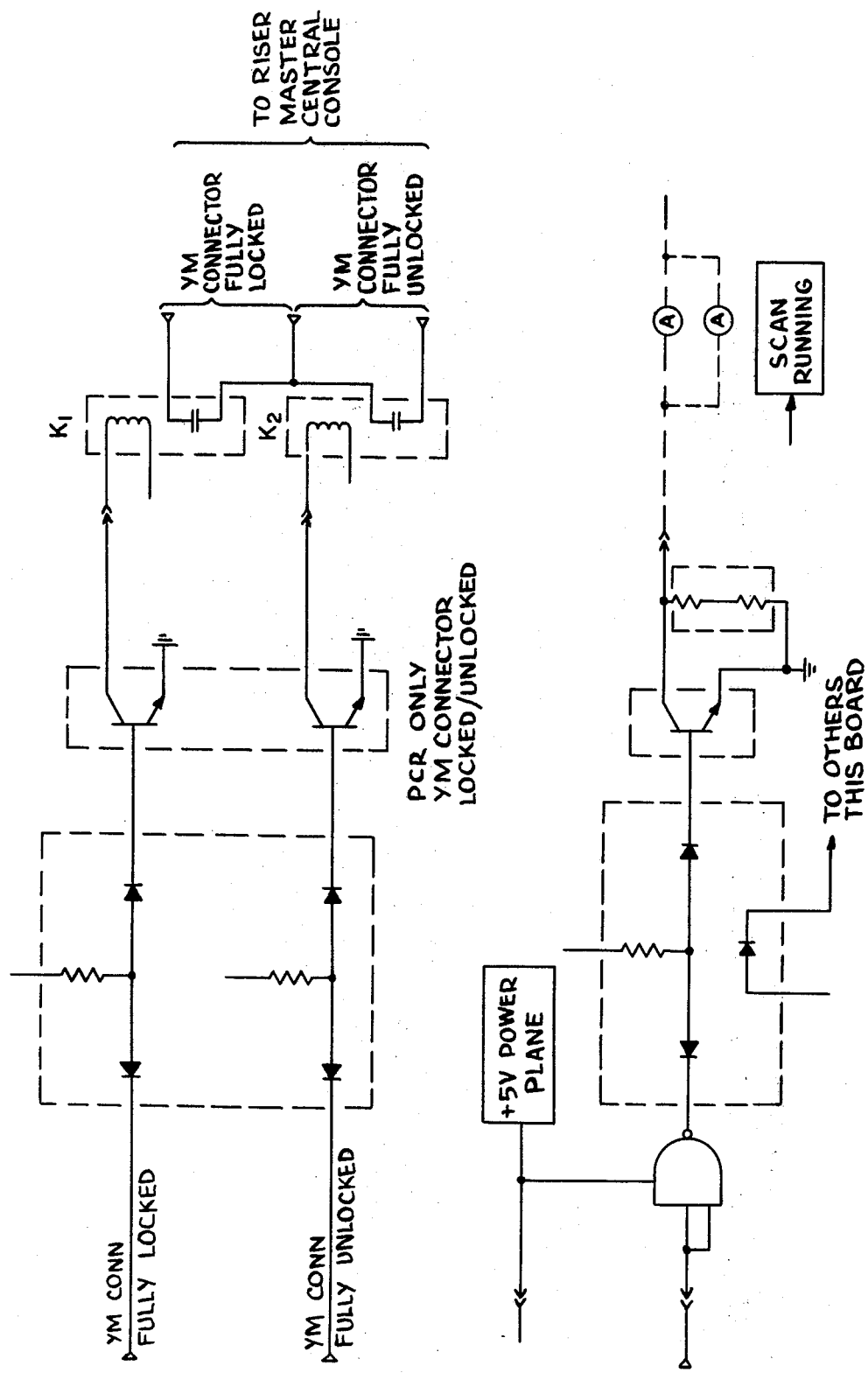
Figure 51:
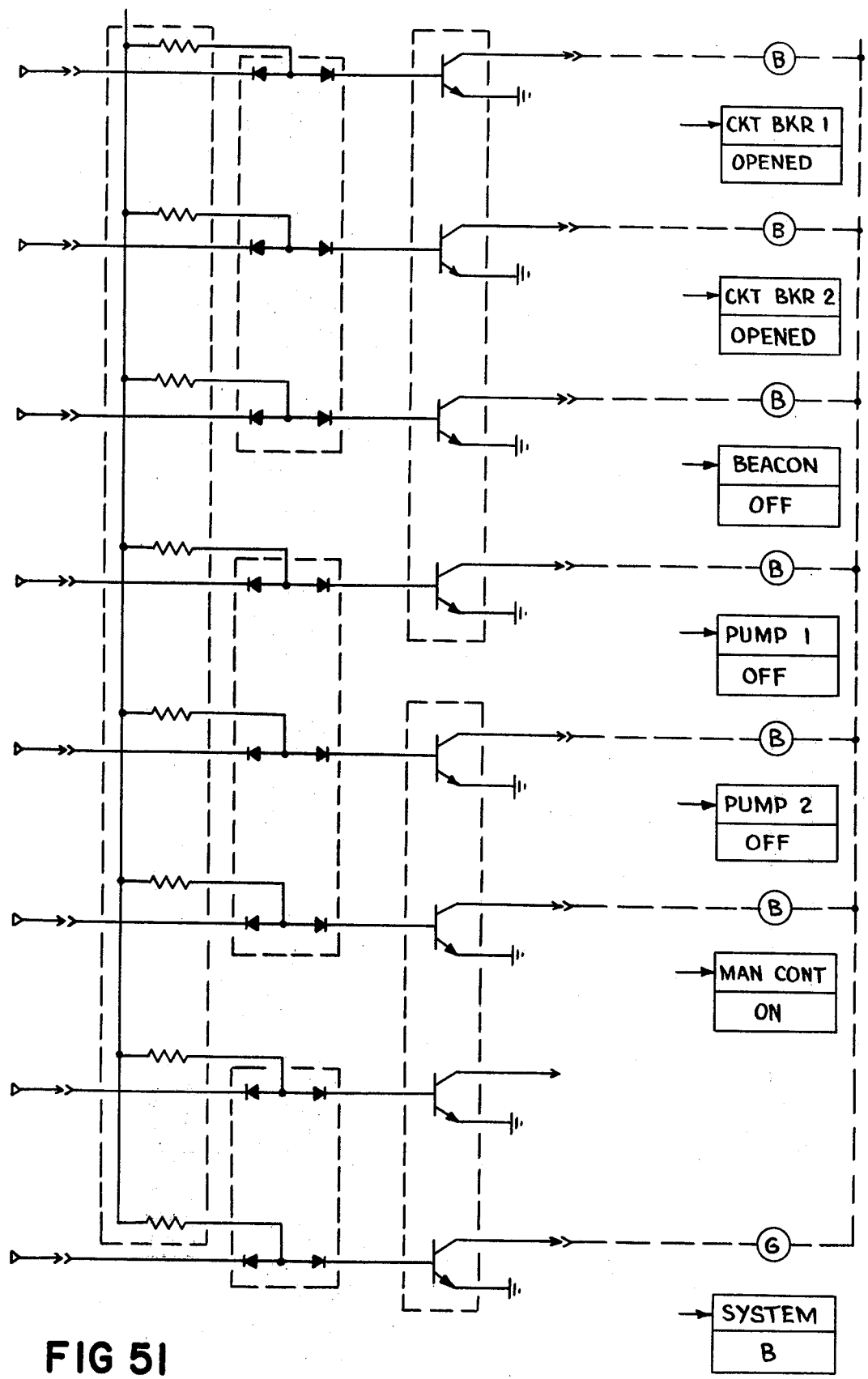
Figure 52:
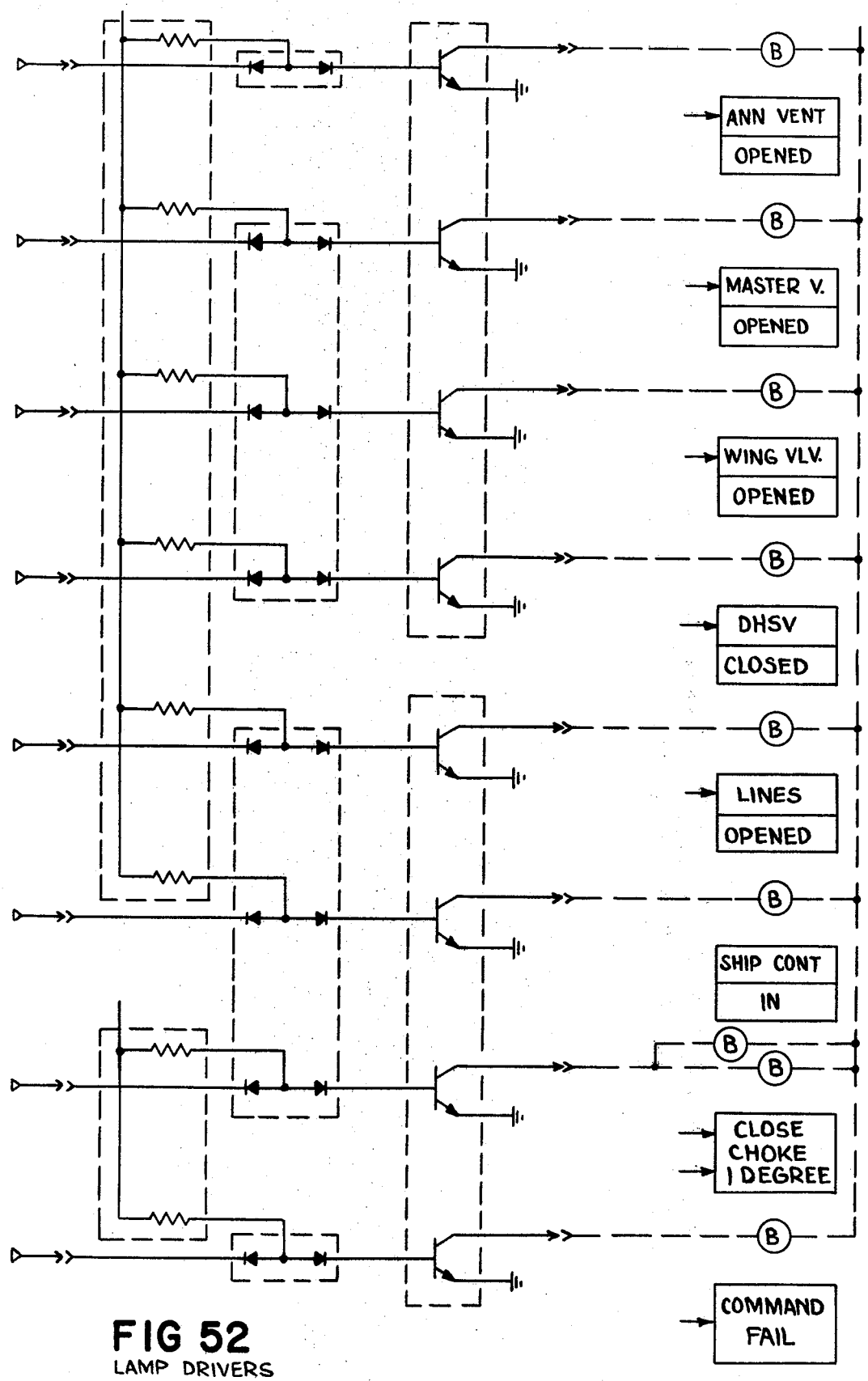
Figure 53:
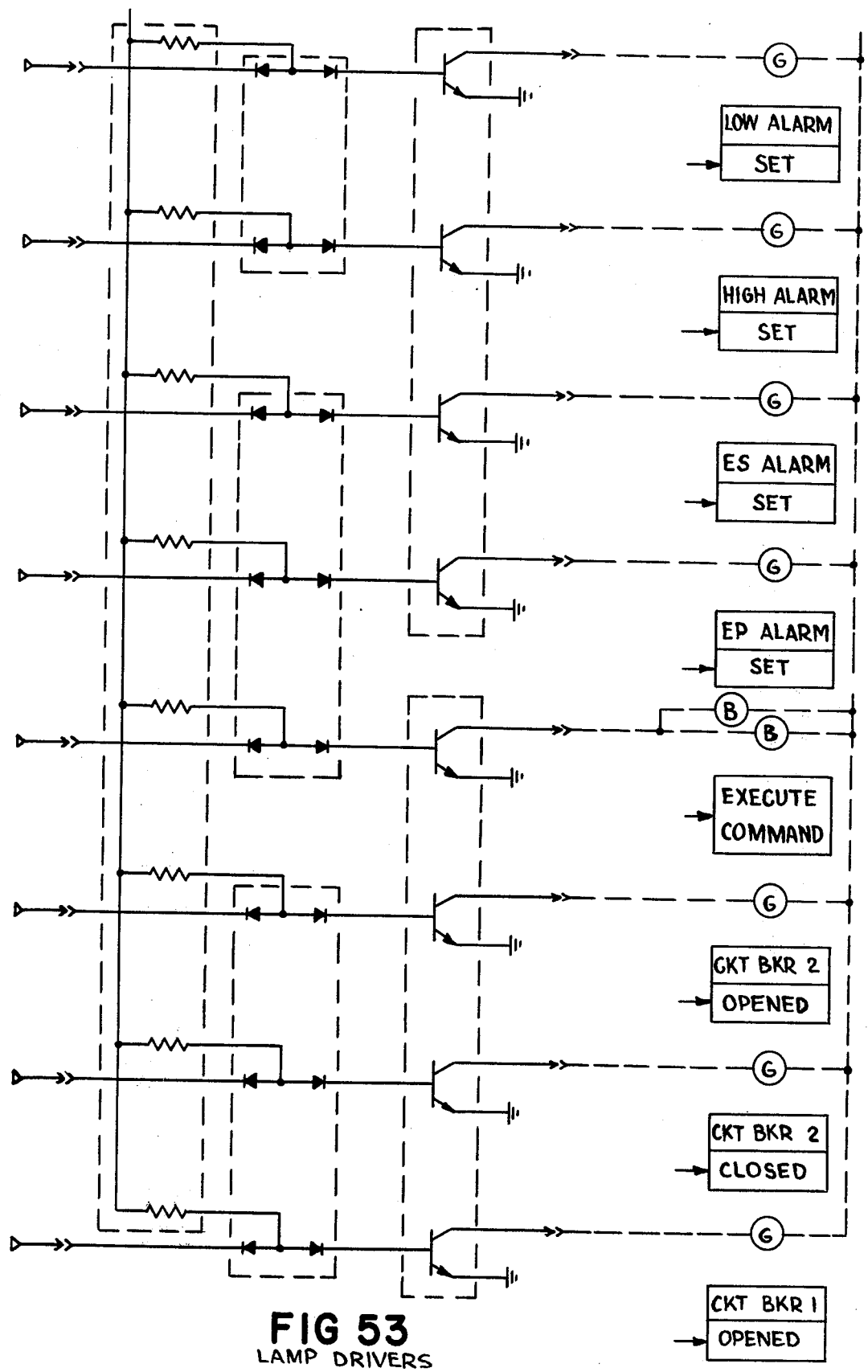
Figure 54:
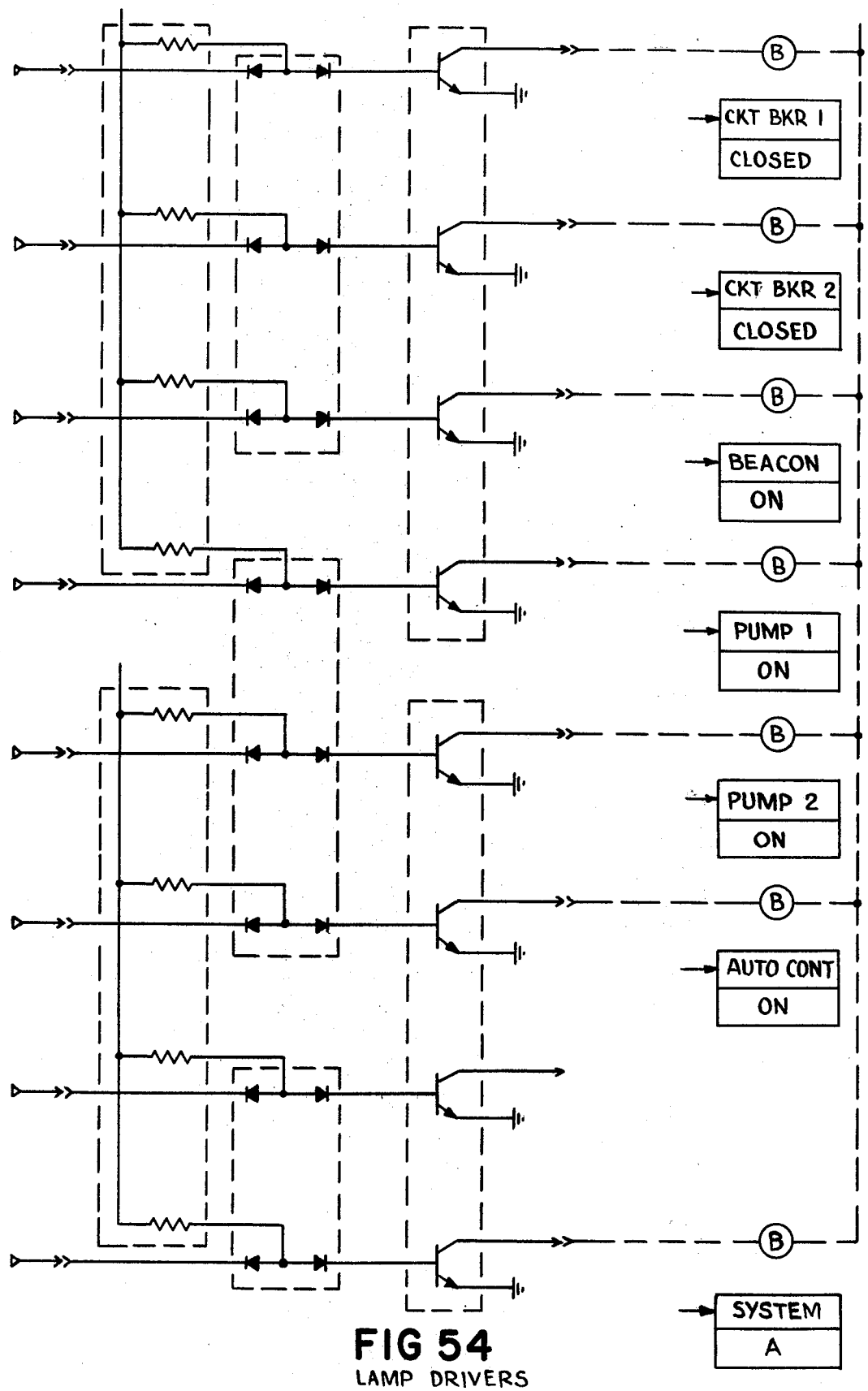
Figure 55:
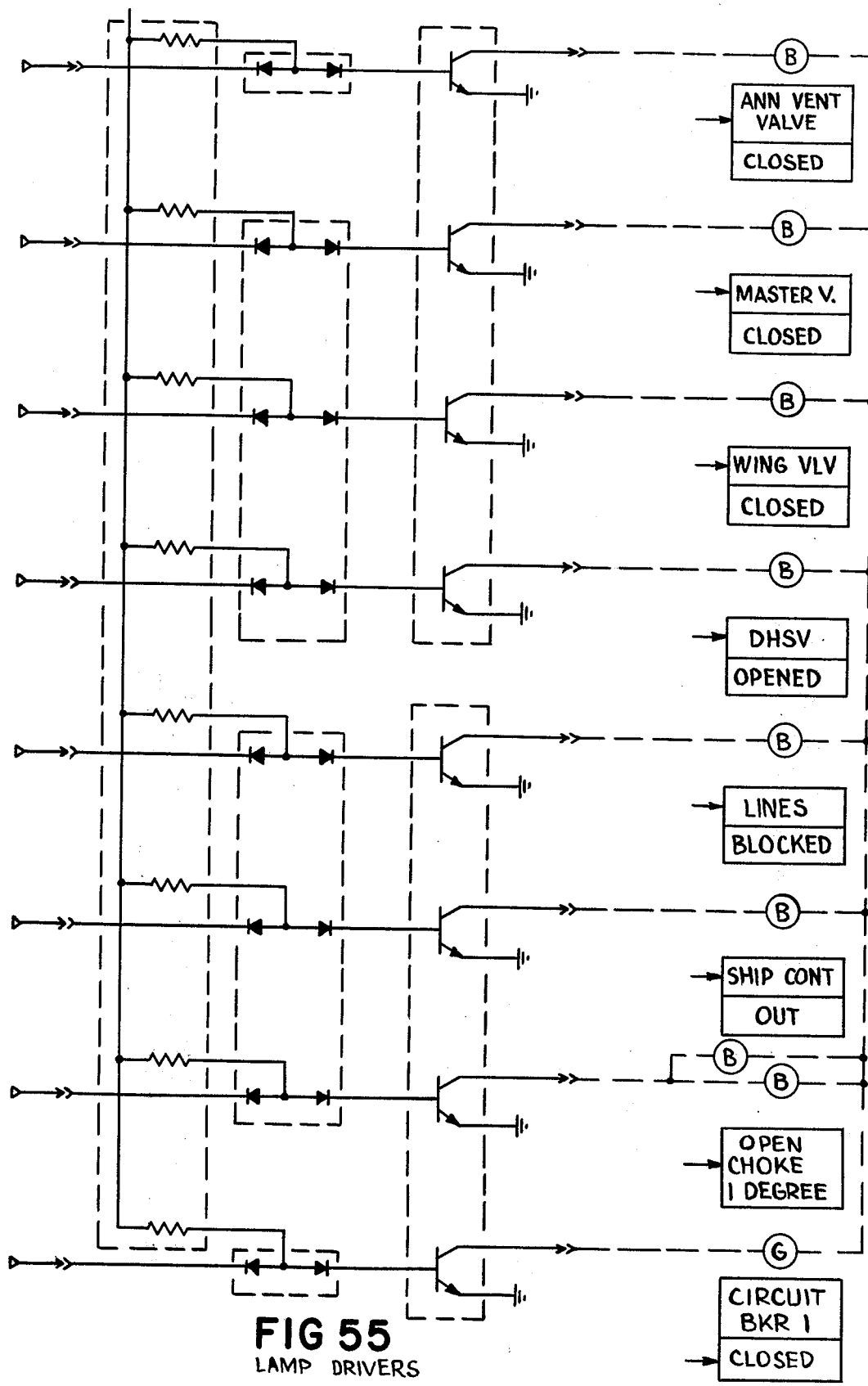

The SCAN RUNNING light FIG. 50 is driven by the DA0 line from the Data Scanner. This line is the least significant bit (LSB) of the data scan address lines and is pulsed most often. Each time the light flashes it indicates that the scan address has been incremented by one and that a scan word was sent. It is interrupted when an execute, alarm level change or control word is sent.

4.11 Lamp Drivers FIGS. 51 to 64

Individual lamp drivers are provided for each indicator light display. In most cases each half of light is driven separately. The circuit includes a diode resistor network and a driver transistor (MHQ2222). Basically, when the control input line is low (0.0V) the transistor is held off since its base is near ground potential and the corresponding indicator lamp remains de-energized. When the control line goes high ($+5V$), this drives the base circuit positive causing the transistor to conduct. The corresponding indicator lamp is then illuminated.

4.12 Lamp Test and Alarm Horn Circuit FIGS. 63 to 66

This circuit allows for the lamp test of all indicators when switch S130 is depressed. Relays K1 thru K6 are energized and their contacts close the lamp circuits to ground, energizing the lamps.

The steering diode isolates the lamp test circuits from the lamp driver circuit.

The alarm horn circuit is also included and during lamp test, the horn will sound.

When an alarm condition is indicated by the control line, the red lamp of the acknowledge switch is illuminated and the horn sounds. When the switch is depressed, its holding coil maintains its position, the red lamp goes out, the amber lamp illuminates and the alarm horn silences. When the alarm condition is removed, as indicated by the control line, the lamp driver turns off releasing the switch holding coil and the amber lamp goes out.

Figure 36:
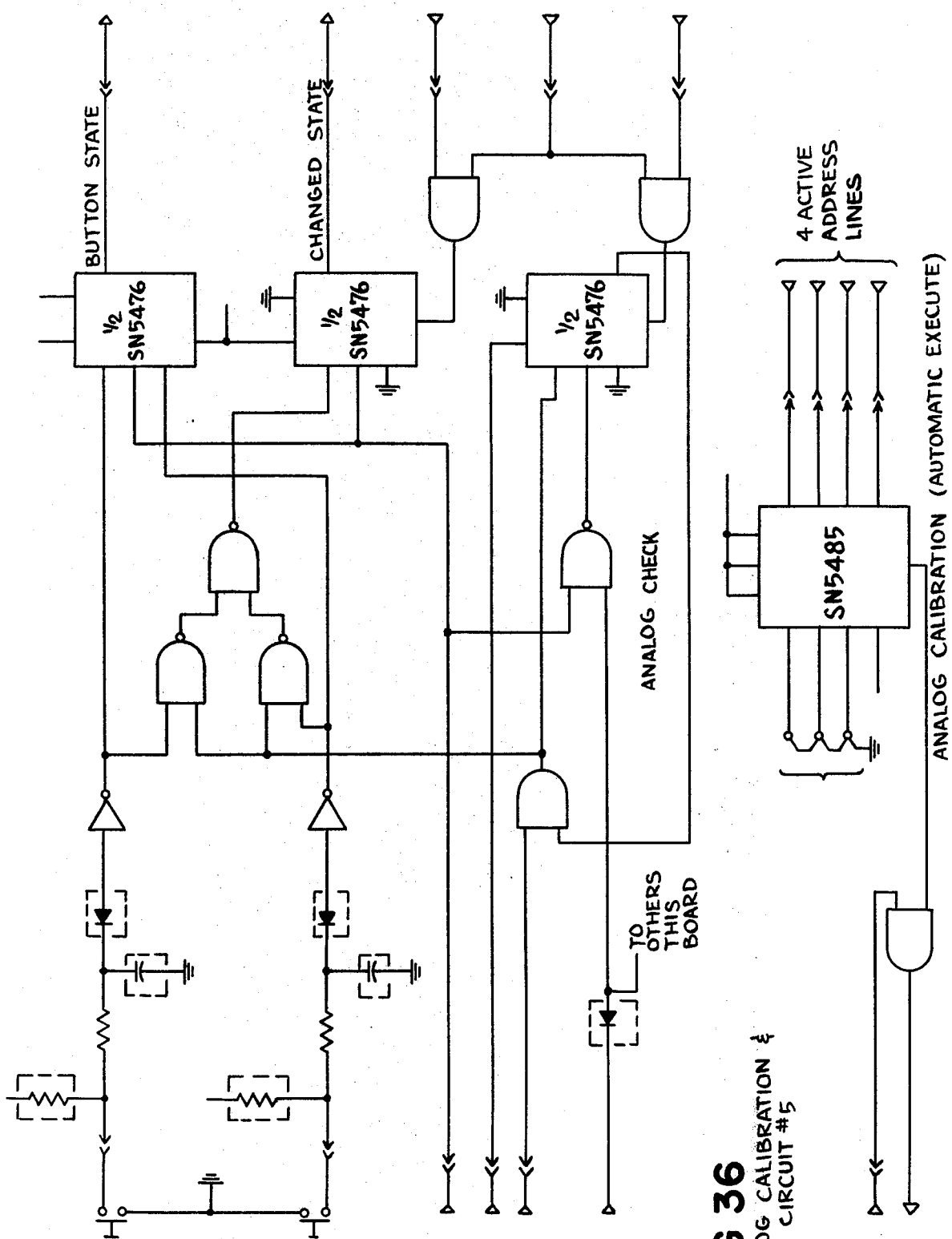

4.13 Analog Check (Auto Command Cycle) FIGS. 10 and 36

When the data scan address comparator has an equality (A=B), a control bid is generated through the following:
(a) Equality line AUC goes high FIG. 10
(b) A single pulse is produced that sets the auto command change of state flip-flop. Another flip-flop is set to keep the auto command change of state flip-flop from being set again. It can be reset only when the scan address reaches the last address plus one (FIG. 36).
(c) During the normal control button scan this auto command change of state flip-flop produces a control bid.

When the bid is accepted a control word will be sent subsea.

This is generated automatically and a control word with its status bit either 0 or 1 according to the "Check Zero" or "Check Gain" pushbutton selection, respectively, is sent.

Next, an execute word should be generated; this is done by decoding the previous word op code (in SB2). If it contains a control op code (CNB = 1), and the control word address in SB2 is = 1000, and execute bid is produced and an execute word will be sent.

Figure 63:
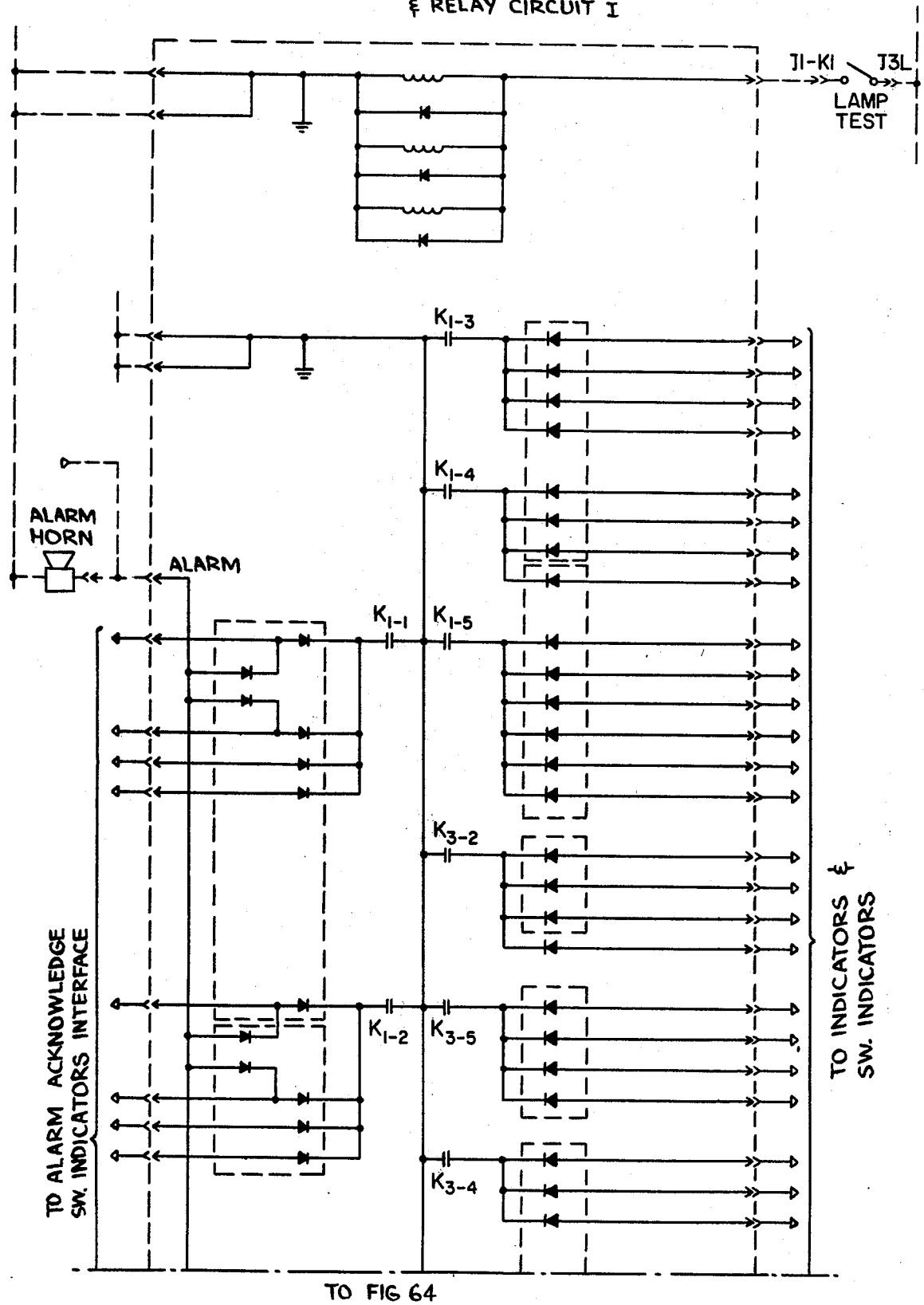
Figure 64:
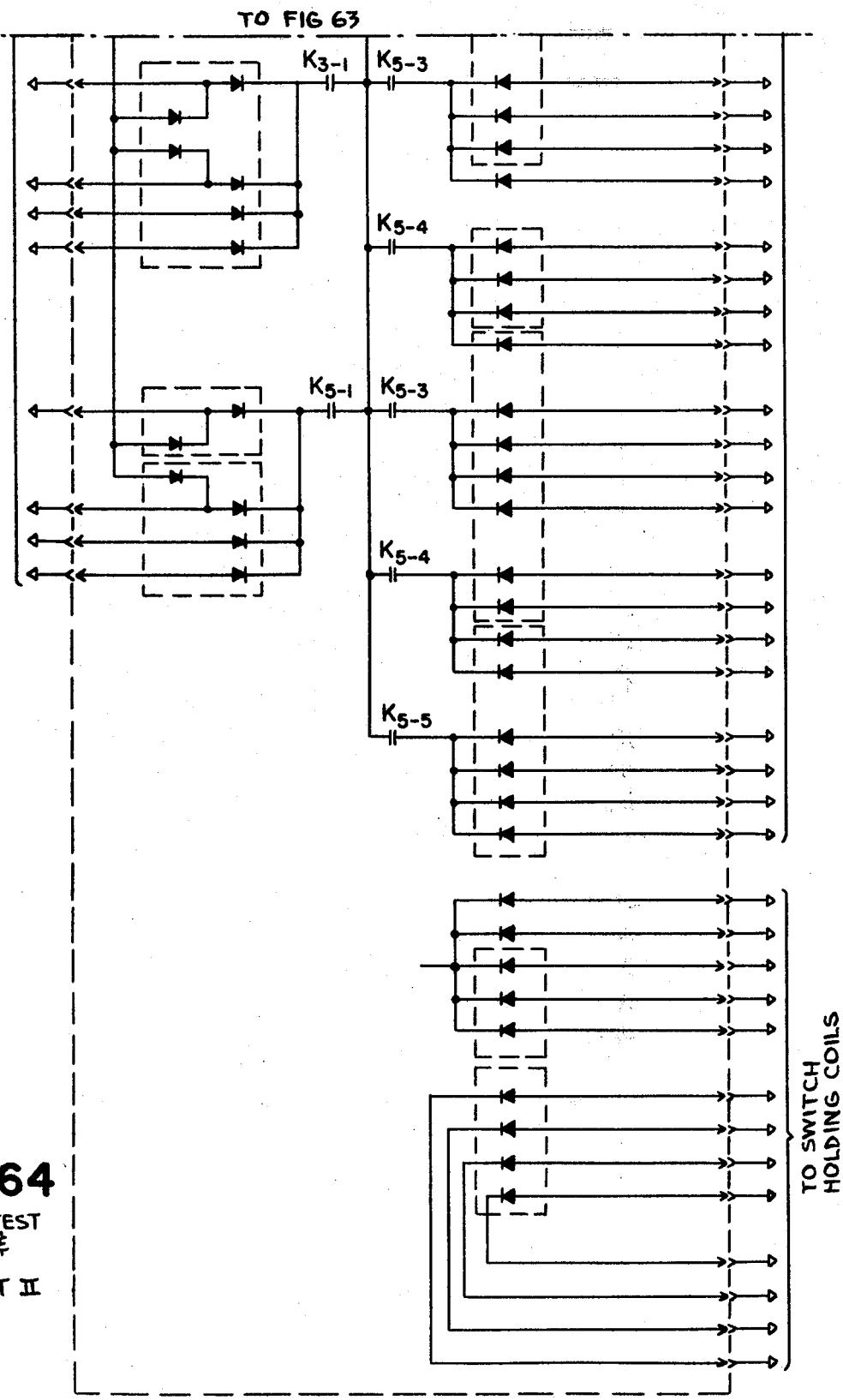
Figure 65:
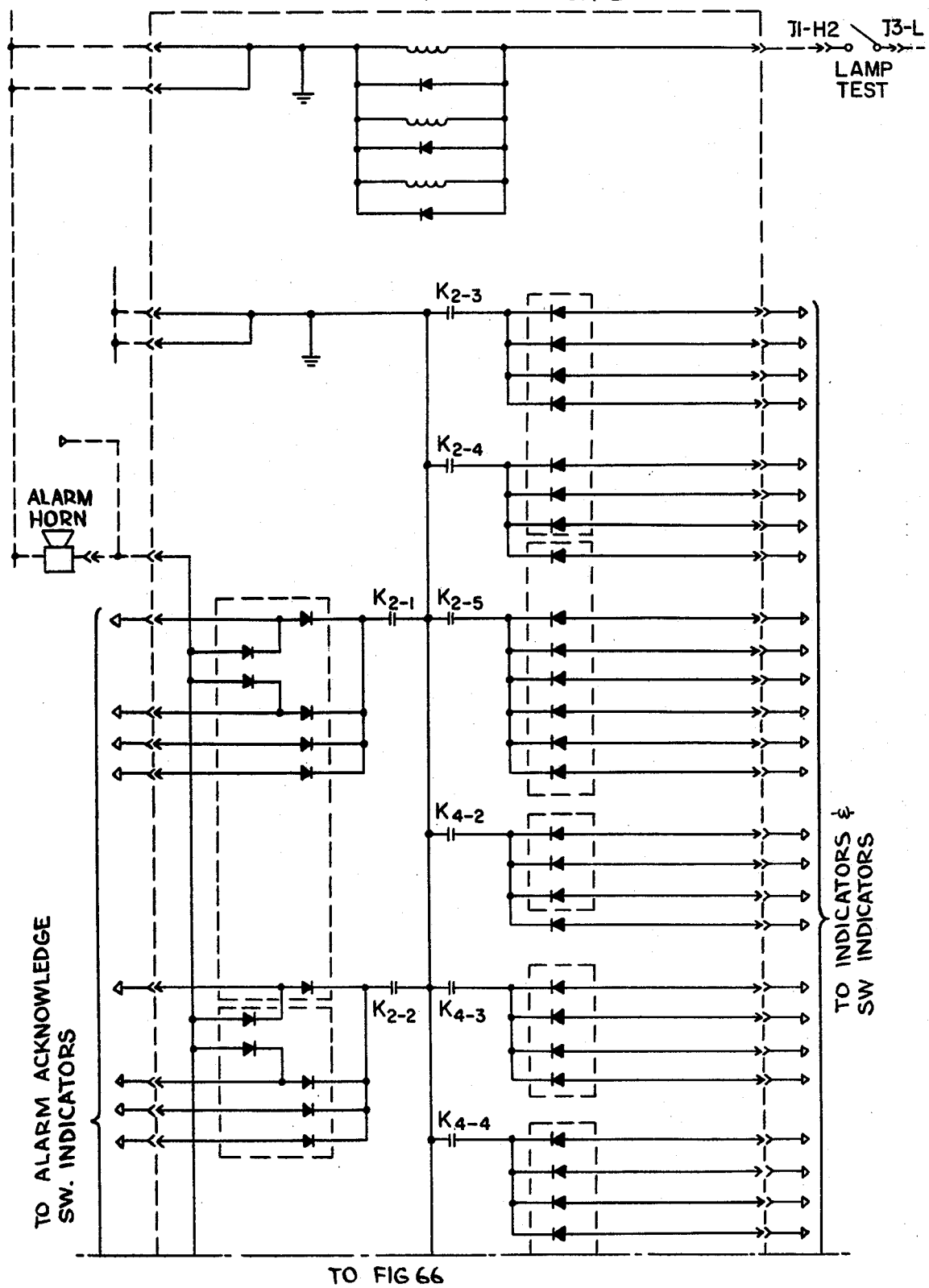
Figure 66:
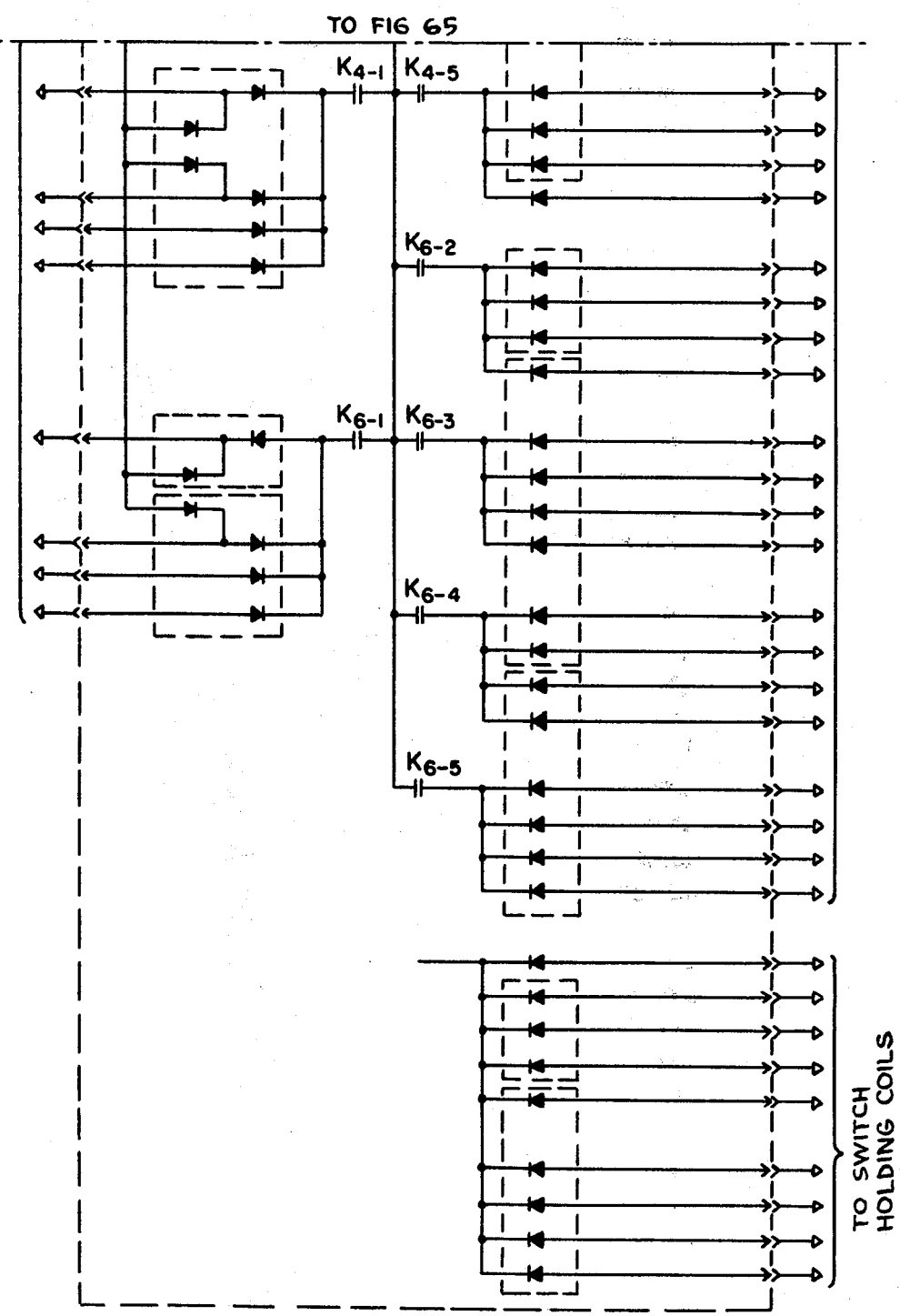

On the next data frame, the data address comparator (FIG. 10) A>B line goes high, the counter is cleared and the pulse flip-flop is also cleared (FIG. 63).

4.14 Master Reset (FIG. 31)

The master reset circuit is designed to maintain a master reset line low for approximately 1.6 seconds after power is turned ON; it also brings the master reset lines low if the supply voltage Vcc dips 0.5 volts below the previous steady state value. This value is the sliding average of the last 10 seconds.

The circuit functions as follows (FIG. 11: Initially both capacitors are discharged. When the power supply Vcc level increases, the voltage across the 0.05 $\mu$F capacitor raises quicker than the voltage across the 1.0 $\mu$F capacitor and this keeps the unijunction transistor non-conducting.

When the 1.0 $\mu$F capacitor voltage reaches the threshold of the CD4010A gates, the output of these gates will go high. The diode across the first gate introduces positive feedback which will lock the gate in the high state, and will also charge the 1.0 $\mu$F through the 2.2K resistor.

Since the diode voltage drop decreases with decreasing current, the 1.0 $\mu$F capacitor voltage will reach a voltage of approximately Vcc-0.2 volts.

When the Vcc supply goes low by 0.5 volts from the average value of the last 10 seconds, then the unijunction will fire, discharging the 1.0 $\mu$F capacitor. After 50 usec, the master reset lines MR1 thru MR4 will go low, resetting the PCR (STT) logic.

The 20K resistor and 0.05 $\mu$F capacitor comprise an RC filter which keeps Vcc noise spikes from triggering the unijunction into the conducting state.

To bring the unijunction back into a non-conducting state, the Vcc supply must be turned off, and then on.

5.0 CONTROL PANEL

The following descriptions are given to acquaint the operator with the operating philosophy of the consoles.

5.1 Control Buttons

The control button lights are split horizontally in two halfs. The upper half indicates the command given; the lower half indicates the status of the subsea system. For example: There are two buttons labeled BEACON, ON, OFF. Assume initially the OFF button was pushed and the beacon was actually off. In this situation both half lights in the OFF button are lit, and both half lights in the ON button are out. If the ON button is pushed now, the upper half of the ON button will be lit, the upper half in the OFF button goes out, and a control word is generated. After the EXECUTE button is enabled (and lit) and pushed, the subsea will turn ON the beacon. During the normal scan, the beacon ON status will return and the lower half of the ON button is lit. The lower half of the OFF button then goes out. Therefore, for any control button, if both halves have the same state (either lit or dark) then the last command given and the status of the subsea equipment are the same. Otherwise the last command either was not executed or was not accepted by the subsea equipment.

Note that the maximum delay to receive a subsea status bit is approximately 10 seconds during a normal scan cycle.

5.2 Alarm Level Change Buttons

With the alarm level change button, there is a slight variation from the control button philosophy. This change is due because the alarm level does not have a digital status to be scanned back to the PCR (STT) station. Therefore, when an alarm level button is pressed, it changes from normally half lit to full lit. Pressing it automatically produces two alarm level words and two execute words (para. 4.9). When the second execute word is sent, the half light goes out indicating a valid transmission.

If the full light remains on for more than 2.8 seconds, another alarm level change should be attempted.

The indicated values of the two thumbwheels used with each alarm level change button, represent the desired alarm level point in percent of full scale. For example, if the desired alarm point for low flowline pressure is 500 psia then the thumbwheel settings would be 10 (10% of 5000 which is full scale). The following are the full scale ranges of the four adjustable alarm levels.

Secondary Voltage (ES) = 0–150V
Primary Voltage (EP) = 0–600V
Flowline Press (High and Low) = 0–5000 PSIA

5.3 Analog Calibration

The two pushbuttons labeled "Analog Check Zero" and "Analog Check Gain" select if the zero level or the +5.00 volts level. Pressing either button does not produce any action other than registering the buttons state.

During the end of the normal scan cycle, a command word and an execute will be sent automatically, commanding the subsea equipment to return the zero voltage or the calibrating voltage level.

The following two functions are performed by this circuitry:
(a) Check periodically if the analog portion of the subsea is performing correctly.
(b) Check periodically if PCR (STT) and subsea command, execute, confirm cycles are working correctly.

5.4 Alarm Buttons

Several conditions in the subsea equipment are considered sufficiently serious to require quick response from the operator. When such a condition is reported by the subsea equipment, the appropriate button will be lit red and a horn will sound. The operator acknowledges receiving the alarm by pressing that button. The horn will be silenced and the button color will turn amber. The amber light will not go out until the subsea reports that the alarm is cleared.

The "Command Fail" alarm reports that during a command (or alarm level set), return word, execute or execute confirm cycle, one or more of the security checks failed. This indicates that the action should be attempted again, unless it occurred during the analog check auto command cycle. Pushing the "Command Fail" button clears the alarm and the light goes out.

5.5 Execute Command Button

Whenever an execute command cycle is enabled, the "Execute Command" button will be lit. This can occur after pressing a control button, an alarm level set button, or during the auto command cycle.

If a control button was pushed and the security check on the returned word was successful, the "Execute Command" button will be lit (after a maximum delay of 1.7 sec). If it is pressed while it is lit, an execute word will be sent and the light goes out. If it is not pressed within 10 seconds, the light goes out and the execute button is disabled. To carry out that particular control, the same control button must be pressed to again enable the execute command.

After an alarm level button was pressed, and after all security checks passed, the execute command button will flash on twice with pulses of 0.14 seconds minimum to 0.45 sec maximum, varying according to the relative timing of the arriving word in the subsea equipment and the subsea transmitter sync signal.

When an auto command (analog check) word is sent, the execute button will flash once (same timing as above).

5.6 Scan Running Light

Of the scan address lines, the least significant bit (pulsed most often) is used to drive the "Scan Running" light. Every time it flashes it signals that the address has been incremented by one and that a scan word was sent. It is interrupted momentarily when an execute, alarm or control word is sent.

5.7 Ship In Control (STT Only)

The ship in control button is a control button which must be used in conjunction with the execute button (sect. 4.5). When this command is accepted by the subsea equipment, a ship in control alarm is indicated at the PCR and all control and alarm level change words from the PCR are ignored. However, request for data words from the PCR are accepted and the PCR and STT will asynchronously scan for data and update their displays in normal fashion.

The alarm condition at the PCR will persist as long as the STT is in control. The STT reverts control back to the PCR in two ways:

(1) Operating its ship control out button, or
(2) Loss of the STT carrier signal to the subsea equipment.

SECTION IV

FUNCTIONAL DESCRIPTION SUBSEA TELECOMMUNICATIONS CAPSULE

1.0 INTRODUCTION

The subsea telecom capsule is designed to control and monitor the operation of the Yellow Module Assembly from the PCR (platform) and/or STT (shipboard) stations. These stations generate commands, either automatically or by action of the operator, which are transmitted digitally in serial form over a single pair of wires to the subsea telecom capsule. For every command word received, the subsea system transmits back to the PCR (STT) an appropriate answer whose action becomes part of the command/confirm/execute cycle (refer to Section III for the functional description of the PCR and STT control systems).

The subsea system uses parallel TTL (transistor-transistor logic) logic except for the serial data transmission. For the AC and DC control outputs, triacs and high wattage silicon transistors are used. Where a conversion from high impedance to TTL input impedance is needed, CMOS/TTL buffer drivers are used. The switch contact inputs (digital status) and AC/DC control outputs are isolated from the logic circuit interface by LED (light-emitting diode) photo couplers.

2.0 SYSTEM SIGNAL TYPES AND CAPACITY

The type of signals that are handled by the subsea system are basically divided into three categories. They are:

1. Control Signal

The initiation of which causes a particular function to be performed, such as a valve to open or close, a motor to start or stop or to change an alarm level setting. Thus, a command signal (word) is initiated at the PCR (STT) station and received at the subsea.

2. Supervisory Digital Signal

This signal indicates the status of a control device, such as a valve position (opened or closed), circuit breaker position or alarm point status. Thus, a supervisory digital signal is initiated subsea and received at the PCR (STT) station.

3. Supervisory Analog Signal

This signal indicates quantitative information, such as pressure and voltage readings from transducer outputs. Thus, this signal originates subsea and is received at the PCR (STT) station.

Table II-1 in Section II herein lists and identifies the control and monitor functions that are performed by the system. Each function is assigned a unique format and is transmitted in binary form (refer to Tables III-1, 2, 3 and 4 in Section III for communication word address assignments). Communication word formats are described in the appropriate paragraphs of this section.

The subsea Telecom system has a capacity of 32 two-bit control points, 64 sixteen-bit data channels for digital and analog supervise functions and 64 four-bit channels for alarm level change functions. Of these 17 two-bit control points, 16 sixteen-bit data channels and 8 four-bit alarm level change channels are used.

System update time for the functions listed in Table II-1 (Section II) is approximately 10 seconds.

3.0 SUBSYSTEM DESCRIPTIONS

The subsea telecom block diagram is shown in FIGS. 112–115. The system consists of data scan, alarm level change, control output and execute subsystems, data storage, word decoding, multiplexing and receiver/transmitter control circuits. Operational description of these circuits is given in paragraph 4.0 of this section. In summary, however, when a command word is received from the PCR (STT) station, it is stored and retransmitted to the PCR (STT) station for confirmation. Upon successful confirmation, an Execute Command word is transmitted. Upon receipt of this execute word at the subsea, it is compared with the previously stored word in all but the execute code portion of the word. Successful comparison unlocks the stored command word for action. This fully interlocked command/confirm/execute cycle essentially affords foolproof PCR (STT) station operation. System supervisory data is obtained by data scan subsystem. The analog portion of this subsystem includes the scaling amplifiers, analog multiplexer and A/D converter, which convert the data to BCD format. Pre-set differential comparators are also included for detecting specific alarm conditions. The digital data (contact closures) portion of the data scan subsystem, receives data through LED-coupled photo isolators which provide isolation and noise immunity. Contact wetting is also used to ensure reliable operation over long time periods. The AC and DC output control portion of the system is all-solid-state employing glass-passivated triacs and high wattage silicon transistors.

System coded data transmission and receiving security is provided for by the LARSE data communicators, which employ the LARSE transmission code. These devices employ frequency-shift-keying (FSK) transmission and are used in the final transmit and receiving stages of the system. Reference is had to the LARSE Data Communicator Technical Manual.

Redundant receiver/transmitter modules, central processing logic modules and power supplies are used. They are identified as System A and System B. Each is independently selectable from the PCR (STT) station at any time without interference to normal system operation (bumpless transfer). The output control circuits and digital data interface circuits are common to Systems A and B.

The operation of the equipment is based upon the premise that the subsea telecom system will not generate any signals independently and that all subsea telecom signals are the result of commands sent from the PCR and/or the STT.

There are four distinct commands used. Listed in order of increasing priority they are:
1. Scan — Send back a portion of system status (digital or analog)
2. Control — Load into a control buffer the data necessary to perform a control function and send back the command as received
3. Alarm Level Change — Load into an alarm level set buffer the data necessary to perform an alarm level change and send back the command as received
4. Execute — Execute the previously loaded control or alarm level change command. Note: If both were previously loaded the alarm level change takes precedence 3.1 Data Scan Subsystem The data scan subsystem provides the necessary means for the platform (PCR) or ship (STT) stations to monitor the status of the subsea equipment. Analog information, such as Flowline Temperature, and digital information, such as Master Valve Opened, are sent back to the PCR or STT stations by the scan system.

The OP code for a scan word (request for data) is 00. The OP code is defined as bits 14 and 15 of the 16-bit request for data word transmitted from the PCR (STT) station.

The capacity of the data scan system is 16 analog channels of up to 16 bits each. The A/D converter used has an output of 12-bits plus a 100% overrange bit. It encodes the analog data into 3-decode BCD form. In addition, the scan system has five channels of digital information, each with a capacity of 16-bits, providing a total capacity of 80-bits (refer to Tables III-2 and III-3 in section III for request for data word address assignments). Digital data returns as 16 independent status points packed into the same word. The returning data word does not have address information associated with it. This information is supplied by retaining the command (request for data) at the PCR (STT) that initiated the data request.

The well number bits in the request for data words are hardwired in as 1111 or this single well system.

When OP code 00 is detected, the system first decodes if the request is for an analog scan or a digital scan.

If the address is a request for analog scan, bit-8 of the request word is 0. This sets the output multiplexer addresses to 111 since the output lines of the A/D converter are connected to the corresponding input lines (terminals 17) of the output multiplexers. The 16 channel analog multiplexer is also addressed according to bits-4 thru 7 of the request word thus selecting the proper analog channel for scan. When bit 8 = 0 it enables the output multiplexer and starts the analog to digital conversion.

If the address is a request for a digital scan, bit-8 of the request word is high (1). This enables the output multiplexers to be addressed in accordance with bits-4 thru 6 of the request word. These three bits have the capacity for eight addresses ($2^3$), however, of these eight addresses, 111 is reserved for the analog scan (previously described), 110 is reserved for the alarm level change subsystem and 101 is reserved by the control output subsystem. There are five addresses, then, that can be validly used for digital scan, 000 through 100. See Table IV-1 for output multiplexer address assignments.

TABLE IV-1

OUTPUT MULTIPLEXER ADDRESS ASSIGNMENTS

| ADDRESS NO. | MUX INPUT | ADDRESS S2 | S1 | S$\phi$ | OUTPUT DATA |
|---|---|---|---|---|---|
| 0 | I0 | 0 | 0 | 0 | Digital Scan |
| 1 | I1 | 0 | 0 | 1 | Digital Scan |
| 2 | I2 | 0 | 1 | 0 | Digital Scan |
| 3 | I3 | 0 | 1 | 1 | Digital Scan |
| 4 | I4 | 1 | 0 | 0 | Digital Scan |
| 5 | I5 | 1 | 0 | 1 | Control Output (Stored Word) |
| 6 | I6 | 1 | 1 | 0 | Alarm Level Change (Stored Word) |
| 7 | I7 | 1 | 1 | 1 | Analog Scan |

3.2 Control Output Subsystem

The control output subsystem provides the means to carry out a control action request by the PCR or STT stations (refer to Table III-1, Section III for word address assignments). To actually carry out a control action, such as "open the Master Valve", two subsystems are involved. They are the control output and execute subsystems. The latter is discussed in paragraph 3.4.

The OP code for a control function is 01 as defined by bits-14 and 15 of the control function word. FIG. IV-3 shows the word format of a control function as received the PCR (STT). The capacity of the control subsystem consists of 32 separate addresses as defined by bits-4 thru 8 of the word. For each address two states can be commanded such as ON and OFF. This action is defined by bit-0 (high or low) of the word. For further security, bit-1 is a parity bit on the status bit (bit-0), and P = $\bar{S}$. Therefore, each control word received by the subsea Telecom commands 1 of 64 possible control actions. Bits 2, 3 and 9 are permanently set high (1).

In the logic sequence for control subsystem operation, when a control OP code is decoded, bits-0, 1 and 4 thru 13 of the control word are stored in a 12-bit latch. The outputs of these latches, plus the remaining bits (2, 3, 14 and 15) are sent to the output multiplexer. Simultaneously, the output multiplexer addresses are set to 101, since the above bit lines are connected to the 15 inputs of the multiplexer (refer to Table IV-1). The data is then locked in the transmitter buffers and transmitted back to the PCR or STT stations.

3.3 Alarm Level Change Subsystem

The alarm level change subsystem provides the means to change the level at which an alarm will be initiated. The PCR is the only station which has this command capability (refer to Table III-4, Section III for address assignments). The alarms are:

1. High Flow Line Pressure
2. Low Flow Line Pressure
3. High Primary Voltage (Phase C)
4. Low Secondary Voltage (Phase A, B or C)

The execute subsystem (para. 3.4) is also involved in carrying out the alarm level change.

The OP code for an alarm level change is 10, as defined by bits-14 and 15 of the command word. The data bits (0 thru 3) define one BCD (binary-coded-decimal) digit. These bits are loaded into a 2-BCD digit D/A converter. Therefore, it takes two alarm level change words to specify the alarm level setting. Bits-5 and 6 specify four addresses since two words per alarm are required (LSB and MSB). Bit 4 specifies if the word sent is for the LSB or the MSB of the setting (C = 0 for LSB). Bits-7 thru 9 are permanently set high (1).

In the sequence of words transmitted to the subsea Telecom from the PCR station, two consecutive alarm level words are sent followed immediately by two execute words (para 3.4).

In the logic sequence for alarm level change operation the subsystem is composed of two levels of latches. As each word is received, the second level latches are loaded with the data present at the outputs of the first level of latches. At the next clock period, the first level latches are loaded with the received data if the OP code is 10 (alarm level change). For any other OP code, the latches are loaded with zeroes.

Three clock periods are used in this subsystem. As each word is received a burst of single clock pulses, C4, C5 and C6 are generated in that order. During the C4 period the execute commands are enabled. During the C5 period the level 2 latches are enabled and during the C6 period the level 1 latches are enabled.

3.4 Execute Subsystem

The execute subsystem provides the means of carrying out a previously requested and loaded (stored) command. That is, either an alarm level change command or a control output command.

The alarm level change execute subsystem consists of an execute OP code decoder and a 24-bit comparator. As the execute word is received, bits-0 thru 6 and 10 thru 13 are compared with the outputs of the level 2 latches.

If these bits are successfully compared and bit 15 is a logical one then the equal output of the comparator goes high. With a C4 clock cycle, a 2-input decoder is enabled and in turn, it half-enables two out of eight 4 bit latches. The inputs to this decoder are bits-5 and 6 of the execute word. Bit-4 and its compliment each half-enable four out of the eight 4-bit latches. Only one out of the eight latches is fully enabled at any one time and its output will retain the data present at bits-0 thru 3 of the received word. FIG. IV-9 shows the logic sequence. The output of these latches are connected to a D/A converter that fixes the voltage (alarm level) at one of the inputs to an analog comparator.

Bit 15 of the word is loaded into the level 2 latches to appear at the output as a 1 when an alarm level change OP code (10) was accepted during the previous word. If the previous word was not a 10 OP code, bit-15 will be zero. Therefore, this bit is used as a control execute disable flag, CED. That is, when it is a logical 1 the next execute command is interpreted as an alarm level execute and not a control output execute.

When the stored alarm level change word compares with the execute word, the execute confirm flag (EXC) is set true (EXC = 1) and retransmitted. This is bit-15 of output multiplexer address 111.

When the STT station is on control, all alarm level changes are disabled by the SIC (ship-in control) flag.

The control output execute subsystem consists of the same execute OP code decoder used in the alarm level change system, and a separate 24-bit comparator. The execute word format is the same as shown in FIG. IV-8 and the logic sequence is shown in FIG. IV-10. When the execute word is received and the CED (execute disable) flag is not high, the control output comparator is enabled. If bits-0, 1 and 4 thru 13 of the received word compare with the output of the control output latch, then a decoder is enabled. This decoder has bits-7 and 8 as inputs and the outputs will enable one out of four control output latches. These latches have bits-4, 5 and 6 as address lines and bit-0 as the data line. Therefore bits-4 thru 8 specify one out of 32 latch outputs where the status of bit-0 will be stored.

To check for parity, bit-0 (S) is compared with $\overline{bit\text{-}1}$. Since bit-1 (P) is transmitted as $\overline{bit\text{-}0}$, the subsea checks the parity by verifying that $S = \overline{P}$. If the bits compare, the execute confirm flag is set true (EXC = 1) and retransmitted. This is bit-15 of the output multiplexer address 111.

When the ship (STT) is in control, all control functions are disabled for the PCR station by PCR disable line SHD. This line is low (SHD = 0) when the ship obtains control (SIC = 0) and the PCR is selected for transmission (SSS = 0). The PCR disable line state is represented by SHD = SIC + SSS.

3.5 Receivers and System A/B Selector

The subsea Telecom system has two parallel systems in the logic portion, System A and System B. Only one is active at any on time. The final control output subsystem and data input subsystem are the non-paralleled portion of the subsea Telecom.

The twisted pair transmission line, connecting the PCR station and the subsea telecom, terminates into two transmitters and two receivers at the subsea end. One of each are in System A, the other set in System B. The outputs of each receiver are fed into a 16-bit input decoder. When a predetermined bit pattern is decoded, the decoder will set a flip-flop according to the status of bit-0. The output of this flip-flop determines which of the two systems is active. This same operation also applies for the STT station.

Each system (A and B) has two receivers, one for the STT and one for the PCR. The anticoincidence input select circuit selects either the PCR receiver or the STT receiver. The input select circuit can choose alternatively the STT or the PCR designated receivers irrespective of the relative time of arrival of the two words.

The ship receiver has an output that signals when the STT carrier frequency is present. The signal sets a latch, and when a ship in control command is received the output is the ship in control flag. Receipt of ship-out of-control command or loss of carrier signal will result in ship-out of-control flag.

Transmissions received subsea by the PCR and STT are carried on a FSK channel of 750 Hz center frequency at a data rate of 60 bps.

3.6 Trasmitters and Output Control

The transmitters send serial digital information to the PCR and STT stations on a FSK channel of 1620 Hz center frequency at a data rate of 360 bps. The transmitters operate on a single-word transmission mode (refer to LARSE Data Communicator Technical Manual in component data section of this manual). In this operation mode, 42 bits for word transmission are used, eight of which are synchronizing bits. These 42 bits are preceded by a maximum of 26 bit quiescent period. Therefore, the maximum total sending period is $(42 + 26)/360 = 189$ msec.

The word received from the PCR (STT) consists of 34 bit words at a 60 bps rate. Therefore the receiving time period is $34/60 = 566$ msec.

Each subsea transmitter, then, uses 189 msec of a 566 msec window. The worst case is when the PCR and STT words are received simultaneously. This increases the send time to 193 msec out of the 566 msec available. This is due to a maximum transmission delay of 1.04 msec caused by the processing logic plus 3 msec for A/D conversion.

The output control circuit receives the data out signal and generates two pulses, DLKn and DTn. These pulses strobe the data into the transmitter buffers and start single-word transmission. According to the state of System A/B Selector, either System A or System B transmitters will be used.

4.0 CIRCUIT DESCRIPTIONS

The subsea Telecom circuits described herein make reference to the following figures:

FIGS. 69 to 76-Transmitter/Receiver Board Logic Schematic (System A/B)

FIGS. 77 to 96-System A/B Board Logic Schematic

FIGS. 97 to 111-Common Board Logic Schematic

4.1 Receivers (FIGS. 69-72)

Two LARSE receivers are included on the Transmitter/Receiver Board and two boards are used; one for System A and the other for System B. One receiver is used for PCR communication and the other for STT communication.

The LARSE receivers operate upon receipt of a FSK (frequency-shift-keying) signal with a center frequency of 750 Hz ($\pm$ 150 Hz) at a data rate of 60 bps (bits-per-second). The data output lines (RBn00 thru RBn15) go low when their corresponding received bit is high (each data output line is controlled by a transistor gate internal to the receiver, and when the associated received bit is high the transistor is turned ON). The end-of-word pulse, EOWn, (where n = 1 for PCR receiver and n = 2 for STT receiver) at pin 7 goes low for maximum of 100 $\mu$sec when received data has been released to the data output lines. At pin 3, a data fail detector pulse is provided which indicates a communication failure by going high. This line, for the STT receiver, is identified as CPB, and is used in the ship-in-control logic as "carrier present". When this line is low (CPB = 0) it indicates that the STT communication circuit is coupled and the STT is transmitting request-for-data words.

The computer interface controller clamps the output data lines until a reset pulse, RRn, is applied in pin 4. Clamping is accomplished internally by occurrence of an EOW pulse (data ready). The reset pulse is NAND gated with the CP line (data fail) so that the output data lines remain clamped if a communication failure occurs. Normally the reset pulse is high for 5 $\mu$sec minimum and the input is 5 volt logic compatible.

The sensitivity of the receivers can be varied by selection of a resistor between pins 48 and 49. For resistance values from 100 ohms to 50 K ohms, the sensitivity changes from $-40$ dbm to $-12$ dbm respectively.

Refer to LARSE Data Communicator Technical Manual in the component data section of this manual for the operational description of the receiver (REDE unit).

Figure 81:
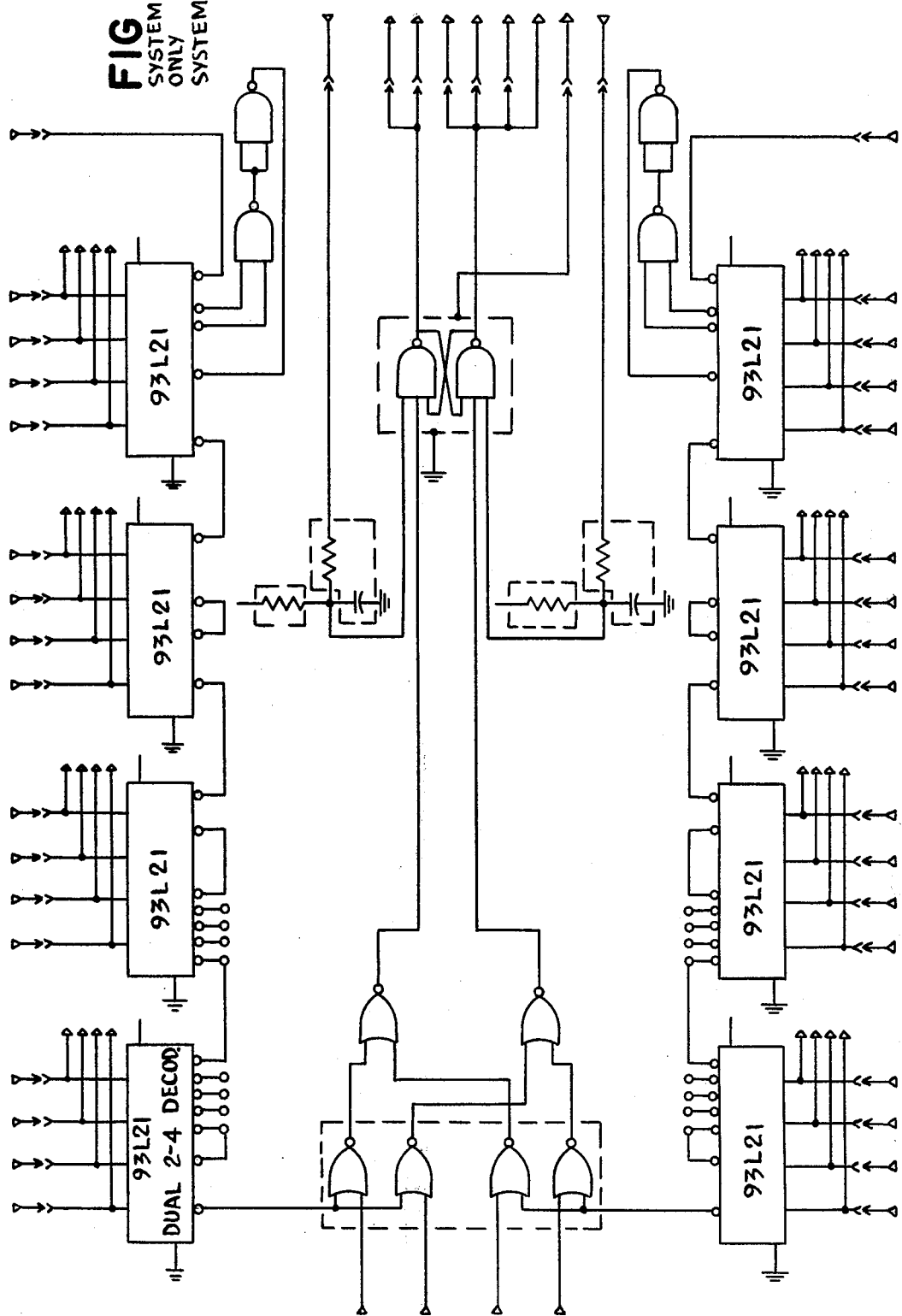
Figure 82:
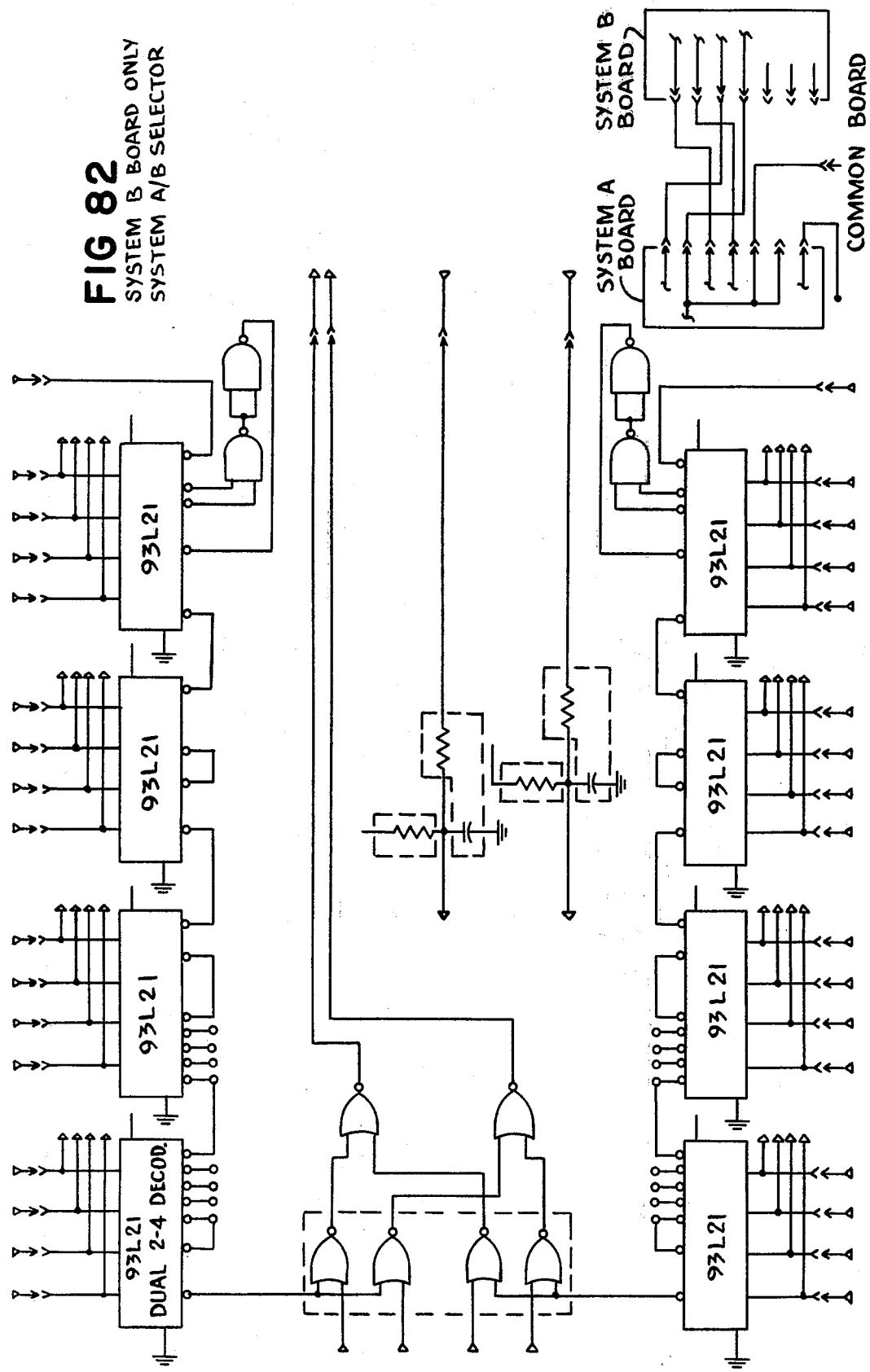

4.2 System A/B Selector (FIGS. 81 and 82)

The system A/B selector circuit is included on both System A and System B boards to interface with their respective System A and System B receivers. The only difference between the two is the circuit on the System A board contains the System A/B flip-flop (SN5410) which is common to both System A and System B circuits. The following description applies to either the System A or System B circuit.

Each receiver (PCR and STT) has a 16-bit decoder composed of 4 dual 2-input decoders (93L21). Each 93L21 consists of two independent one of four decoders, each with an active low enable. Each decoder accepts two inputs and provides one of four mutually exclusive active low outputs. The active low enable must be low for any output to be low. One of these four outputs, properly addressed, can then enable the succeeding 93L21 decoder. Table IV-2 shows the truth table for a ½ 93L21 decoder.

The first decoder is enabled with the EOWn pulse (n = 1 for PCR and n = 2 for STT) and the fourth (last) decoder when enabled along with bits-0 and 1 sets the system A/B toggle in the proper state according to which system (A or B) has been requested for. Request for System A or B is accomplished by a control function word. The bit

TABLE IV-2

93L21 DECODER TRUTH TABLE

| | ENABLE | ADDRESS | | OUTPUTS | | | |
|---|---|---|---|---|---|---|---|
| | $\overline{E}$ | $A_o$ | $A_l$ | $\overline{0}$ | $\overline{1}$ | $\overline{2}$ | $\overline{3}$ |
| ACTIVE LOW ENABLE ADDRESS INPUTS | 1 | X | X | 1 | 1 | 1 | 1 |
| | 0 | 0 | 0 | 0 | 1 | 1 | 1 |
| | 0 | 1 | 0 | 1 | 0 | 1 | 1 |
| | 0 | 0 | 1 | 1 | 1 | 0 | 1 |
| | 0 | 1 | 1 | 1 | 1 | 1 | 0 |

```
    E  A₀A₁
   1/2 93L21
    0 1 2 3
    | | | |
 ACTIVE LOW
  OUTPUTS
```

X = Don't care condition
1 = High Voltage Level (5.0V)
0 = Low Voltage Level (0.0V)

assignments are the negation of the bits formed by the PCR (STT) and transmitted to the subsea receivers. This is due to the inversion caused by the receiver data output lines. The bits are stored to their proper state (inverted) after being processed by the PCR/STT selector circuit multiplexers.

The first one-half decoder performs a parity check on bits-0 and 1 of the word irregardless of which system has been requested for and if successful enables the second-half of the first decoder. If S = 0 and P = 1, then output line 2 will be high and line 1 will be low. If the reverse is true (S = 1 and P = 0) then output line 2 will be low and line 1 will be high. Output lines 1 and 2 will both be high when P = $\bar{S}$ (00 or 11), a parity error. The second half of the decoder then, will be enabled only if either outputs 1 or 2 of the first half are high but not both high, which can occur only when the EOWn pulse is low and P = $\bar{S}$. Output lines 1 and 2 of the first half are double NAND gated to form the enable pulse for the second half decoder. With either input lines high the output enable pulse is low. When both lines are high the enable line remains high. The second half of the decoder is addressed by bits-2 and 3 of the received word which both must be low. When enabled, output line 0 goes low and in turn provides the enable pulse for the first half of the second decoder. Bits-4 and 5 of the received word address the first half of the second decoder. Both bits must be low and when enabled, output line 0 goes low. This is the enable pulse for the second half of the same decoder. The address for the second half are bits-6 and 7 of the received word. Bit-6 must be low and bit-7 must be high. When enabled, output line 1 will go low which is the enable pulse for the first half of the third decoder. Bits-8 and 9 address the first half of the third decoder. Bit-8 must be high and bit-9 must be low. When enabled, output line 2 will go low which is the enable pulse for the second half of the decoder. The second half of the third decoder and the first half of the fourth decoder are addressed by the well number bits (bits-10 thru 13) of the received word. An output line is selected on each, and strapped to the next enable input. This selection is based upon the proper well number for a multi-well application. Refer to Table IV-III for strapping

TABLE IV-3
SYSTEM A-B SELECT, DECODER WELL NUMBER CONNECTIONS

| WELL NO. | Y JUMPER | X JUMPER | RECEIVED BITS 13-10 |
|---|---|---|---|
| 0 | 3 | 12 | 1111 |
| 1 | 2 | 12 | 1110 |
| 2 | 1 | 12 | 1101 |
| 3 | 0 | 12 | 1100 |
| 4 | 3 | 8 | 1011 |
| 5 | 2 | 8 | 1010 |
| 6 | 1 | 8 | 1001 |
| 7 | 0 | 8 | 1000 |
| 8 | 3 | 4 | 0111 |
| 9 | 2 | 4 | 0110 |
| 10 | 1 | 4 | 0101 |
| 11 | 0 | 4 | 0100 |
| 12 | 3 | 0 | 0011 |
| 13 | 2 | 0 | 0010 |
| 14 | 1 | 0 | 0001 |
| 15 | 0 | 0 | 0000 | connections. At present, this single well system is strapped for well number 15 (address = 0000), output lines 0. Therefore for proper enabling, bits-10 thru 13 must all be low. Bits-14 and 15, the control word OP code, address the last decoder stage. Bit-14 must be low and bit-15 must be high which causes output line 1 to go low. This line serves as one of the inputs to System A/B flip-flop control circuit (NOR gates). The System A/B toggle (SN5410) has normally high inputs and any low set input will cause SYSA = 1 (System A selected). When the received bit RBn00 = 1 and RBn01 = 0 and the last decoder stage output is low, the first NOR gate goes high, setting the second NOR gate low. This causes the SYSA output of the flip-flop to go high. The same description applies for System B select (SYSB = 1) where received bits RBn00 = 0 and RBn01 = 1. The System A/B select circuit on the System B board (sheet 10) is coupled to the select toggle System A board through lines SSAB and SSBB. It can be seen, then, that all four receivers can set the flip-flop to either state. The logic states for the output signal lines are as follows:

SYSA = 0 (System B active)
SYSA = 1 (System A active)
SYSB = $\overline{SYSA}$
SSAB = 0 (set System A active)
SSBB = 0 (set System B active)

4.3 Anticoincidence Input Select

The anticoincidence input select circuit allows for data to be received simultaneously from the PCR and STT stations and is included on both System A and B boards.

The input select circuit consists of two J-K flip-flops (SN54111) that produce a data ready pulse (DR = 1) after an end-of-word pulse (EOWn = 0) is received. Since the circuit is symmetrical with respect to EOW1 and EOW2 pulses, only the following cases are described.

1. No EWOn Pulses Received

With no end-of-word pulses received (EOWn = 1) flip-flop FF1 continues to toggle in search of data from either the PCR or STT. The J input to FF2 stays low and the DR output line stays low indicating data is not available for processing. Toggling of FF1 occurs on the falling edge of clock pulse C8.

2. EOW1 Pulse Received (PCR Data)

When an EOW1 pulse is received (EOW1 = 0) indicating that data has been received by the PCR receiver, the FF1 flip-flop will stop its toggling when its Q output (SSS) goes low. This sets SSS = 0 which indicates that data from the PCR has been selected. The J-input to FF2 then goes high causing the DR output line to go high indicating that data is ready for processing.

3. EOW1 Pulse Received While STT Momentarily Selected

FIG. IV-16, case 3 shows the timing sequence for when an EOW1 pulse (PCR data) occurs while the STT has been selected (SSS = 1). The FF1 J-input may go low sooner than its normal toggle cycle, however, FF1 will continue to toggle until its Q output goes low (SSS = 0). If the J-input does go low sooner, the J-input to FF2 will go high but only for the time period shown. This time period is not sufficient for the DR line to go high. When SSS line is set high, the description for case 2 applies.

4. EOW1 and EOW2 Simultaneously Received

Provision is made for a the timing sequence for when both EOW1 and EOW2 pulses are simultaneously received while the SSS line is low and the EOW1 pulse is followed immediately by a second EOW1 pulse ($t \leq T_{c8}$).

From the timing diagram, it can be seen that the input select circuit will service both PCR and STT stations giving no preference. The only restriction is that from either receiver, the new EOWn pulse cannot come sooner than $T_{c8}$ or 139 $\mu$sec after the reset pulse to the receiver (RR1 or RR2, refer to para 4.1). for the output signal lines are as follows:

SSS = 0    PCR Data Input Selected
SSS1 = 0
SSS = 1    STT Data Input Selected
DR = 1    Data Ready for Processing
SHD = 0    PCR disabled The SHD pulse is generated for the well enable and OP code decoder circuit (para. 4.6). Then during the SSS = 0 period the SHD line will go low indicating the PCR is disabled.

Figure 75:
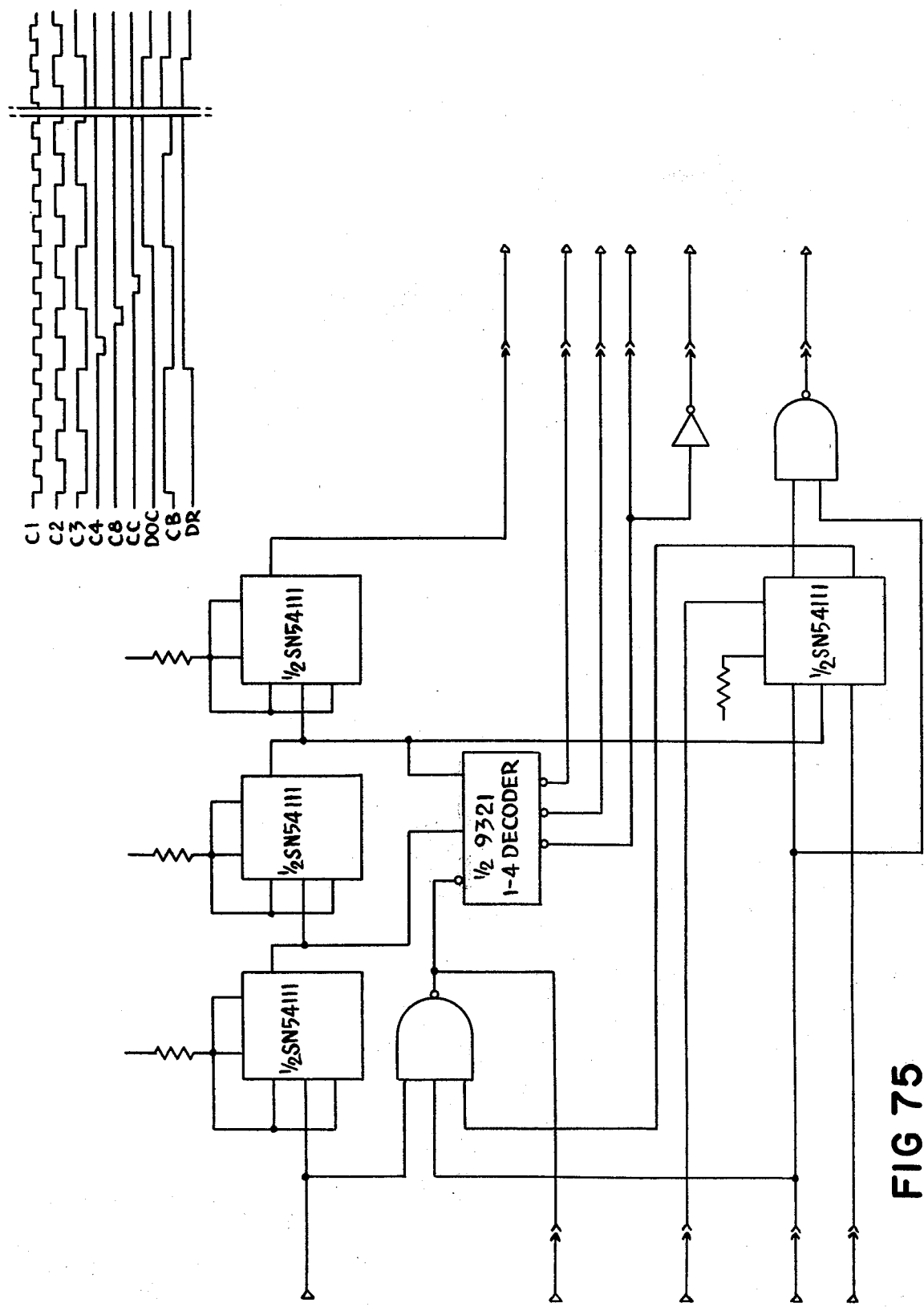
Figure 76:
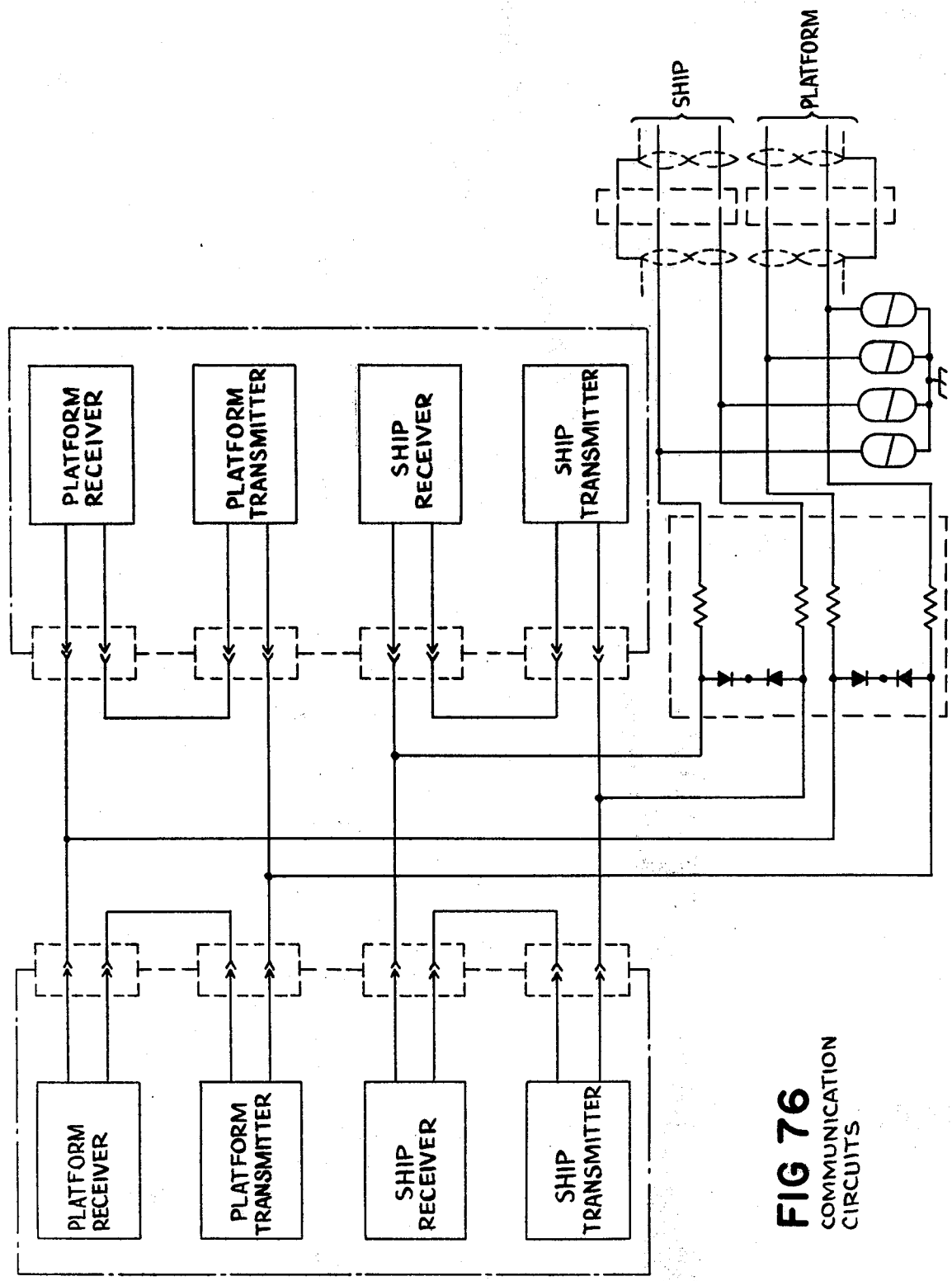
Figure 77:
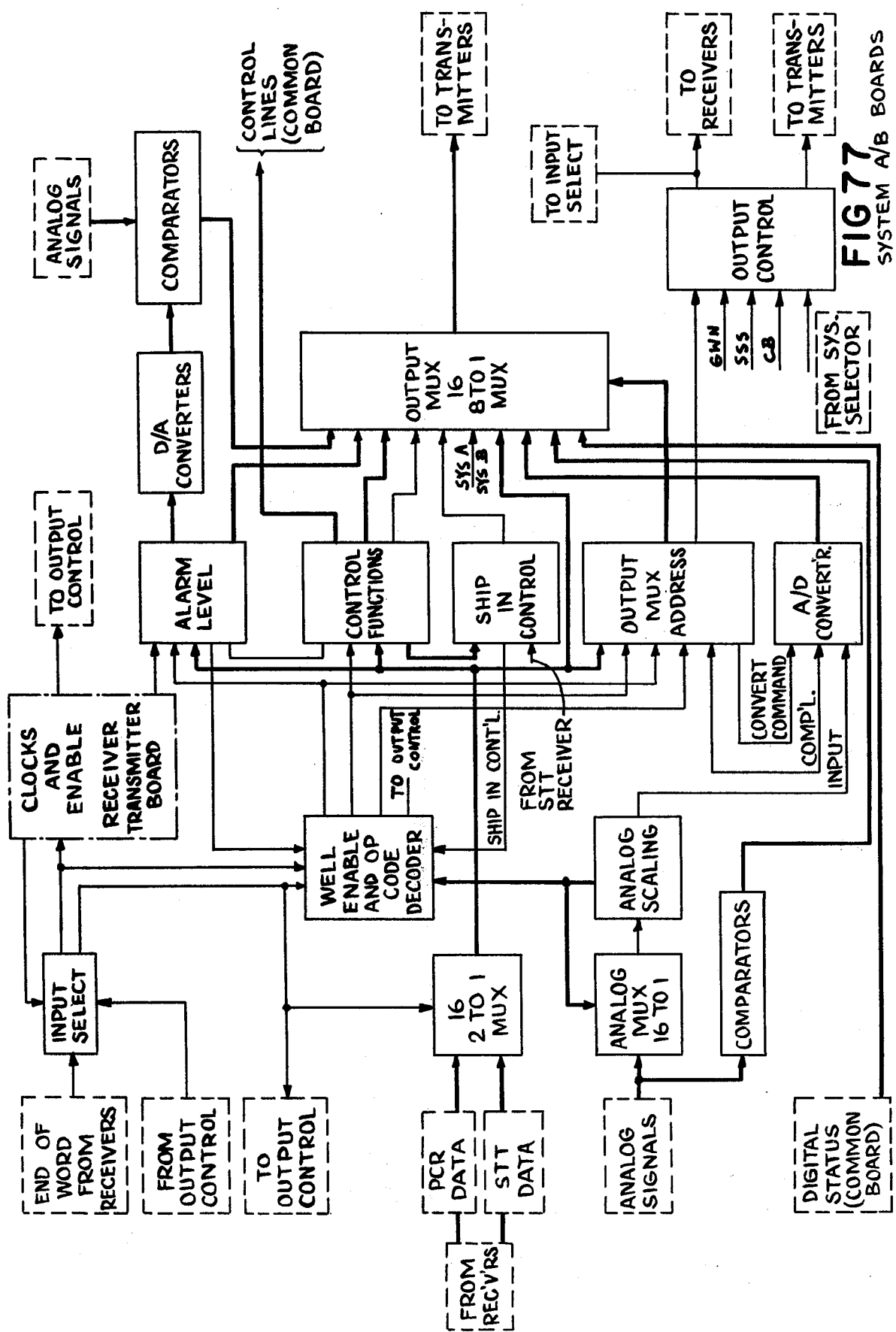
Figure 78:
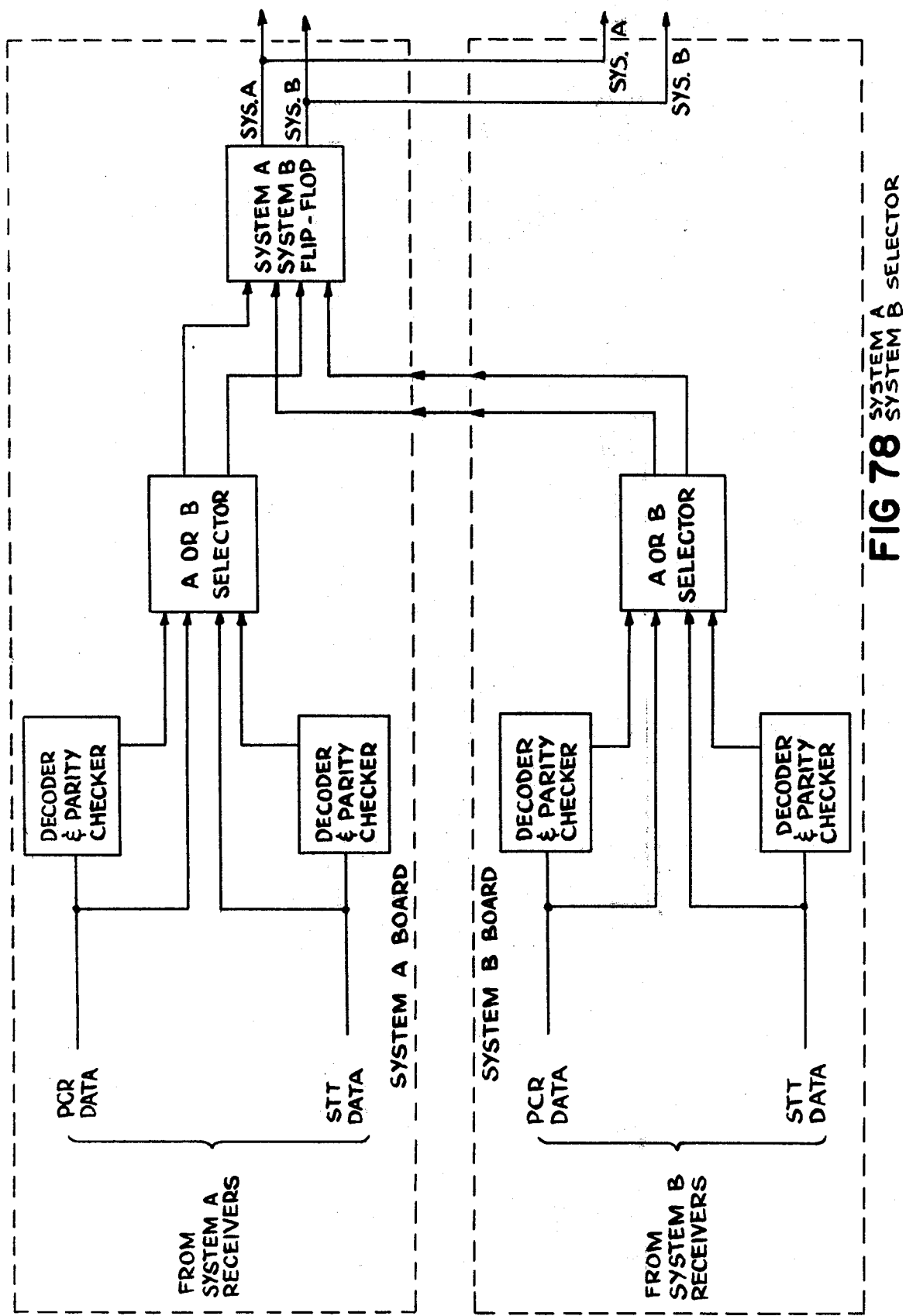
Figure 79:
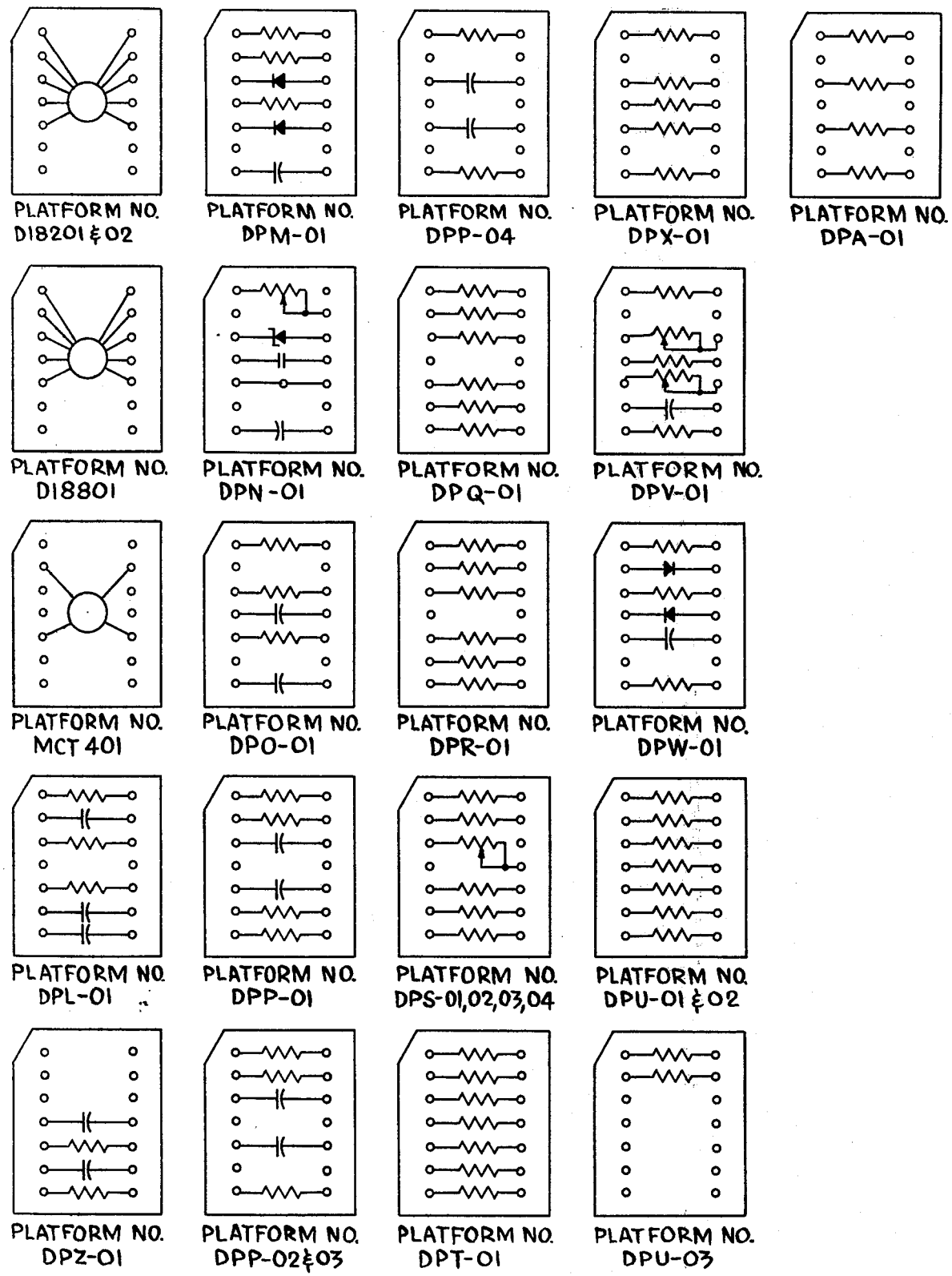

4.4 Clock Distribution (FIG. 75).

Each System A and B Transceiver Board contains the clock circuit as shown. The basic clock pulse (C1B) is derived from the STT LARSE transmitter and has a frequency of 57.6 KHz.

The C1B clock pulse drives a 3 stage asynchronous counter which consists of three J-K flip-flops (SN54111). Initially all three flip-flops are in the logical 0 state ($Q_{FF1} = Q_{FF2} = Q_{FF3} = 0$). When clock pulse C1B is applied to the clock input of FF1, line C2 ($Q_{FF1}$) changes from logical 0 to logical 1. This line serves as the clock input to FF2. FF2 does not change state at this time since it is triggered by the negative-going edge of the clock line, that is, logical 1 to logical 0. With the arrival of the second clock pulse to FF1, line C2 goes from 1 to 0. This change of state (negative going pulse) triggers FF2 and line C3 ($Q_{FF2}$) goes from 0 to 1. Two C1B pulses later, line C3 goes from 1 to 0 triggering FF3. Line C8 ($Q_{FF3}$) then goes from 0 to 1. Before arrival of the negative going portion of the eighth pulse all Q's of the flip-flops are in the 1 state. Clock pulse 8 causes lines C2, C3 and C8 to go to 0 in turn and the cycle repeats itself.

The 3 stage counter repeats itself for every $2^N$ clock pulses where N = number of flip-flops. Therefore, the cycle repeats every 8 clock pulses. From the timing diagram it can be seen that clock C1B is divided by 8 to yield a C8 clock with a period of 139.2 μsec.

Clock pulses C4, C5 and C6 are generated in a sequential burst by a two-input 1-4 active low output decoder (9321). The decoder is addressed by lines C2 and C3 from the 3-stage counter and is enabled when line CDCDE goes low (active low enable). The CDCDE line is generated by the 3-input NAND gate which requires all three inputs to be high for its output (CDCDE) to go low. With DR line and $\overline{Q}_{FF4}$ line high, CDCDE negative going enable pulses are generated by clock line C1B. Upon the next negative going C3 pulse (after C6 clock pulse), FF4 toggles causing the decoder enable line to go high. Data out enable line, $\overline{DOE}$, goes low indicating that all logical operations have been performed, except for A/D conversion. The function of clock pulses C4, C5 and C6 are shown in Table IV-4.

Figure 80:
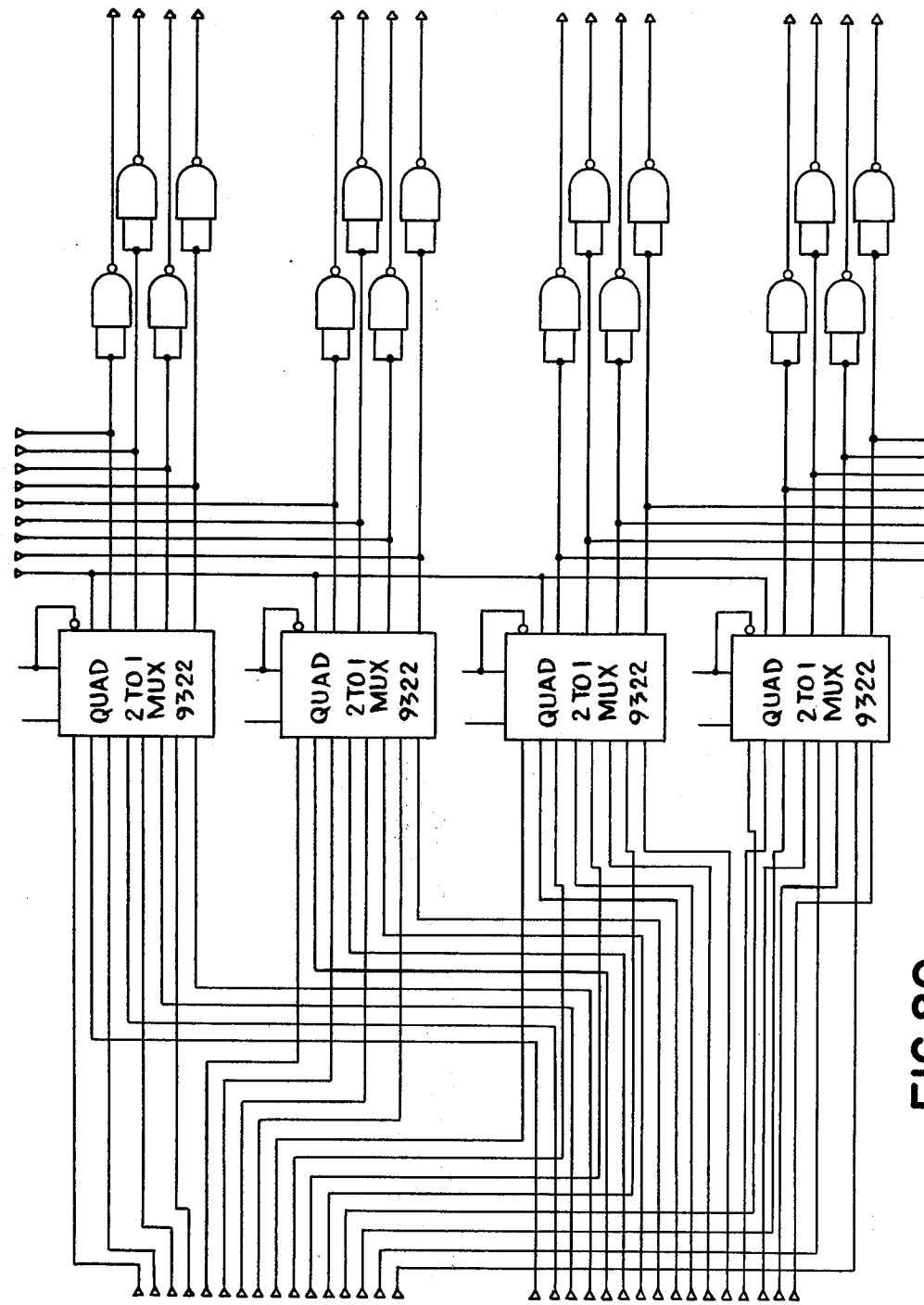

4.5 PCR-STT Data Selector (FIG. 80).

The circuit, consisting of input multiplexers and two-input NAND gates, is included on both System A and B modules.

The outputs of the PCR and STT receivers, which are also directed to the System A/B Selector Circuit (para. 4.2), are fed into four quad 2-input multiplexers. Two each are used for the PCR/STT received data. The outputs of the multiplexers are inverted by 2-input NAND buffer drivers.

Each multiplexer (9322) consists of four 2-input multiplexers with common input select logic (S input), common active low enable (E input) and active high outputs (Za thru Zd). It allows four bits of data to be switched in parallel to the appropriate outputs from four 2-bit data inputs (A0, A1 through D0, D1).

Each 2-bit input includes a data line from the PCR receiver and the related data line from the STT receiver. These are arranged in order from the LSB to the MSB of the received data word. The common select inputs (S) are connected to the SSS line, which control the multiplexers, and all active low enable inputs are grounded which permanently enable the multiplexers. When the PCR has been selected (refer to para. 4.3), SSS line goes low which selects the received word from the PCR receiver. When SSS goes high, the received word from the STT receiver is selected. Since the bits of the received word are inverted at the outputs of the receiver, the NAND buffer gates re-invert the bits to their proper state (as transmitted by the PCR and/or STT). Therefore, a high level bit exists at the output of these inverters (BN00 thru BN15) when an ON or high bit is received subsea.

Figure 84:
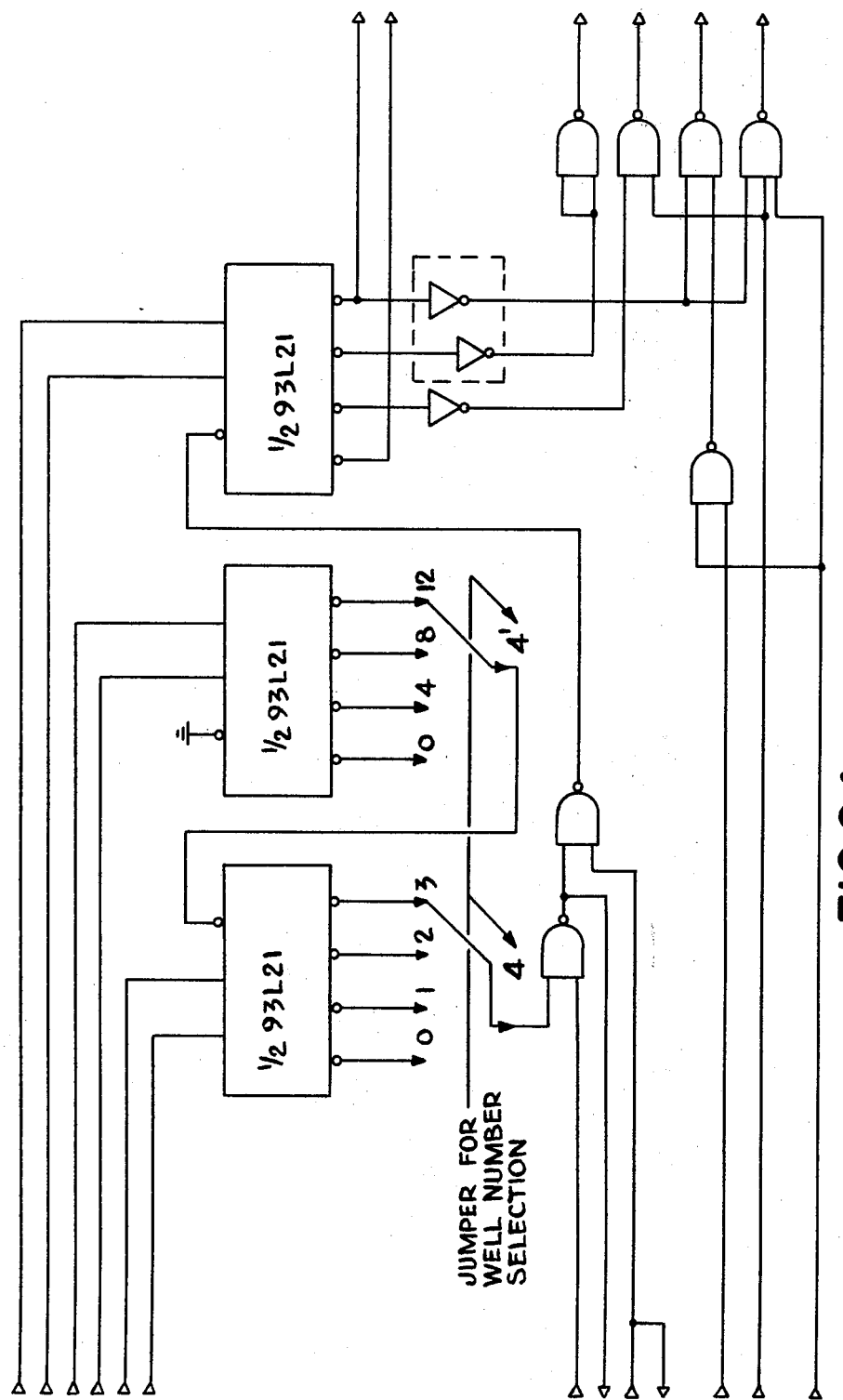

4.6 Well Enable and OP Code Decoder (FIG. 84).

Bits-10 thru 13 of all words received from the PCR station identify the well number code. This enables the PCR to control up to 16 separate subsea Telecom systems. Since the STT is connected directly to one well only, the well enable circuit disregards bits-10 thru 13 when a word is received from the STT.

The decoders used in this circuit (93L21 and 9321) are one of four decoders, each with active low enables. Each decoder accepts two inputs and provides one of four mutually exclusive active low outputs. These decoders are the same as used in the System A/B select circuit (para. 4.2). Refer to Truth Table IV-2.

The Well Enable Circuit uses two 2-input decoders, whose outputs are hardwired (jumpered) for a given well number. Table IV-5 identifies these jumper connections. In this system well number 15 has been selected, therefore, jumper connections 12 (Z3) on the first decoder and 3 (Z3) on the second decoder are used. The connection on the first decoder acts as the enable line for the second decoder and its output jumper serves as one of the control inputs to the WEA line NAND gate circuit.

The first decoder is permanently enabled by the grounding of its enable input. It is addressed by bits-12 and 13 of the received word and when the code is for well number 15, bits-12 and 13 are both high. Output Z3 goes low enabling the second decoder. The second decoder is addressed by bits-10 and 11 of the received

TABLE IV-4

| CLOCK | CLOCK PULSE FUNCTIONS | | | |
|---|---|---|---|---|
| | EXECUTE | ALARMS | CONTROL | SCAN |
| C4 = φ | Enable alarm & control latches | | | |
| C5 = φ | | Load level 2 latches | | |
| C6 = φ | | Load or clear level 1 latches | | |
| $\overline{DOE}$ = 1 | Release data to transmitters | Release data to transmitters | Release data to transmitters | Wait for A/D conversion then release data to transmitters |
| C8 | Clock for Data Output Control Circuit (Transmitter Selector) | | | | word. Their logic state is also high for a well number 15 code. When the decoder is enabled with this address present, output Z3 to the NAND circuit goes from high to low. With Z3 output low, the $\overline{SSS}$ line high (PCR data selected), WEA line will go low upon receipt of data ready pulse DR = 1. The well enable line, WEA, when low enables the OP Code Decoder.

When the SSS line selects the STT ($\overline{SSS}$ = 0), the well number decoders are ignored regardless of what state received bits-10 thru 13 may be. The well enable line, WEA, is then controlled by the data ready line and will go low when DR = 1.

The OP Code Decoder Circuit consists of a 2-input one to four decoder, hex inverters and NAND gate buffers. The decoder is enabled by the WEA line and is addressed by bits-14 and 15 of the received word. The bits are the OP code portion of the word. Table IV-6 identifies the four possible OP codes.

TABLE IV-5
WELL ENABLE DECODER JUMPER CONNECTIONS

| WELL NO. | DECODER 2 JUMPER | DECODER 1 JUMPER | BN BITS 13-10 |
|---|---|---|---|
| 0 | 0 | 0 | 0000 |
| 1 | 1 | 0 | 0001 |
| 2 | 2 | 0 | 0010 |
| 3 | 3 | 0 | 0011 |
| 4 | 0 | 4 | 0100 |
| 5 | 1 | 4 | 0101 |
| 6 | 2 | 4 | 0110 |
| 7 | 3 | 4 | 0111 |
| 8 | 0 | 8 | 1000 |
| 9 | 1 | 8 | 1001 |
| 10 | 2 | 8 | 1010 |
| 11 | 3 | 8 | 1011 |
| 12 | 0 | 12 | 1100 |
| 13 | 1 | 12 | 1101 |
| 14 | 2 | 12 | 1110 |
| 15 | 3 | 12 | 1111 |

TABLE IV-6
RECEIVED WORD OP CODES

| BN15, 14 | OPERATION |
|---|---|
| 00 | REQUEST FOR DATA SCAN |
| 01 | CONTROL FUNCTION |
| 10 | ALARM LEVEL CHANGE |
| 11 | EXECUTE |

The restrictions on the use of these operations are as follows:
1. SCAN (00) - No restrictions
2. CONTROL FUNCTION (01)
   From STT - No restrictions
   From PCR - Active only when STT is not in control
3. ALARM LEVEL CHANGE (10)
   From STT - Not accessible
   From PCR - Active only when STT is not in control
4. EXECUTE (11)
   Alarm Level Change Execute - Same as 3 above
   Control Execute - Same as 2 above except if an alarm execute is pending, it takes precedence over a control execute To implement the above operations and restrictions, the following signals are used:
SSS = 0 - PCR selected when low
$\overline{SIC}$ = 1 - STT in control when high
SHD = 0 - PCR disabled when low, it is low when STT is in control and PCR is selected or SHD = $\overline{SIC}$ + SSS
WEA = 0 - Well enabled when low
CEDR = 0 - Control execute disable when low (signals there is an alarm execute pending for either the 1st or 2nd alarm level change word)

Therefore, when line WEA enables the decoder, one of the four outputs corresponding to the OP code address will go low; refer to Table IV-7.

TABLE IV-7
OP CODE DECODER LOGIC

| LINE WEA | OP CODE (BN15, 14) | ADDRESS A1 | A0 | OUTPUT Z3 | Z2 | Z1 | Z0 |
|---|---|---|---|---|---|---|---|
| 1 | X | X | X | 1 | 1 | 1 | 1 |
| 0 | DATA SCAN | 0 | 0 | 1 | 1 | 1 | 0 |
| 0 | CONTROL | 0 | 1 | 1 | 1 | 0 | 1 |
| 0 | ALARM LEVEL | 1 | 0 | 1 | 0 | 1 | 1 |
| 0 | EXECUTE | 1 | 1 | 0 | 1 | 1 | 1 |

Where X = don't care condition

The OP code lines, then, are active low and are enabled as follows:

The Data Scan OP Code (line SC) is enabled when SC = BN15 + BN14 + WEA

The Control OP Code (line CN) is enabled when CN = BN15 + BN14 + SHD + WEA. Output Z1 (line CNB) is inverted and NAND gated with SHD line to form the CN line. For CN = 0, the SHD line must be high. SHD (PCR disabled) goes low when the STT is in control (SIC = 0) and the PCR is selected for data (SSS = 0); however, when the STT is selected for data (SSS = 1), line SHD goes high. This action prevents a CN low state (control word enable) for PCR data while the STT is in control and satisfies the philosophy that the PCR control commands are inhibited while the STT is in control.

The Alarm Level Change OP Code (line AL) is enabled when AL = BN15 + BN14 + WEA.

The Control Execute OP Code (line CEX) is enabled when CEX = BN15 + BN14 + CEDR + SHD + WEA. As described for the control OP code above line SHD must be high, otherwise control execute for the PCR is disabled. Line CEDR also must be high, otherwise PCR control execute is disabled. CEDR goes high when there is no bid for alarm level change execute for either the 1st or 2nd received words.

The Alarm Level Change Execute OP Code (line AEX) is enabled when AEX = $\overline{BN15}$ + $\overline{BN14}$ + SIC + CEDR + WEA. When the STT is in control ($\overline{SIC}$ = 1), the AEX line remains high preventing an alarm word execute. However, when the PCR is in control ($\overline{SIC}$ = 0) and line CEDR is low (alarm word execute bid), the AEX line can be enabled.

In addition to the execute OP codes described (CEX and AEX), a common execute confirm line, EX, is used. It is enabled (active low) when EX = $\overline{BN15}$ + $\overline{BN14}$ + WEA and is used to retransmit the acceptance or rejection of either execute commands (CEX or AEX).

Figure 56:
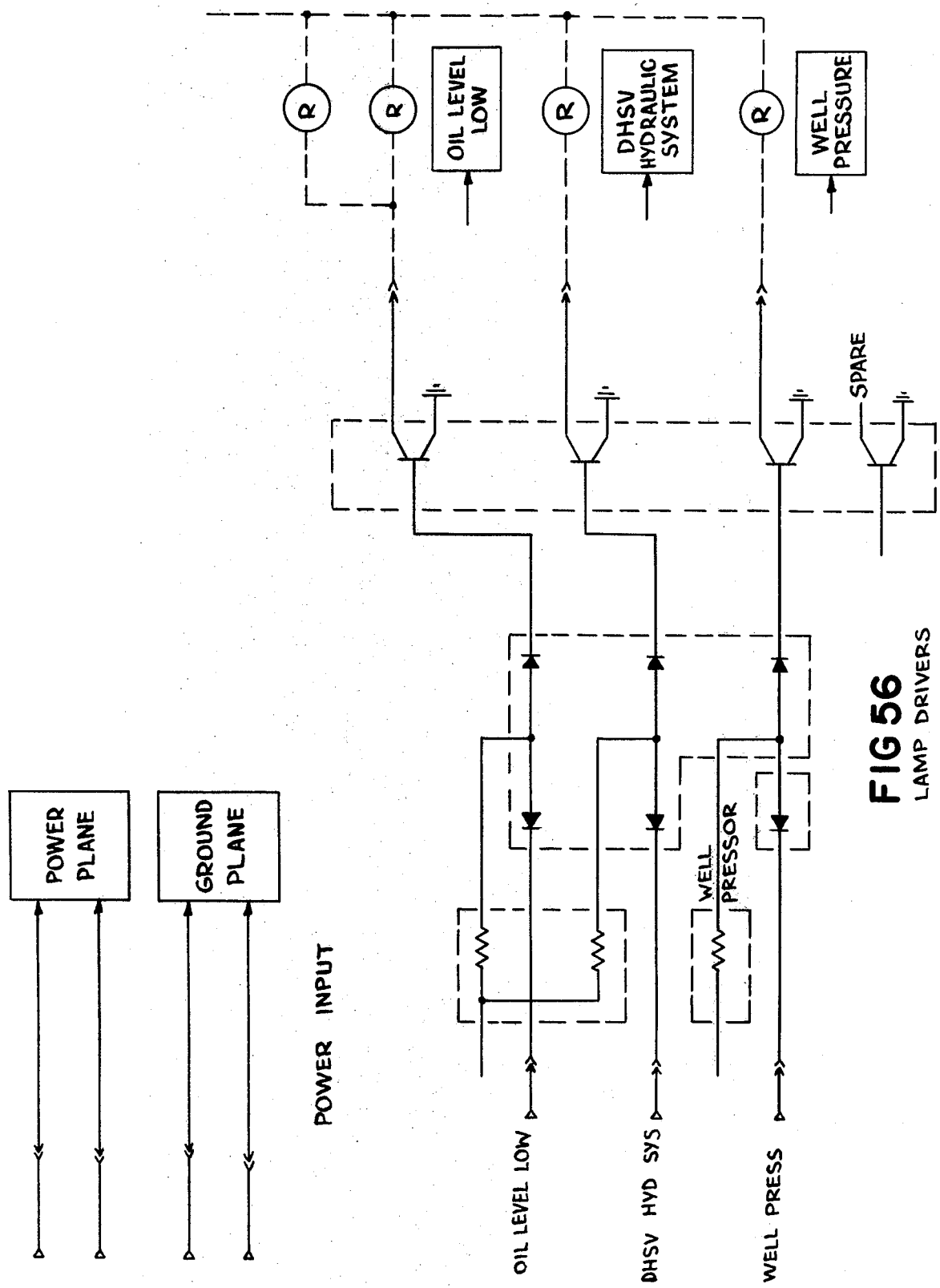
Figure 57:
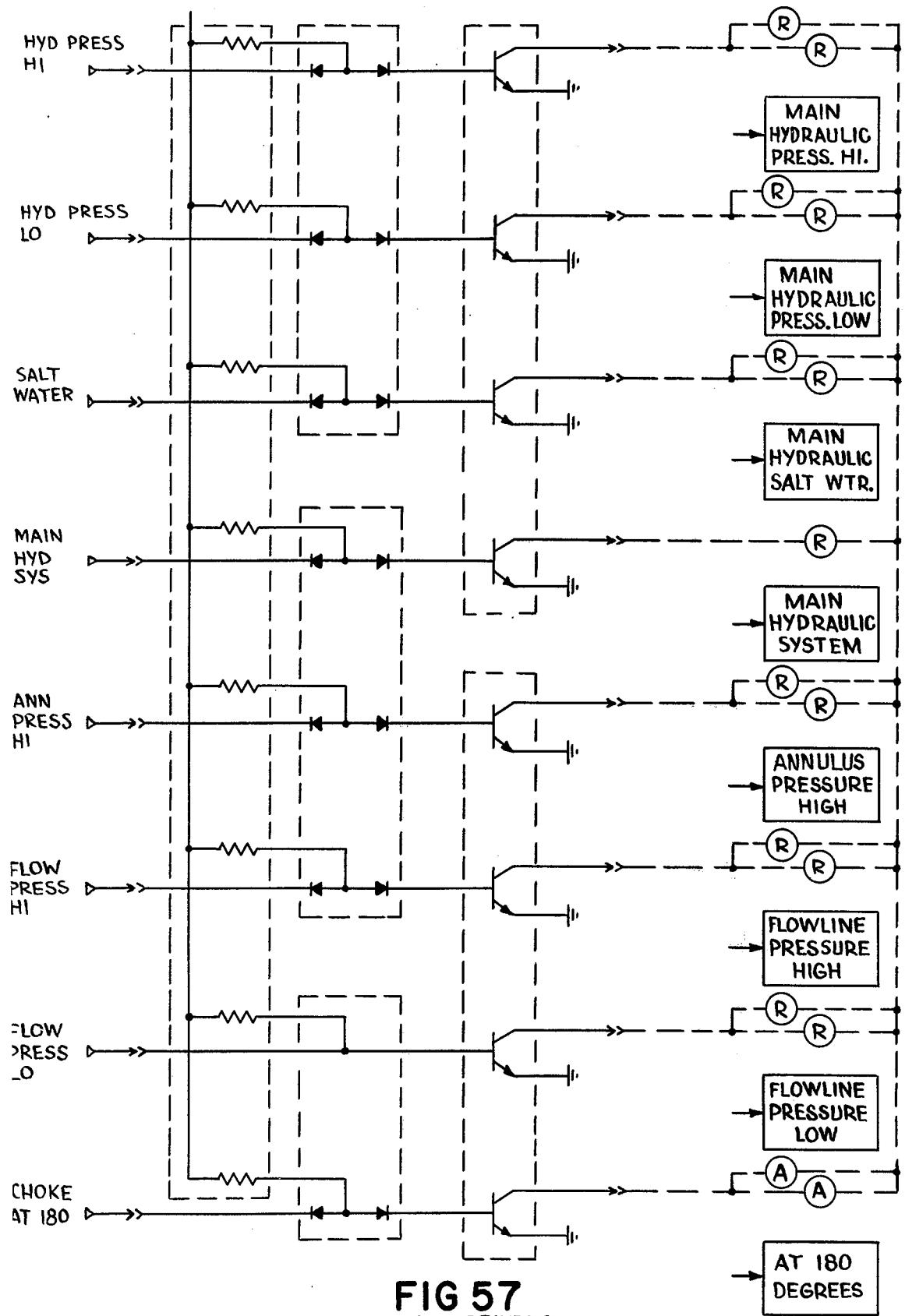
Figure 58:
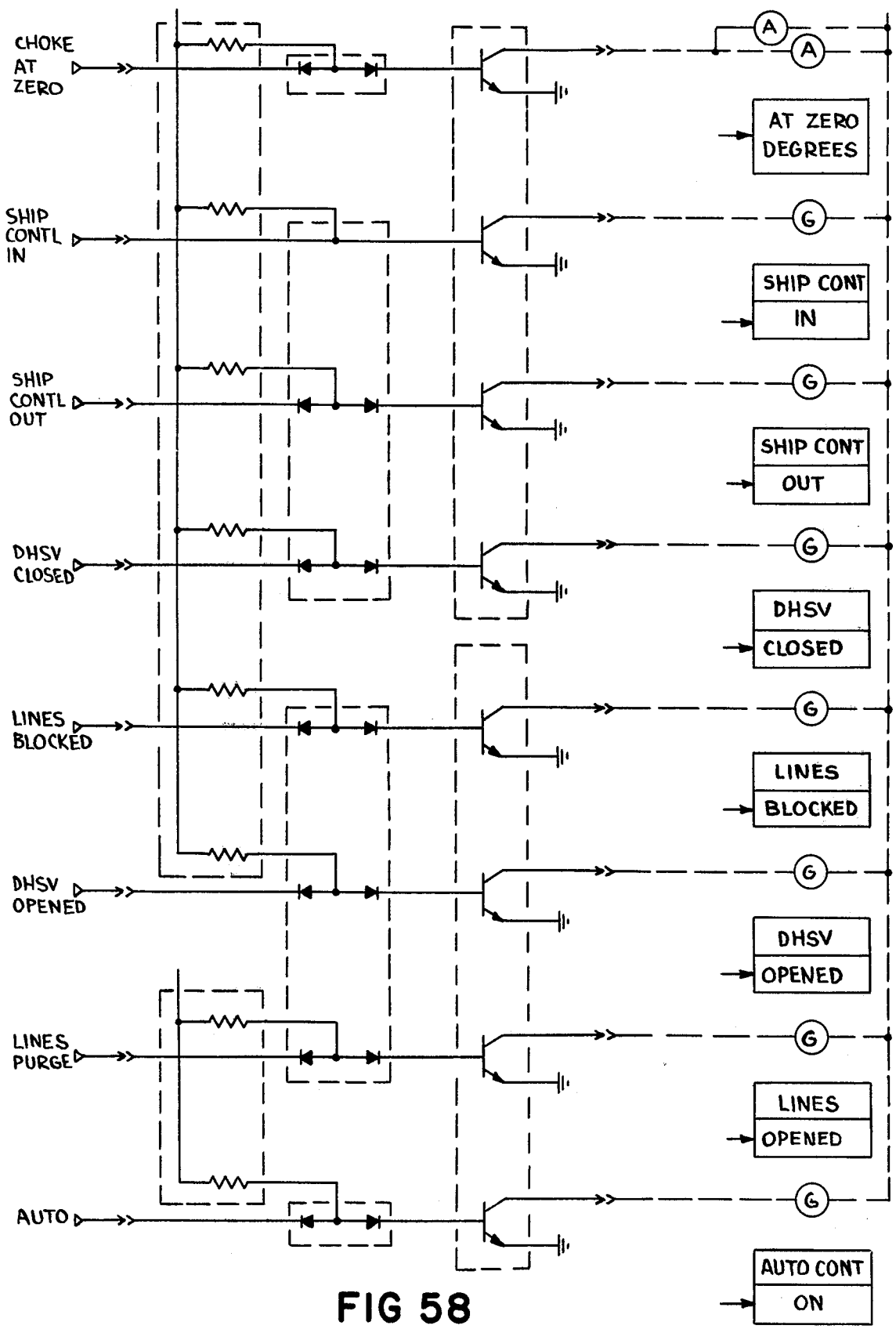
Figure 59:
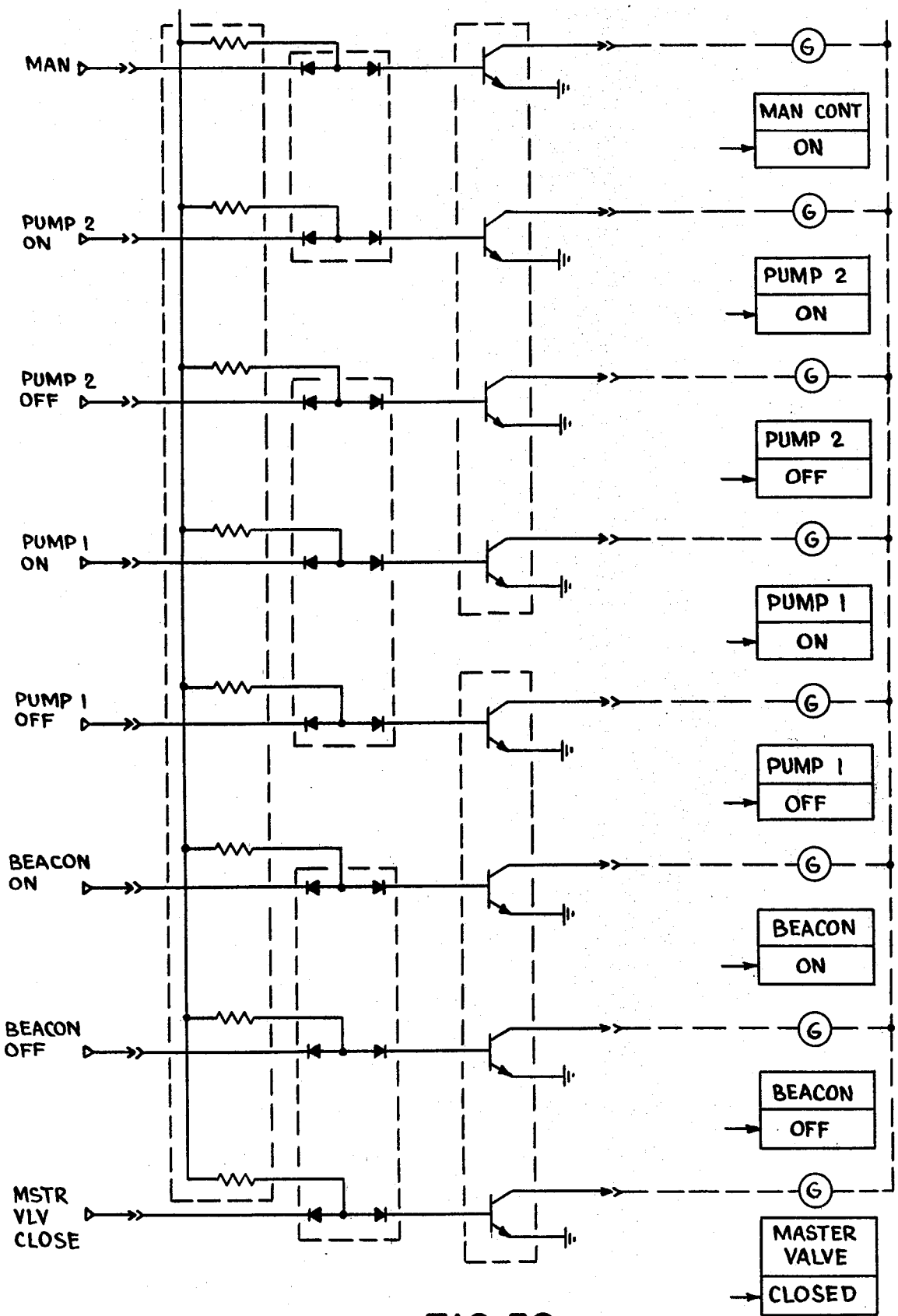
Figure 60:
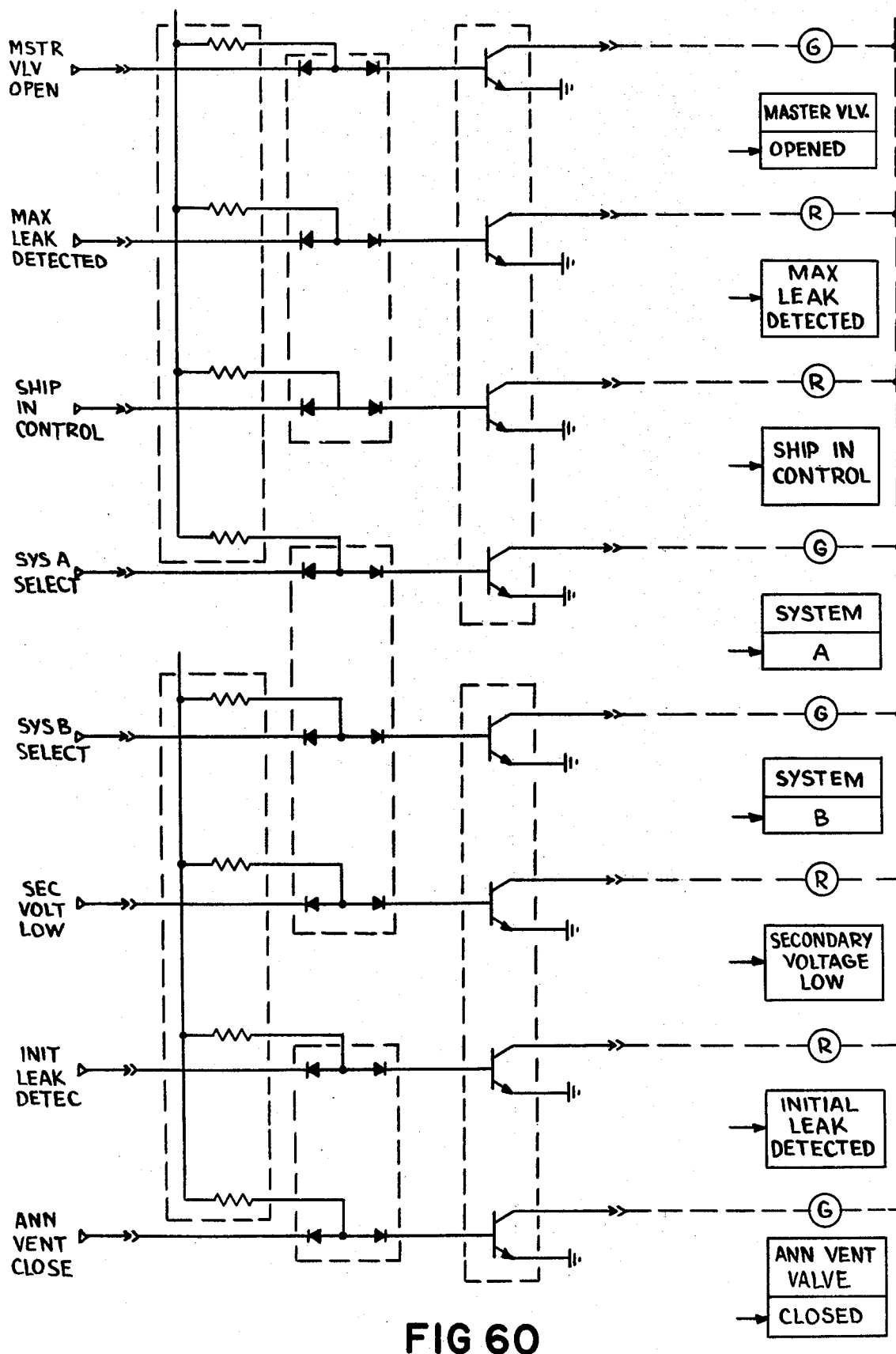
Figure 61:
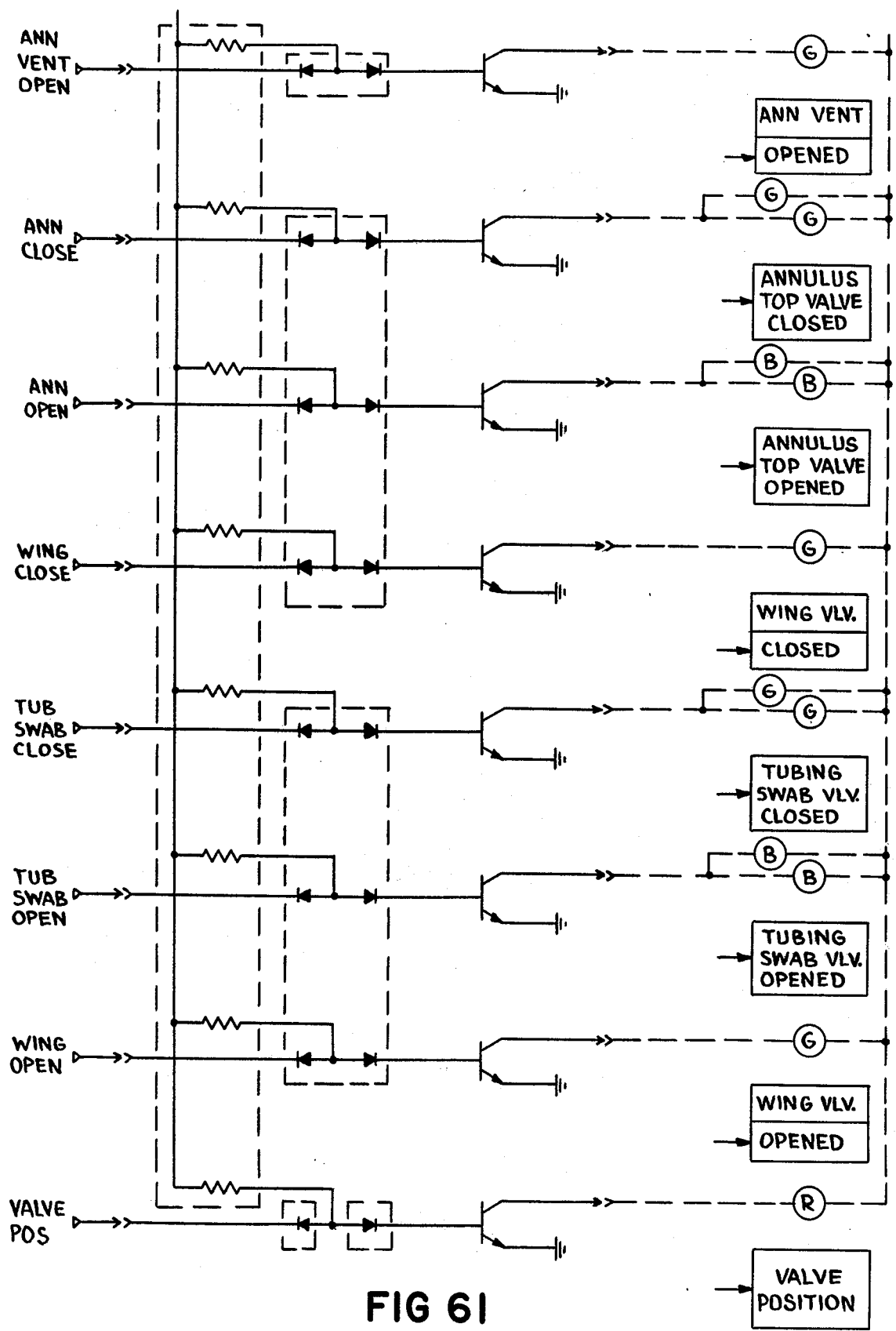
Figure 62:
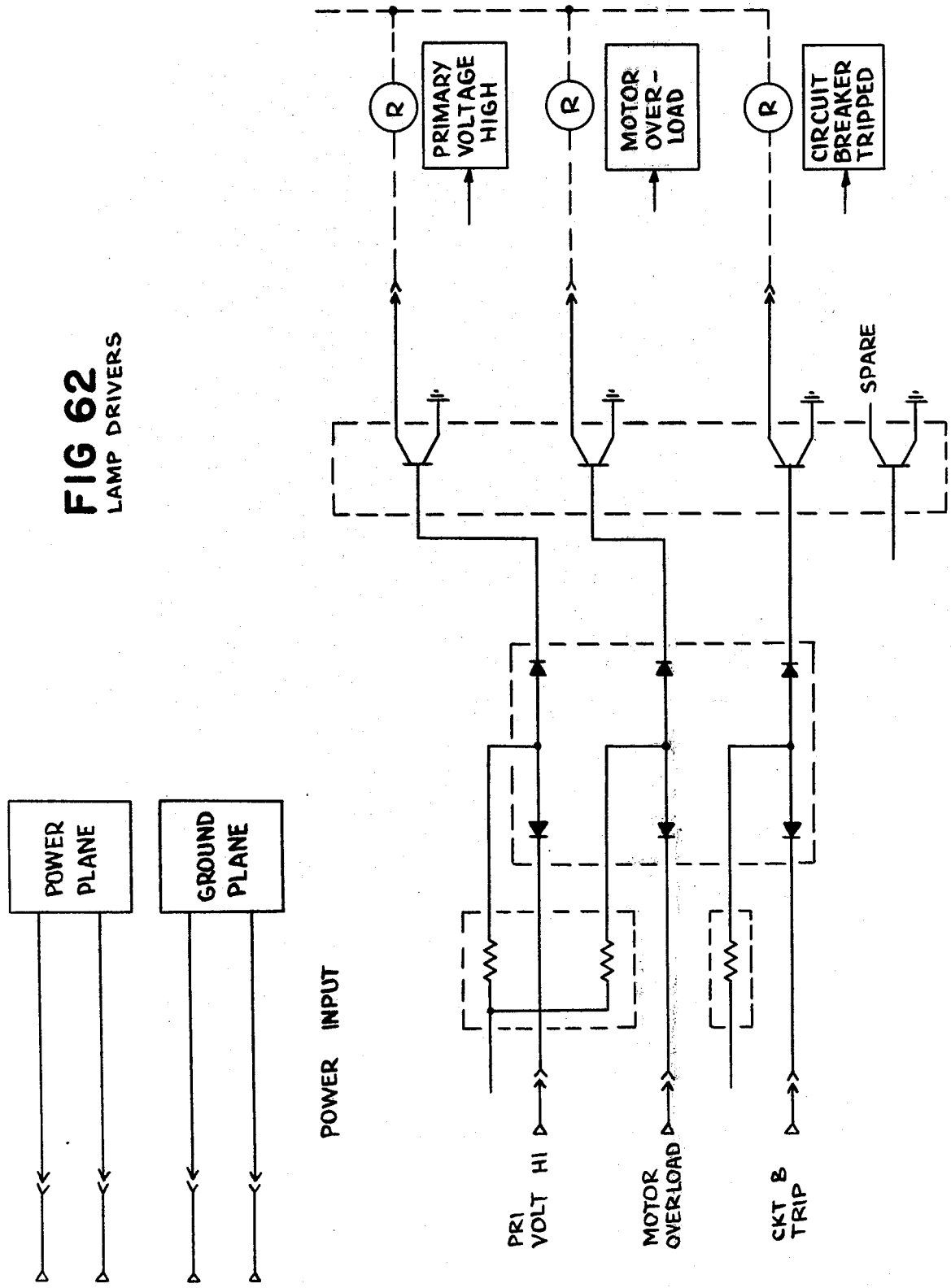
Figure 85:
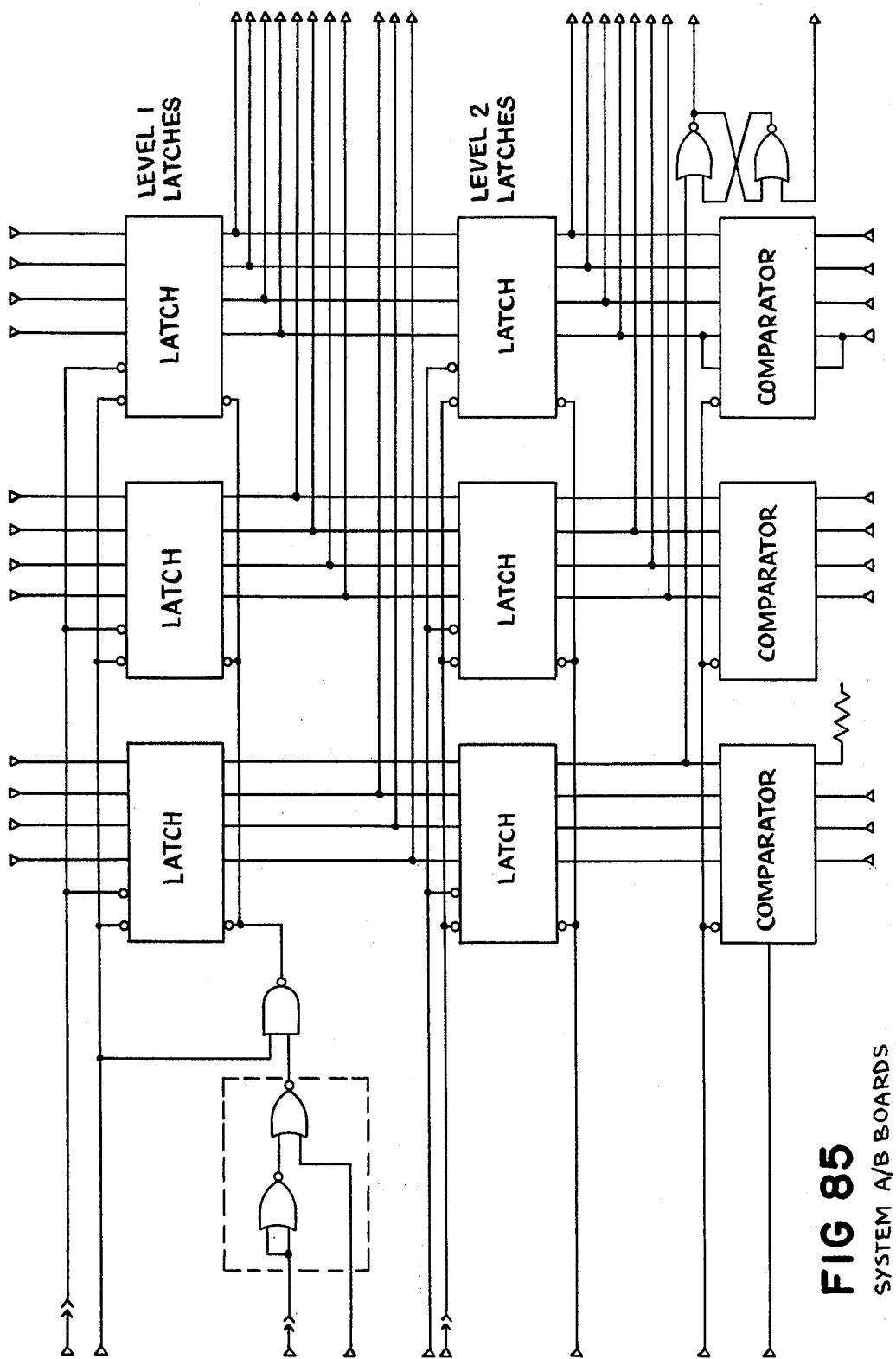
Figure 86:
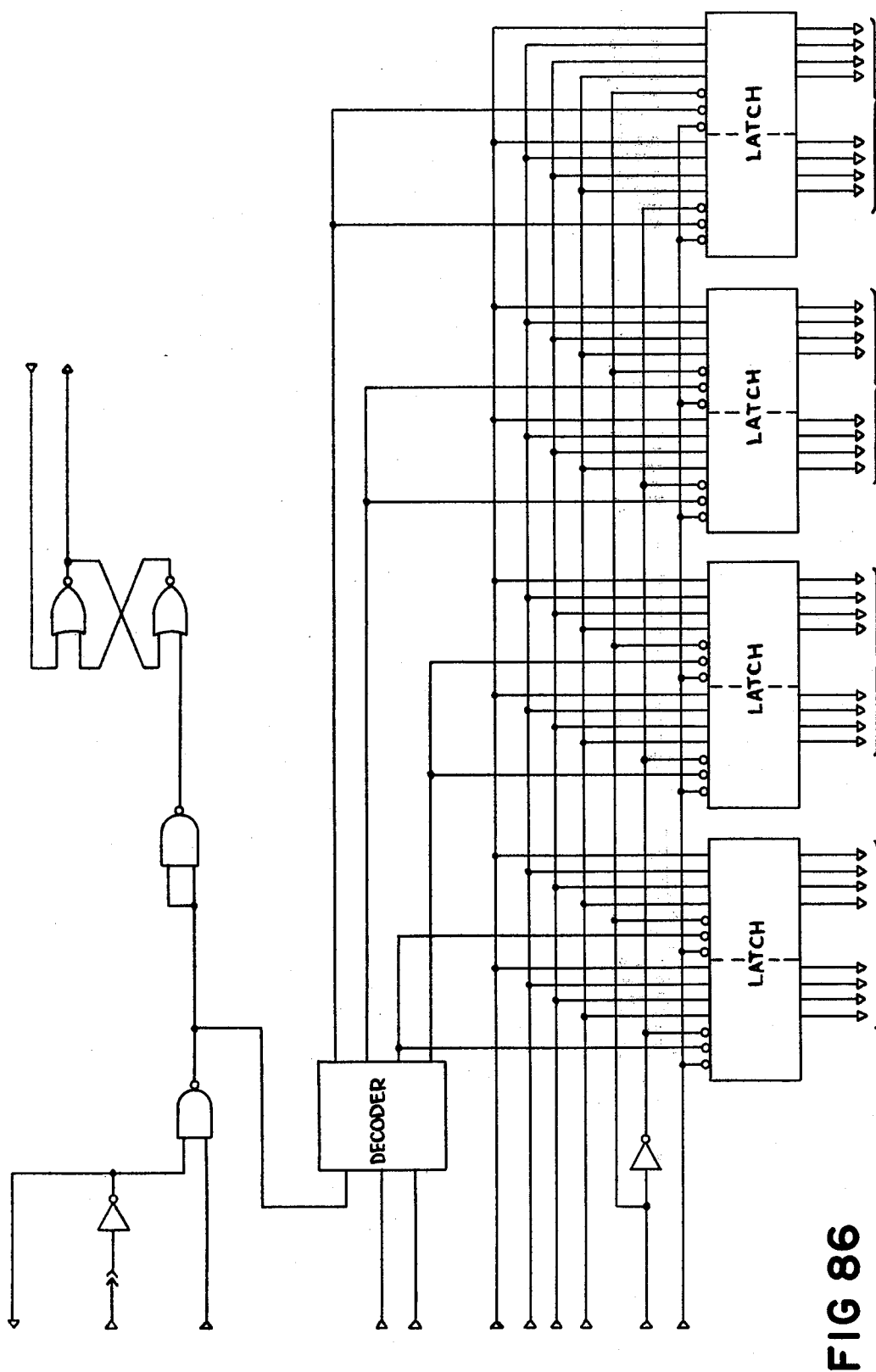
Figure 87:
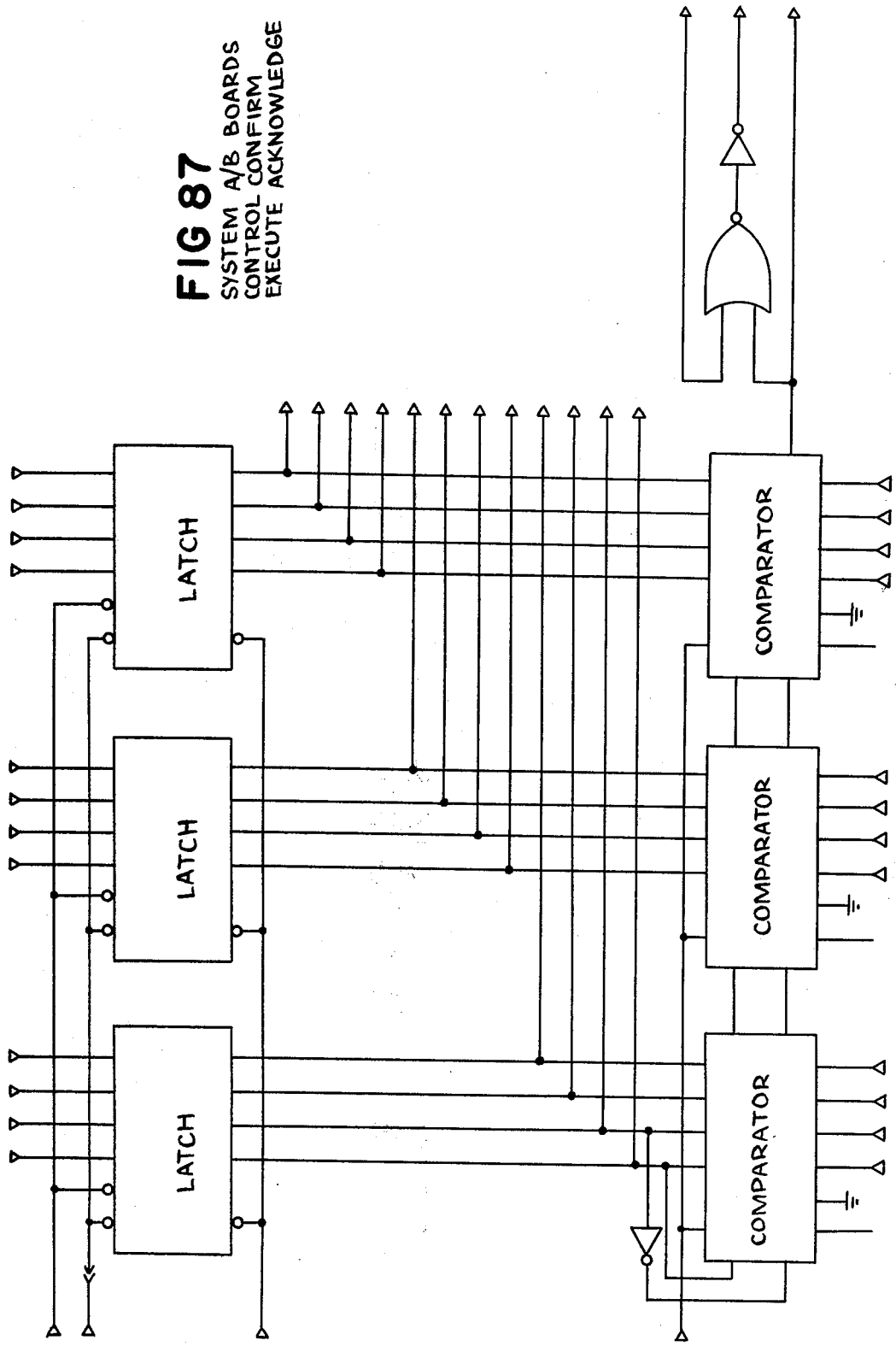
Figure 88:
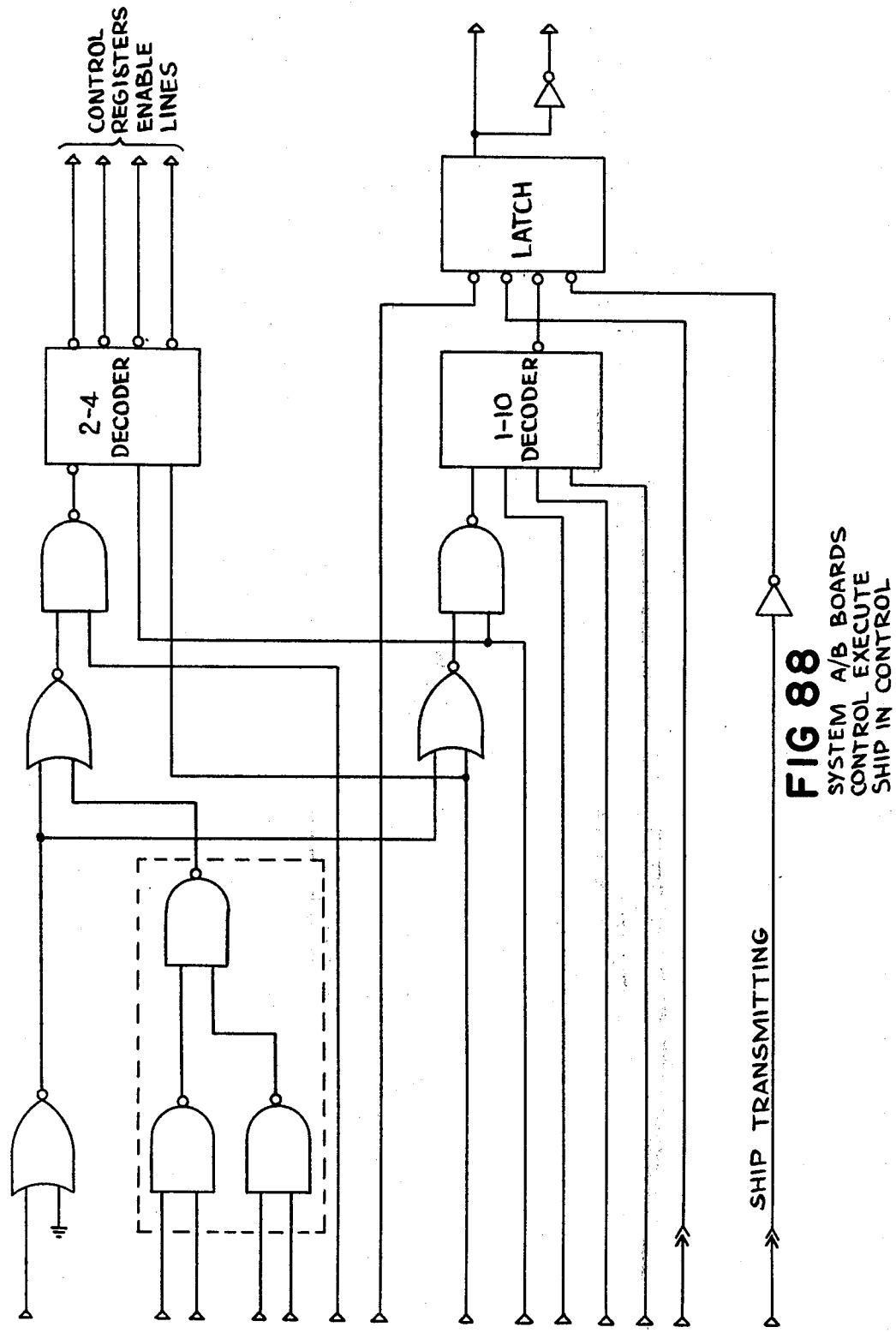

4.7 Alarm Level Change (FIGS. 85, 56 and 94).

The alarm level change circuits are included on both System A and B boards.

When the alarm level word OP code line (AL) goes low, indicating that the data received is an alarm level change word, and during the C6 clock pulses, bits BN00 thru BN06, BN10 thru BN13, and BN15 are loaded into three 4-bit latches. These are identified as the Level 1 Latches.

The 4-bit latch (½ 9308) provides parallel gated data storage. Alarm word data enters (inputs D0, D1, D2 and D3) when both enable inputs, E1 and E2 (A1 and C6) are low. As long as this logic condition exists, the outputs of the latch (Z0, Z1, Z2 and Z3) will follow the inputs. If either of the enable inputs go high, the data present in the latch at the time is held in the latch and is no longer affected by the data input. This latching action takes place at the end of C6 clock pulse.

The master reset input, MR, is an active low and overrides all other input conditions. When activated, it forces the outputs of the latch to to low (latch cleared). If no AL OP code is present (AL = 1) during the C6 clock pulse and if the PCR data has been selected (SSS1 = 0), the NAND gate output goes low clearing the latch. NOTE: The simultaneous occurrence of C6 clock pulse ($\overline{C6}$ = 1) and PCR selected pulse (SSS1 = 0), which resets the latch, can only happen when PCR data selection has been made by the anticoincidence input circuit (para. 4.3) and its output, Data Ready, increments the clock circuit (para. 4.4).

The data stored in the Level 1 latches, is routed to the Level 2 latches and to the output multiplexer (lines SAW00 thru SAW06 and SAW10 thru 13). The stored Level 1 latch data is then transmitted back to the PCR station for confirmation so that an alarm level change execute word can be transmitted subsea (refer to para. 4.17 for output multiplexer operation).

The same discussion for the C6 and SSS1 pulses applies to the simultaneous occurrence of C5 clock pulse (C5 = 0) and SSS1 = 0. With line SSS1 = 0 and during the C5 clock pulse, a second set of three 4-bit latches are loaded with the stored data from the Level 1 latches. These sets of latches are identified as the Level 2 latches. Their outputs are routed to a comparator circuit and to the alarm level selector circuit (sheet 14) where the data is held until proper comparison and alarm word execute is enabled (AEX = 0).

The comparator circuit consists of three 5-bit comparators (93L24) which provide comparison between two 5-bit words and gives three outputs, "less than" (A<B), "greater than" (A>B), and "equal to" (A = B). In this circuit, the two words compared are the stored alarm level change word in the Level 2 latches (A inputs) and the alarm level execute word transmitted by the PCR (B inputs). Since 11-bits of each word are compared, three comparators are required. They are wired in series by connecting the A>B and A<B outputs to the A0 and B0 inputs respectively of the next stage. In the last stage, inputs A0 to A1 and B0 to B1, are connected because of the 4-bit input. The bits not compared are bits-7 thru 9 (don't care) and bits-15 and 14 (OP code). Since bit-15 of the alarm level change word is carried thru the Level 2 latch (line CED) and is high for an alarm level OP code, input B4 of the first-stage comparator is permanently wired high for proper comparison.

The comparators are enabled when the alarm execute line goes low (AEX = 0, refer to para. 4.6). If bit-for-bit comparison is proper, A = B output of the first stage goes high (EQU = 1). This signal is NAND gated with the C4 clock pulse ($\overline{C4}$ = 1) to generate the enable pulse (DE = 0) for a one-of-four decoder. The enable pulse is also used to generate an alarm execute confirm signal (AEQ = 1) which is enabled during the data ready pulse (DR = 0). This signal in turn sets line EXC high (FIG. 87) which is transmitted to the PCR station to signal that the execute was accepted.

The one of four decoder (½ 93L21) is addressed by bits-5 and 6 of the compared word and when enabled (DE = 0, active low), selects (partially enables) two of eight 4-bit latches (½ 93L08) whose outputs are connected to four corresponding 8-bit D/A converters FIG. 94 refer to para. 4.20). Table IV-8 shows the decoder address and latch select assignments.

TABLE IV-8
ALARM LEVEL DECODER/SELECTOR ASSIGNMENTS

| ALARM LEVEL SET FUNCTION | DECODER ENABLE (DE) E | DECODER ADDRESS (BIT 6) A1 | DECODER ADDRESS (BIT 5) A0 | OUTPUT Z3 | OUTPUT Z2 | OUTPUT Z1 | OUTPUT Z0 | LATCH SELECT LSD | LATCH SELECT MSD |
|---|---|---|---|---|---|---|---|---|---|
| NONE | 1 | X | X | 1 | 1 | 1 | 1 | — | — |
| Flowline Pressure Low Alarm Set | 0 | 0 | 0 | 1 | 1 | 1 | 0 | A1 | A2 |
| Flowline Pressure High Alarm Set | 0 | 0 | 1 | 1 | 1 | 0 | 1 | B1 | B2 |
| Sec. Voltage Low Alarm Set | 0 | 1 | 0 | 1 | 0 | 1 | 1 | D1 | D2 |
| Prim. Voltage Low Alarm Set | 0 | 1 | 1 | 0 | 1 | 1 | 1 | C1 | C2 |

The final four sets of dual latches, then, store the 2-BCD data required to set the alarm level D/A converters. This data (Level 2 latch outputs) is bits-0 thru 3 of the compared word. As previously discussed, partial enabling (active low) occurs when the decoder selects which latch is to be used, that is, which alarm level is to be changed. Complete enabling of the selected latch is controlled by the AW04 data line which is bit-4 of the compared word. Bit-4 identifies the 1-BCD data to be the LSD (least significant digit) or the MSD (most significant digit) of the alarm level % value as set on the PCR console. AW4 = 0 for the LSD and AW4 = 1 for the MSD. Therefore, when completely enabled, the selected latch transfers its 8-bits of 2-BCD information (lines VALXX) to its corresponding alarm level D/A converter (FIG. 94, refer to para. 4.20).

The total actions described occur twice since two alarm level change words are transmitted in succession by the PCR to set the selected alarm level. The first word sent sets the LSD and the second the MSD. Therefore for each alarm level change word received (DR = 1) the Level 1 and Level 2 latches are loaded and the data is retransmitted to the PCR for confirmation and execute. The corresponding execute word, when received, is compared with the stored word (Level 2 latches) and if proper the select circuit is enabled directing the alarm level change data to the appropriate D/A converter (refer to para. 4.20). At the end of the second alarm level change word and the occurrence of another word with a different OP code the Level 1 latches are reset and the Level 2 latches are loaded with zeroes. To assure that the two words can be received in succession (two word frames) and subsequently executed, Bit-15 of each word is carried thru (line CED) to indicate that an alarm execute is pending (CED = 1). This line is directed to a NOR circuit 1 which is toggled by a $\overline{DR}$ pulse. When CED = 1, output line CEDR goes low disabling the control word execute circuit. At the end of the data ready pulse ($\overline{DR}$ = 1) after the second alarm word has been processed (CED = 0), the circuit toggles setting CEDR line high.

This allows the control word execute circuit to function.

Figure 97:
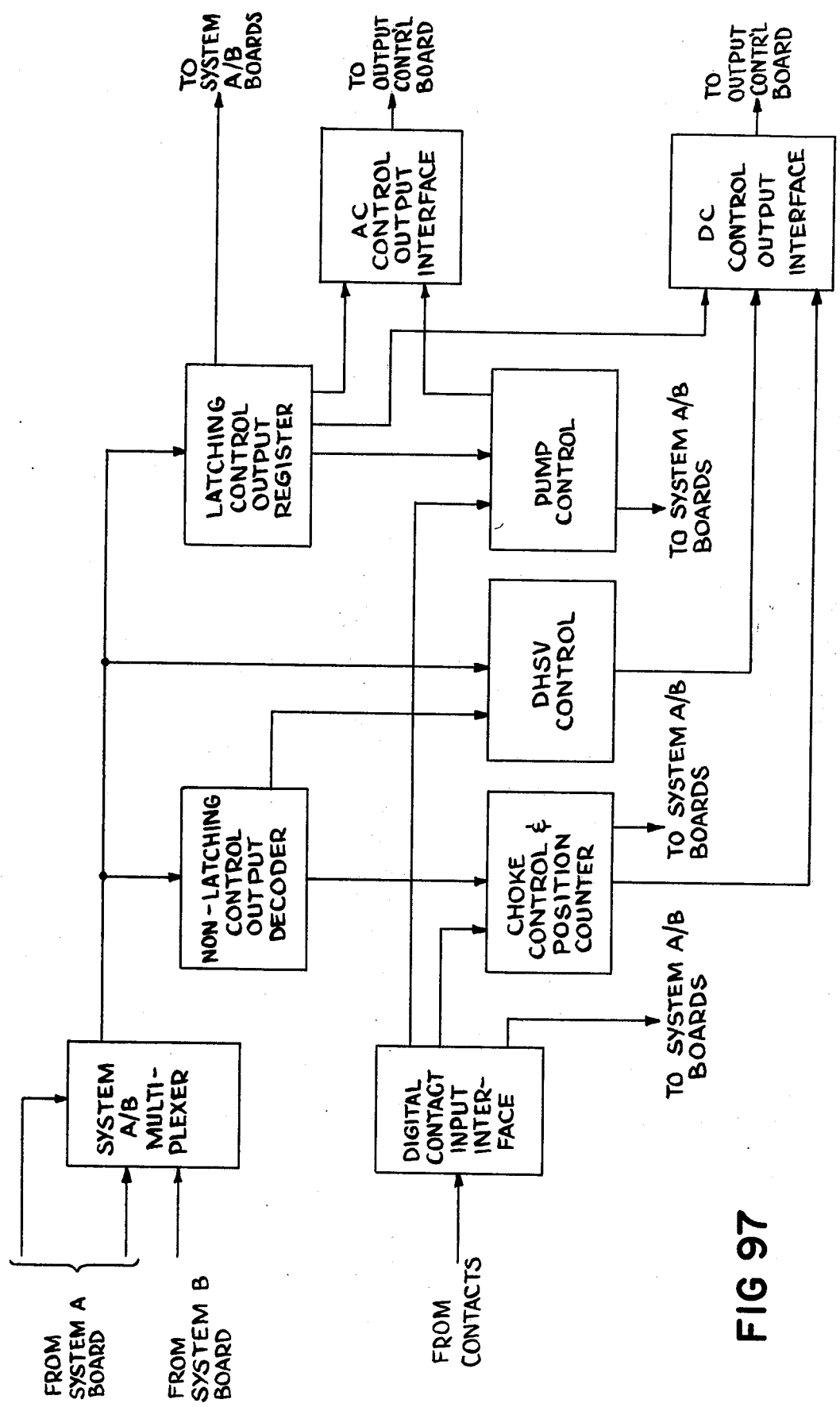
Figure 98:
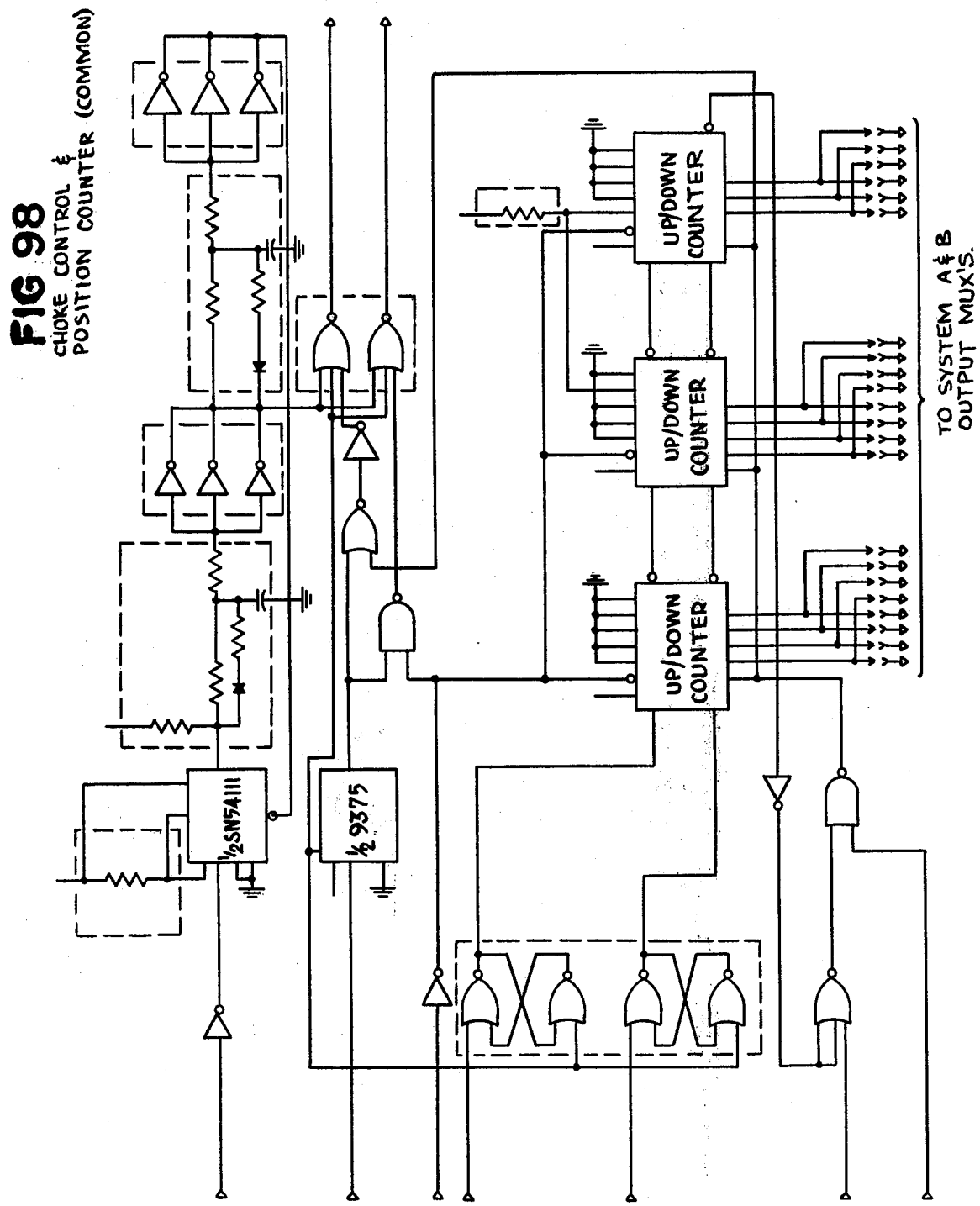

4.8 Control Word Execute (FIG. 97)

The control word execute circuits are included on both System A and B boards. The storage and comparison portion of the circuit operates in a similar manner as described for alarm level set (para. 4.7). One set of latches, however, are used since only one word is used for a command function.

When a control word OP code has been decoded (CN = 0) and during C6 clock pulse, bits-0, 1, and 4 thru 13 of the received word are stored in three 4-bit latches (½ 9308). These bits, now identified as SCW00, SCW01 and SCW04 thru SCW13, are then retransmitted to the PCR or STT for confirmation and subsequent execute command. When the execute command is received, line CEX goes low, and the execute word is compared bit-by-bit with the stored word (93L24 comparators). If proper comparison is made, line CEQU (A = B) goes high setting line EXC high which transmitted back to the PCR or STT to indicate that execute has been confirmed.

Figure 101:
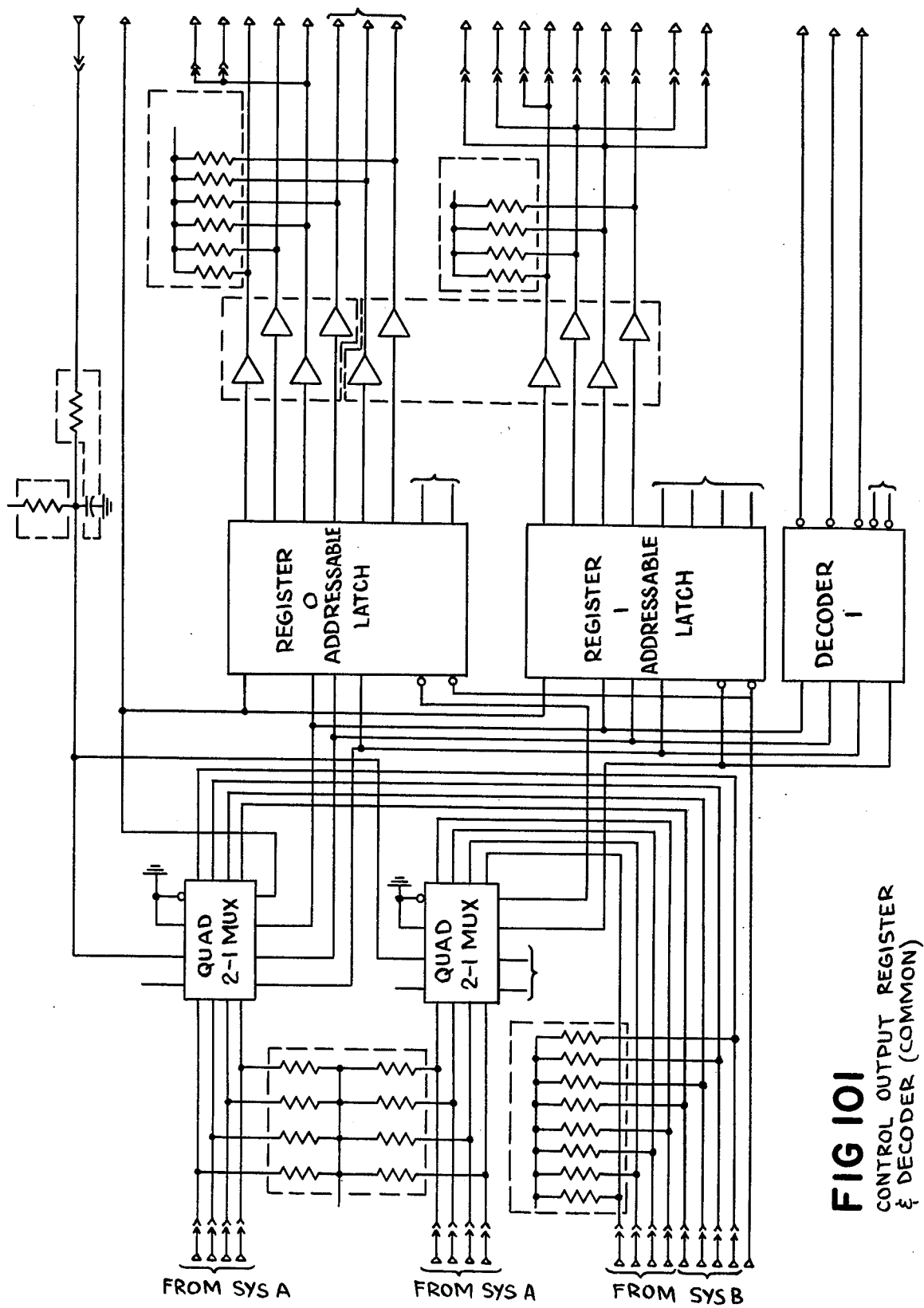

Line CEQU is also gated with the C4 clock pulse which when CEQU = 1 and $\overline{C4}$ = 1 enables a one of four decoder. Lines $\overline{S1C}$, $\overline{SSS}$, S1C and SS1 are also gated in this circuit to allow enabling for when either the PCR or STT is in control. The decoder is addressed by bits-7 and 8 of the compared word and when decoded selects (enables) one of two addressable control registers (9334) thru a quad 2-input multiplexer (9322). Refer to FIG. 101 and para. 4.9 for circuit operation. The outputs of the decoder are capable of selecting one of four registers, however, only two registers are required to satisfy the system's control functions. Table IV-9 shows the decoder address assignments (refer to Table III-1 in Section III for control word number and address assignments).

CEQU = 1 pulse (indicating confirmation of received execute word) enables the decoder at input A3.

When decoder output Z7 goes low and during a C4 clock pulse a 4-bit latch (½ 9308) is enabled. Data into the latch is received at input D0, which is data line SCW00. For a "Ship Control In" command, SCW00 = 1 and for an "Out" command SCW00 = 0. Therefore when SCW00 = 1 and the latch is enabled, output line Z0 goes high indicating that the ship (STT) is in control ($\overline{S1C}$ = 1). $\overline{S1C}$ will go low when SCW00 = 0 indicating ship (STT) is out of control or when the latch is reset. The latch is reset (output goes low) when ship transmitting line CP goes high indicating that either power at the STT has been turned off or the carrier signal has been lost.

4.9 Control Word Output Register and Decoder

The control word output register and decoder circuits are located on the Common Logic board and are common to both System A and B logic circuits.

Confirmed word data lines SCW00 and SCW04 thru SCW06, from both System A and System B boards, are routed to a Quad-2 Input Multiplexer (9322). In the same manner, System A and B output register select lines ECR0 thru ECR3 are routed to another multiplexer.

The 9322 multiplexer consists of four 2-input multiplexers with common input select logic (S), common active low enable (E) and active high outputs (ZA thru ZD). It allows four bits of data to be switched in parallel to the corresponding outputs from four 2-bit data sources.

In this circuit the multiplexers are permanently enabled by the grounding of their E input. System A data is routed to inputs A0 thru D0 and System B data to inputs A1 thru D1. Selection of System A or B data is controlled by S input line SYSB. When SYSB = 1, indicating System B has been selected, inputs A1 thru

TABLE IV-9

| CONTROL WORD NO. (TABLE III-1) SEC. III | CONTROL WORD DECODER/REGISTER ADDRESS ||||||| |
|---|---|---|---|---|---|---|---|---|
| | DECODER |||||| CONTROL REGISTER ENABLE ||
| | ADDRESS || | OUTPUT |||| |
| | (A1) SCW08 | (A0) SCW07 | E | (Z3) ECR3 | (Z2) ECR2 | (Z1) ECR1 | (Z0) ECR0 | #1 | #2 |
| None | X | X | 1 | 1 | 1 | 1 | 1 | — | — |
| 0 thru 6 | 0 | 0 | 0 | 1 | 1 | 1 | 0 | YES | NO |
| 8 thru 11 | 0 | 1 | 0 | 1 | 1 | 0 | 1 | NO | YES |
| | 1 | 0 | 0 | 1 | 0 | 1 | 1 | } NOT USED, never addressed ||
| | 1 | 1 | 0 | 0 | 1 | 1 | 1 | ||

As indicated in Table IV-9, control words 7 and 12 thru 15 are not processed in the same manner as the others. These commands, namely "Step Choke Forward/Backward", "Open/Close DHSV", "Block-/Purge DHSV Lines (STT control only)" and "Ship Control In/Out" require special handling and cannot be addressed through the control registers. For these commands, a one-of-ten decoder, with active low outputs, is used (9301) which is wired as a one-of-eight decoder by having its A3 input act as the active low enable. With exception of "Ship Control In/Out" command, refer to para. 4.9 for circuit operation.

For either a Ship Control In or Out command by the STT station, data bits SCW04 thru SCW07 = 1 and bit SCW08 = 0. Lines SCW04 thru SCW06 address the 9301 decoder, and when the decoder is enabled, output Z7 goes low (active low). Enabling is controlled by the gating of data lines SCW07 and SCW08, and the CEQU line. With SCW07 = 1 and SCW08 = 0, receipt of a D1 are selected. When SYSB = 0, inputs A0 thru D0 are selected. Since the multiplexer input lines from the System A and B boards are of some length pull-up resistors are used at the multiplexer inputs to guarantee proper logical 1 and 0 states and d-c noise margin.

The output of multiplexer No. 1, lines MSCW0 and MSCW4 thru MSCW6, contain the data present on lines SCW00 and SCW04 thru SCW06 respectively. Lines MSCW4 thru MSCW6 serve as the address lines for the two control output registers and single 9301 decoder (inputs A0 thru A2). These lines represent address bits-4, 5 and 6 of the received control word. Line MSCW0 serves as the D input to the registers and represents control action bit-0 of the received control word (on/off, open/close, etc.).

The output of multiplexer No. 2, lines MECR0 and MECR1, correspond to the information contained in select lines ECR0 and ECR1 respectively. Since only two control output registers have to be selected (refer to Table IV-9), inputs ECR2 and ECR3, and outputs ZA and ZB are not used. When MECR0 = 0, register No. 1 is enabled (selected). When MECR1 = 0, register No. 2 is enabled (selected).

The control output register is an 8-bit addressable latch which stores single line data in the addressed latch. It has an active low enable and a common clear. When enabled, one of eight outputs is selected according to the input address with the remaining non-addressed outputs remaining in their previous state. The logic state of the addressed output will follow the state of the D input. When the enable pulse is removed, the device transfers to the memory mode where all outputs remain in their previous state and are unaffected by the inputs. Upon system clear signal (CLR0 = 0), all outputs to a logical zero state which is a fail-safe control condition (open, off, etc.). Refer to para. 4.21 for system clear operation and to Table IV-10 for the register addressed control functions. The outputs of the registers are inverted to form lines CL00 thru CL05 and CL08 thru CL11. They are directed to their respective control output interface circuits.

Lines MSCW4 thru MSCW6 also address a 9301 Decoder. MSCW4 thru MSCW6 are the address inputs (A0 thru A2) and MECR1 is the enable (A3). The decoder is used for commands "Step Choke Forward/Backward", "Open/Close DHSV", and "Block/Purge DHSV Lines (STT control only)" which are not addressed through the control registers. When approximately addressed and enabled, the corresponding output (Z4 through Z6) will go low and are routed to their special control circuits. Refer to Table IV-11 for decoder address functions.

TABLE IV-10
CONTROL REGISTER ADDRESS FUNCTIONS

| CONTROL WORD | CONTROL FUNCTION | ADDRESS MSCW6 (A2) | MSCW5 (A1) | MSCW4 (A0) | CONTROL DATA MSEW0 (D) | ENABLE (E) MECR1 | MECR0 | REG. NO. | SELECTED OUTPUT Z0 | Z1 | Z2 | Z3 | Z4 | Z5 | Z6 | Z7 | LINE | REMARKS |
|---|---|---|---|---|---|---|---|---|---|---|---|---|---|---|---|---|---|---|
| φ | (NONE) | X | X | X | X | 1 | 1 | No. 1 | M | M | M | M | M | M | M | M | ALL | MEMORY MODE |
| φ | CIRCUIT BREAKER NO. 1 - OPEN | 0 | 0 | 0 | 0 | 1 | 0 | ↓ | 0 | | | | | | | | CL00 | |
| 1 | CIRCUIT BREAKER NO. 1 - CLOSE | 0 | 0 | 0 | 1 | 1 | 0 | ↓ | 1 | | | | | | | | CL00 | |
| 1 | CIRCUIT BREAKER NO. 2 - OPEN | 0 | 0 | 1 | 0 | 1 | 0 | ↓ | | 0 | | | | | | | CL01 | |
| 2 | CIRCUIT BREAKER NO. 2 - CLOSE | 0 | 0 | 1 | 1 | 1 | 0 | ↓ | | 1 | | | | | | | CL01 | |
| 2 | ACOUSTIC BEACON - OFF | 0 | 1 | 0 | 0 | 1 | 0 | ↓ | | | 0 | | | | | | CL02 | ADDRESSABLE |
| 3 | ACOUSTIC BEACON - ON | 0 | 1 | 0 | 1 | 1 | 0 | ↓ | | | 1 | | | | | | CL02 | |
| 3 | HYDRAULIC PUMP NO. 1 - OFF | 0 | 1 | 1 | 0 | 1 | 0 | ↓ | | | | 0 | | | | | CL03 | |
| 4 | HYDRAULIC PUMP NO. 1 - ON | 0 | 1 | 1 | 1 | 1 | 0 | ↓ | | | | 1 | | | | | CL03 | |
| 4 | HYDRAULIC PUMP NO. 2 - OFF | 1 | 0 | 0 | 0 | 1 | 0 | ↓ | | | | | 0 | | | | CL04 | |
| 5 | HYDRAULIC PUMP NO. 2 - ON | 1 | 0 | 0 | 1 | 1 | 0 | ↓ | | | | | 1 | | | | CL04 | |
| 5 | Pump CONTROL - MANUAL | 1 | 0 | 1 | 0 | 1 | 0 | ↓ | | | | | | 0 | | | CL05 | |
| 6 | Pump CONTROL - AUTO | 1 | 0 | 1 | 1 | 1 | 0 | ↓ | | | | | | 1 | | | CL05 | |
| 6 | (SPARE) | 1 | 1 | 0 | 0 | 1 | 0 | ↓ | | | | | | | 0 | | CL06 | NOT CONNECTED |
| 7 | (SPARE) | 1 | 1 | 0 | 1 | 1 | 0 | ↓ | | | | | | | 1 | | CL06 | |
| 7 | SYSTEM A - ACTIVE | 1 | 1 | 1 | 0 | 1 | 0 | ↓ | | | | | | | | 0 | CL07 | |
| 7 | SYSTEM B - ACTIVE | 1 | 1 | 1 | 1 | 1 | 0 | No. 1 | | | | | | | | 1 | CL07 | |
| 8 | ANALOG CHECK - ZERO | 0 | 0 | 0 | 0 | 0 | 1 | No. 2 | 0 | | | | | | | | CL08 | |
| 8 | ANALOG CHECK - GAIN | 0 | 0 | 0 | 1 | 0 | 1 | ↓ | 1 | | | | | | | | CL08 | |
| 9 | ANNULUS VENT VALVE - CLOSE | 0 | 0 | 1 | 0 | 0 | 1 | ↓ | | 0 | | | | | | | CL09 | |
| 9 | ANNULUS VENT VALVE - OPEN | 0 | 0 | 1 | 1 | 0 | 1 | ↓ | | 1 | | | | | | | CL09 | |
| 10 | MASTER VALVE - CLOSE | 0 | 1 | 0 | 0 | 0 | 1 | ↓ | | | 0 | | | | | | CL10 | ADDRESSABLE |
| 10 | MASTER VALVE - OPEN | 0 | 1 | 0 | 1 | 0 | 1 | ↓ | | | 1 | | | | | | CL10 | |
| 11 | WING VALVE - CLOSE | 0 | 1 | 1 | 0 | 0 | 1 | ↓ | | | | 0 | | | | | CL11 | |
| 11 | WING VALVE - OPEN | 0 | 1 | 1 | 1 | 0 | 1 | ↓ | | | | 1 | | | | | CL11 | |
| 12 | STEP CHOKE - FORWARD | 1 | 0 | 0 | 0 | 0 | 1 | ↓ | | | | | 0 | | | | — | |
| 12 | STEP CHOKE - BACKWARD | 1 | 0 | 0 | 1 | 0 | 1 | ↓ | | | | | 1 | | | | — | |
| 13 | DHSV - CLOSE | 1 | 0 | 1 | 0 | 0 | 1 | ↓ | | | | | | 0 | | | — | NOT CONNECTED |
| 13 | DHSV - OPEN | 1 | 0 | 1 | 1 | 0 | 1 | ↓ | | | | | | 1 | | | — | SEE TABLE IV-11 |
| 14 | LINES - BLOCK (STT ONLY) | 1 | 1 | 0 | 0 | 0 | 1 | ↓ | | | | | | | 0 | | — | |
| 14 | LINES - CLOSE (SIT ONLY) | 1 | 1 | 0 | 1 | 0 | 1 | ↓ | | | | | | | 1 | | — | |
| 15 | SHIP CONTROL - OUT | 1 | 1 | 1 | 0 | 0 | 1 | ↓ | | | | | | | | 0 | — | |
| 15 | SHIP CONTROL - IN | 1 | 1 | 1 | 1 | 0 | 1 | ↓ | | | | | | | | 1 | — | |

X = DON'T CARE

TABLE IV-11

| CONTROL WORD | CONTROL FUNCTION | CONTROL DECODER ADDRESS FUNCTIONS ADDRESS | | | ENABLE MECR1 (A3) | ONE OF EIGHT SELECTED OUTPUT (ACTIVE LOW) | | | | | | | | | LINE | REMARKS |
|---|---|---|---|---|---|---|---|---|---|---|---|---|---|---|---|---|
| | | MSCW6 (A2) | MSCW5 (A1) | MSCW4 (A0) | | Z9 | Z8 | Z7 | Z6 | Z5 | Z4 | Z3 | Z2 | Z1 | Z0 | |
| 0 THRU 7 | CONTROL WORDS 0 THRU 7, TABLE IV-10 | X | X | X | 1 | 1 | 1 | 1 | 1 | 1 | 1 | 1 | 1 | 1 | 0 | — | DISABLED |
| 8 | ANALOG CHECK - ZERO/GAIN | 0 | 0 | 0 | 0 | 1 | 1 | 1 | 1 | 1 | 1 | 1 | 1 | 0 | 1 | — | |
| 9 | ANNULUS VENT VALVE - OPEN/CLOSE | 0 | 0 | 1 | 0 | 1 | 1 | 1 | 1 | 1 | 1 | 1 | 0 | 1 | 1 | — | NOT CONNECTED |
| 10 | MASTER VALVE - OPEN/CLOSE | 0 | 1 | 0 | 0 | 1 | 1 | 1 | 1 | 1 | 1 | 0 | 1 | 1 | 1 | — | |
| 11 | WING VALVE - OPEN/CLOSE | 0 | 1 | 1 | 0 | 1 | 1 | 1 | 1 | 1 | 0 | 1 | 1 | 1 | 1 | — | |
| 12 | STEP CHOKE - FORWARD/BACKWARD | 1 | 0 | 0 | 0 | 1 | 1 | 1 | 1 | 0 | 1 | 1 | 1 | 1 | 1 | — | |
| 13 | DHSV - CLOSE/OPEN | 1 | 0 | 1 | 0 | 1 | 1 | 1 | 0 | 1 | 1 | 1 | 1 | 1 | 1 | SFSB | USED |
| 14 | LINES - BLOCK/CLOSE (STT) | 1 | 1 | 0 | 0 | 1 | 1 | 0 | 1 | 1 | 1 | 1 | 1 | 1 | 1 | ESV6 | |
| 15 | SHIP CONTROL - OUT/IN | 1 | 1 | 1 | 1 | 1 | 0 | 1 | 1 | 1 | 1 | 1 | 1 | 1 | 1 | ESV7 | NOT CONNECTED |

X = DON'T CARE

Figure 99:
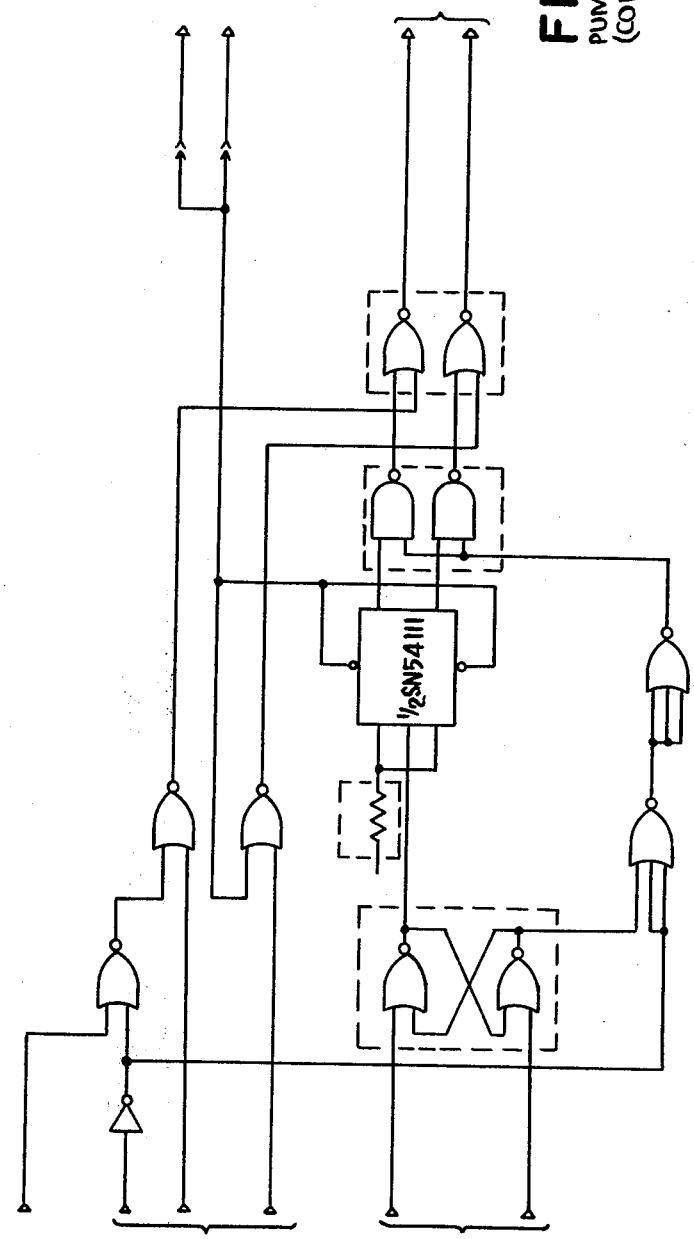

4.10 Hydraulic Pump Control (FIG. 99)

The hydraulic pump control logic circuit is located on the common board and is common to the System A and B circuits. The circuit is used to control pumps 1 and 2 in the Main Hydraulics Capsule by actuating motor starters MS1 and/or MS2 in the Power Distribution Capsule. The motor starters switch-in the 3-phase 480V, 60 Hz lines to the motors and have coils which are rated at 120V, 60 Hz. The coils are energized by solid-state switches (triacs, refer to para. 4.14) which are controlled by this pump control circuit.

There are two modes of operation for the two hydraulic pumps; automatic and manual.

1. Automatic Mode: Both pumps will alternate (one on at a time) when system pressure indicates low. The pump energized will remain on until system pressure indicates high. NOTE: These low and high pressure limits are set by pressure switches PS1 and PS2 in the main hydraulics capsule. These limits are used for pump control only and not for alarm indications. Low and High alarm levels are derived from the main hydraulics system pressure transducer output (PT1, refer to para. 4.20).

2. Manual Mode: Both pumps or a single pump can be controlled either on or off and an ON command will override the high pressure switch setting. Overpressurizing, in this mode, is only limited by the pressure relief valve setting in the main hydraulics capsule.

Therefore, three commands are used, namely:
1. Pump 1 On/Off
2. Pump 2 On/Off
3. Automatic/Manual Mode In the automatic mode, the pumps alternate in turning on when the low pressure switch (PS2) contact closes (MHPL = 1). When the pressure is high, PS1 contact closes (MHPH = 1) and the pump is turned off. The low and high pressure lines, MHPL and MHPH set and reset a NOR latch circuit. The truth table for this circuit is shown in Table IV-12

TABLE IV-12
R-S NOR LATCH TRUTH TABLE

| CONDITION | MHPL (R) | MHPH (S) | MHPHOR (Q) | MHPLOR ($\overline{Q}$) | REMARKS |
|---|---|---|---|---|---|
| In-Between High & LOW Press. | 0 | 0 | NO CHANGE | | Remain in last state |
| High Press. Indication | 0 | 1 | 1 | 0 | — |
| Low Press. Indication | 1 | 0 | 0 | 1 | Toggle J-K Flip/Flop |
| Not allowed | 1 | 1 | 0 | 0 | Never occurs |

When line MHPL goes high, indicating a low pressure condition, output line MHPHOR goes low toggling the auto mode pump select J-K flip-flop (½ SN54111). This flip-flop is wired as a T-type flip-flop with both J and K inputs tied permanently together to Vco (+5v). The Set and Reset inputs are also tied together to the DS2203 line which is high when in the auto mode. With these two inputs high, the flip-flop is enabled for T-type operation, however when low (indicating manual mode or motor overload) the flip-flop is disabled and the Q and $\overline{Q}$ outputs are held high. Table IV-13 shows the truth table for this flip-flop operation.

TABLE IV-13
AUTO MODE PUMP SELECT FLIP-FLOP TRUTH TABLE

| | CONDITION | MHPHOR (C) | INPUT (J) | (K) | SET (S) | RESET (R) | PUMPOFF (Q) | PUMPOFF ($\overline{Q}$) |
|---|---|---|---|---|---|---|---|---|
| 1 | MANUAL MODE OR MOTOR OVERLOAD | X | 1 | 1 | 0 | 0 | 1 | 1 |
| 2 | AUTO MODE, 1ST LOW PRESS INDICATION | 0 | 1 | 1 | 1 | 1 | 1 | 0 |
| 3 | AUTO MODE, IN BETWEEN LOW TO HIGH PRESS. | 0 | 1 | 1 | 1 | 1 | 1 | 0 |
| 4 | AUTO MODE, HIGH PRESS INDICATION | 1 | 1 | 1 | 1 | 1 | 1 | 0 |
| 5 | AUTO MODE, IN BETWEEN HIGH TO LOW PRESS. | 1 | 1 | 1 | 1 | 1 | 1 | 0 |
| 6 | AUTO MODE, 2ND LOW PRESS INDICATION | 0 | 1 | 1 | 1 | 1 | 0 | 1 |
| 7 | CONDITION 3 ABOVE | 0 | 1 | 1 | 1 | 1 | 0 | 1 |
| 8 | CONDITION 4 ABOVE | 1 | 1 | 1 | 1 | 1 | 0 | 1 |
| 9 | CONDITION 5 ABOVE | 1 | 1 | 1 | 1 | 1 | 0 | 1 |
| 10 | AUTO MODE, 3RD LOW BASE INDICATION | 0 | 1 | 1 | 1 | 1 | 1 | 0 |
| 11 | CONDITION 3 ABOVE | 0 | 1 | 1 | 1 | 1 | 1 | 0 |
| 12 | CONDITION 4 ABOVE | 1 | 1 | 1 | 1 | 1 | 1 | 0 |
| 13 | CONDITION 5 ABOVE | 1 | 1 | 1 | 1 | 1 | 1 | 0 |

The SN54111 flip-flop is toggled on the negative going portion of the clock input (when MHPHOR goes low) and in T-type operation with J and K inputs high the Q and $\overline{Q}$ output static will transfer upon application of each new MHPHOR = 0 pulse only. That is, for the first low pressure indication, Q = 1 and $\overline{Q}$ = 0, for the second Q = 0 and $\overline{Q}$ = 1, for the third Q = 1 and $\overline{Q}$ = 0, and so forth. This toggling action, then, selects the pump which had not previously been used. The state of these Q and $\overline{Q}$ outputs will also remain the same during the build-up from low to high pressure and during the reduction from high to low pressure.

The Q and $\overline{Q}$ flip-flop outputs, lines $\overline{\text{PUMPCFF}}$ and PUMPCFF, serve as separate inputs to a dual 2-input NAND gate (1/q SN5400). The other input to these gates, labeled TOGGLE, is formed by two 3-input NOR circuits which are controlled by the MHPLOR and $\overline{\text{CL05}}$ lines. When auto mode has been commanded, line $\overline{\text{CL05}}$ goes low and with line MHPLOR line high, indicating a low pressure indication, the TOGGLE line goes high (TOGGLE = 1). Thus, one of the outputs of the NAND circuit (PMP1A or PMP2A) will go low depending on which input, Q or $\overline{Q}$, is high. When a high pressure indication is received (MHPH = 1), line MHPLOR goes low, causing the TOGGLE line to go low which in turn sets the previously selected PMP1A or PMP2A line to high. This action stops the pump for a high pressure indication and the other pump will not be turned on until the next low pressure indication.

As previously stated, line DS2203 is high when auto mode is selected. This is generated by a 2-input NOR gate (¼ SN5402) which is controlled by lines CL05 and DS2206. With both inputs low, indicating that auto mode has been commanded and no motor overloads are present, line DS2203 = 1. However, when any one of the motors overload, line DS2206 goes high and the effect is the same as commanding a manual mode operation (DS2203 = 0). When the overload is cleared and if the auto mode command is retained ($\overline{CL05}$ = 0), the circuit will revert back to the auto control mode (DS2203 = 1). Line DS2203 is also directed to the output multiplexer circuit (refer to para. 4.17) for transmission of Auto or Manual pump control status to the PCR (STT) station.

When a Manual operation mode is commanded, line $\overline{CL05}$ goes high. This causes line DS2203 to go low which disables the J-K flip-flop causing both of its outputs (Q and $\overline{Q}$) to go high. The TOGGLE line also goes high which causes both PMP1A and PMP2A lines to go low. Lines PMP1B and PMP2B are controlled by separate 2-input NOR gates (¼ SN5402) whose inputs are lines CL03, CL04 and DS2203. When Pump 1 is manually commanded to turn ON, CL03 goes high and with DS2203 = 0 line PMP1B goes low. When commanded to turn OFF, PMP1B goes high. The same is true for Pump 2 and lines CL04 and PMP2B. During the Auto mode, lines PMP1B and PMP2B are permanently held low (DS2203 = 1) so that auto control is possible.

The final stage in the pump control circuit is a dual 2-input NOR gate (½ SN5402) whose outputs are pump control lines PMP1 and PMP2. Lines PMP1A and PMP1B serve as the inputs to one and PMP1B and PMP2B as the inputs to the other. During the Auto mode lines PMP1B and PMP2B = 0 and ON control is effected by either PMP1A or PMP2A going low. During the Manual mode the opposite is true, that is, PMP1A and PMP2A are held low and lines PMP1B and/or PMP2B are controlled. Lines PMP1 and PMP2 go high for ON control and are directed to the AC control output circuits, para. 4.14.

4.11 Choke Control and Position Counter

The choke control and position counter circuit is located on the Common Board and is common to both System A and B circuits. Upon command the circuit energizes a solenoid valve (SV4 or SV5) in the Main Hydraulics Capsule to step the choke 1 degree forward or 1 degree backward through a range of 0°–180° (lines CKOB and CKOF). The choke is hydraulically actuated and is located in the Produced Fluid Circuit.

The choke includes four limit switches which upon contact closure provide status information. They are:

Limit Switch #1: Choke at zero degrees (line AZR)
Limit Switch #2: Choke at 180 degrees (line AFR)
Limit Switch #3: Choke stepped 1 degree forward (line ODF) (momentary contact)
Limit Switch #4: Choke stepped 1 degree backward (line ODB) (momentary contact)

These contact closures are used by the circuit to provide choke position information to the PCR (STT) stations.

The basic restrictions for operating the choke, either forward or backward, is that it must be energized for a specified minimum time ($t_e$) and then remain de-energized for another minimum time ($t_d$). This is due to the inherent hydraulic time delay of the choke to complete one stepping (stroking) cycle. One complete stepping cycle consists of the following separate time intervals:

1. Power stroke
2. Delay at completion of power stroke } Energization time, $t_e$.
3. Return stroke (spring return)
4. Delay at completion of return stroke } De-energization time, $t_d$ For proper choke operation $t_e$ = 4 secs minimum and $t_d$ = 2 secs minimum.

Referring back to para. 4.8, 4.9, and Table IV-11, when a Step Choke command function is sent, multiplexed control address lines MSCW4 thru MSCW6 and register enable line MECR1 are decoded to cause the SF/SB line to go low during the C4 clock period. The SF/SB pulse, then, has the same time period as the C4 clock pulse and drives a J-K flip-flop thru a hex inverter ($\overline{SF/SB}$ = 1) at its clock input.

The flip-flop has its J and S (set) inputs wired to Vco (+5V) and the K input strapped to ground. Therefore, with J and S inputs permanently high and K input permanently low, output $\overline{Q}$ is controlled by the clock ($\overline{SF/SB}$) and reset (R) lines. With R input high, $\overline{Q}$ will go from 1 to 0 during the trailing edge of the $\overline{SF/SB}$ pulse. When R input goes low (at the end of the timing cycle), $\overline{Q}$ goes from 0 to 1. This resets the flip-flop for another Step Choke command ($\overline{SF/SB}$ = 1).

Prior to a Step Choke command, where $\overline{Q}$ = 1, capacitor C1 is charged very quickly to Vco through the diode and 2K resistor network. The output of the first CMOS buffer gate (⅙ CD4009A) goes low discharging capacitor C2 to zero potential very quickly through the diode and 2K resistor. The output of the second CMOS buffer gate (⅙ CD4009A) goes high. This sets the active low R input to the flip-flop high and maintains a $\overline{Q}$ = 1 output state.

When a Step Choke command is received, $\overline{Q}$ goes low causing C1 to discharge through the 4.3 megohm resistor. When the discharge output of the voltage reaches approximately 2.5 volts, the output of the first CMOS gate switches to high (+5V) and starts to charge capacitor C2. The time it takes for capacitor C1 to discharge to 2.5 volts is the choke energization time ($t_e$) and is approximately 6 seconds. It is calculated as follows:

$t$ = (RC) ln Ec/Eo
$t_e$ = (8.6) ln 2.5/5
$t_e$ = (8.6)(0.69315)
$t_e$ = $\underline{5.96}$ seconds When capacitor C2 charges to approximately 2.5 volts, the output of the second CMOS gate will switch to low (0.0V) resetting the flip-flop (active low R input). The $\overline{Q}$ output, then, goes from low to high (0 to 5V) and C1 will charge rapidly and C2 will discharge rapidly. This completes the timing cycle. Both capacitors charge to Vcc and discharge to GND since both diodes in each circuit are shunted with a resistor, nullifying the diode voltage offset. The charge time of C2 to 2.5 volts is $t_d$ and is approximately 2.6 seconds. It is calculated as follows:

$t$ = (RC)(1 - ln (Ec/Eb)
$t_d$ = (8.6)(1 - ln 2.5/5)
$t_d$ = $\underline{2.64}$ seconds The portion of the circuit described above only controls the ON (valve energization, $t_e$) and OFF (valve de-energization, $t_d$) times of the choke and line SF/SB only identifies when a step forward or step backward action is to take place. Actual forward or backward control is controlled by line MSCW0 and 4-bit Latch (9375). Referring to paragraph 4.9, and Table IV-10, MSCW0 = 1 for a step forward command or = 0 for a step backward command during the C4 clock pulse. Line MSCW0 is the data (D1) input to the latch and is entered into the latch only when CP1-2 input goes high (when timing circuit flip-flop is reset, $\overline{Q} = 1$).

The latch functions in the following manner. MSCW0 information, present at data input D1, is transferred to Q1 output when the clock input, CP1-2, is high. The Q1 output will follow the MSCW0 input as long as the clock remains high. When clock input CP1-2 goes low (receipt of SF/SB pulse causing flip-flop $\overline{Q}$ output to go low), the MSCW0 information present at the time of clock transition is retained at the Q1 output until the clock, CP1-2, is again permitted to go high (flip-flop reset). Therefore, the latch serves as a temporary storage device of choke forward or backward control information during the ON/OFF timing control cycle.

For a Choke Step Forward command, the latch output (Q1 = 1) is routed to a 2-input NAND gate. The other input to this gate is line UDCTPL which is normally high when the choke is not at the 180 degree position (NOTE: The choke cannot be stepped further forward after it has reached the 180 degree position, UDCTPL = 0). Therefore, with Q1 input high and UDCTPL input high, the output of the NAND gate goes low and is routed to a 3-input NOR gate. The other two inputs to this NOR gate come from the ON/OFF timing circuit. One is the $\overline{Q}$ output line of the flip-flop and the other the output of the first stage CMOS buffers. The output of this NOR gate is the CKOF line which is the step forward control line that is routed to the DC control circuit (solenoid valve control). To energize the solenoid, the CKOF line must go high. Therefore all three inputs to the NOR gate must be low. ON (energization) timing is effected when flip-flop $\overline{Q}$ goes initially low and first stage CMOS output stays low until capacitor C1 discharges to 2.5 volts ($t_e$). OFF (de-energization) timing is effected when C2 charges to 2.5 volts ($t_d$) causing the flip-flop to reset, $\overline{Q} = 1$. This action maintains the CKOF line low (de-energization state) for at least the $t_d$ period.

For a Choke Step Backward command, the latch output (Q1 = 0) is routed to a 2-input NOR gate. The other input to this gate is line AZR which is normally low when the choke is not at the zero degree position (NOTE: the choke cannot be stepped further backward after it has reached the zero degree position, AZR = 1). Therefore, with both inputs low, the output of the NOR gate is inverted to provide a low input to 3-input NOR gate, whose output is the step backward control line, CKOB. The other two inputs to this NOR gate come from the timing circuit and the previous description for Choke Step Forward timing control applies.

Choke degree position (000 to 180 degrees) information to the PCR (STT) station, is provided for by a 3-stage up/down counter which is incremented by either the one degree forward or one degree backward NOR toggle circuit. Both toggle circuits are set by the $\overline{Q}$ output of the timing circuit flip-flop. Prior to a step forward or backward command where $\overline{Q} = 1$ and with lines ODF and ODB both low, the outputs of both toggles are high (lines UDCTPUO1 and UDCTCPD0). When a Step Forward command is received, flip-flop output $\overline{Q}$ goes low setting the toggle and as previously described, starts the ON/OFF timing cycle. During this time period the UDCTPUO1 line will remain high until a momentary ODF high pulse is received. The UDCTPUO1 line will then go low and will remain low until the timing circuit flip-flop is reset ($\overline{Q} = 1$) at the end of the timing cycle. This low to high transition increments the counter by one count (one degree) at the CPu input of the first stage. The ODF pulse is generated by the momentary contact closure of the one-degree step-forward limit switch in the choke assembly and can only occur during the choke energization time period ($t_e$).

For a Step Backward command the same above description applies for lines ODB and UDCTCPD0. The ODB pulse is generated by the momentary contact closure of the step-backward limit switch and line UDCTCPD0 decrements the counter by one count (one degree). Therefore, for a given choke command and momentary step switch pulse, one of the toggle outputs will go low and back to high while the other remains high. All this occurring during and at the end of the choke ON/OFF time period.

The 3-stage counter consists of three up/down decade counters (9360) which are wired for multidecade operation (000 to 999). Counting is synchronous, with the outputs (QA thru QD) changing state after the low to high transition of either the count-up clock input (CPu) or the countdown clock input (CPd). The direction of counting is determined by which clock input is pulsed while the other clock input is high. The counter responds to a clock pulse on either input by changing to the next state of the count sequence (up or down).

Each counter has a asynchronous parallel load facility which permits the counter to be preset to a given value (PA thru PD inputs). Whenever the data enable input ($\overline{PL}$) is low, the information present on the data inputs is loaded into the counter and appears on the outputs (QA thru QD) independent of the conditions of the clock inputs. When the data enable input is high this information is stored in the counter and when the counter is clocked it changes to the next appropriate state in the count sequence. That is, the data inputs are inhibited when the data enable is high and have no effect on normal count operation. In this circuit, the PA thru PD inputs of the 3 counters are permanently wired for the number 180 (1000 0001 0000, MSB to LSB, PA thru PD). When the choke is not at the 180 degree position, as indicated by the position limit switch, enable line UDCTPL is high (AFR = 0) and the number 180 is stored in the counters. When the choke reaches the 180 degree position, line UDCTPL goes low (AFR = 1) transferring the stored data to the output. If during normal step forward counting action, the degrees open display at the PCR (STT) does not read 180 at the time the 180 degree limit switch closes; this stored data action changes the display to read 180 degrees. Thus, if counts are lost or gained during the step forward process, the PCR (STT) display will be set to read the true 180 degree position. NOTE: A separate "At 180 Degree" status light is also provided at the PCR (STT) station.

Multidecade counter operation is made possible by the terminal count-up ($\overline{TCu}$) and terminal count-down ($\overline{TCd}$) outputs (carry and borrow respectively). The counters are connected (cascaded) by feeding the $\overline{TCu}$ output to the CPu clock input and $\overline{TCd}$ output to the CPd clock input of the following counter. Therefore, for a count-up sequence the first-stage counter (LSB) upon reaching count 9 will on the next count (count 0) cause its normally high $\overline{TCu}$ output to go low for the duration of its CPu clock-input pulse. This action clocks the second counter at input CPu to count 1. This action continues until the second counter reaches count 9 and then back to count 0. At this count, its $\overline{TCu}$ output will clock the third counter to count 1 and so forth. The up-counting sequence has the capability of counting to 999, however, due to the stored 180 degree information the counters should never exceed a 180 count.

The down-counting sequence of the counters works the same as described above but in reverse. That is, count 9 to 0 and back to 9 instead of count 0 to 9 and back to 0. If the counters should count down passed 000, i.e. −999, the $\overline{TCd}$ output of the third stage (MSB) will go low. This line (UFLO) is inverted and is routed to a 3-input NOR gate which also has the AZR line (at zero degrees) as an input. The output of this NOR gate is NANDed with the system clear line (CLR0) to form the master reset or clear input to the counters. If a system clear is not present (CLR0 = 1) and if "at zero degrees" status has not been received (AZR = 0), and if the counter has counted one count pass 000 (UFLO = 0) a master reset is generated (UDCTMR = 1) to reset the counters to a 000 output. This action prevents the counter from counting passed 000. The same is true for the AZR line. If the cirrent count is of some value above 000, the counters will be reset to 000 when AZR line goes high (at zero degree limit switch). This action synchronizes the counters and PCR (STT) display to the true zero degree position of the choke if some counts were lost. NOTE: An "At Zero Degree" status light is also provided at the PCR (STT) station. The system clear line (CLR0) sets the counters to an initial 000 output upon application of power and initial operation.

The outputs of the counters, then, provide 3-digit BCD format information for choke position display from 0 to 180 degrees. The outputs are routed to the output multiplexer stage, refer to para. 4.17, the transmission to the PCR (STT) station.

Figure 100:
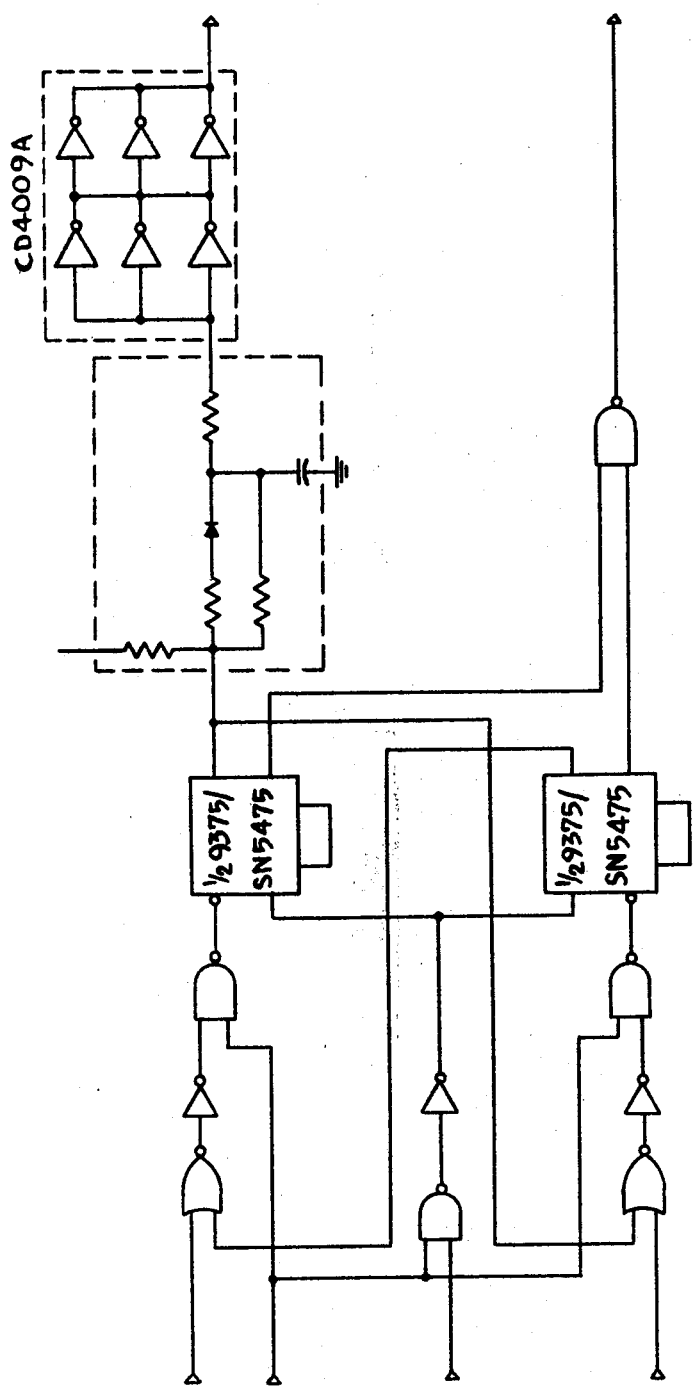

4.12 Down Hole Safety Valve Control (FIG. 100)

The Down Hole Safety Valve (DHSV) control circuit is located on the common board and is common to both the System A and B circuits.

The circuit controls two solenoid valves in the Main Hydraulics Capsule, SV6 and SV7. These two valves are used for opening or closing the DHSV and for purging or blocking the DHSV lines. The PCR station has controls OPEN/CLOSE DHSV only. The STT station has controls for OPEN/CLOSE DHSV and PURGE/BLOCK DHSV LINES. Table IV-14 shows the energization state of SV6 and SV7 for each of these commands.

TABLE IV-14

| DHSV CONTROL, SOLENOID VALVES SV6 AND SV7 | | |
|---|---|---|
| DHSV COMMAND | VALVE SV6 | VALVE SV7 |
| Open DHSV | E | E |
| Close DHSV | D | D |
| Block Lines | D | D |
| Purge Lines | E | D |

D = De-energized
E = Energized

To preclude a hydraulic system failure condition, the DHSV control circuit is designed to prevent the opening of the DHSV and to purge the DHSV lines simultaneously. The DHSV OPEN and LINES PURGE commands are interlocked and can only be accepted as follows:

| COMMAND | ACCEPTED ONLY IF |
|---|---|
| OPEN DHSV | - Previous state was DHSV CLOSED or LINES BLOCKED |
| PURGE LINES | - Previous state was LINES BLOCKED or DHSV CLOSED |

The circuit accepts data on lines ESV6, ESV7, MSCW0 and CLR0. Referring to paragraph 4.9 and Tables IV-10 and IV-11, when the decoder in the control output circuit is addressed by a DHSV close or open command, line ESV6 goes low. When addressed by a Lines Block or Purge command, line ESV7 goes low. When none of these commands are present, both lines ESV6 and ESV7 are high. Line MSCW0, the control data line, goes low for a DHSV close or Lines Block command, and goes high for a DHSV open or Lines Purge command. Line CLR0 is normally high when a system reset is not called for.

The ESV6 and ESV7 lines are NOR gated with the Q1 and Q3 outputs of their opposite 9375 latches. Upon inversion (hex buffers) they are NAND gated with CLR0 line to form the clock input to the latches (CP1-2 and CP3-4). Data into the latches (inputs D2 and D4), is formed by line MSCW0 which is NAND gated with CLR0 and inverted (D2=D4=D1=D3=CLR0·MSCW0) where MSCW0 = 0 for close and 1 for open. With lines ESV6 and ESV7 both high, indicating no command is present, the clock inputs to the latches, lines DHFCP) and DHFCP3 are both low. The latches can only accept data when their clock input is high. The clock input logic is:

$$CP1\text{-}2 = \overline{CLR0 \cdot (\overline{ESV6 + Q3})}$$

$$CP1\text{-}4 = \overline{CLR0 \cdot (\overline{ESV7 + Q1})}$$

Therefore, the clock inputs are only high when CLR0 = 0 or when both ESV6 = 0 and Q3 = 0 (ESV7 = 0 and Q1 = 0). Table IV-15 shows the logic operation of this control circuit. Output control line, SV7, is timed control so that when a Close DHSV or Block Lines command is received, where both valves have to be de-energized, SV7 line will go low approximately 8 seconds after SV6 line goes low (capacitor discharged to 2.5 volts thru 6.2M resistor). Therefore solenoid valve, SV6 de-energizes before SV7.

TABLE IV-15

| DOWN HOLE SAFETY VALVE CONTROL CIRCUIT LOGIC | | | | | | | | |
|---|---|---|---|---|---|---|---|---|
| RESET | ADDRESS LINES | | CONTROL STATUS BIT | LATCH OUTPUT | | VALVE CONTROL LINES | | |
| CLRφ | ESV6 (DHSV) | ESV7 (LINES) | MSCWφ | Q1 | Q3 | SV6 | SV7 | |
| 1 | 1 | 1 | W | Y | Z | Y+Z | Y | |
| 1 | φ | 1 | W | φ | 1 | 1 | φ | See Note 1 |

TABLE IV-15-continued

DOWN HOLE SAFETY VALVE CONTROL CIRCUIT LOGIC

| 1 | φ | 1 | X | X | φ | X | X | Action State |
|---|---|---|---|---|---|---|---|---|
| 1 | 1 | 1 | W | Y | Z | Y+Z | Y | |
| 1 | 1 | φ | W | 1 | φ | 1 | 1 | See Note 2 |
| 1 | 1 | φ | X | φ | X | X | φ | Action State This state not possible |
| 1 | φ | φ | | | | | | |
| φ | W | W | W | φ | φ | φ | φ | See Note 3 |

Where X, Y and Z are binary digits and W is a don't care digit.

| COMMAND | ADDRESS ESV6 | ESV7 | BIT MSCWφ | LINE SV6 | LINE SV7 |
|---|---|---|---|---|---|
| Block Lines | 1 | φ | φ | φ | φ |
| Purge Lines | 1 | φ | 1 | φ | 1 |
| (Illegal) | φ | φ | — | 1 | φ |
| OPen DHSV | φ | 1 | 1 | 1 | 1 |
| Close DHSV | φ | 1 | φ | φ | φ |

IV-69

NOTE 1: Since Q3 = 1, Q1 must be φ and the control request has no effect.
NOTE 2: Since Q1 = 1, Q3 must be φ and the control request has no effect.
NOTE 3: Both valves are Off when reset line CLRφ = φ.

Figure 103:
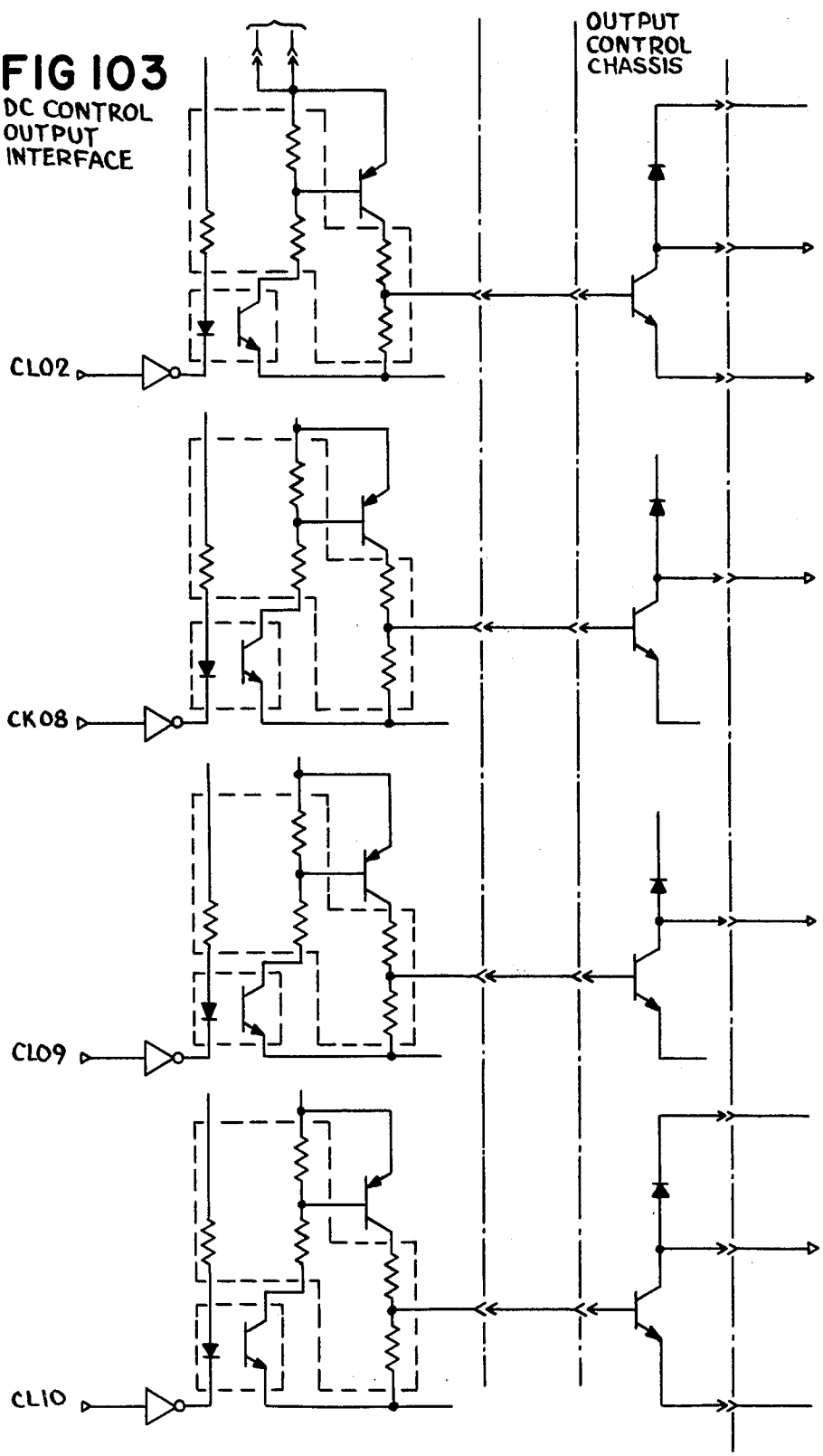
Figure 104:
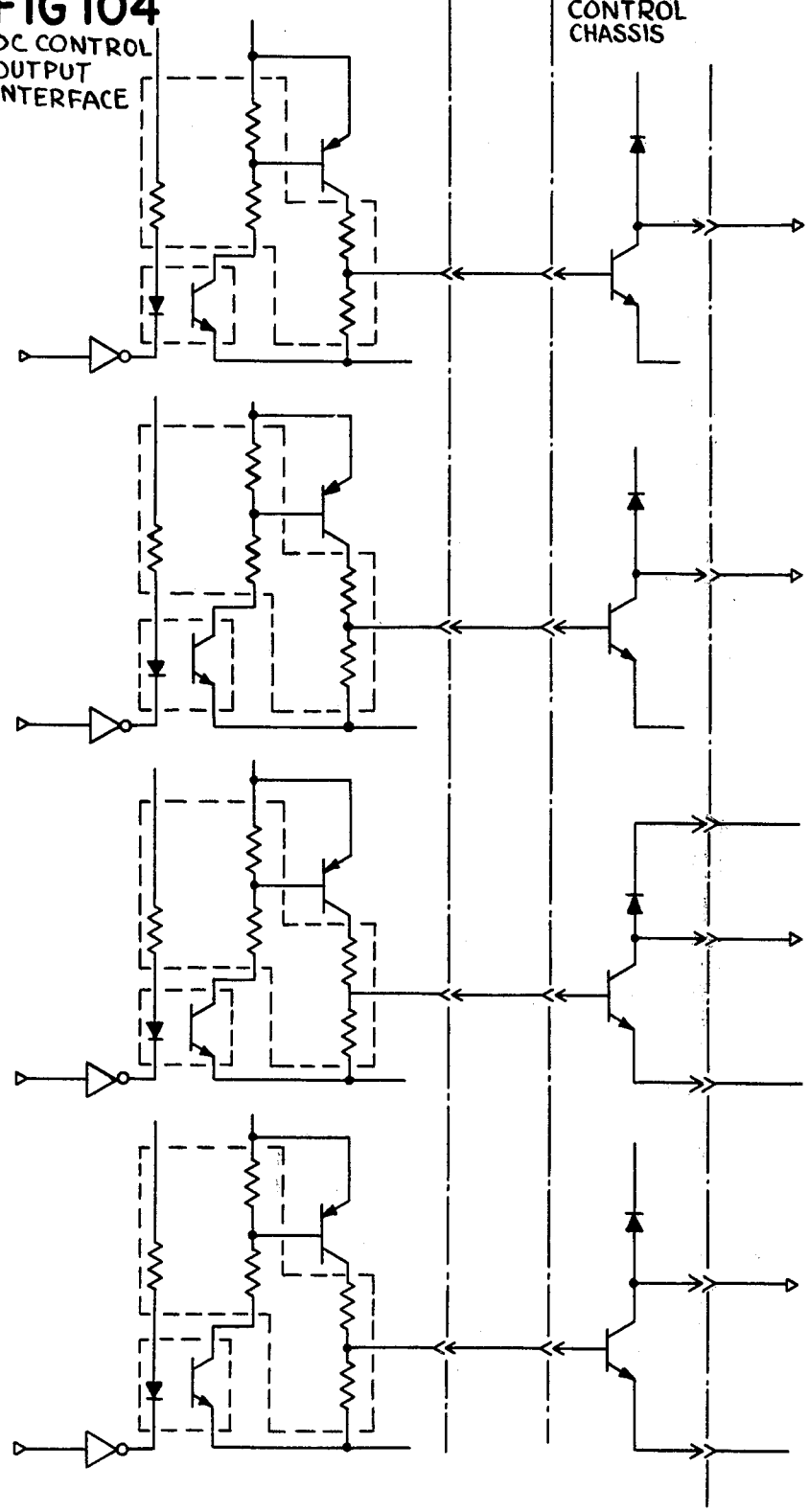
Figure 105:
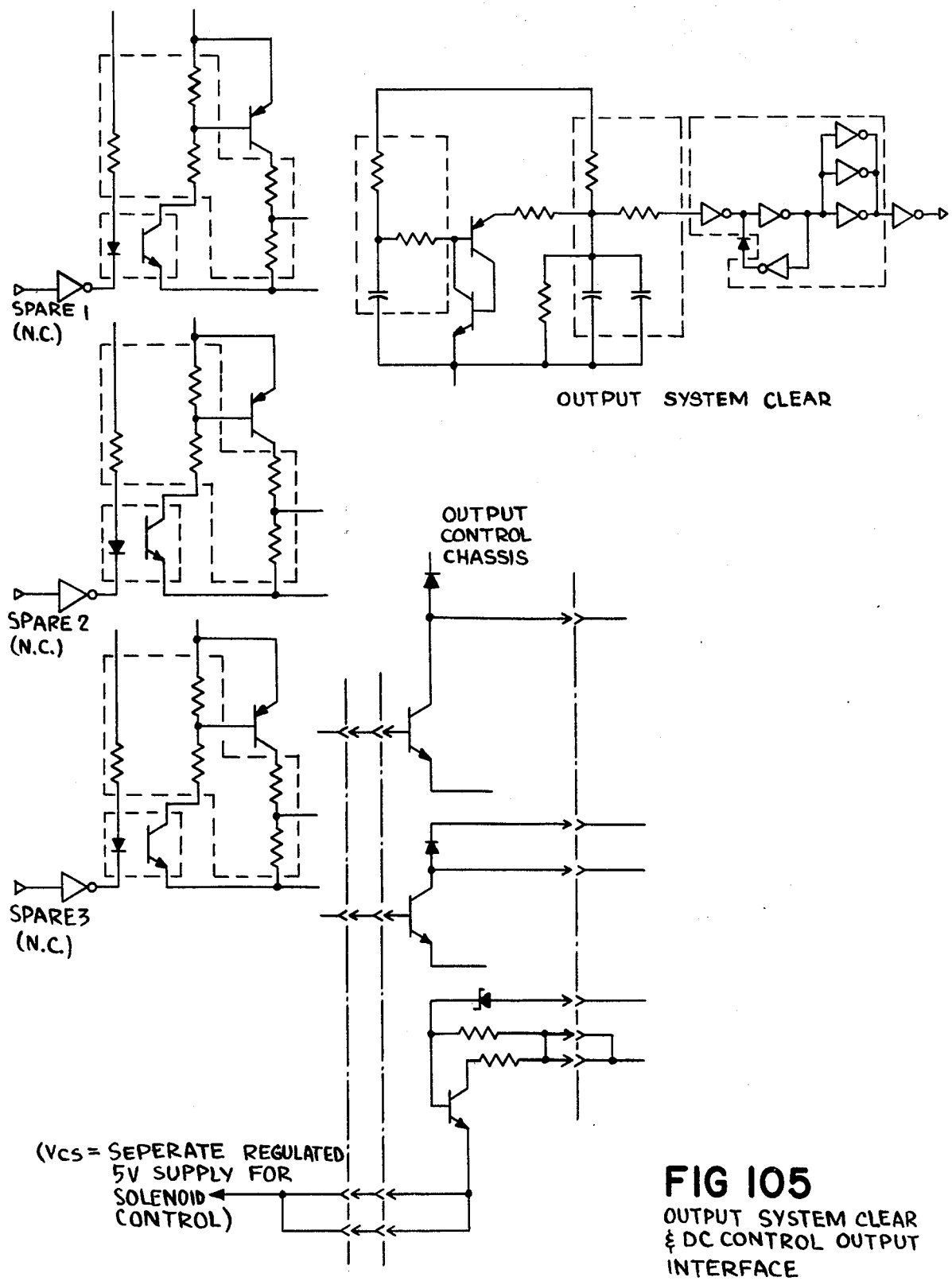
Figure 106:
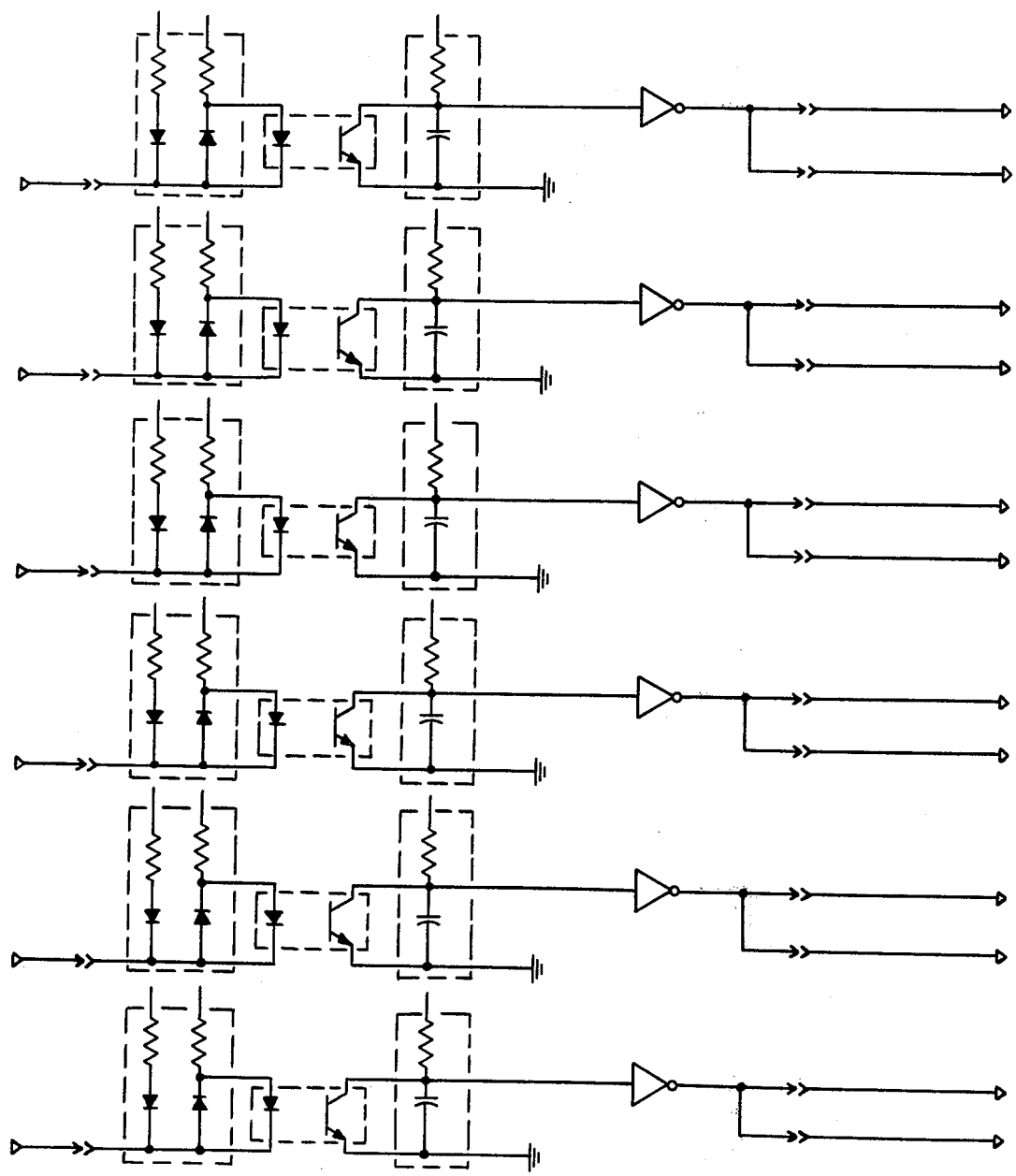
Figure 107:
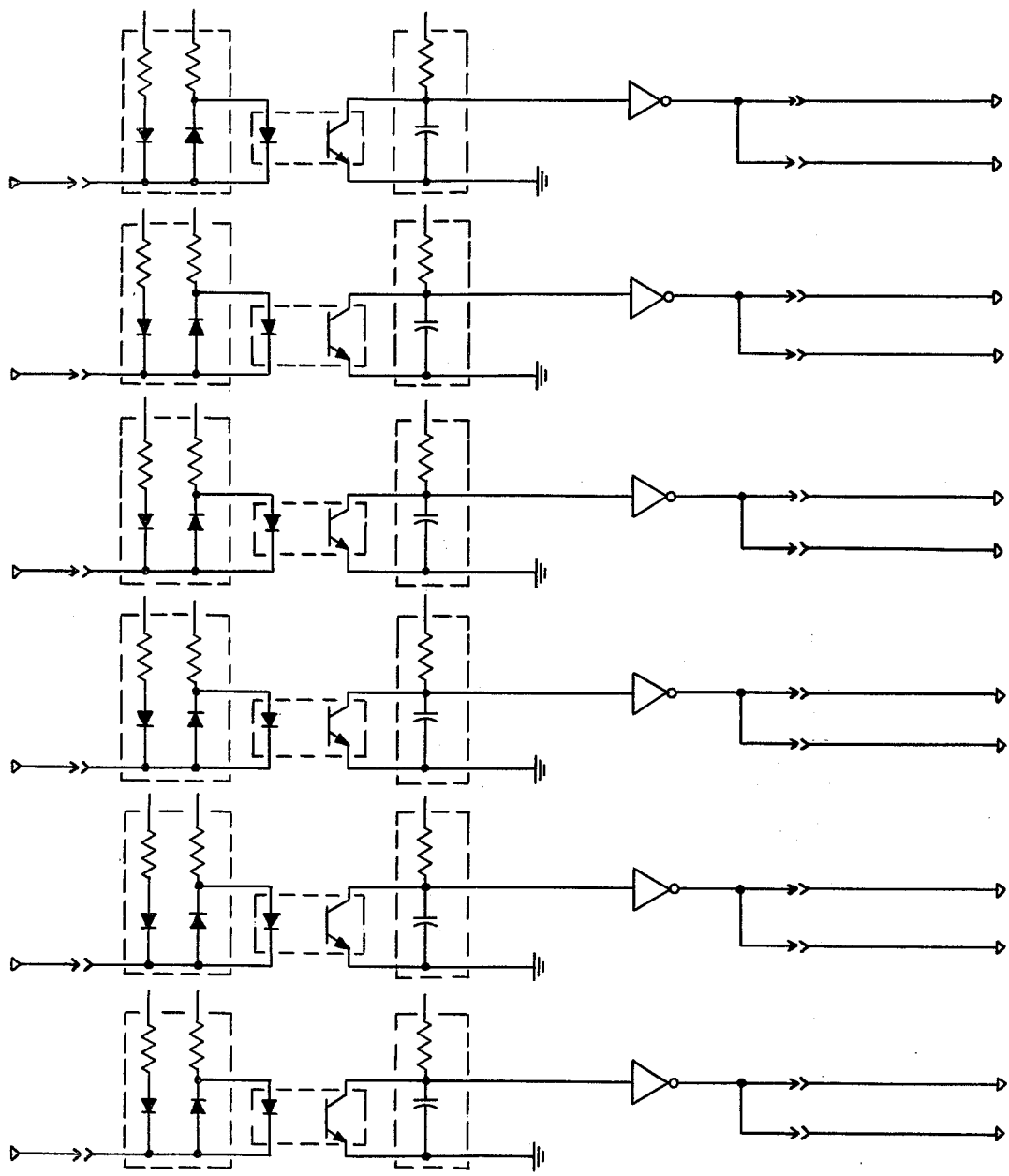
Figure 108:
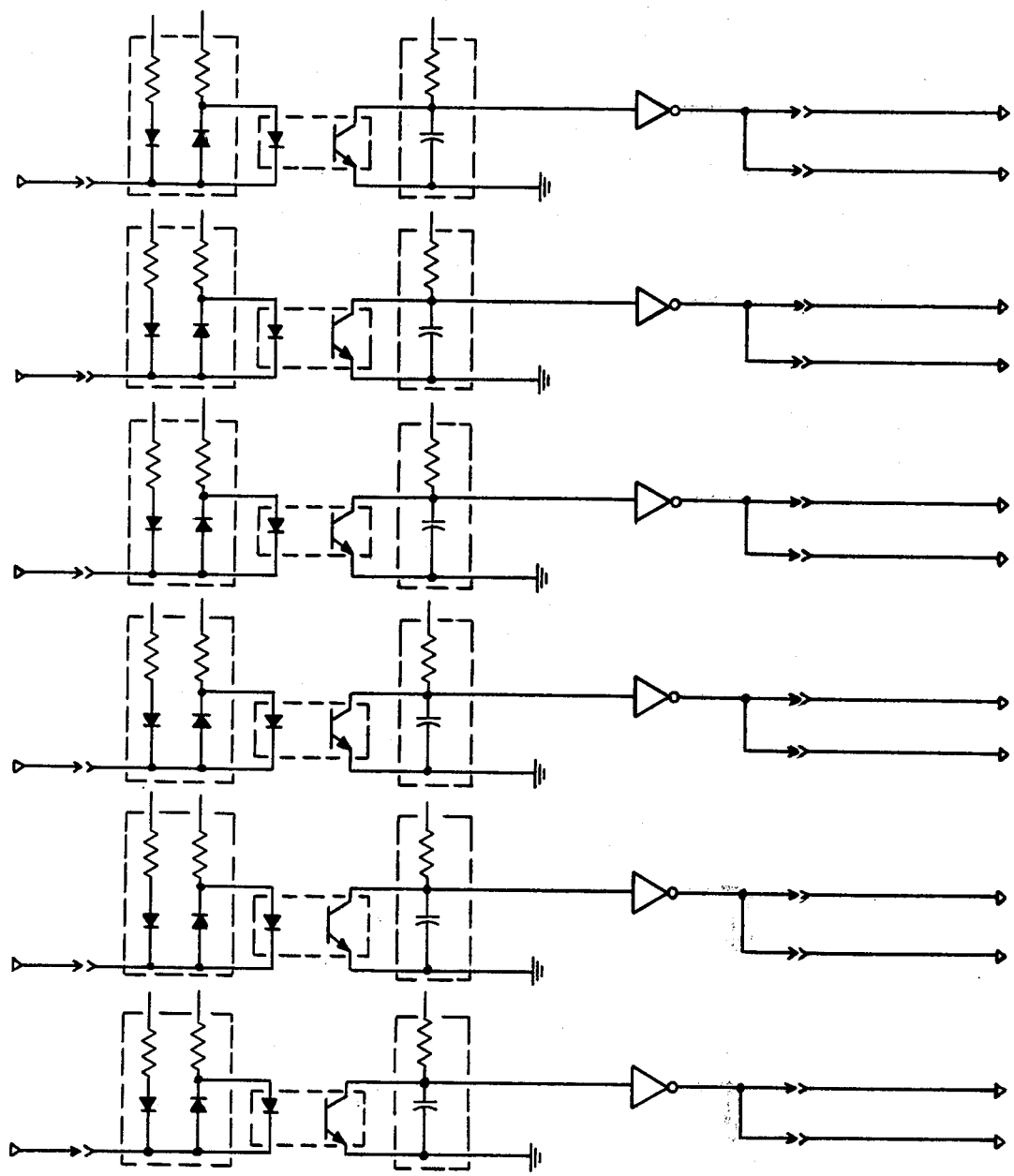
Figure 109:
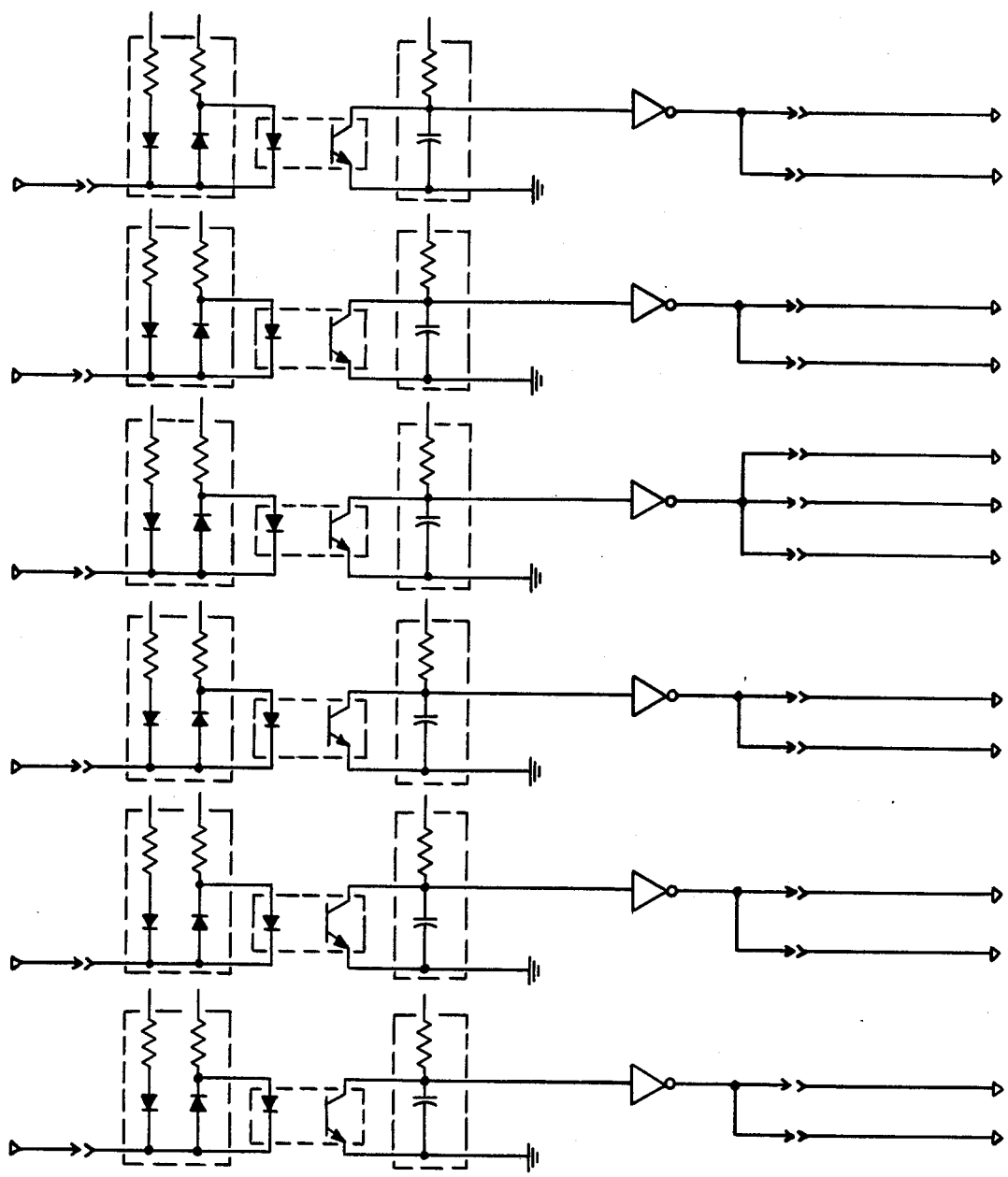
Figure 110:
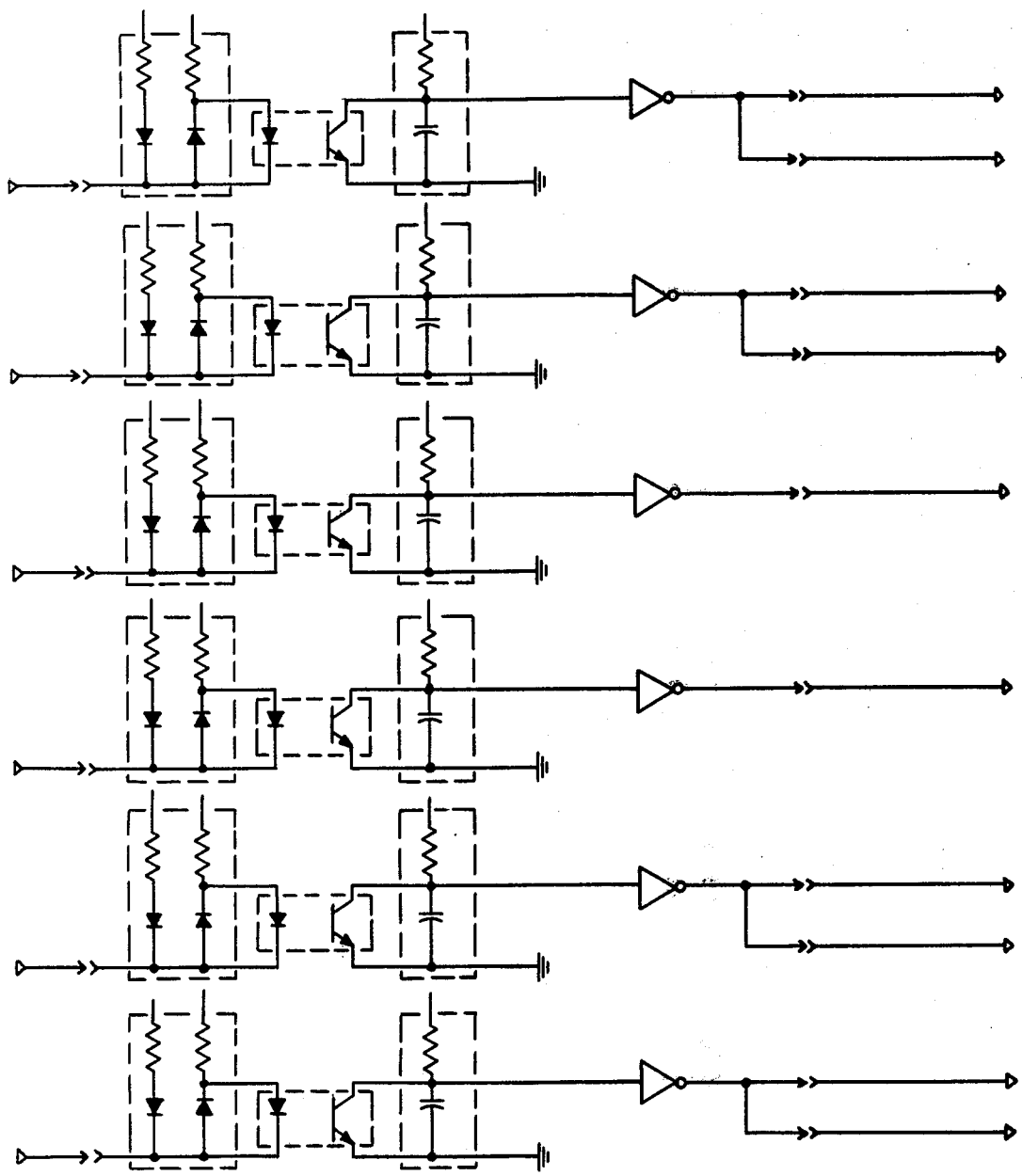

4.13 DC Control Output Interfaces (FIGS. 103 to 105)

The DC control output interface circuits are located on the Common Logic Board and the Output Control Module. They are common to both System A and B circuits. The final power transistor stage of these circuits, located on the output control module, interfaces directly with the end device which require 24VDC for energization. These devices are the solenoid values in the hydraulic system and the acoustic beacon.

Each circuit is turned on when its corresponding input line goes high (refer to para. 4.9 and the control output registers). The high level control input forward biases the emitter of a photocoupler. The detector of the photocoupler then conducts biasing ON the NPN power transistor through a common emitter PNP amplifying stage. The VCS supply for the photocoupler detector and amplifier is a separate series regulated source. The circuit, consisting of a 5 volt zener diode and a resistor/transistor network is located on the output control module and is shown on sheet 13 of Dwg. 393D161. The use of this separate supply and photocoupler provides complete isolation and noise immunity between the power stage and logic control.

The power transistor is protected against high voltage transients by a high current diode (1N5402) at the collector and is held in saturation for loads up to 1 amp. It can sustain a collector-to-emitter voltage of 200V at 100 ma and for a heat sink temperature of 50 degrees C. it can safely dissipate 50 watts.

Figure 102:
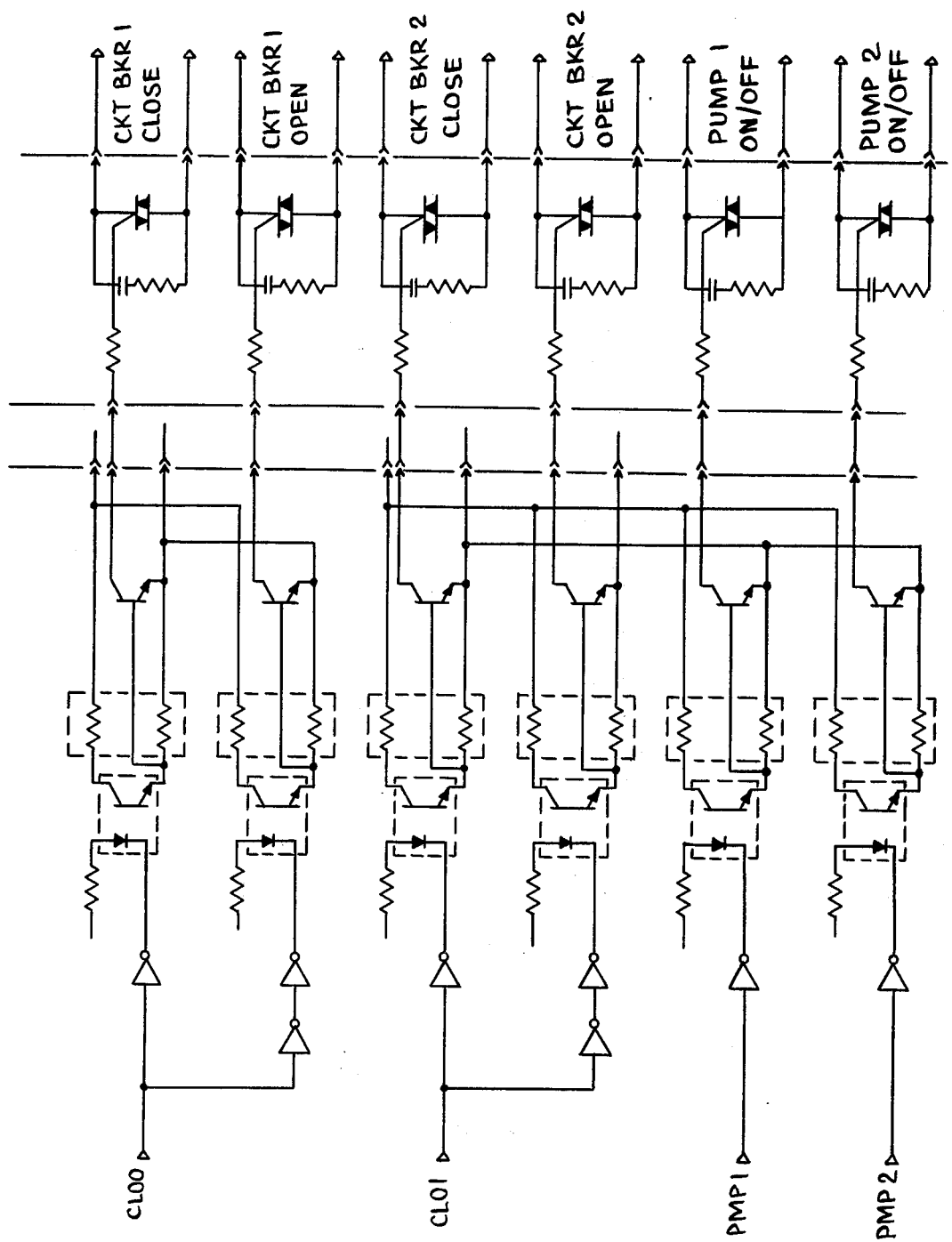

4.14 AC Control Output Interfaces (FIG. 102)

The AC control output interface circuits are located on the Common Logic Board and the Output Control Module. The circuits are common to both System A and B logic control and are used to control the system AC devices. Namely, the motor operated circuit breakers and the hydraulic pump(s) motor starters. The final power stage of the circuit connects directly to these end devices.

The circuit consists of a photocoupler driving a bi-directional Thyristor through a common emitter NPN transistor amplifying stage. A high logic level at the control line input forward biases the photocoupler emitter. The photocoupler detector then conducts, biasing ON the gate transistor (MAQ2222) which is connected to a −10V bias supply. This triggers the Thyristor which then supplies 110VAC to the end device.

The Thyristor is protected against high voltage rates (dv/dt) by an RC snubber network. This snubber reduces the high dv/dt rates that are produced when the Thyristor turns OFF with non-unity power factor loads. These high dv/dt rates, if not attenuated, would tend to turn the Thyristor back ON. A separate gate bias supply (−10VDC) must be used for each 110VAC line phase used. Two separate power supplies provide the −VGBB and −VGBC bias voltages. They are energized by the Phase B and Phase C lines of the 3-phase 110VAC source (4-wire) respectively.

The photocouplers provide isolation and noise immunity between the logic control and power output stages.

4.15 Digital Contact Interfaces (FIGS. 106 to 111)

The contact interface circuits are located on the Common Logic Board and are common to both System A and B logic circuits. They accept the switch contact closures external to the Telecom for digital status transmission to the PCR (STT) station.

The circuit performs three functions: (1) it isolates the high switching voltage while transmitting the contact open or closed status information; (2) it provides a high voltage, approximately 168V peak, to break down any oxide insulating film on the switch contact surfaces; and (3) it provides a relatively high current, approximately 130 ma, to keep the contact surfaces clean.

The isolating coupler device is an MCT-4 photocoupler. When its emitter is forward biased, the detector conducts causing the voltage across the capacitor to lower. At approx 2.5 volts, the CMOS gate will switch from low to high providing a high logic output. Since the forward bias current through the photocoupler can only flow through the switch contacts, the logic output of the circuit is high when the switch is closed.

Condition: External Contact closed
Operation: During the positive half cycles of the 110 VAC supply the photocoupler will conduct. Diode D1 is also forward biased by the 2 VAC supply during its positive half cycle. The current, then, through R1 and D1 plus the lesser current through R2 and the photocoupler, flows through the contact keeping it clean. The current through R1 and D1 (approximately 130 milliamps) is the dominant wetting current and is approximately 60-70 times greater than the current through the photocoupler. 100 to 150 milliamps is considered sufficient for proper contact wetting.

During the negative half cycles of the 110 VAC supply, current flows through D2 and R2 and the photocoupler is off. No current flows through R1 and D1 from the 2 VAC supply during its negative half cycle. The photocoupler output, then, is ON and OFF every half cycle. The R3, C1 time constant (T = 120 msec) filters these ON/OFF pulses and in half-a-cycle (60 Hz) the voltage across C1 will rise to approximately 0.8 volts. The worst case characteristic of the CD4009A for a 0.8 volt input shows the output to be 4.7 volts minimum. This output is quite adequate TTL interface. The RC network also serves as a suppressor for possible contact bounce and/or AC voltage ripple effect. The output of the CMOS buffer (CD4009A) serves as the input to the output multiplexer, refer to paragraph 4.17.

The reason for using the separate 2 VAC wetting source is to reduce the power consumption and dissipation factor of the circuit. The circuit consumes approximately 275 milliwatts. To produce the same wetting current from the 110 VAC supply would result in a power consumption of approximately 15 watts. The latter, therefore, becomes untolerable considering 37 such circuits are used.

Condition: External contact opened

Operation: During the positive half cycles of the 110 VAC supply, diode D1 prevents the photocoupler from conducting and the peak voltage across the contact is approximately $+110 \sqrt{2}$. During the negative half cycle both D1 and D2 conduct and the photocoupler remains off. The peak voltage across the contact is approximately $-(2\sqrt{2} + 0.7)$.

Figure 92:
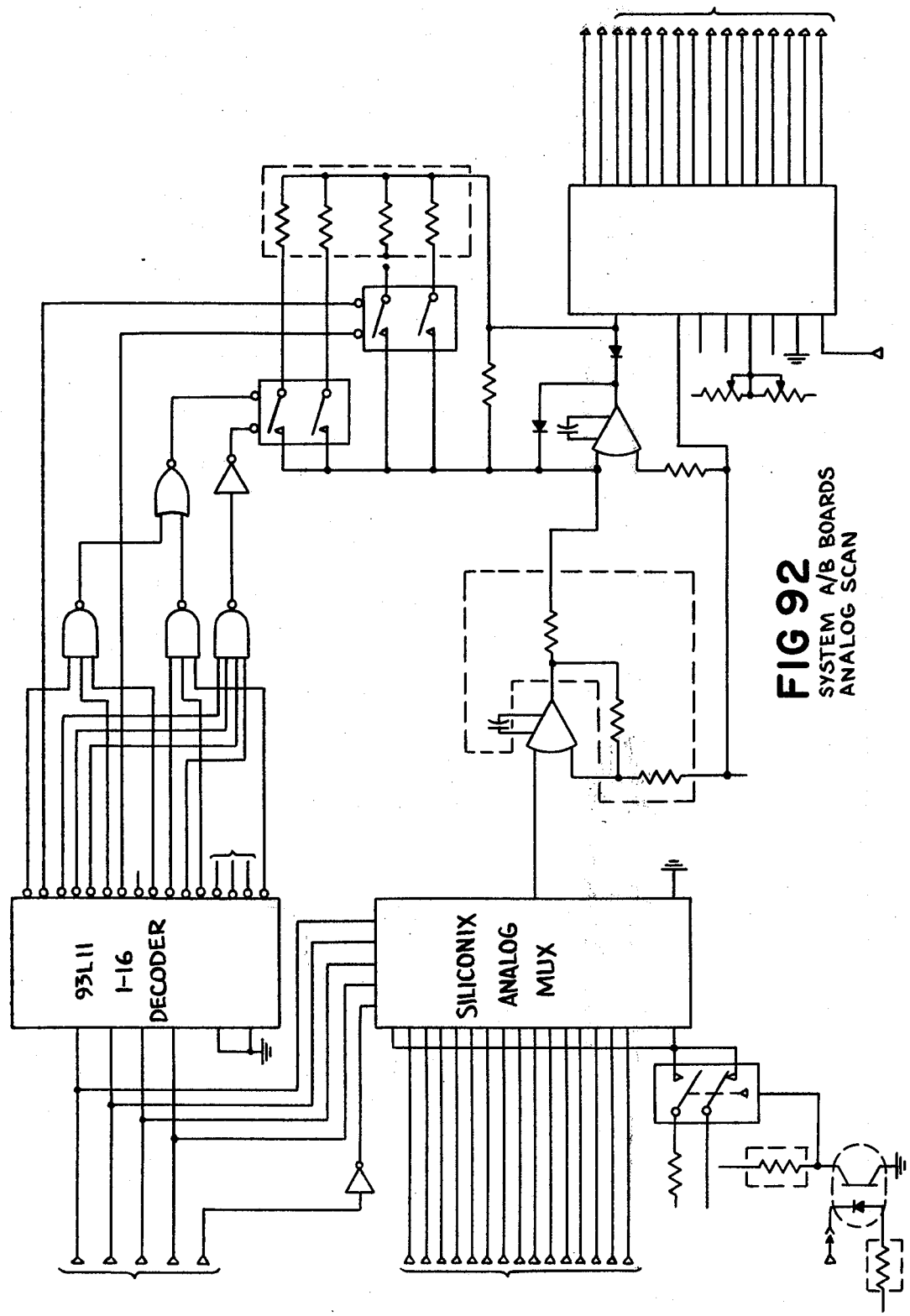
Figure 93:
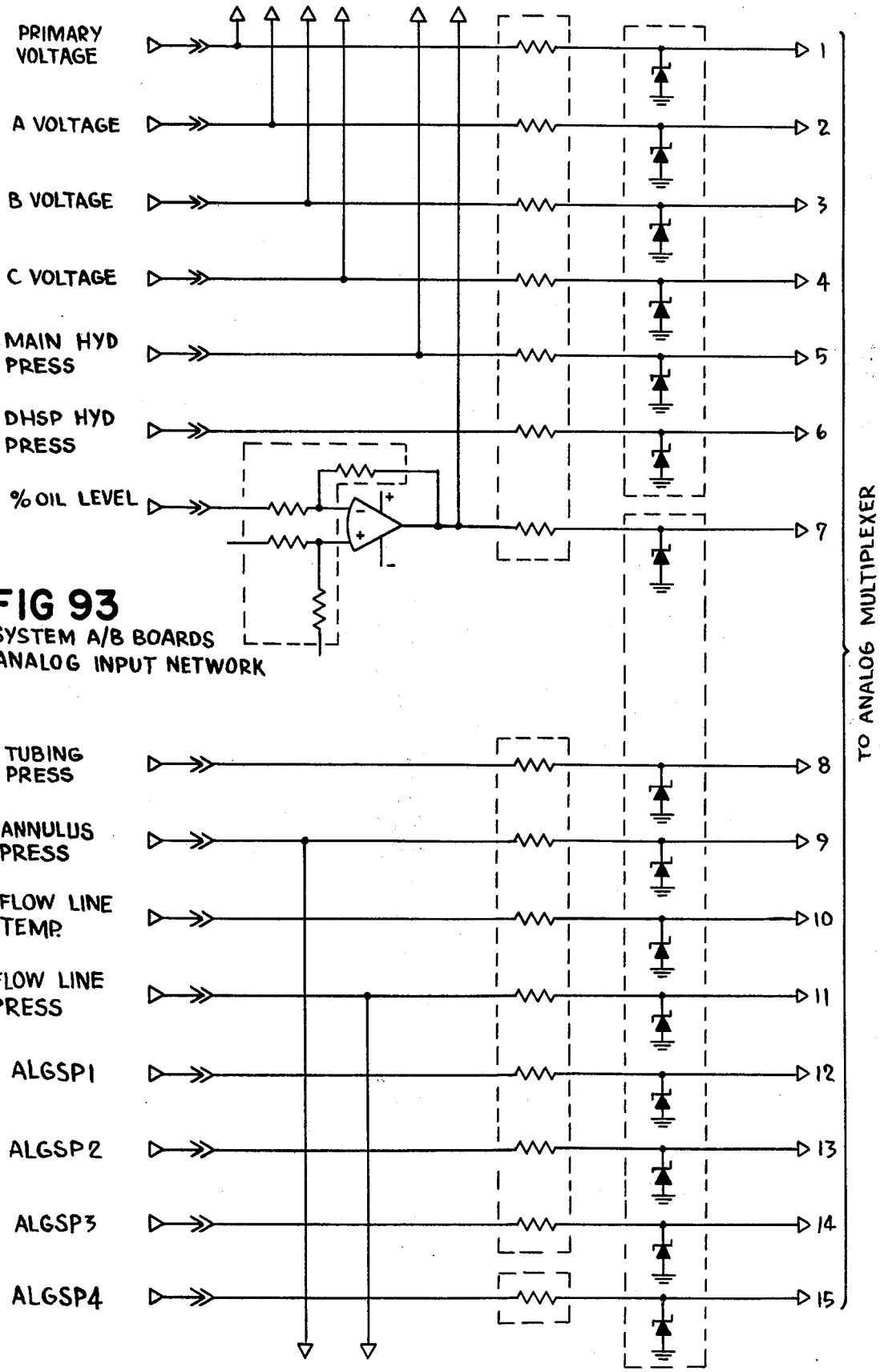
Figure 95:
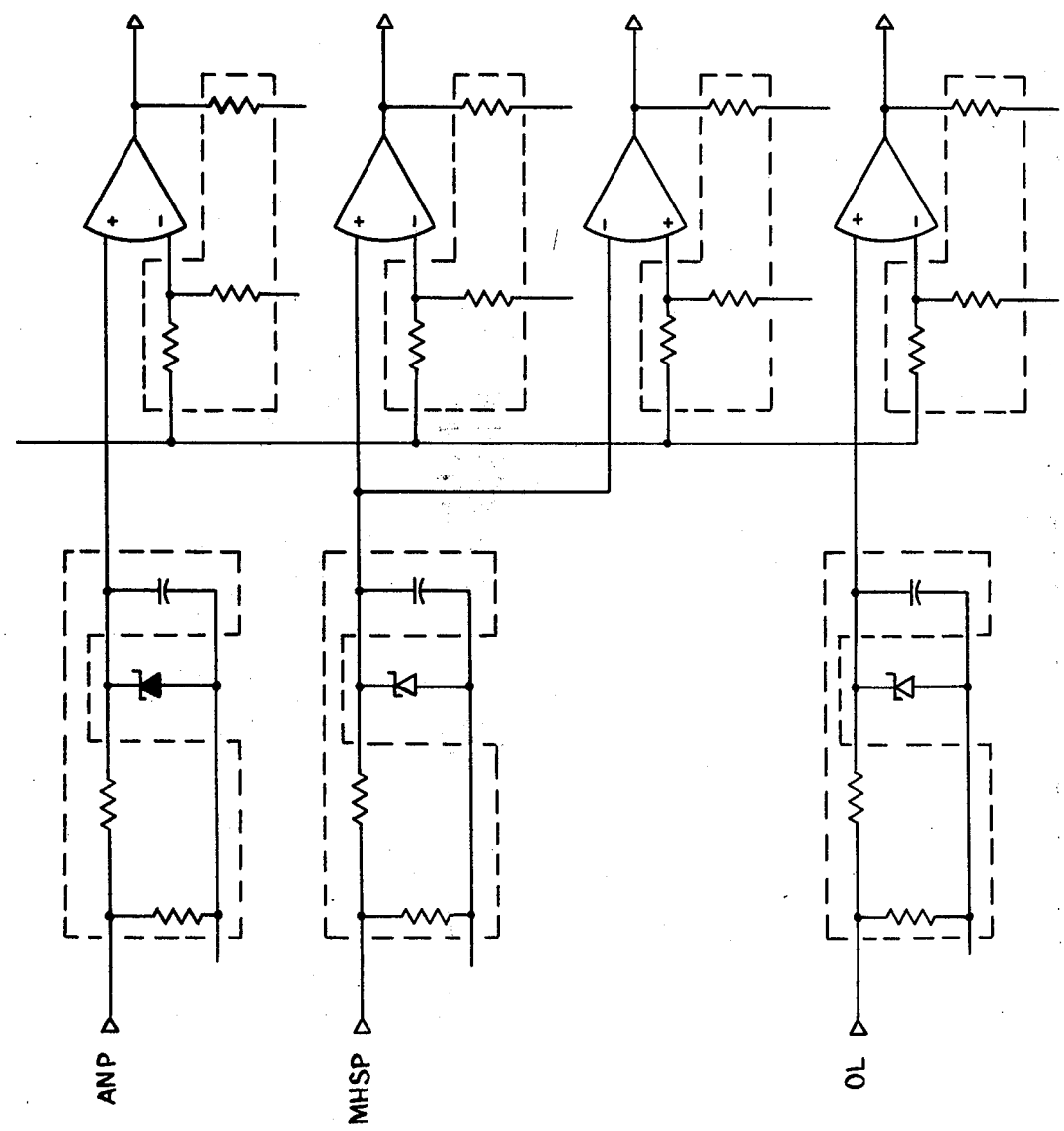

4.16 Analog Subsystem (FIGS. 92 and 93)

The analog subsystem is included on both System A and B boards and includes input networks, scan and scaling circuits, a self-check circuit, and alarm circuits both fixed and adjusted. The alarm circuits are described in paragraph 4.20.

The system accepts 0 to 5 volt full range transducer outputs which are routed to the A/D converter through an input network circuit and a 16 channel analog multiplexer.

The input network serves as a protective circuit in that the zener diode will clamp the circuit to approximately 6.2 volts for inputs exceeding the normal 5 volt maximum. The 5K resistor limits the fault cirrent to $I_f$ = VAN-6.2/5 ma. The circuit is directed through the analog multiplexer to an operational amplifier (uA777). The input impedance of the uA777 is a minimum of $2 \times 10^6$ ohms and normally $10 \times 10^7$ ohms. The 5K series resistor in the input network, therefore, introduces an analog accuracy error of 0.05% normally and 0.25% maximum. The % oil level transducer input is essentially inverted (complimentary) thru a uA747 OP Amp. The OP Amp serves as a differential amplifier with a gain of 0.1 and a fixed reference of 0.5 volts at one of the inputs. When the OL line swings from 0 to 5 volts, the output of the OP Amp swings from 0.5 volts to 0. This represents the 0 to 100% full range respectively.

The analog multiplexer (DG506) is a single-pole 16-position electronic switch array which employs 16 pairs of CMOS field-effect transistors designed to function as analog switches. In the ON condition each switch will conduct current, and in the OFF condition each switch will block voltages up to 30V peak-to-peak. The ON/OFF state of each switch is controlled by the 4-bit binary word inputs which selects 1 of 16 channels (switches) and the Enable input. The multiplexer is addressable when the Enable input is high. When low, all switches are maintained in the OFF state. Switching is a break-before-make action.

The multiplexer, then, is addressed by lines BN04 thru BN07 at inputs A0 thru A3 for analog channel selection and enabled by line BN08 (refer to paragraph 4.5). These represent bits-4 thru 8 of the received request for data word. Table IV-16 identifies the request for analog data addresses and analog multiplexer channel selection.

TABLE IV-16

REQUEST FOR ANALOG DATA WORDS

| (MSB) 15 | 14 | 13 | 12 | 11 | 10 | 9 | 8 | 7 | 6 | 5 | 4 | 3 | 2 | 1 | 0 (LSB) |
|---|---|---|---|---|---|---|---|---|---|---|---|---|---|---|---|
| φ | φ | 1 | 1 | 1 | 1 | 1 | ADDRESS | | | | | 1 | 1 | 1 | 1 |

OP CODE | WELL NUMBER | FIXED | SEE TABLE WORD FORMAT | FIXED

| WORD NO. | ADDRESS BITS 8 BNφ8 | 7 BNφ7 | 6 BNφ6 | 5 BNφ5 | 4 BNφ4 | ANALOG DATA | ANALOG MUX SELECTED CHANNEL |
|---|---|---|---|---|---|---|---|
| 0 | φ | φ | φ | φ | φ | Analog Check 0V or 5V | 1 |
| 1 | φ | φ | φ | φ | 1 | Primary Voltage | 2 |
| 2 | φ | φ | φ | 1 | φ | Secondary Voltage-Phase A | 3 |
| 3 | φ | φ | φ | 1 | 1 | Secondary Voltage-Phase B | 4 |
| 4 | φ | φ | 1 | φ | φ | Secondary Voltage-Phase C | 5 |
| 5 | φ | φ | 1 | φ | 1 | Main Hydraulic Pressure | 6 |
| 6 | φ | φ | 1 | 1 | φ | DHSV Hydraulic Pressure | 7 |
| 7 | φ | φ | 1 | 1 | 1 | % Oil Level | 8 |
| 8 | φ | 1 | φ | φ | φ | Tubing Pressure | 9 |
| 9 | φ | 1 | φ | φ | 1 | Annulus Pressure | 10 |
| 10 | φ | 1 | φ | 1 | φ | Flowline Temperature | 11 |
| 11 | φ | 1 | φ | 1 | 1 | Flowline Pressure | 12 |
| 12 | φ | 1 | 1 | φ | φ | (spare) | 13 |
| 13 | φ | 1 | 1 | φ | 1 | (spare) | 14 |
| 14 | φ | 1 | 1 | 1 | φ | (spare) | 15 |
| 15 | φ | 1 | 1 | 1 | 1 | (spare) | 16 |

The selected analog multiplexer channel is routed to a non-inverting operational amplifier (uA777) which has a gain factor of 2, i.e., E out = E in (1 + 10K/10K). Therefore, for a full scale input of 5V the output of this first OP Amp is 10 volts. The amplification is required since the A/D converter has a full scale input rating of 10V. The output is routed to a second uA777 OP Amp which is used as part of the analog scaling circuit.

Since the PCR and STT stations display the received BCD analog data directly and since the 5 volt full output of the transducers represent different measured ranges, a variable scaling system that changes the attenuation for each different measured range is used. A 1 of 16 decoder, four analog switches, and an operational amplifier accomplish this scaling.

The 1 of 16 decoder (93L11), is addressed by the same lines which addressed the analog multiplexer; BN04, BN05, BN06, and BN07. The decoder is permanently enabled by both E inputs strapped to ground (active low) and according to the 4-bit binary address, the decoder provides one low corresponding output. This output, then, corresponds to the selected analog channel and switches in the proper scaling circuit which sets the gain of the second OP Amp. Table IV-17 lists the decoder addresses and scaling parameters. As can be seen, ANALOG CHECK, MAIN HYDRAULIC PRESSURE, TUBING PRESSURE, ANNULUS PRESSURE and FLOWLINE PRESSURE data require a scaling gain of 0.5; PRIMARY VOLTAGE requires a gain of 0.6; SECONDARY VOLTAGE PHASES A, B, and C require a gain of 0.15; and DHSV HYDRAULIC PRESSURE and % OIL LEVEL require unity gain (1.0). Therefore, decoder outputs 0, 5, 8 and 9, 11, 15 are NAND gated to a common NOR circuit whose output is the 0.5 gain line. When any one of these channels are selected, the corresponding decoder output goes low causing the output of the NOR circuit to go low (0.5 gain line). This enables one of the DG182AA FET switches which is in the 100K gain resistor. Since 3-input NAND gates were used, spare decoder output 15 serves as one of the inputs thus providing a spare 0.5 gain channel.

the full scale input rating (10V) of the A/D converter. Therefore:

$$\text{Gain } (K) = \frac{\text{Maximum Range}}{1 \times 10^N}$$

where $N$ = minimum scale in powers of 10

$$K_{Analog\ Check} = \frac{5}{10} = 0.5$$

$$K_{Prim\ Volts} = \frac{600}{1000} = 0.6$$

$$K_{Sec.\ Volts} = \frac{150}{1000} = 0.15$$

$$K_{Pressures} = \frac{5000}{10000} = 0.5$$

$$K_{DHSV\ Hyd\ Press} = \frac{10,000}{10,000} = 1.0$$

$$K_{Flowline\ Temp} = \frac{150}{1000} = 0.15$$

$$K_{\%\ Oil\ level} = \frac{100}{100} = 1.0$$

The fixed input and feedback resistors ($R_i$ and $R_f$) for the second OP Amp are both 100K ohms. They alone provide a gain of 1 (unity) for the OP Amp where:

$$K = \frac{R_f}{R_i} = \frac{100K}{100K} = 1$$

For the other gain requirement a resistor $R_k$ is connected in parallel with $R_f$. This resistor, as switched in by the DG182AA device, is calculated as follows:

$$K = \frac{R_k R_f / R_k + R_f}{R_i}$$

TABLE IV-17
ANALOG DATA DECODER/SCALING

| ANALOG DATA | DECODER ADDRESS | | | | SELECTED DECODER OUTPUT (φ) | FULL SCALE RANGE FOR 0-5V XDCR OUTPUT | REQUIRED SCALING GAIN | SCALING RESISTOR VALUE |
|---|---|---|---|---|---|---|---|---|
| | BNφ7 | BNφ6 | BNφ5 | BNφ4 | | | | |
| ANALOG CHECK | φ | φ | φ | φ | 0 | 5V | 0.5 | 100K |
| PRIMARY VOLTAGE | φ | φ | φ | 1 | 1 | 600V | 0.6 | 150K |
| SEC. VOLTAGE, PHASE A | φ | φ | 1 | φ | 2 | 150V | 0.15 | 17.64K |
| SEC. VOLTAGE, PHASE B | φ | φ | 1 | 1 | 3 | 150V | 0.15 | 17.64K |
| SEC. VOLTAGE, PHASE C | φ | 1 | φ | φ | 4 | 150V | 0.15 | 17.64K |
| MAIN HYDRAULIC PRESSURE | φ | 1 | φ | 1 | 5 | 5000 PSID | 0.5 | 100K |
| DHSV HYDRAULIC PRESSURE | φ | 1 | 1 | φ | 6 | 10000 PSID | 1.0 | NONE |
| % OIL LEVEL | φ | 1 | 1 | 1 | 7 | 100% | 1.0 | NONE |
| TUBING PRESSURE | 1 | φ | φ | φ | 8 | 5000 PSIA | 0.5 | 100K |
| ANNULUS PRESSURE | 1 | φ | φ | 1 | 9 | 5000 PSIA | 0.5 | 100K |
| FLOWLINE TEMP | 1 | φ | 1 | φ | 10 | 150° C | 0.15 | 17.64K |
| FLOWLINE PRESSURE | 1 | φ | 1 | 1 | 11 | 5000 PSIA | 0.5 | 100K |
| (SPARE) | 1 | 1 | φ | φ | 12 | | | |
| (SPARE) | 1 | 1 | φ | 1 | 13 | | | |
| (SPARE) | 1 | 1 | 1 | φ | 14 | | | |
| (SPARE) | 1 | 1 | 1 | 1 | 15 | | | |

Similarly, decoder outputs 2, 3, 4 and 10 are NAND gated, then inverted to form the 0.15 gain line. When low the DG182AA switch is enabled, switching in the 17.64K gain resistor. Gain line 0.6, is driven directly by decoder output 1 which when low switches in the 150K gain resistor. Since the data represented by decoder outputs 7 and 8 requires unity gain, no scaling is required and the fixed gain (K = 1) of the second OP Amp is used.

The required gain values (K), for the four different ranges are obtained as follows: Since the first OP Amp amplifies the incoming analog signal (0 to 5 volts maximum) by a factor 2, the maximum output to the scaling circuit for each range is 2 × 5V = 10V. This satisfies and, $$R_k = \frac{K R_i R_f}{R_f - K R_i}$$

then for, $$R_{0.5} = \frac{(0.5)(100 \times 10^3)^2}{100 \times 10^3 (1 - 0.5)} = \frac{50}{0.5} \times 10^3 = 100K \text{ ohms}$$

$$R_{0.6} = \frac{(0.6)(100 \times 10^3)^2}{100 \times 10^3 (1 - 0.6)} = \frac{60}{0.4} \times 10^3 = 150K \text{ ohms}$$

-continued
$$R_{0.15} = \frac{(0.15)(100\times10^3)^2}{100\times10^3(1-0.15)} = \frac{15}{0.85} \times 10^3 = 17.64K \text{ ohms}$$

The gain of the second OP Amp, therefore, is determined by the scaling circuit. Its output is negative going (0 to −10V max) and inputs directly into the A/D converter. The output and feedback diodes (1N649's) form a perfect diode circuit, which clamps the output to zero for zero volts in and prevents any possible positive voltage drift.

The A/D converter is a dual-slope integrating type of converter which provides a 12-bit BCD output with 100% overrange capacity. The dual slope integration technique provides high accuracy and excellent linearity. The input signal is integrated UP during a fixed length of time after which an internal reference voltage of opposite polarity is integrated DOWN to zero. The length of time it takes to integrate DOWN is directly proportional to the analog input value. The integration, then, averages out the input signal and spikes or noise that would normally affect accuracy are integrated out before they become a source of error.

The specifications for the device are:
Resolution (number of bits): 12 bits
Linearity (maximum): ± ½ LSB
Quantizing Error (maximum): ± ½ LSB
Zero Error (offset): Trimmable to zero
Gain Error (scale factor): ± 0.2%, trimmable
Gain Accuracy vs. Temperature: ± 40 ppm/° C.
Conversion Time (maximum): 2.5 msec
Power Supply Rejection (maximum): ± 0.005%/% Vs
Input: 0 to −10VDC
Input Impedance: 100K ohm
Input Offset Current (maximum): 1 uA
Output Code: 3 BCD digits + overrange bit
Overrange: 100% (0 to −20V), 13th bit
Temperature Range: 0° to 70° C.

FIG. IV-22 shows the timing diagram for the TPN4111 converter. Analog-to-digital conversion starts when the Reset input, line CAXE, goes low. This is controlled by the BN08, SC and $\overline{C4}$ lines in the output multiplexer address circuit (refer to para. 4.17). At the time the Reset input goes low, complete line, $\overline{CMPL}$, goes high. It remains during the conversion time period (2.5 msec max) after which it goes low. This signal is sent to the output multiplexer address circuit, para. 4.17, to enable data transmission. The 12 bits of 3-BCD output data are routed directly to the 17 inputs of the 12 corresponding output multiplexers, refer to para. 4.17.

The overrange bit output, although wired to the output multiplexer is not used by the PCR (STT) station.

Checking of the analog system for proper calibration is accomplished by switching in a regulated 5V supply or analog ground to the input of the analog multiplexer (channel 1). Therefore, the gain and zero accuracy levels of the system are constantly monitored. Switching is accomplished by device DG188AA which is controlled by line CL08 from the control output register, refer to para. 4.9. Control function address line, CL08, enables a photocoupler whose output is connected to a 2-channel analog switch (DG188AA). When CL08 goes low, the photocoupler conducts causing the switch to select the analog ground line. When CL08 goes high, the photocoupler turns off and the switch selects the 5V calibration line (VCAL). The calibration voltage, VCAL (+5V), is supplied by a separate precision voltage source followed by an attenuator buffer, refer to sheet 23 dwg 393D162. The circuit which is supplied by the +15V (VAN) source consists of a current regulator (1N5294) and a two-stage OP Amp network. The precision voltage (VCAL) is generated by a constant current diode (current regulator) which fixes the bias current for the zener diode (1N823). The voltage output for the first stage OP Amp is clamped to 6.3 volts and is attenuated to 5.00 volts at the output of the second OP Amp by potentiometer PT6. This voltage (VCAL) besides checking analog calibration is also used in the fixed alarm level circuits.

Figure 89:
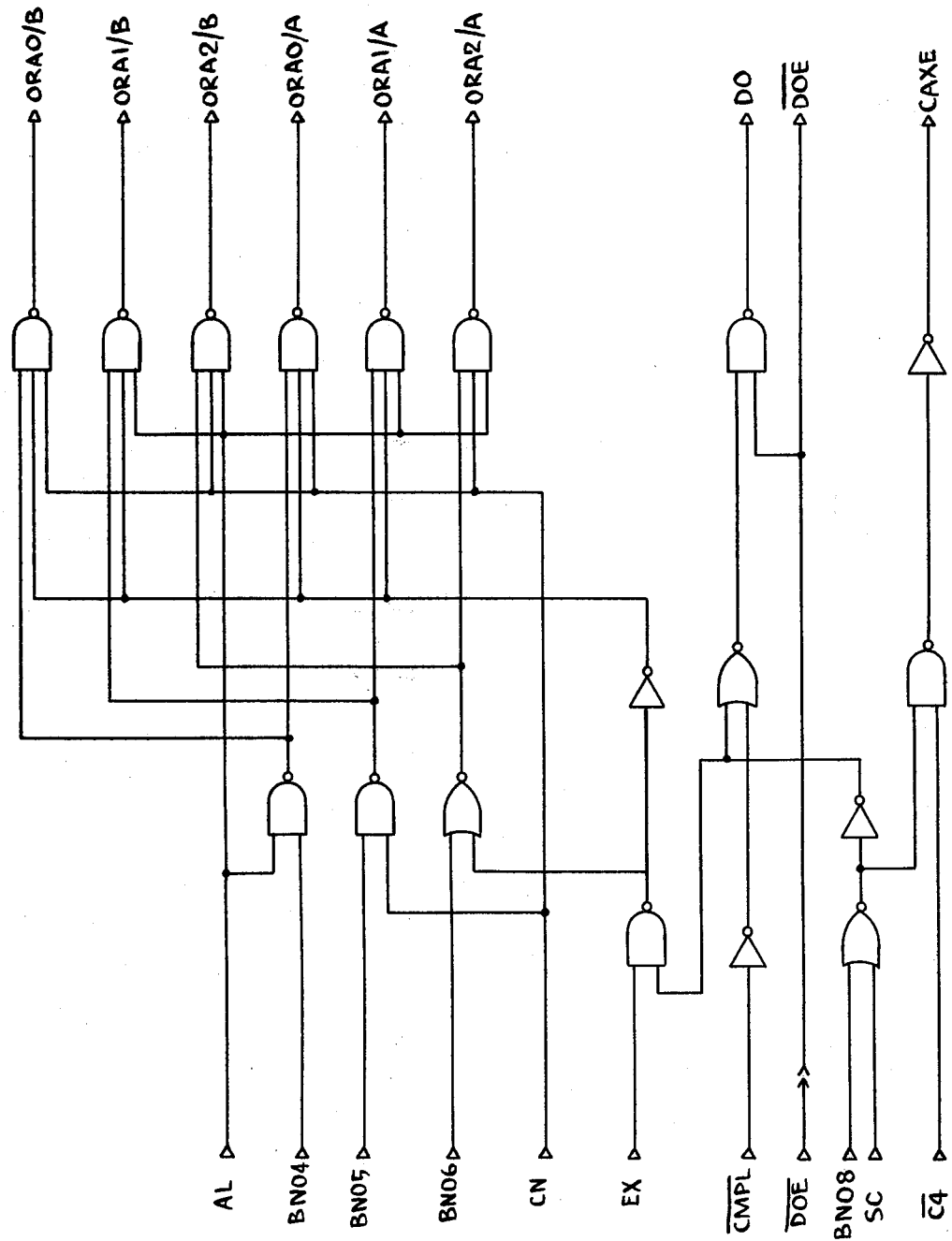

4.17 Output Multiplexer (FIGS. 89, 90 and 91)

The output multiplexer circuits are included on both System A and B logic boards. The circuit consists of an address generator stage and sixteen 93L12 multiplexers.

The address generator circuit selects the proper data to be transmitted to the PCR (STT) which is inputed at the output multiplexers. The address lines are ORA0/A thru ORA2/A and ORA0/B thru ORA2/B and are formed according to the functions shown in Table IV-18.

TABLE IV-18

| RECEIVED WORD BITS | | | | OUTPUT MULTIPLEXER ADDRESS | | | | | | | |
|---|---|---|---|---|---|---|---|---|---|---|---|
| | | | | OP CODE LINES | | | | MUX ADDRESS LINES | | | |
| BN$\phi$8 | BN$\phi$6 | BN$\phi$5 | BN$\phi$4 | EX | AL | CN | SC | ORA2 | ORA1 | ORA$\phi$ | FUNCTION |
| W | X | Y | Z | 1 | 1 | 1 | 1 | X | Y | Z | Not used, no active OP code |
| $\phi$ | X | Y | Z | 1 | 1 | 1 | $\phi$ | 1 | 1 | 1 | Analog scan |
| 1 | X | Y | Z | 1 | 1 | 1 | $\phi$ | X | Y | Z | Digital scan |
| W | X | Y | Z | 1 | 1 | $\phi$ | 1 | 1 | $\phi$ | 1 | Control word confirm |
| W | X | Y | Z | 1 | $\phi$ | 1 | 1 | 1 | 1 | $\phi$ | Alarm level word confirm |
| W | X | Y | Z | $\phi$ | 1 | 1 | 1 | 1 | 1 | 1 | Execute confirm |

Where X, Y and Z are binary bits according to the received word and W is a don't care bit.

The output multiplexers are low power devices (93L12) which select one bit of data from the eight input data sources (10 thru 17) according to address inputs S0 thru S2. Each unit contains its own internal select decoding and is permanently enabled by the strapping of the active low enable input to ground. The output line of each is complimentary to each selected input and is routed through a SN5406 inverter buffer line driver. The outputs of all buffers are labeled BO00 thru BO15 and are routed directly to the subsea PCR and STT transmitters. Table IV-19 shows the multiplexer input data select addresses.

TABLE IV-19

OUTPUT MULTIPLEXER INPUT DATA SELECT ADDRESS

| MUX ADDRESS | | | INPUT | |
|---|---|---|---|---|
| S2 | S1 | S0 | SELECTED | DATA TYPE |
| 0 | 0 | 0 | 10 | ⎫ |
| 0 | 0 | 1 | 11 | ⎪ Digital Status from |
| 0 | 1 | 0 | 12 | ⎬ contact input interface |
| 0 | 1 | 1 | 13 | ⎪ circuits |
| 1 | 0 | 0 | 14 | ⎭ |
| 1 | 0 | 1 | 15 | Control Word Confirm |
| 1 | 1 | 0 | 16 | Alarm Level Word Confirm |
| 1 | 1 | 1 | 17 | Analog BCD Data and Execute Confirm |

Besides generating the multiplexer address lines, the address circuit also generates lines DO and CAXE. Line DO controls the output control circuit, para. 4.18, and is formed by inputs DOE, $\overline{AXE}$ and CMPL.

$$DO = DOE \, (\overline{AXE} + CMPL)$$

where,
$\overline{AXE} = 0$ when analog conversion is indicated
CMPL = 1 when analog conversion is completed
DOE = Data out enable clock pulse (goes low)
$\overline{AXE} = 1$ no analog conversion needed Line CAXE goes low during the $\overline{C4}$ clock period when analog converion is indicated (AXE = 1). This is the reset line to the A/D converter and starts analog-to-digital conversion.

Figure 83:
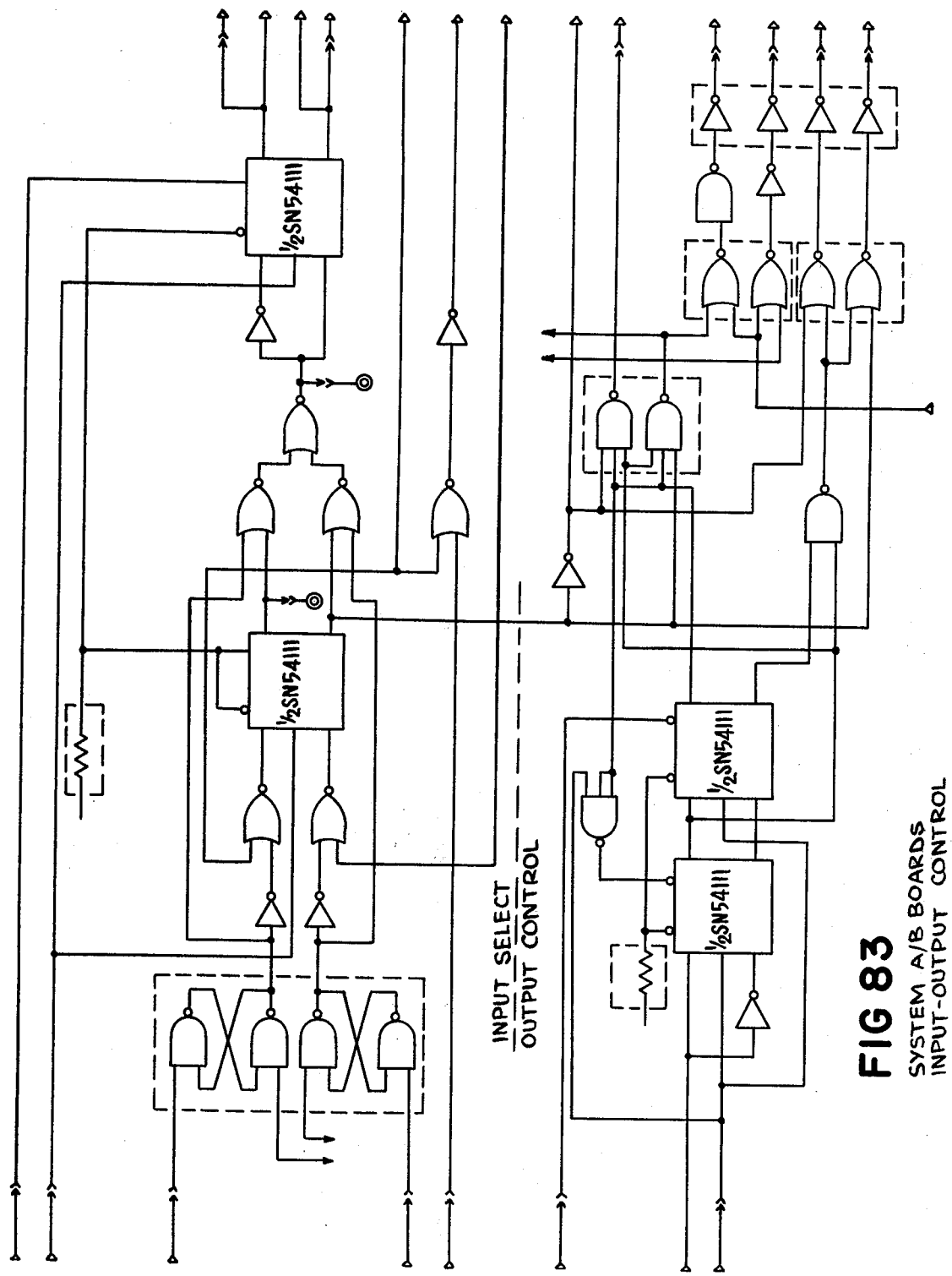

4.18 Output Control/Transmitter Select (FIG. 83)

The output control circuit is included on both System A and B logic boards. This circuit selects which transmitter (PCR and/or STT) is to transmit the data received from the output multiplexers.

The controlling signal is the DO line (para. 4.17) which when it goes low (DO = 1) signals that data should be transmitted. The DO line serves as an input to a two-stage J-K flip-flop circuit which delays the DO signal to produce the data lock (DLK1 or DLK2) and single word transmission (DT1 or DT2) pulses to the selected transmitter. Transmitter selection is achieved by gating the circuit with $\overline{Q}$ output of the Input Select circuit flip-flop which identifies which station, PCR or STT, has been selected (refer to para. 4.5). System A or B select lines are also gated to effect operation at the proper location (System A or B board).

DLK1 and DT1 lines serve the PCR transmitter, and DLK2 and DT2 lines serve the STT transmitter (refer to para. 4.19).

Figure 73:
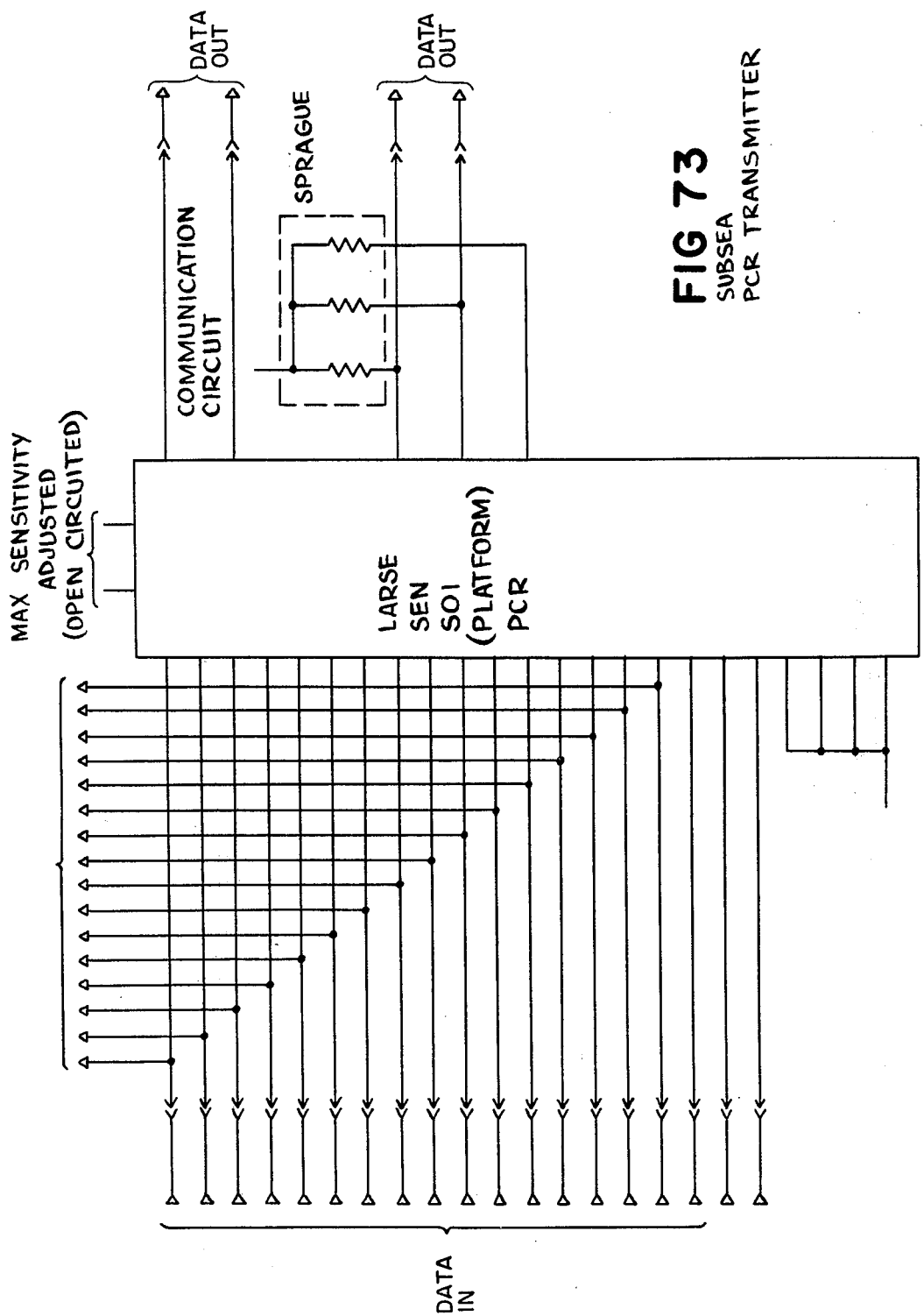
Figure 74:
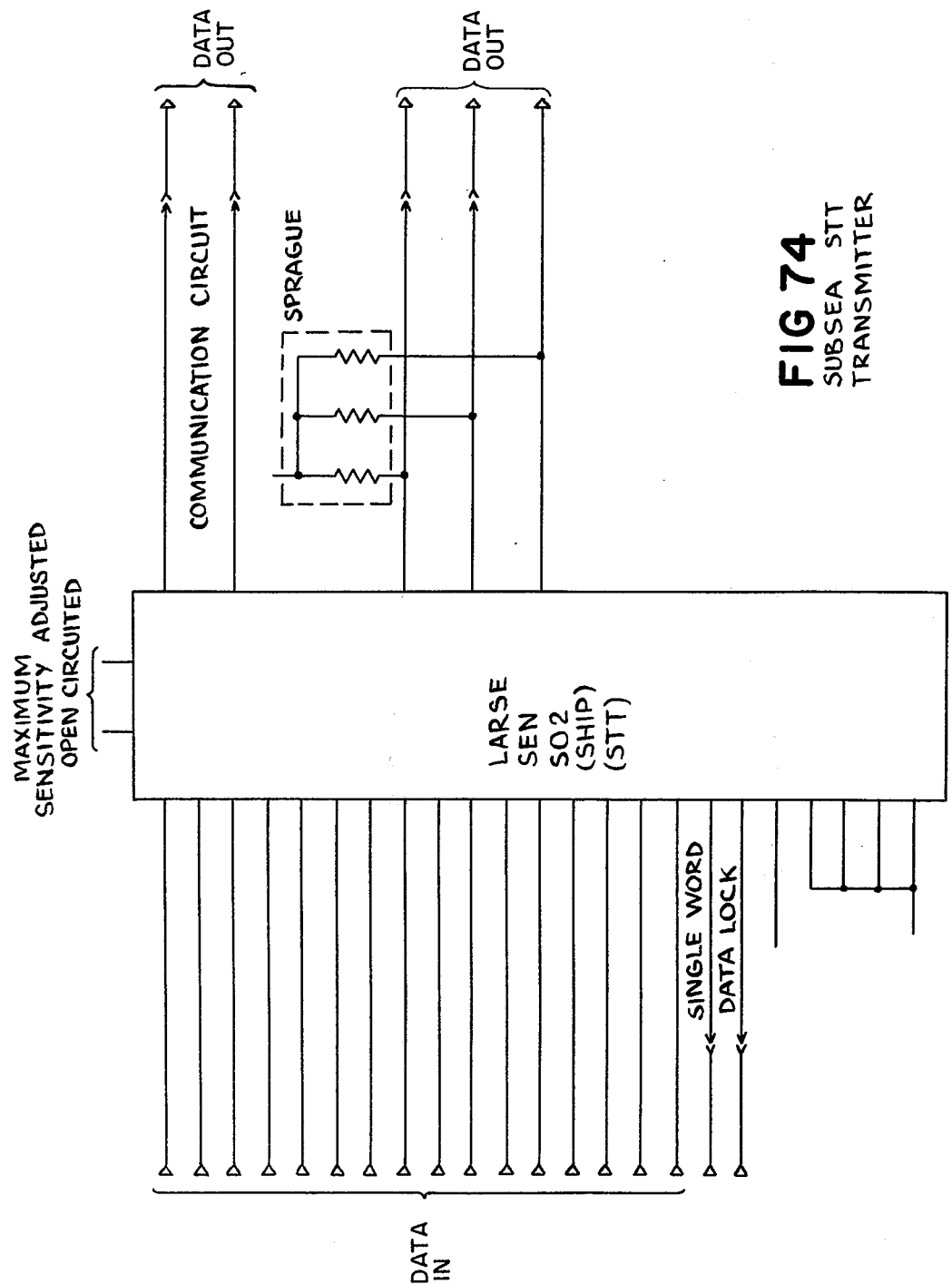

4.19 Transmitter (FIG. 73 and 74)

Two transmitters (SEN units) are included on each System A and B Transceiver Boards. One (SO1) is used to trnsmit data to the PCR Station and the other (SO2) to transmit data to the STT Station.

The transmitters operate in a single word transmission mode using a FSK tone output of 1620 Hz, center frequency (± 180 Hz) at a bit rate of 360 bps. The control and data input lines are driven by high voltage, open collector TTL buffers, which act as switch inputs to the transmitters, and the transmitted bit is High when the data input is Low (closed switch).

Single word transmission mode is effected when the data transmit input (line DT1 and DT2) goes High for a 40 μsec minimum time period. The transmitter then sends a total of 42 bits, 32 of which are normal word bits and 8 are conditioning bits to synchronize the PCR (STT) receivers. This bit arrangement makes up the LARSE security code. Refer to the LARSE Data Communicator Technical Manual in the component data section of this manual for a detail description of the SEN unit. After a single word transmission a quiescent period of 26 bit times is necessary prior to the next transmission.

The data-lock input, when Low (lines DLK1 or DLK2) transfers the data from the 16-data input lines into the hold memory for transmission. This Low period is 100 μsec minimum. The transfer occurs each time the line is pulsed.

The communication output circuit is routed to a hybrid circuit which connects to the subsea transmission line. The sensitivity of this output level is adjustable by an external resistor between pins 39 and 40. For resistance values from 100 to 50K ohms the output level sensitivity changes from −33 dbm to 0 dbm respectively.

Figure 96:
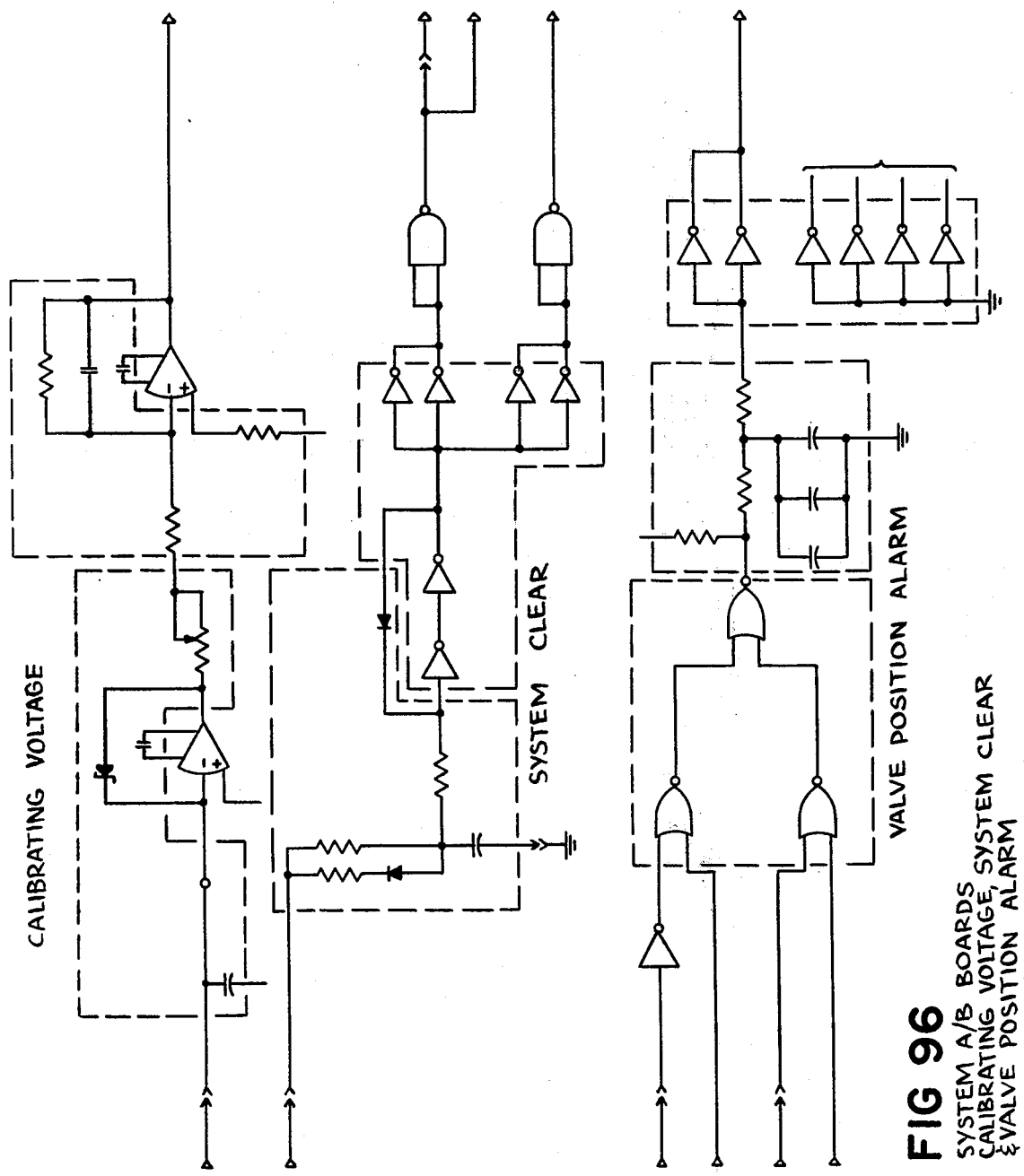

4.20 Alarm Subsystem (FIGS. 94 and 96)

The alarm subsystem is included on both System A and B boards and consists of the fixed level alarm circuits, the adjustable level set alarm circuits, and the valve position alarm circuit.

The fixed level alarm circuits consist of an LM211 comparator which has two inputs: One being the analog signal from the transducer output and the other being a fixed portion of the precision voltage supply (VCAL). The transducer signal is routed through a protective RC zener network which limits the voltage to 6.2 volts maximum and protects against voltage spikes. The LM211 is a voltage comparator which switches it output when the analog input level is the same as the fixed level. If the analog input is connected to the non-inverting input (+), the output will go high indicating a High alarm upon comparison. When connected to the inverting input (−), the output goes Low upon comparison thus indicating a Low alarm. The High and Low analogy is the reverse for the Low Oil Level alarm since a zero volt input corresponds to 100% full.

The fixed voltage level is set by the resistor network and represents the value at which the alarm is to occur. The resistor network is calculated from the following.

$$V \text{ alarm level} = \frac{(VCAL) \, (R2)}{R1 + R2}$$

where V alarm level = (alarm point in % of full range) (5.0V) Table IV-20 shows the alarm level voltage and resistor values for the fixed alarms. The output lines are routed directly to the output multiplexer.

TABLE IV-20

| RANGE | ALARM | FIXED ALARM LEVELS | | R1 | R2 | OUTPUT LINE |
|---|---|---|---|---|---|---|
| | | ALARM LEVEL | FIXED VOLTAGE | | | |
| 0-5000 PSIA | Annulus Press High | 2000 PSIA | 2V | 12.1K | 8.06K | DS2008 |
| 0-5000 PSIA | Main Hydraulic Press High | 3300 PSIA | 3.3V | 9.31K | 18K | DS2013 |
| 0-5000 PSIA | Main Hydraulic Press Low | 1250 PSIA | 1.25V | 12K | 4.02K | DS2014 |
| 100% to 0 | Oil Level Low | 25% | 3.75V | 4.99K | 15.0K | DS2113 |

The adjustable level alarm circuits function simularly to the fixed alarms, except the reference alarm level is set by the D/A converters rather than the VCAL voltage.

The D/A (digital-to-analog) converters receive 8-bits of data (2-BCD) from the two of eight 4-bit latches in the alarm level change circuit, refer to para. 4.7. As described in paragraph 4.7, two alarm level change words are transmitted to set the D/A converters. The first word sets the LSD of the analog output (input bits 5 thru 8) and the second the MSD of the analog output (input bits 1 thru 4). The D/A converters, then, have 2-BCD inputs with a resolution of 1%. Control timing is not necessary and each converter has its own internal reference voltage.

The output of each unit is a current output +1.6ma maximum, and is connected with a resistive load (604 ohms) to develop an output voltage of (1.6ma) (604)=0.9964V. This voltage generator serves as a low impedance voltage input to an OP Amp buffer. The output of the OP Amp is the voltage used for comparison by the LM211 comparators. The gain of the OP Amp is trimmed by a 500 ohm potentiometer and is set for an output voltage of 4.95 ± 0.1 volts when the converter 2-BCD input is 99 (corresponding to 99% alarm level setting at the PCR station). The output of the OP Amp (0 to 4.95) then tracks the 0 to 99% alarm level change settings at the PCR station.

The valve position alarm circuit, output line DS2204, goes High when either one of the following alarm conditions exist:

1. After the Master Valve had previously been commanded to close and the closed indication acknowledged; command the Master Valve to open but after approximately 12 seconds the acknowledgement (open status bit) is not high.

2. Command the Annulus Vent Valve to close but after 12 seconds the acknowledgement (closed status bit) is not high.

Lines CL10, DS2009 and CL09, DS2007 are NOR gated to a common NOR circuit whose output controls the output stage timing circuit. Normally, the output of the common NOR gate is high which causes the capacitors to charge to 5V through the 2K and 3M resistors. This maintains the output of the CMOS buffers low, line DS2204. When the common NOR gate output goes low, the capacitors discharge through the 3M resistor (RC = 16.2 seconds). After approximately 12 seconds, the capacitor voltage will be approximately 2.5 volts which causes the CMOS buffers to switch. Line DS2004 then goes high, indicating an alarm condition. If, however, the common NOR gate output goes back high before the 12 second period, the capacitors will again charge and line DS2204 is maintained low.

Therefore, for an alarm condition to exist, one of the inputs to the common NOR gate must go high and stay high for a 12 second minimum period.

For the Master Valve open position alarm, CL10 = 1 for Open Command and DS2009 = 1 for open status. When previously command and acknowledged closed, CL10 = 0 and DS2009 = 0. With line CL10 inverted, this sets the output of its NOR gate to zero (low). When a command to open is received CL10 goes high and the NOR output goes high. The output will go low again when the DS2009 line goes high (Master Valve closed). If the later action does not occur within the 12 second period the alarm will sound.

For the Annulus Vent Valve close position alarm the NOR circuit action is the same, where CL09 = 0 for a closed command and DS2007 = 1 for a closed status.

4.21 System Clear (FIG. 96)

The system clear circuit is located on both System A and B boards. The circuit is used to insure that, when power is applied to the Telecom capsule, the system logic will start in the proper state. Clear lines CLR1 and CLR2 are provided which remain low for approximately 1.5 seconds after power is turned on. These lines are routed to the clear input of the final stage J-K flip-flop in the Input Select Circuit and to the master reset inputs of the Alarm Level Confirm circuit second stage storage latches, the Alarm Level Selector 4-bit output latches; and the Control/Confirm/Execute Acknowledge circuit storage latches. These devices are disables, with all outputs low, during the 1.5 second timing period.

The circuit consists of an RC network, CMOS hex buffers and 2-input NAND gates. Upon application of power (VCC), CLR1 and CLR2 lines are low and the capacitor charges through the 2M resistor (RC = 2 seconds). At approximately 1.5 seconds the capacitor is charged to 2.5 volts. This causes the output of the first CMOS buffer to switch from high to low which in turn causes output lines CLR1 and CLR2 to go high. Upon removal of power or if the power is reduced abruptly, the capacitor is quickly discharged (approx 150 μsec) through the 1N448 diode and 51 ohm resistor. The reverse diode, across the first two CMOS buffers, assures positive switching action.

4.22 Control Output System Clear (FIG. 105)

The control output system clear circuit, located on the common logic board, serves as the reset circuit for the Control Output Registers, Down Hole Safety Valve Control and Choke Position Counter. The circuit performs two functions:

1. To insure that the logic starts in the proper state when power is applied to the Telecom capsule. Upon application of power, line CLR0 stays low for approximately 1.5 seconds. Line CLR0 serves as the master reset input to the control output registers, DHSV control and choke position counter. When Low, the output of the control circuits are maintained Low which corresponds to all Off commands. The counter outputs are also maintained Low which sets the initial Choke Position display to 000. This precludes the possibility of random On/Off control outputs and choke position display. The 1.5 second time period is determined by the 1.2M and 4.4 mfd resistor capacitor network. The capacitors will charge to 2.5 volts in approximately 1.5 seconds. At that time the CMOS buffers will switch and line CLR0 will go from Low to High removing the reset command.

2. If the VCO supply should drop below 4.2 volts during normal operation, the cicuit will switch and line CLR0 will go Low. This affords fail safe operation in that all control outputs would be switched to the Off position. The choke position counters would also be reset to zero. If the VCO supply dip is momentary (300 μsec minimum), the CLR0 line will be maintained Low for approximately 1 to 2 seconds. This action is controlled by the two transistors and second RC network. Normally the MHQ2906 transistor is held off when VCO is greater 4.2 volts. If the voltage drops below 4.2 volta the 1 ufd capacitor will start to discharge causing the base-to-emitter difference potential of the MHQ2906 to be negative. This causes the HHQ2906 to start conduct and in turn switches on the MHQ2222 which fully discharges the 1 ufd capacitor thru the 10 ohm resistor. MHQ2906, then, fully turns on causing the 4.4 ufd capacitors to discharge through the 196 ohm resistor transistors. When the discharge voltage is approximately 2.5 volts, the CMOS buffers switch and line CLR0 goes Low.

Having described the invention, we claim as new and desire to be secured by Letters Patent, the following:

1. In a system for the remote monitoring and controlling of functions of subsea oil/gas production equipment wherein a control station generates a plurality of coded signals for transmission to first and second remote stations for the monitoring and control of the production equipment, said control station comprising
    selection means for selecting either the first or the second remote stations for the control of the production equipment, said first remote control station having dominant control with respect to said second remote control;
    control means for generating an address and control digital signal for transmission to the selected remote station for a selected function thereat;
    alarm level adjustment means for generating an alarm level digital signal for transmission to the selected remote station for selecting a predetermined alarm level for a predetermined function;
    first multiplexing means coupled to said control and alarm means and operable for forming one of said coded signals from both said address and control signal and said alarm level signal and operable for multiplexing said plurality of coded signals for transmission to the selected remote station;
    priority selection means operable to receive said one coded signal from said first multiplexing means for storing said one coded signal in accordance with a predetermined signal priority arrangement;
    second multiplexing means for the selective demultiplexing of a received coded signal from the selected remote station to obtain a coded signal in a time slot allocated to said one coded signal;
    comparator means operable for receiving and comparing said received coded signal in the time slot allocated to said one coded signal with said one signal and operable to produce a set signal for a match therebetween;
    execute control means for generating an execute digital signal when said set signal and a predetermined signal are coupled therein;
    coupling means for coupling said execute digital signal to said first multiplexer means for incorporation into said one coded signal for transmission; and
    monitor means for providing monitoring information to said second remote station when said first remote station has been selected.

2. The system as claimed in claim 1, further comprising a display means coupled to said comparator and responsive to said set signal to show a confirmation of a match in said comparator means and to indicate said selected function.

3. The system as claimed in claim 1, wherein said first multiplexing means comprises a digital buffer means for processing digital signals coupled into said first multiplexing means.

4. The system as claimed in claim 1, wherein said comparator comprises a buffer means for processing digital signals coupled into said comparator means.

5. The system as claimed in claim 1, wherein said control means comprises digital means for generating address and control digital signals in response to a predetermined command input signal and a command scanning means for scanning said command input signals to determine said predetermined command input to generate the corresponding address and control digital signal.

6. The system as claimed in claim 1, wherein said alarm level adjustment means is continuously variable over a predetermined range of values.

7. The system as claimed in claim 1, further comprising a decoder means operable to receive address digital signals from said comparator means and receive digital signals from said second multiplexing means to form display data.

8. The system as claimed in claim 1, wherein said execute control means is coupled to said priority selecter means for sequentially selecting signals therein in the order of priority.

9. A control system for the remote monitoring and controlling of functions of subsea oil/gas production equipment wherein a control station generates a plurality of coded signals for transmission to first and second remote station for the monitoring and control of the production equipment, said control station comprising
    selection means for selecting either the first or the second remote stations for the control of the production equipment, said first remote control station having dominant control with respect to said second remote control;
    control means for generating an address and control digital signal for transmission to the selected remote station for a selected function thereat;
    alarm level adjustmemt means for generating an alarm level digital signal for transmission to the selected remote station for selecting a predetermined alarm level for a predetermined function;
    first multiplexing means coupled to said control and alarm means and operable for forming one of said coded signals from both said address and control signal and said alarm level signal and operable for multiplexing said plurality of coded signals for transmission to the selected remote station;
    priority selection means operable to receive said one coded signal from said first multiplexing means for storing said one coded signal in accordance with a predetermined sgnal priority arrangement;
    second multiplexing means for the selective demultiplexing of a received coded signal from the selected remote station to obtain a coded signal in a time slot allocated to said one coded signal;

comparator means operable for receiving and comparing said received coded signal in the time slot allocated to said one coded signal with said one signal and operable to produce a set signal for a match therebetween;

execute control means for generating an execute digital signal when said set signal and a predetermined signal are coupled therein;

coupling means for coupling said execute digital signal to said first multiplexer means for incorporation into said one coded signal for transmission; and monitor means for providing monitoring information to said second remote station when said first remote station has been selected.

10. The system as claimed in claim 9, further comprising a display means coupled to said comparator and responsive to said set signal to show a confirmation of a match in said comparator means and to indicate said selected function.

11. The system as claimed in claim 9, wherein said first multiplexing means comprises a digital buffer means for processing digital signals coupled into said first multiplexing means.

12. The system as claimed in claim 9, wherein said comparator comprises a buffer means for processing digital signals coupled into said comparator means.

13. The system as claimed in claim 1, wherein said control means comprises digital means for generating address and control digital signals in response to a predetermined command input signal and a command scanning means for scanning said command input signals to determine said predetermined command input to generate the corresponding address and control digital signal.

14. The system as claimed in claim 9, wherein said alarm level adjustment means is continuously variable over a predetermined range of values.

15. The system as claimed in claim 9, further comprising a decoder means operable to receive address digital signals from said comparator means and receive digital signals from said second multiplexing means to form display data.

16. The system as claimed in claim 9, wherein said execute control means is coupled to said priority selecter means for sequentially selecting signals therein in the order of priority.

* * * * *